US012032803B2

(12) United States Patent
Pastrana Vicente et al.

(10) Patent No.: US 12,032,803 B2
(45) Date of Patent: Jul. 9, 2024

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Israel Pastrana Vicente, Spring, TX (US); William A. Sorrentino, III, Mill Valley, CA (US); Stephen O. Lemay, Palo Alto, CA (US); Jeffrey M. Faulkner, Sisters, OR (US); Kristi E. S. Bauerly, Los Altos, CA (US); Peter D. Anton, Portola Valley, CA (US); Alan C. Dye, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/481,187

(22) Filed: Sep. 21, 2021

(65) Prior Publication Data

US 2022/0091722 A1 Mar. 24, 2022

Related U.S. Application Data

(60) Provisional application No. 63/082,354, filed on Sep. 23, 2020.

(51) Int. Cl.
G06F 3/04815 (2022.01)
G06F 3/01 (2006.01)
G06T 19/00 (2011.01)

(52) U.S. Cl.
CPC .......... *G06F 3/04815* (2013.01); *G06F 3/012* (2013.01); *G06F 3/017* (2013.01); *G06T 19/003* (2013.01); *G06T 19/006* (2013.01)

(58) Field of Classification Search
None
See application file for complete search history.

(56) References Cited

U.S. PATENT DOCUMENTS 10,481,755 B1   11/2019   Ngo et al.
11,096,006 B1   8/2021    Robinson
(Continued)

FOREIGN PATENT DOCUMENTS

EP   3361352 A1      8/2018
JP   2002073246 A    3/2002
(Continued)

OTHER PUBLICATIONS

Invitation to Pay Additional Fees, dated Jan. 10, 2022, received in International Patent Application No. PCT/US2021/051498, which is in correspondence with U.S. Appl. No. 17/481,187, 12 pages.
(Continued)

*Primary Examiner* — Yi Wang
(74) *Attorney, Agent, or Firm* — Morgan, Lewis & Bockius LLP

(57) ABSTRACT

A computer system displays a first view of a three-dimensional environment. While displaying the first view, the computer system detects a first movement of a first hand that meets first criteria, and in response, displays a first virtual object that includes a first plurality of selectable controls at a first position in the first view, wherein the first position corresponds to a location of the first hand after the first movement in a physical environment. While displaying the first virtual object at the first position, the computer system detects a second movement of the first hand, and in response, displays movement of a representation of the first hand in the first view in accordance with the second movement of the first hand relative to a position of the first virtual object in the first view.

30 Claims, 28 Drawing Sheets

(56) References Cited

U.S. PATENT DOCUMENTS

| | | | |
|---|---|---|---|
| 2012/0139935 A1 | 6/2012 | Miyasaka et al. | |
| 2012/0194554 A1 | 8/2012 | Kaino et al. | |
| 2012/0257035 A1 | 10/2012 | Larsen | |
| 2014/0282105 A1 | 9/2014 | Nordstrom | |
| 2014/0292665 A1 | 10/2014 | Lathrop et al. | |
| 2014/0313119 A1 | 10/2014 | Cho et al. | |
| 2017/0109936 A1 | 4/2017 | Powderly et al. | |
| 2017/0329404 A1* | 11/2017 | Keskin | G06F 3/015 |
| 2017/0357398 A1 | 12/2017 | Alonso-Ruiz | |
| 2018/0066956 A1 | 3/2018 | Kim et al. | |
| 2018/0286070 A1 | 10/2018 | Benedetto | |
| 2018/0292906 A1* | 10/2018 | Kato | H04N 5/74 |
| 2019/0182355 A1 | 6/2019 | Clement et al. | |
| 2020/0004321 A1 | 1/2020 | Kawano | |
| 2020/0051335 A1 | 2/2020 | Antypov | |
| 2020/0142475 A1 | 5/2020 | Paez et al. | |
| 2020/0233485 A1 | 7/2020 | Chan et al. | |
| 2020/0387228 A1* | 12/2020 | Ravasz | G06F 3/04842 |
| 2021/0158715 A1 | 5/2021 | Kim | |
| 2022/0101593 A1 | 3/2022 | Rockel et al. | |
| 2022/0214743 A1 | 7/2022 | Dascola et al. | |
| 2023/0143827 A1 | 5/2023 | Rockel et al. | |
| 2023/0147148 A1 | 5/2023 | Rockel et al. | |
| 2024/0177403 A1 | 5/2024 | Rockel et al. | |

FOREIGN PATENT DOCUMENTS

| | | |
|---|---|---|
| JP | 2011-170682 A | 9/2011 |
| JP | 2013025369 A | 2/2013 |
| JP | 2015-118332 A | 6/2015 |
| KR | 20190092141 A | 8/2019 |
| WO | WO 2019/067470 A1 | 4/2019 |

OTHER PUBLICATIONS

International Search Report and Written Opinion, dated Mar. 3, 2022, received in International Patent Application No. PCT/US2021/051498, which is in correspondence with U.S. Appl. No. 17/481,187, 42 pages.

Invitation to Pay Additional Fees, dated Jan. 27, 2022, received in International Patent Application No. PCT/US2021/052027, which corresponds with U.S. Appl. No. 17/483,730, 14 pages.

Ballendat et al., "Proxemic Interaction: Designing for a Proximity and Orientation-Aware Environment", Dept. of Computer Science, University of Calgary, 2500 University Drive NW, Calgary, AB, T2N, IN4, Canada, Nov. 7, 2010, 10 pages.

International Search Report and Written Opinion, dated Mar. 22, 2022, received in International Patent Application No. PCT/US2021/052027, which corresponds with U.S. Appl. No. 17/483,730, 38 pages.

International Search Report and Written Opinion, dated Apr. 26, 2022, received in International Patent Application No. PCT/US2021/065537, which corresponds with U.S. Appl. No. 17/563,864, 19 pages.

Notice of Allowance, dated Sep. 8, 2022, received in U.S. Appl. No. 17/483,730, 10 pages.

Office Action, dated Aug. 3, 2023, received in U.S. Appl. No. 17/563,864, 16 pages.

Notice of Allowance, dated Jun. 28, 2023, received in U.S. Appl. No. 18/091,154, 10 pages.

Notice of Allowance, dated Nov. 22, 2023, received in U.S. Appl. No. 17/563,864, 9 pages.

Office Action, dated Jun. 23, 2023, received in U.S. Appl. No. 18/091,119, 8 pages.

Notice of Allowance, dated Oct. 2, 2023, received in U.S. Appl. No. 18/091,119, 9 pages.

Office Action, dated Feb. 28, 2024, received in Japanese Patent Application No. 2023-515647, which corresponds with U.S. Appl. No. 17/483,730, 8 pages.

Ni, "A Survey of Large High-Resolution Display Technologies, Techniques, and Applications", Dept. of Computer Science, University of California, Jan. 4, 2006, 12 pages.

Office Action, dated May 28, 2024, received in European U.S. Appl. No. 17/483,730, which corresponds with U.S. Appl. No. 17/483,730, 13 pages.

\* cited by examiner

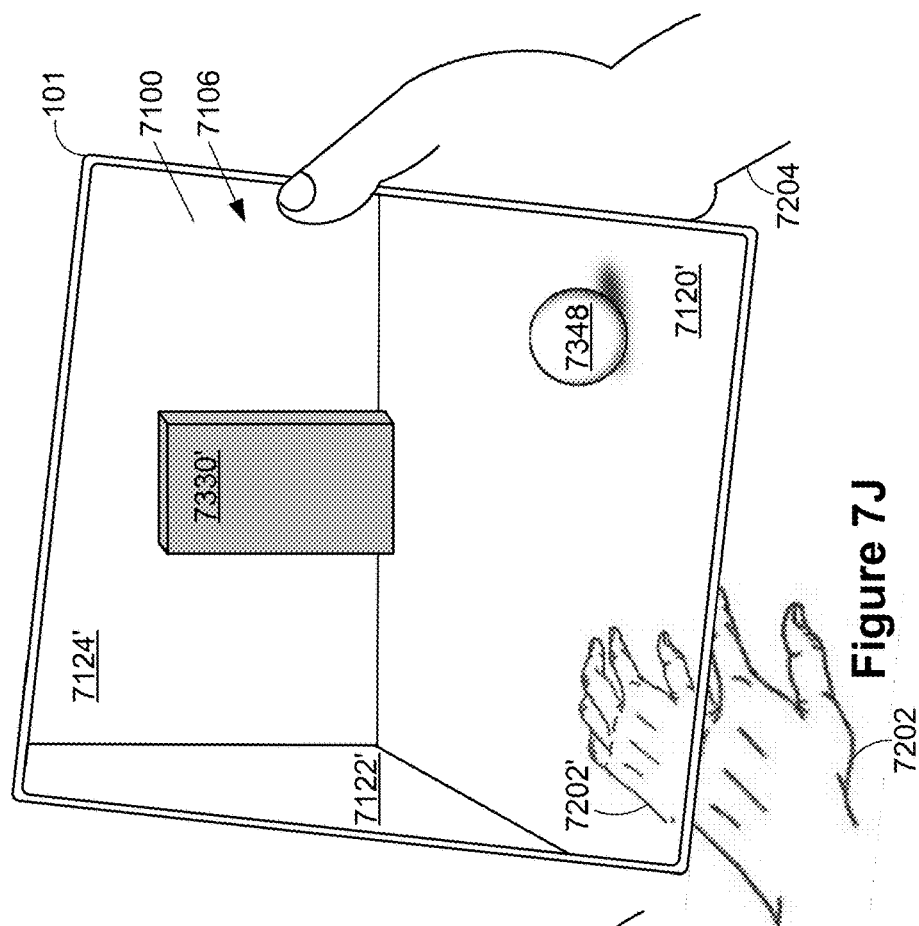
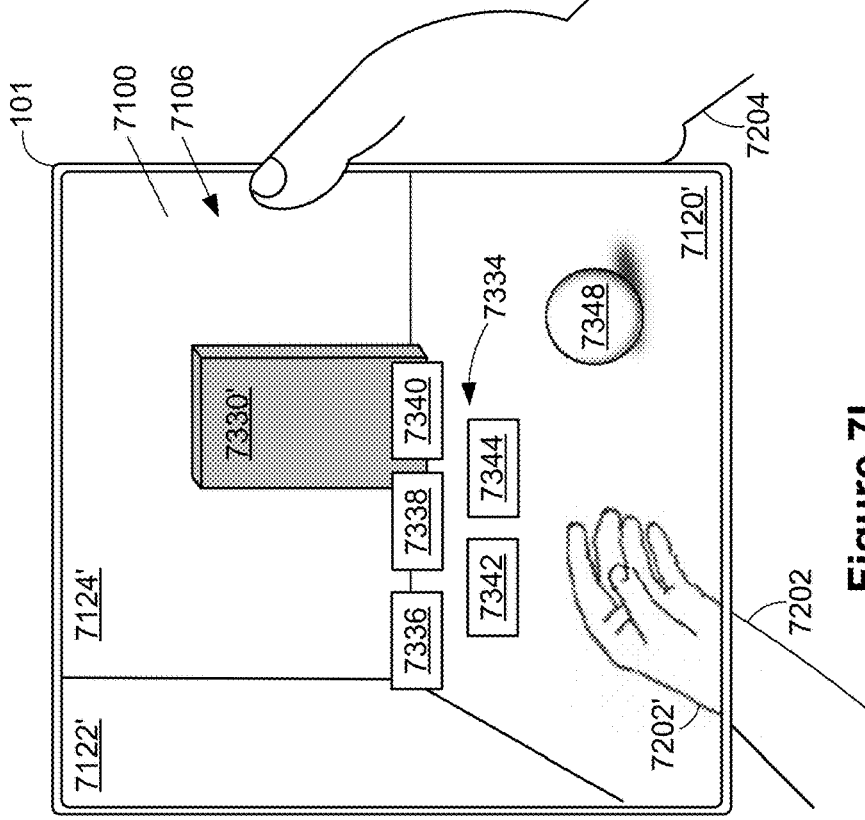
Figure 7I
Figure 7J

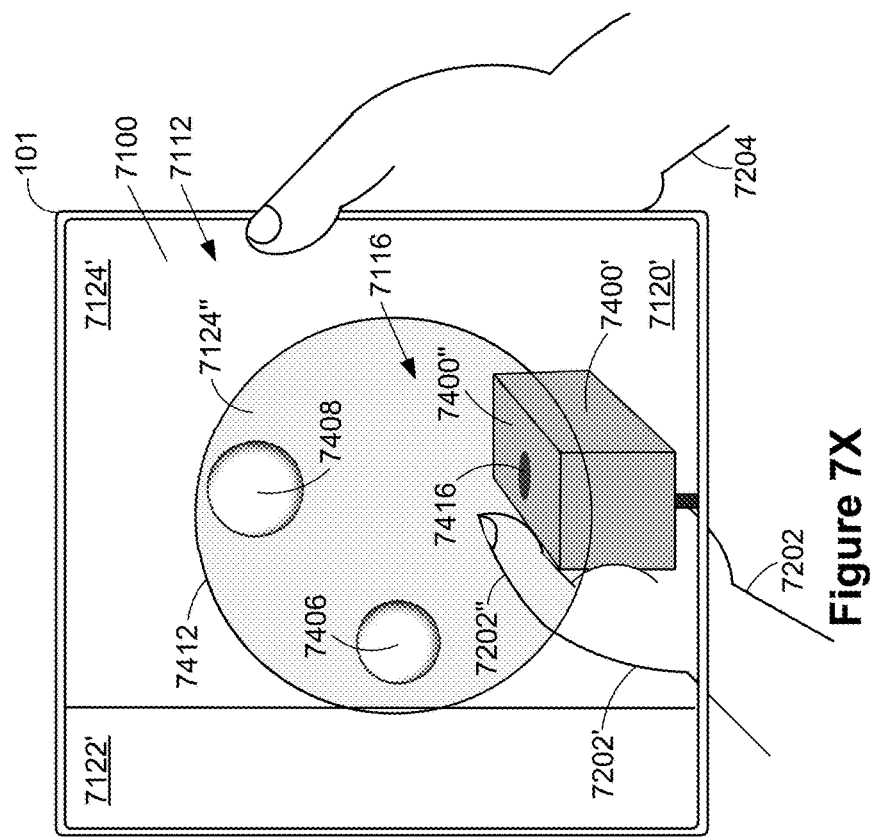
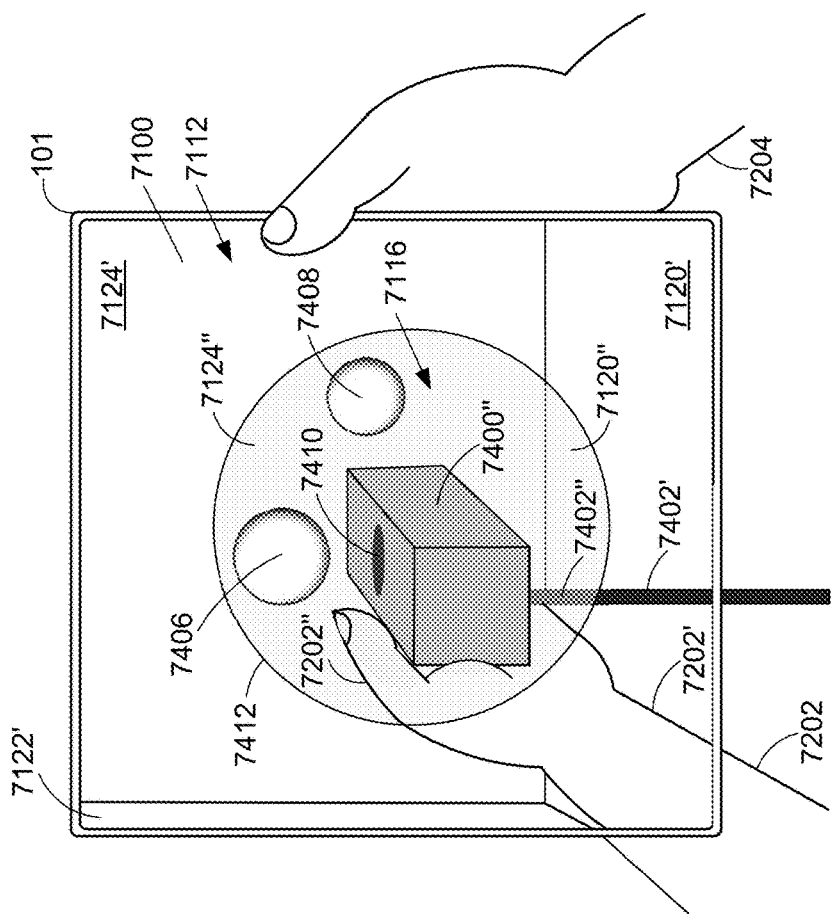
Figure 7X
Figure 7W

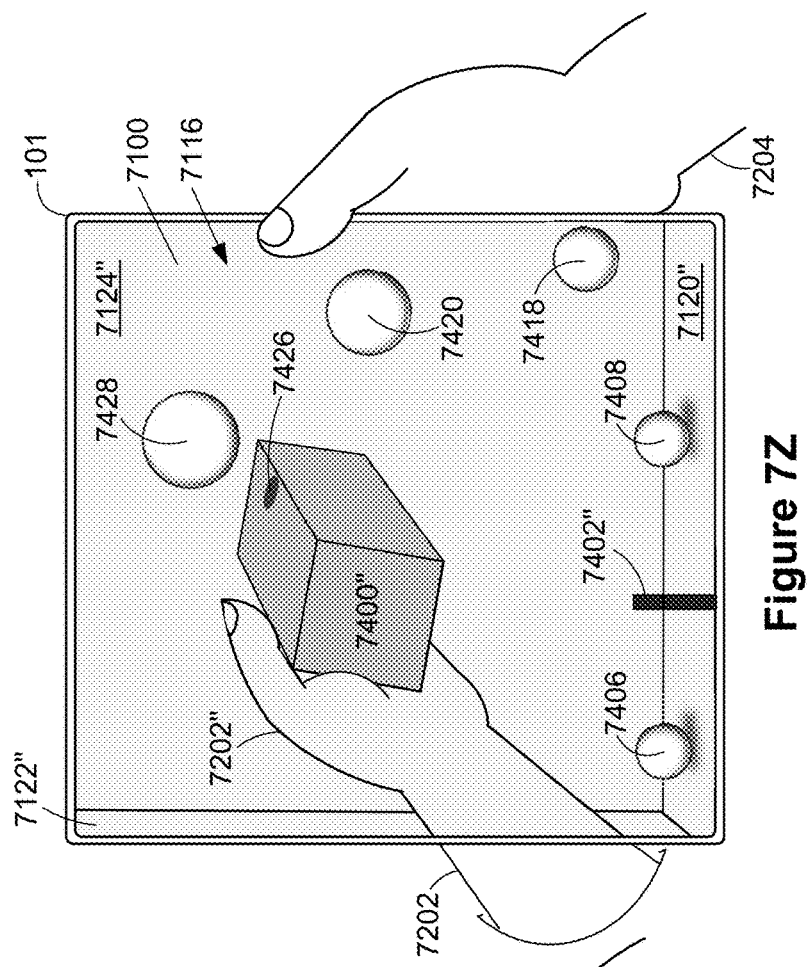
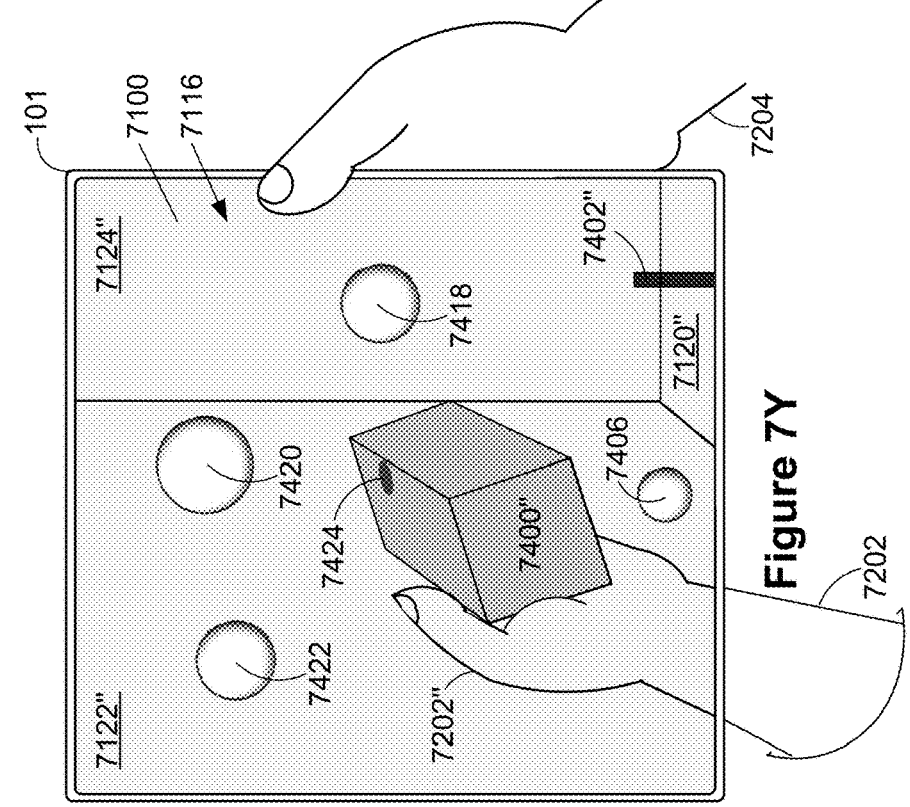

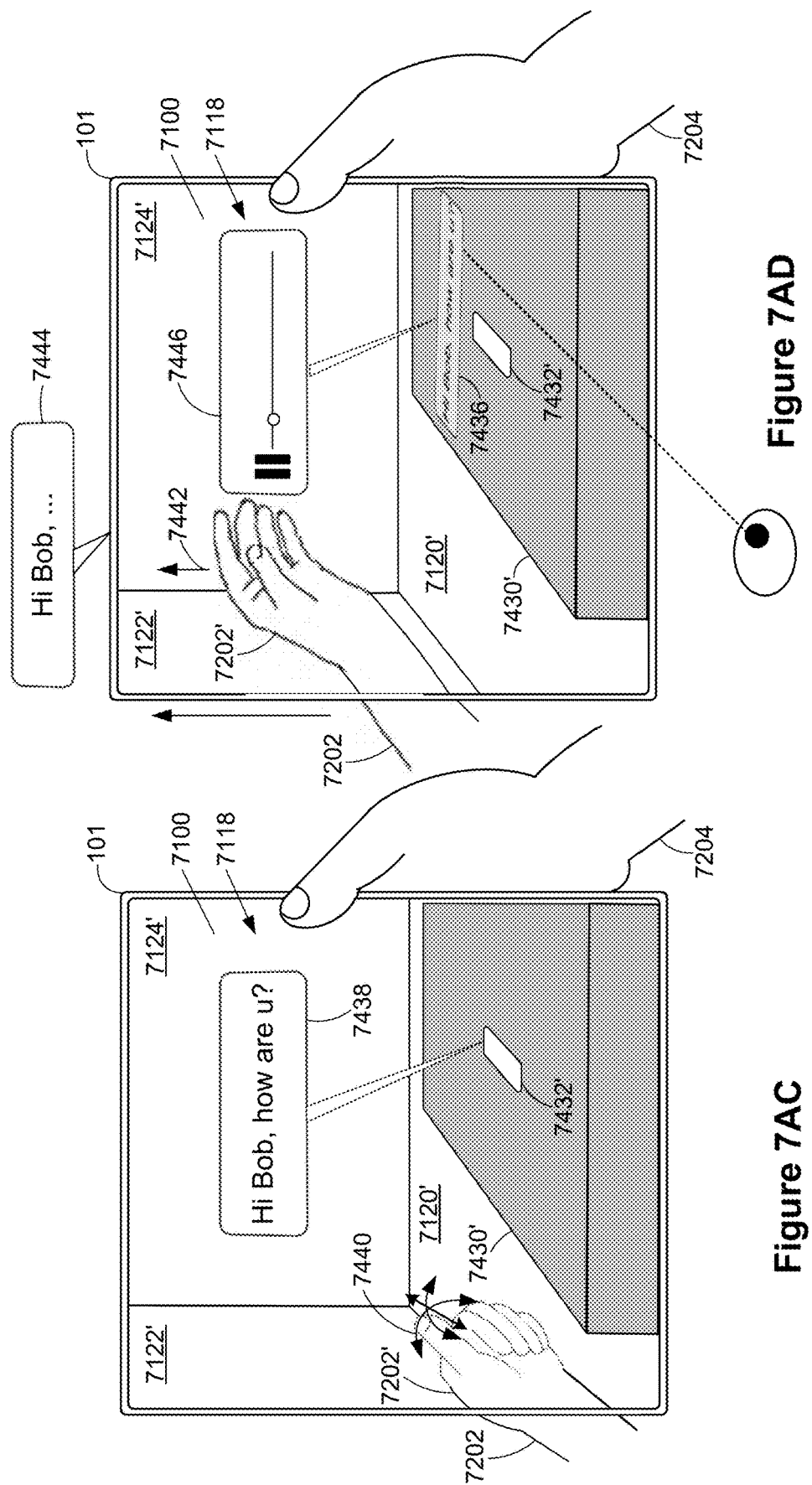

DEVICES, METHODS, AND GRAPHICAL USER INTERFACES FOR INTERACTING WITH THREE-DIMENSIONAL ENVIRONMENTS

RELATED APPLICATIONS

This application claims priority to U.S. Provisional Patent Application 63/082,354, filed Sep. 23, 2020, which is incorporated by reference in its entirety.

TECHNICAL FIELD

This disclosure relates generally to computer systems with a display generation component and one or more input devices that provide computer generated reality (CGR) experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. The above deficiencies and other problems associated with user interfaces for computer systems with a display generation component and one or more input devices are reduced or eliminated by the disclosed systems, methods, and user interfaces. Such systems, methods and interfaces optionally complement or replace conventional systems, methods, and user interfaces for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

In accordance with some embodiments, a method is performed at a computer system that is in communication with a display generation component and one or more cameras, including: displaying, via the display generation component, a user interface object, wherein displaying the user interface object includes concurrently displaying: a first region that displays respective representations of one or more of a plurality of items in a set of items, and a second region that corresponds to an index of the set of items, wherein a respective index item in the index corresponds to a respective subset, less than all, of the plurality of items in the set of items; while displaying the user interface object, detecting, by the one or more input devices, a first input of a first type; and in response to detecting the first input of the first type: in accordance with a determination that a detected gaze is directed to the first region, performing a first navigation operation that includes navigating through the respective representations of the plurality of items by a first amount; and in accordance with a determination that the detected gaze is directed to the second region, performing a second navigation operation that includes navigating through the respective representations of the plurality of items by a second amount that is greater than the first amount.

In accordance with some embodiments, a method is performed at device computing system that is in communication with a display generation component and one or more input devices, including: displaying, via the display generation component, a first view of at least a portion of a three-dimensional environment; while the first view of at least the portion of the three-dimensional environment is being displayed, detecting a first movement of a first hand that meets first criteria; in response to the detecting the first movement of the first hand that meets the first criteria, displaying, via the display generation component, a first virtual object that includes a first plurality of selectable controls at a first position in the first view of at least the portion of the three-dimensional environment, wherein the first position corresponds to a location of the first hand after the first movement in a physical environment; while displaying, via the display generation component, the first virtual object at the first position, detecting a second movement of the first hand; and in response to detecting the second movement of the first hand, displaying movement of a representation of the first hand in the first view of at least the portion of the three-dimensional environment in accordance with the second movement of the first hand relative to a position of the first virtual object in the first view of at least the portion of the three-dimensional environment.

In accordance with some embodiments, a method is performed at device computing system that is in communication with a display generation component and one or more input devices, including: receiving a request to display, via the display generation component, a view of a three-dimensional environment that corresponds to a physical environment in a field of view of the display generation component; and in response to detecting the request to display the view of the three-dimensional environment: in accordance with a determination that a preset first portion of the physical environment is associated with a virtual menu and that the field of view of the display generation component includes the preset first portion of the physical environment, displaying the virtual menu at a position in the three-dimensional environment corresponding to the preset first portion of the physical environment; and in accordance with a determination that the preset first portion of the physical environment is associated with the virtual menu and that the field of view of the display generation component does not include the preset first portion of the physical environment, forgoing display of the virtual menu in the view of the three-dimensional environment.

In accordance with some embodiments, a method is performed at device computing system that is in communication with a display generation component and one or more input devices, including: displaying, by the display generation component, a first object at a first position in a view of at least a portion of a three-dimensional environment, wherein the first position corresponds to a first location in the three-dimensional environment; while gaze is directed toward the first location in the three-dimensional environment, displaying at least a first control at a second position in the view of the at least the portion of the three-dimensional environment, wherein the first control, when activated, performs a first operation corresponding to the first object, and wherein the second position corresponds to a second location in the three-dimensional environment that is a first distance away from the first location; while displaying at least the first control at the second position in the view of the at least the portion of the three-dimensional environment, detecting movement of the gaze away from the first location in the view of the three-dimensional environment; and, in response to detecting the movement of the gaze away from the first location in the view of the three-dimensional environment, in accordance with a determination that the gaze has moved outside of a region of the three-dimensional environment that corresponds to the first object and the first control, moving at least the first control from the second position to a third position in the view of the at least the portion of the three-dimensional environment, wherein the third position corresponds to a third location in the three-dimensional environment that is at a second distance away from the first location that is less than the first distance.

In accordance with some embodiments, a method is performed at device computing system that is in communication with a display generation component and one or more input devices, including: displaying, via the display generation component, a view of a first portion of a three-dimensional environment and at least a first selectable virtual object that corresponds to a first computer-generated experience; while displaying the view of the first portion of the three-dimensional environment, detecting, by the one or more input devices, a first input directed to the first virtual object that meets first criteria; in response to detecting the first input directed to the first virtual object that meets the first criteria, starting a preview of the first computer-generated experience, wherein a spatial extent of the preview of the first computer-generated experience includes a first portion of the preview of the first computer-generated experience within the view of the first portion of the three-dimensional environment and at least a second portion of the preview of the first computer-generated experience outside of the view of the first portion of the three-dimensional environment; while displaying the first portion of the preview of the first computer-generated experience within the view of the first portion of the three-dimensional environment, detecting relative movement of at least a portion of the computer system and at least a portion of a physical environment surrounding the portion of the computer system; in response to detecting the relative movement of the portion of the computer system and the at least the portion of the physical environment: displaying a view of a second portion of the three-dimensional environment in accordance with the relative movement of at least the portion of the computer system and at least the portion of the physical environment; and displaying the second portion of the preview of the first computer-generated experience in the view of the second portion of the three-dimensional environment, the second portion of the preview not having been displayed prior to detecting the relative movement of at least the portion of the computer system and at least the portion of the physical environment; while displaying at least a portion of the preview of the first computer-generated experience, detecting a second input that meets second criteria, and in response to detecting the second input that meets the second criteria, displaying a view of the first computer-generated experience that occupies a greater spatial extent of the view of the three-dimensional environment than was occupied by the preview of the first computer-generated experience.

In accordance with some embodiments, a method is performed at device computing system that is in communication with a display generation component and one or more input devices, including: displaying, by the display generation component, a view of at least a portion of a three-dimensional environment and a representation of an electronic device at a position in the view of the at least the portion of the three-dimensional environment that is determined based on a location of the electronic device a physical environment corresponding to the three-dimensional environment; while displaying the view of the at least the portion of a three-dimensional environment including the representation of the electronic device, receiving an indication that a notification has been generated at the electronic device; and in response to receiving the indication, displaying, within the view of the at least the portion of the three-dimensional environment, a first representation of the notification, including: in accordance with a determination that the electronic device is located at a first location in the physical environment, displaying the first representation of the notification at a first position in the portion of the three-dimensional environment, wherein the first position is selected to have a predetermined location relative to the representation of the electronic device; and in accordance with a determination that the electronic device is located at a second location in the physical environment that is different from the first location, displaying the first representation of the notification at a second position in the portion of the three-dimensional environment that is different from the first position, wherein the second position is selected to have the predetermined location relative to the representation of the electronic device.

In accordance with some embodiments, a computer system includes or is in communication with a display generation component (e.g., a display, a projector, a head-mounted display, etc.), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's use of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7E-7J are block diagrams illustrating display and interaction with a user interface object (e.g., a dock, a menu, an app tray, a control panel, a virtual three-dimensional object, etc.) in a three-dimensional environment in response to inputs involving movements of a user's hand, in accordance with some embodiments.

FIGS. 7U-7Z are block diagrams illustrating displaying a three-dimensional preview of a computer-generated experience (e.g., a preview with a spatial extend that is greater than the displayed portion of the preview) in response to first interaction with an object (e.g., a virtual object, a representation of a physical object, a physical object, etc.), before transitioning to displaying the computer-generated experience in response to additional input, in accordance with some embodiments.

FIGS. 7AA-7AD are block diagrams illustrating displaying a representation of a notification in a three-dimensional environment at a position that has a predetermine spatial relationship (e.g., location, orientation, distance, etc.) relative to a representation of an electronic device (e.g., the electronic device at which the notification was generated or received), in accordance with some embodiments.

DESCRIPTION OF EMBODIMENTS

Figure 1:
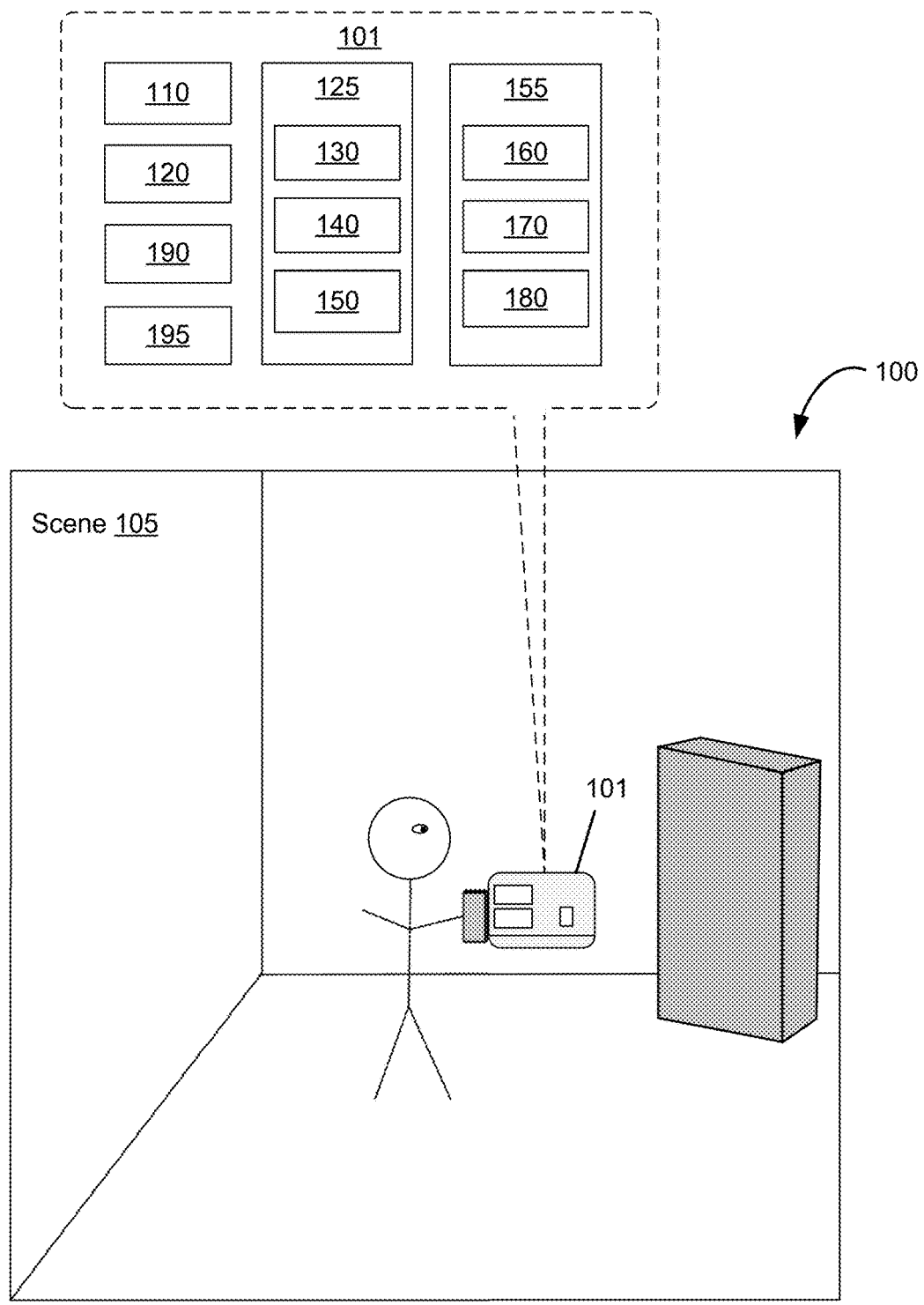
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein improve user interface interactions with virtual/augmented reality environments in multiple ways.

In some embodiments, a computer system displays a set of indexed items in a user interface in a three-dimensional environment and allows the user to navigate through the set of indexed items in the user interface using one or more navigation inputs (e.g., scrolling gestures, touch gestures, etc.). The computer system allows the user to control the navigation amount by moving their gaze relative to the user interface (e.g., from a data region where representations of individual indexed items are displayed and scrolled, to an index region that is associated with an index of the indexed items) in the three-dimensional environment. In some embodiments, when the user's gaze is directed to the index region, a larger amount of navigation (e.g., navigation through a first number of items) through the indexed items in the data region is achieved by a navigation input, as compared with that achieved when the user's gaze is directed to the data region (e.g., navigation through a second number of items smaller than the first number of items). In some embodiments, the navigation input does not involve the user raising his whole hand to a location that corresponds to the position of the user interface in the three-dimensional environment. For example, in some embodiments, the navigation input involves small movements of one part of a hand relative to another part of the hand while the whole hand is not raised up (e.g., resting on the table, lowered on the side of the user's body, resting on the user's lap, etc.). In some embodiments, the index region of the user interface is selected and, optionally, activated to display the index, by the user's gaze directed to a portion of the user interface that is associated with the index. In some embodiments, the amount of navigation that is achieved is further based on the characteristics of the navigation input. Using the user's gaze in conjunction with a navigation input to adjust the amount of navigation through a set of indexed items in a user interface provides an efficient and lightweight way of navigating through a set of indexed items, and reduces the number, extent, and/or nature of the inputs from a user to achieve a desired outcome, thereby creating a more efficient human-machine interface.

In some embodiments, the computer system displays a virtual object that includes multiple selectable controls (e.g., application icons for launching applications, menu options for displaying submenus or performing operations, selectable objects for triggering performance application functions, device functions, adjustment of device settings, etc.) in a three-dimensional environment (e.g., a virtual environment, an augmented reality environment, etc.) in response to a user input that includes movement of a user's hand that meets preset criteria (e.g., dock display criteria, menu display criteria, etc.). The computer system selects the initial position of the virtual object based on the location of the user's hand at the conclusion of the movement that met the preset criteria. Accordingly, the user can influence the initial position of the virtual object in the three-dimensional environment by choosing the location of his/her hand when providing the required movement of the hand to trigger display of the virtual object. Subsequently, the computer system decouples the position of the virtual object from the location of the user's hand, so that the user can use the same hand (and optionally, using a different hand, or a combination of both hands, etc.) to provide gestures to interact with the virtual object and the controls contained therein. In some embodiments, different types of gestures (e.g., swipe, flick, tap, push, etc.) that involve small movements of one part of a hand relative to another part of the hand (e.g., while the whole hand is not raised up (e.g., resting on the table, lowered on the side of the user's body, resting on the user's lap, etc.), while the hand is raised to a location that corresponds to the current position of the virtual object, etc.) are used to interact with (e.g., scrolling, switching input focus, making selection, adjusting value, etc.) the virtual object and the controls contained therein. In some embodiments, movement of the hand as a whole while in various hand postures cause a different set of operations to be performed with respect to the virtual object than that caused by different types of small movements within the same hand. In some embodiments, after the computer system decouples the position of the virtual object from the location of the user's hand following the initial display of the virtual object in the three-dimensional environment (e.g., displayed in response to the movement of the user's hand that met the preset criteria), the computer system optionally couples the position of the virtual object to the viewpoint of the currently displayed view of the three-dimensional environment, such that the virtual object maintains a spatial relationship between the virtual object and the viewpoint of the currently displayed view of the three-dimensional environment during movement of the viewpoint (e.g., as caused by the movement of the user carrying the display generation component, movement of the user's head wearing the HMD, etc.) relative to the three-dimensional environment. Allowing the virtual object containing selectable controls to be displayed at a position that corresponds to the location of the user's hand when the display of the virtual object is invoked by preset movement of the user's hand, and then subsequently decoupling the position of the virtual object from the location of the user's hand make it possible for the user to influence the display position of the virtual object (e.g., selecting which portion of the field of view the virtual object should be displayed in, selecting how far away the virtual object should be displayed from the viewpoint, selecting which orientation the virtual object should be displayed relative to the viewpoint, etc.), but not unnecessarily tying the virtual object to the user's hand to prevent the user from utilizing the same hand to provide gestures to interact with the virtual object. This makes user interaction with the virtual object more efficient, and reduces the number, extent, and/or nature of the inputs from a user to achieve a desired outcome, thereby creating a more efficient human-machine interface.

In some embodiments, a computer system designates (e.g., in accordance with user input, without user input, etc.) a location or area in a physical environment as a "home location" (or "dock location") for displaying a frequently used user interface object, such that, when the user views the physical environment through a field of view provided by a display generation component, the user can easily and predictably locate the user interface object by adjusting the field of view provided by the display generation component relative to the physical environment so that the position that corresponds to the designated location or area is within the field of view. The computer system, when displaying a three-dimensional environment that includes a representation of the physical environment, displays the user interface object at the position that corresponds to the "home location" of the user interface object in accordance with a determination that the position that corresponds to the designated location or area is within the field of view provided by the display generation component. This may occur when the display generation component is placed into a state or a position that allows the user to view the physical environment through the display generation component (e.g., the HMD is turned on, the HMD is placed on the user's head, the display is placed in front of the user's eyes, the user walked in front of a heads-up display, etc.), and/or when the field of view is changed due to movement of the display generation component (and/or the cameras that capture the view of the physical environment) relative to the physical environment (e.g., movement caused by the user walking around carrying a display generation component, turning his/her head while wearing an HMD, etc.). In some embodiments, the user interface object is a home user interface that includes icons for applications, experiences, and/or users from which the user can start corresponding application, computer-generated experiences, and share experiences or communication with other users. Another example user interface object is a control panel for controlling device functions of the computer system, such as functions of and settings for display generation component(s), network connection component(s), audio output component(s), flashlight, camera, audio and video output routing, etc. Another example user interface object is a contextual menu which automatically changes its constituent controls and elements based on the current context, such as the current time, a currently displayed application, the current location, an current schedule, upcoming events on a calendar, user's previous interaction with the computer system, etc. In some embodiments, the user interface object is a combination of one or more of the above. In some embodiments, the location or area designated as the "home location" for the user interface object is all or a portion of a physical surface, such as the surface of a wall, furniture, appliance, a tabletop, a countertop, a window, a poster, a TV screen, a picture frame, etc. In some embodiments, the location or area designated as the "home location" for the user interface object is not occupied by any physical object or surface. For example, the designated "home location" is optionally in the empty region above the countertop, in the middle of a room, above the computer screen of a desktop computer, etc. By utilizing the user's familiarity with a physical environment and the user's intuitive sense of position and orientation in the physical environment, the computer system provides a predictable access point for frequently used functions of the computer system, but does not unnecessarily clutter the user's field of view by persistently displaying the user interface object in the user's field of view (e.g., the user interface object is not displayed when the "home location" is not in the field of view). Furthermore, the home location is stored persistently across multiple usage sessions which are separated by the display generation component being in an off-state, sleep state, or other low-power state of the display generation component. This provides an intuitive and predicable way of providing access to frequently used functions without cluttering the limited field of view available for viewing virtual content and the physical environment, which reduces user mistakes and confusion when the user interacts with the computer system, thereby creating a more efficient human-machine interface. In some embodiments, the computer system automatically starts a configuration process to prompt the user to select the "home location" when the computer system receives a request to display a physical environment that has not been associated with the user interface object (e.g., when the display generation component is turned on or put on the user's head while in a new physical environment). In some embodiments, the computer system scans and highlights available surfaces or regions in the view of the new physical environment to allow the user to select the location or area in the new physical environment from among the highlighted surfaces or regions to as the "home location" for the user interface object.

In some embodiments, the computer system displays a virtual menu (also referred to as a "control object") that includes one or more controls for triggering performance of respective operations corresponding to an object (e.g., a virtual object, a representation of a physical object, a physical object, etc.) in a three-dimensional environment. In some embodiments, the virtual menu is displayed at a position corresponding to the location of the object (e.g., at or near the position of a virtual object, or a representation of a physical object, etc.) in the three-dimensional environment. The virtual menu pops up from its original position in the three-dimensional environment toward a position closer to the virtual position of the user (e.g., the viewpoint of the currently displayed view of the three-dimensional environment, the virtual position of the user's hand in the user's field of view, etc.) in response to selection of the object by the user. In some embodiments, the selection of the object is based on interaction with the object or representation thereof in the three-dimensional environment. In some embodiments, selecting the object includes selecting the virtual object or representation of the physical object using a user's gaze directed to the virtual object or representation of the physical object, providing a preset gesture at the position of the virtual object or representation of the physical object, providing a gesture remote from the position of the virtual object or representation of the physical object while the virtual object or representation of the physical object has input focus, providing a gesture remote from the position of the virtual object or representation of the physical object while the virtual object or representation of the physical object is selected by the user's gaze, etc. In some embodiments, the selection of the object is based on interaction with the object in the physical environment (e.g., touching, manipulating, picking up, opening, otherwise changing the state of the physical object, etc.) that results in selection of the representation of the object in the three-dimensional environment. In some embodiments, the object is a virtual menu that includes one or more selectable controls for performing operations (e.g., launching a user interface, displaying a corresponding virtual experience, displaying a submenu, performing a respective application function, activating a respective device function of the computer system, adjusting a respective device setting of the computer system, etc.) corresponding to the object in the three-dimensional environment (e.g., a virtual environment, an augmented reality environment, etc.). In some embodiments, the object is a physical object with a representation thereof in the three-dimensional environment (e.g., an augmented reality environment, etc.), and the virtual menu includes one or more selectable controls for performing operations (e.g., displaying related virtual content or experiences, launching a user interface, displaying a submenu, activating a respective device function, adjusting a respective device setting, etc.) corresponding to the physical object in the three-dimensional environment. In some embodiments, when the user moves their gaze away from the position of the object, and the user's gaze is no longer directed to the region associated with the virtual menu and the object, the computer moves the virtual menu away from the position close to the virtual position of the user (e.g., the viewpoint, or the position of the user's hand, etc.) and back toward its original position that corresponds to the position of the object in the three-dimensional environment. It is as if the virtual menu is snapping back to its original position after it is released by the departure of the user's gaze from the virtual menu and the object. In some embodiments, a visual link (e.g., a virtual rubber band, a dotted line, etc.) is displayed between the virtual menu and its original position while the virtual menu is displayed at a distance away from its original position due to the selection of the object. In some embodiments, while the virtual menu is displayed away from its original position and closer to the virtual position of the user (e.g., close to the viewpoint, close to the user's hand in the user's field of view, etc.), it can serves as the start position of individual controls contained therein to further move closer to the virtual position of the user when gaze is directed to the individual controls or when the controls are otherwise selected but not activated. In some embodiments, when the user's gaze is moved away from the individual controls, the individual controls retreat back to their original positions in the virtual menu. In some embodiments, the movement of the virtual menu and the individual controls contained therein are based on the movement of the user's gaze toward and away from the virtual menu and/or the object. In some embodiments, while the virtual menu is still coupled to the user's gaze, it moves toward and away from the viewpoint in a way (e.g., with speed, direction, distances, etc.) that depends on the movement of the user's gaze (e.g., speed, direction, distances, etc. of the movement of the user's gaze); and once the user's gaze is outside of the region corresponding to the object and virtual menu, the virtual menu snaps back to its original position quickly. Moving the virtual menu associated with an object closer to the virtual position of the user (e.g., closer to the viewpoint, closer to the user's hand in the field of view, etc.) in response to selection of the object, and then subsequently moving the virtual menu back to its original position in the three-dimensional environment when the user's gaze moves away from the virtual menu and the object allow the user to easily inspect the options included in the virtual menu, and/or interact with the virtual menu at a more accessible position in the three-dimensional environment (e.g., within arm's reach, or near the user's hand, etc.). This makes user interaction with the object more efficient, and reduces the number, extent, and/or nature of the inputs from a user to perform operations associated with the object, thereby creating a more efficient human-machine interface.

In some embodiments, the computer system displays a preview of a computer-generated experience in a three-dimensional environment when a virtual object corresponding to the computer-generated experience is invoked by a user input in the three-dimensional environment. The preview has spatial extent that is greater than the portion of the preview that is displayed in the view of the three-dimensional environment provided by the display generation component. The computer system displays a different spatial portion of the preview adjacent to the previously displayed portion of the preview in accordance with relative movement between the display generation component (and/or, optionally, the cameras that capture the representation of the physical environment shown in the three-dimensional environment, and/or other location sensing components of the computer system, etc.) and the physical environment. In some embodiments, since the preview occupies a portion of the view of the three-dimensional environment, the view of the three-dimensional environment is also updated in accordance with the relative movement between the display generation component (and/or, optionally, the cameras that capture the representation of the physical environment shown in the three-dimensional environment, and/or other location sensing components of the computer system, etc.) and the physical environment. In some embodiments, the computer system displays the computer-generated experience which has a greater spatial extent than the preview in response to a preset user input for triggering display of the computer-generated experience is detected while the preview is displayed. In some embodiments, the preview expands to become the initial view of the computer-generated experience. Displaying a preview of a computer-generated experience with spatial characteristics and navigation properties that are analogous to those of the computer-generated experience provides the user an opportunity to experience the environment of the computer-generated experience and explore within the environment (e.g., through interaction, locomotion, and navigation) without actually starting the three-dimensional environment. This allows the user to make more informed decision about whether or not to proceed with starting the computer-generated experience, reducing user mistakes for accidentally trigger the computer-generated experience, and easing the transition from the currently displayed environment into the fully immersive version of the computer-generated experience, etc., thereby creating a more efficient human-machine interface. In some embodiments, the preview also serves as a transition point for when the user exits the computer-generated experience and returning back to the original three-dimensional environment.

In some embodiments, the computer system displays a representation of an electronic device in a three-dimensional environment at a position that corresponds to the location of the electronic device in the physical environment. When the computer system receives an indication that a notification is generated or received at the electronic device, the computer system displays a representation of the notification at a preset location relative to the representation of the electronic device in the three-dimensional environment. The computer system performs operations with respect to the representation of the notification (e.g., displaying a larger version thereof, dismissing the representation of the notification, playing back the content of the notification, composing a reply to a message corresponding to the notification, etc.) in the three-dimensional environment (and, optionally, causing corresponding operations to be performed with respect to the notification at the electronic device as well) in accordance with user inputs interacting with the representation of the notification. Displaying the representation of the electronic device at a preset location relative to the representation of the electronic device allows the user to easily spot the representation of the notification in the three-dimensional environment and/or locate the electronic device in the physical environment so that the user does not miss the notification when the electronic device is at a location or has an orientation that make notifications on the display of the electronic device hard to see via the display generation component. Furthermore, in some embodiments, the computer system allows the user to interact with the notification through the representation of the notification in the three-dimensional environment by using gestures provided without requiring physical contact or proximity to the electronic device to the user. This makes user interaction with the notification more efficient, and reduces the number, extent, and/or nature of the inputs from a user to perform operations associated with the notification, thereby creating a more efficient human-machine interface. It also means the user does not have to interrupt an on-going computer-generated experience to reach and grab the electronic device to interact with the notification using the electronic device. Furthermore, in some embodiments, the computer system allows the user to interact with the notification by physical manipulation (e.g., touching, turning, rotating, tapping, swiping, etc.) of the electronic device with the visual aid (e.g., visual prompt, visual enhancement, virtual keyboard, and virtual controls, etc.) provided in the three-dimensional environment. This way, the user does not have to see the notification using only the small display of the electronic device, and optionally, can still utilize the more accurate touch sensors located on the electronic device to detect more refined inputs (e.g., typing, fine tuning, etc.) to interact with the notification. For example, the computer system maps the locations of the user's touches on the touch-screen of the electronic device to the positions of the virtual keys displayed in the three-dimensional environment (e.g., on a virtual keyboard displayed in the central region of the field of view, at a position corresponding to the touch-screen of the electronic device, etc.) to output text of a reply to a message that triggered the notification. The flexibility of choosing between different modalities of interactions and the integration of the advantages provided by the different modalities of interactions reduce user mistakes when interacting with notifications and reduce the number, extent, and/or nature of the inputs from a user to perform operations associated with the notification, thereby creating a more efficient human-machine interface.

FIGS. 1-6 provide a description of example computer systems for providing CGR experiences to users. FIGS. 7A-7D are block diagrams illustrating user interactions for navigating through a set of indexed items in a user interface, in accordance with some embodiments. FIGS. 7E-7J are block diagrams illustrating display and interaction with a user interface object in a three-dimensional environment in response to inputs involving movements of a user's hand, in accordance with some embodiments. FIGS. 7K-7N are block diagrams illustrating displaying a virtual menu in a three-dimensional environment at a position that corresponds a preset portion of a physical environment based on whether or not the preset portion of the physical environment is within the field of view, in accordance with some embodiments. FIGS. 7O-7T are block diagrams illustrating displaying a control object associated with an object at different distances away from an initial position of the control object in a three-dimensional environment, depending on whether or not the object is selected by a user input and/or whether or not the user's gaze directed to the object or its associated control object has moved away from a region corresponding to the object and its associated control object, in accordance with some embodiments. FIGS. 7U-7Z are block diagrams illustrating displaying a three-dimensional preview of a computer-generated experience in response to first interaction with an object before transitioning to displaying the computer-generated experience in response to additional input, in accordance with some embodiments. FIGS. 7AA-7AD are block diagrams illustrating displaying a representation of a notification in a three-dimensional environment at a position that has a predetermine spatial relationship (e.g., location, distance, etc.) relative to a representation of an electronic device, in accordance with some embodiments. FIGS. 8-13 are flow diagrams of methods of interacting with a three-dimensional environment, in accordance with various embodiments. The user interfaces in FIGS. 7A-7AD are used to illustrate the processes in FIGS. 8-13, respectively.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people.

People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CGR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
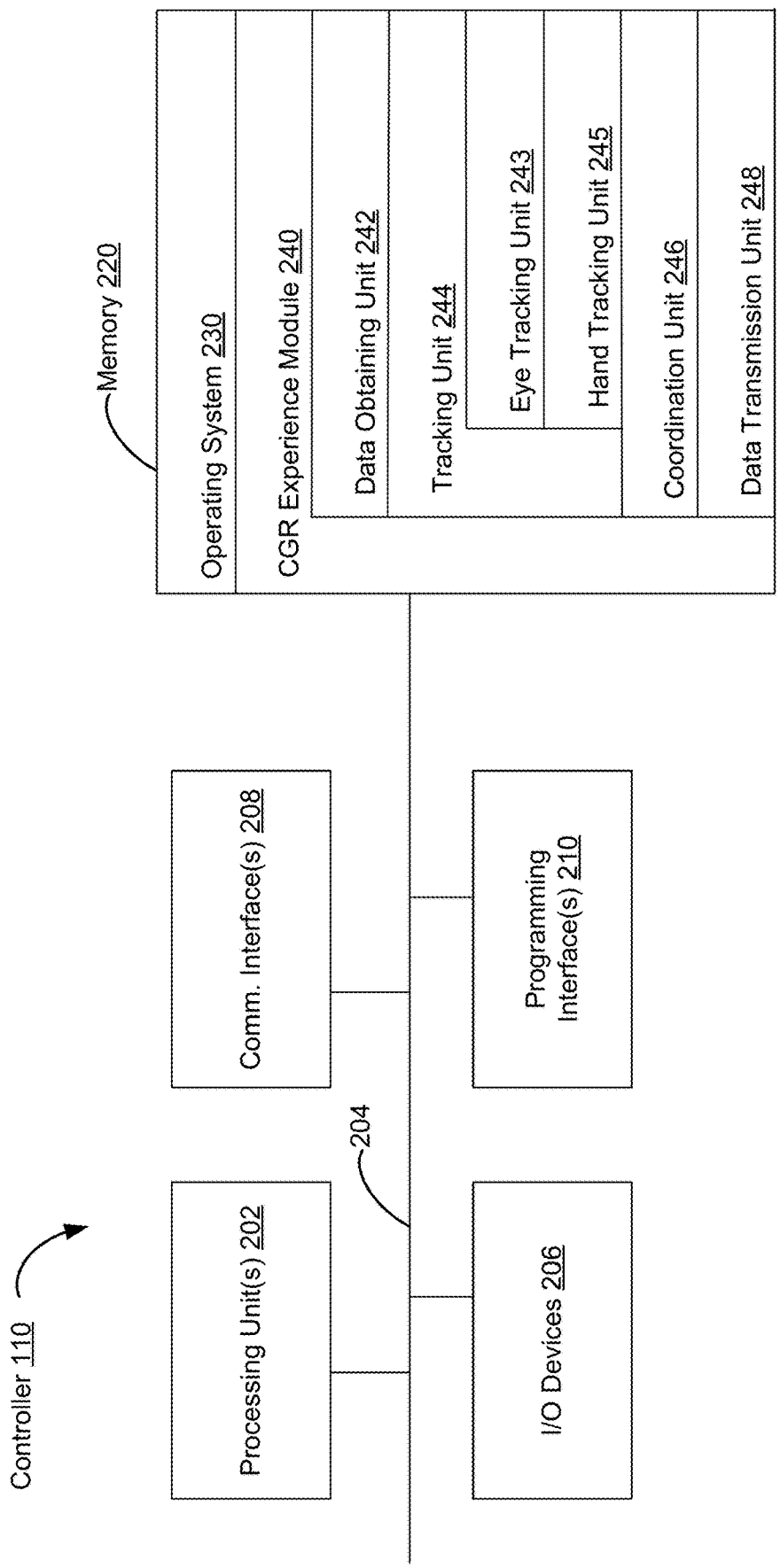
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
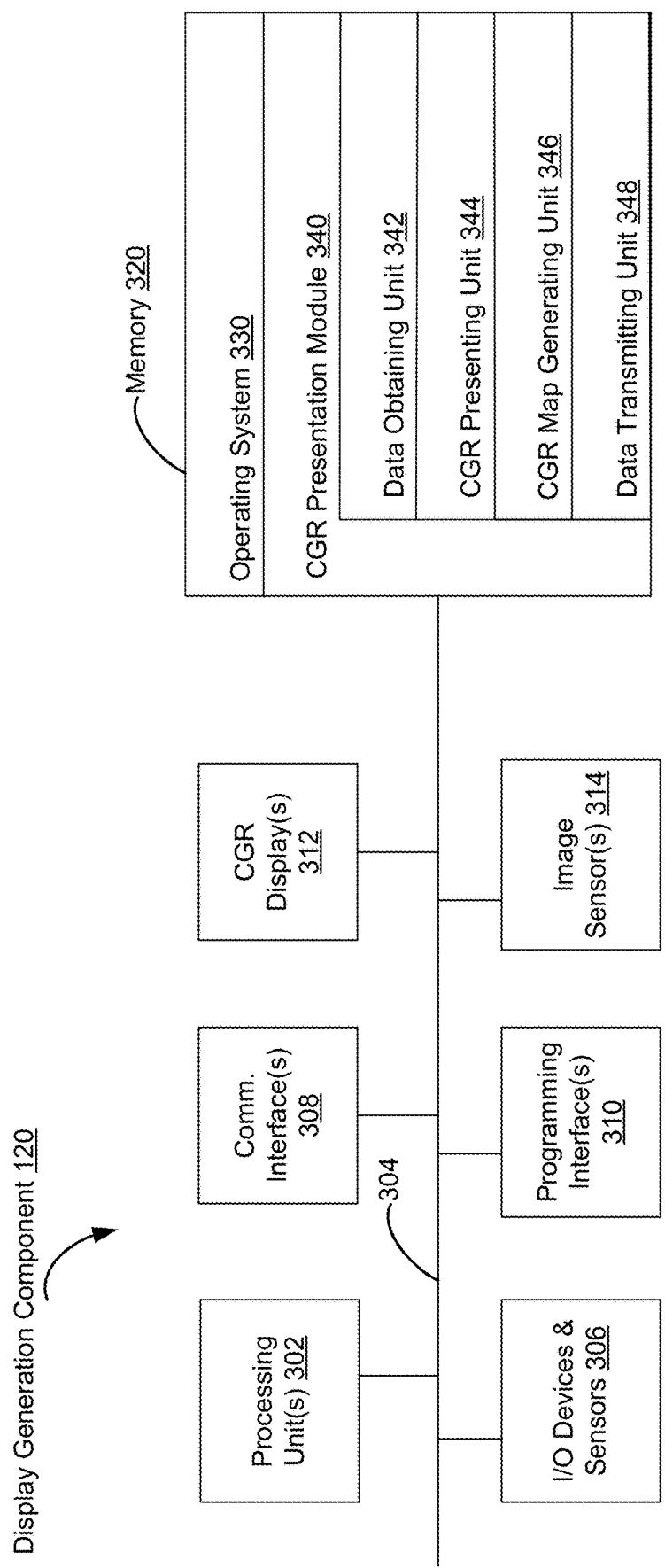
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
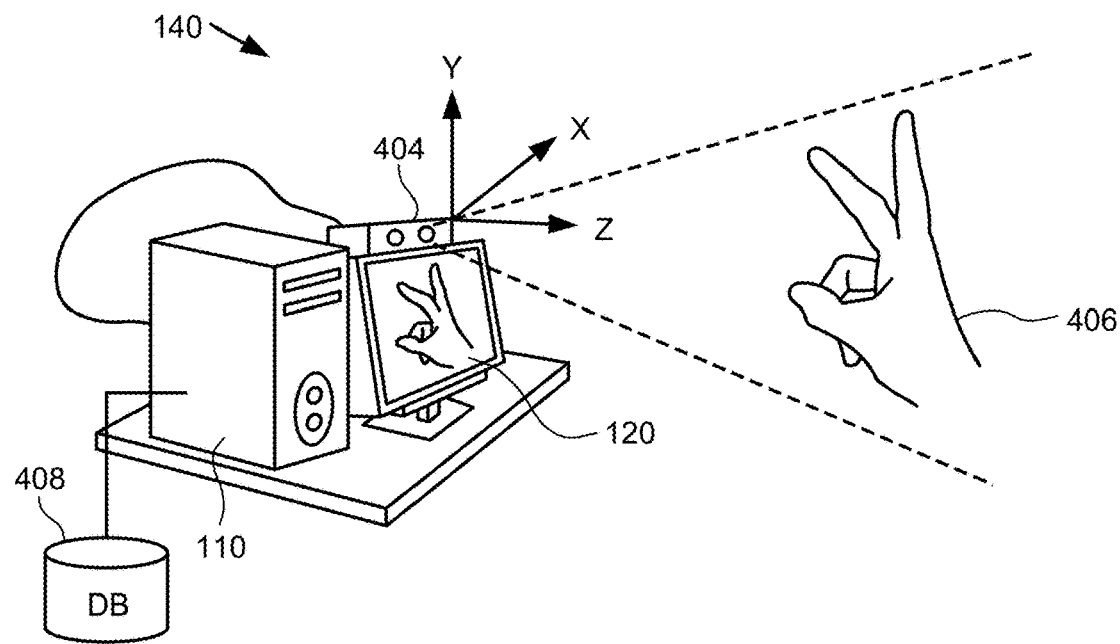
FIG. 4 is a block diagram illustrating a hand tracking unit of a computer system that is configured to capture gesture inputs of the user in accordance with some embodiments.
Figure 4:
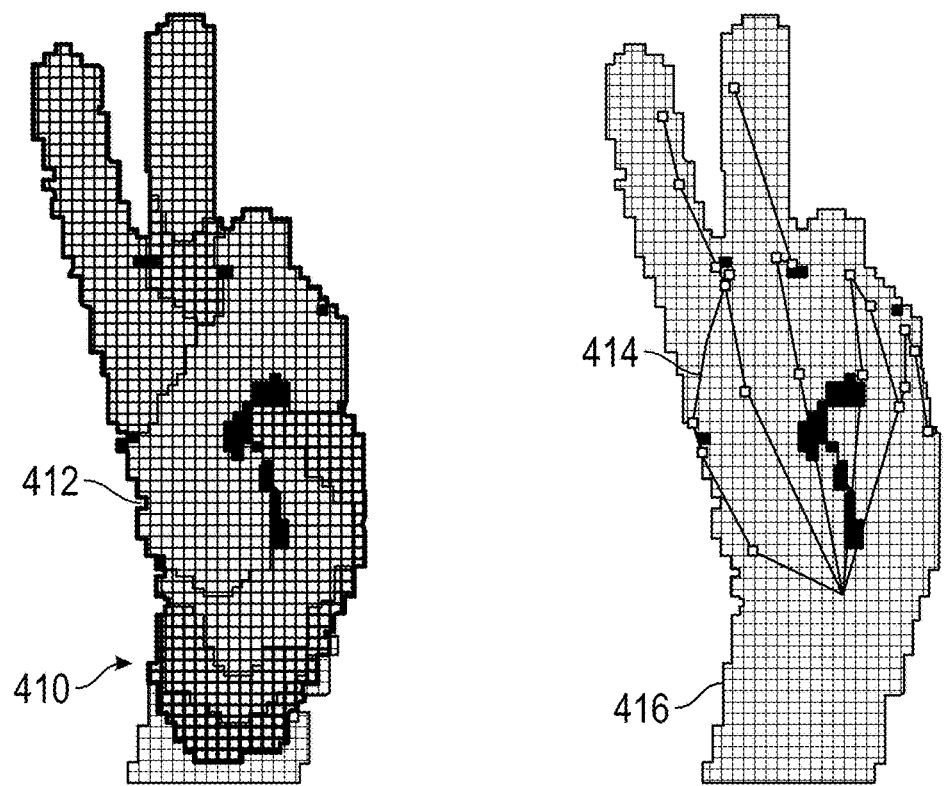

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
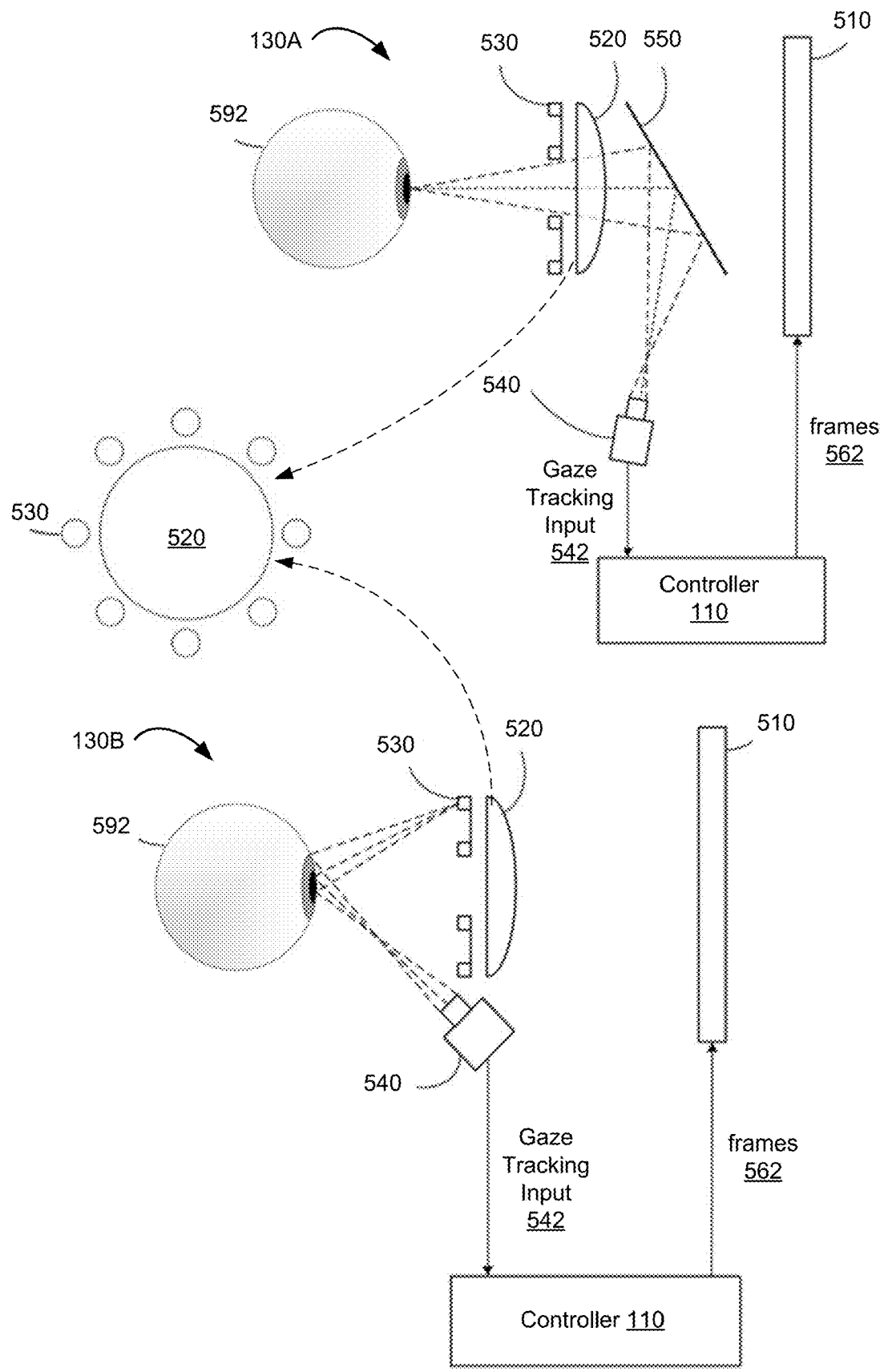
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality (e.g., including virtual reality, and/or mixed reality) applications to provide computer-generated reality (e.g., including virtual reality, augmented reality, and/or augmented virtuality) experiences to the user.

Figure 6:
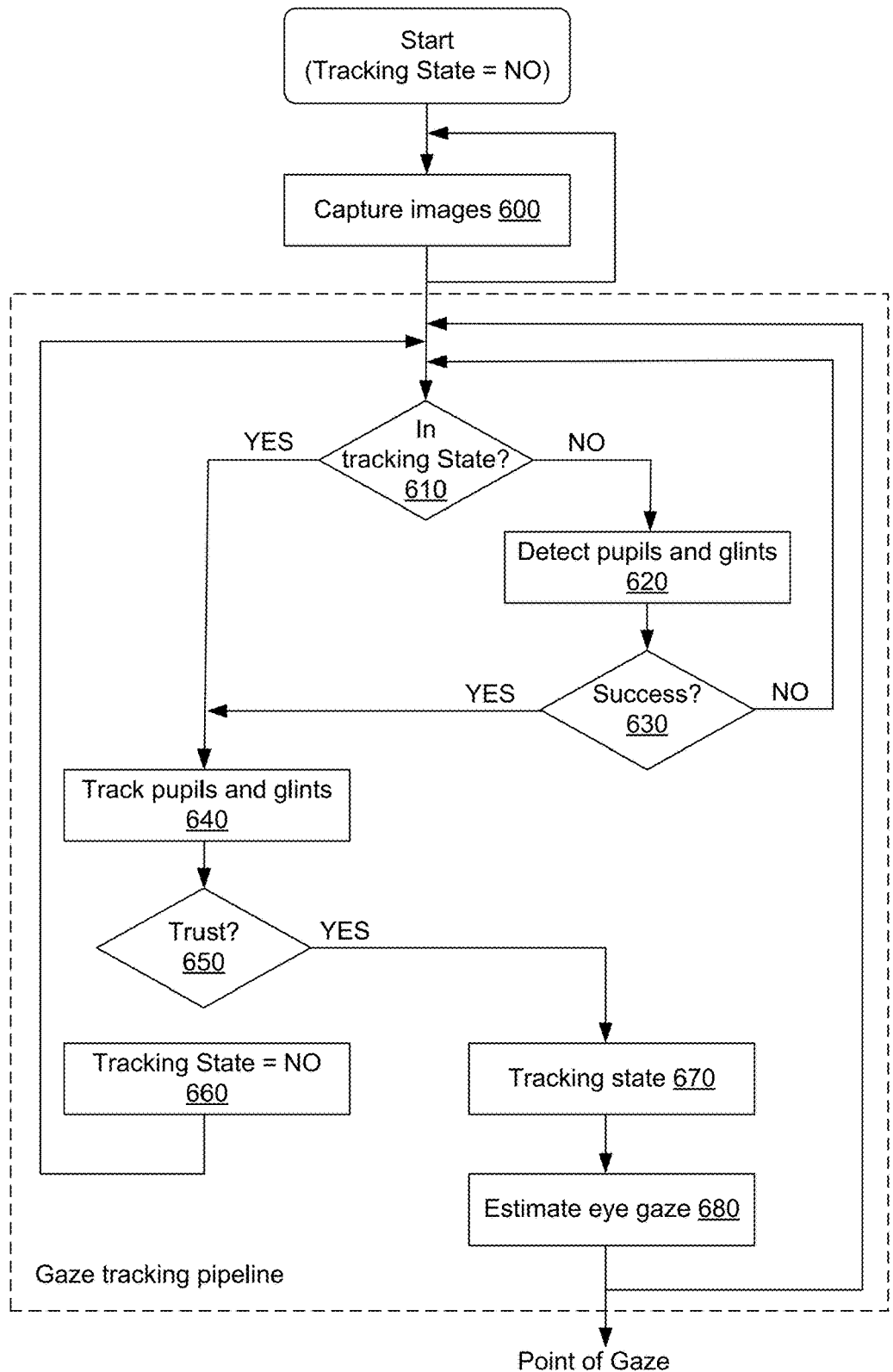
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7AD illustrate three-dimensional environments displayed via a display generation component (e.g., a display generation component 7100, a display generation component 120, etc.) and interactions that occur in the three-dimensional environment caused by user inputs directed to the three-dimensional environment. In some embodiments, the inputs are directed to virtual objects within the three-dimensional environment by a user's gaze detected at the positions of the virtual objects, by a hand gesture performed at a location in the physical environment that corresponds to the position of the virtual object, by a hand gesture that is performed at a location in the physical environment that is independent of the position of the virtual object while the virtual object has input focus (e.g., selected by a gaze, selected by a pointer, selected by a previous gesture input, etc.). In some embodiments, the inputs are directed to a representation of a physical object or a virtual object that corresponds to a physical object by the user's hand movement (e.g., whole hand movement, whole hand movement in a respective posture, movement of one portion of hand relative to another portion of the hand, relative movement between two hands, etc.) and/or manipulation with respect to the physical object (e.g., touching, swiping, tapping, opening, moving toward, moving relative to, etc.).

In some embodiments, the three-dimensional environment that is displayed via the display generation component is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, etc.). In some embodiments, the three-dimensional environment is an augmented reality environment that includes a representation of the physical environment. The representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. When virtual objects are placed relative to the positions of the representations of physical objects and surfaces in the three-dimensional environment, they appear to have corresponding spatial relationships with the physical objects and surfaces in the physical environment.

In some embodiments, the display generation component includes a pass-through portion in which the representation of the physical environment is displayed. In some embodiments, the pass-through portion is a transparent or semi-transparent (e.g., a see-through) portion of the display generation component revealing at least a portion of physical environment surrounding and within the field of view of user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of the mobile device or associated with the head-mounted display, or other cameras that feed image data to the electronic device). In some embodiments, the one or more cameras point at a portion of the physical environment that is directly in front of the user's eyes (e.g., behind the display generation component). In some embodiments, the one or more cameras point at a portion of the physical environment that is not directly in front of the user's eyes (e.g., in a different physical environment, or to the side or behind the user).

In some embodiments, when displaying virtual objects at positions that correspond to locations of one or more physical objects in the physical environment, at least some of the virtual objects are displayed in placed of (e.g., replacing display of) a portion of the live view (e.g., a portion of the physical environment captured in the live view) of the cameras. In some embodiments, at least some of the virtual object and content are projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, at least some of the virtual objects and content are displayed to overlay a portion of the display and blocks the view of at least a portion of, but not all of, the physical environment visible through the transparent or semi-transparent portion of the display generation component. In some embodiments, In some embodiments, the display generation component displays different views of the three-dimensional environment in accordance with user inputs or movements that changes the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, gestures performed by movement of one portion of the hand relative to another portion of the hand, etc.) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD, etc.), etc., relative to the physical environment causes corresponding movement of the viewpoint (e.g., with corresponding movement direction, movement distance, movement speed, and/or change in orientation, etc.) relative to the three-dimensional environment, resulting corresponding change in the currently displayed view of the three-dimensional environment. In some embodiments, when a virtual object has a preset spatial relationship relative to the viewpoint, movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement (e.g., the display generation component and/or other location sensing component of the computer system rotating around a fixed location of the user in the physical environment).

In some embodiments, the views of the three-dimensional environment shown in FIGS. 7A-7AD includes a representation of the user's hand(s), arm(s), and/or wrist(s). In some embodiments, the representation is part of the representation of the physical environment provided via the display generation component. In some embodiments, the representation is not part of the representation of the physical environment and is separately captured (e.g., by one or more camera's pointing toward the user's hand(s), arm(s), and wrist(s)) and displayed in the three-dimensional environment independent of the view of the three-dimensional environment. In some embodiments, the representation includes camera images as captured by one or more cameras of the computer system(s), or stylized versions of the arms, wrists and/or hands based on information captured by various sensors). In some embodiments, the representation replace display of, is overlaid on, or block the view of, a portion of the representation of the physical environment. In some embodiments, when the display generation component does not provide a view of a physical environment, and provides a completely virtual environment (e.g., no camera view or transparent pass-through portion), real-time visual representations (e.g., stylize representations or segmented camera images) of one or both arms, wrists, and/or hands of the user may still be displayed in the virtual environment. In some embodiments, even though a representation of the user's hand is shown in the Figures, it is to be understood that, unless otherwise made clear by the corresponding description, the representation of the user's hand is not necessarily always displayed, and/or may not be required to be displayed or in the user's field of view, when providing the required inputs to interact with the three-dimensional environment.

FIGS. 7A-7D are block diagrams illustrating user interactions for navigating through a set of indexed items (e.g., a contact list, a collection of media objects, a set of documents, etc.) in a user interface, in accordance with some embodiments.

In some embodiments, a computer system displays a set of indexed items (e.g., contacts indexed by contact name; media objects indexed by title, artist name, album name, genre; documents indexed by filename, document type, etc.) in a user interface (e.g., user interface object 7300, a virtual surface, a virtual region, etc.) in a three-dimensional environment (e.g., environment 7104) and allows the user to navigate through the set of indexed items in the user interface using one or more navigation inputs (e.g., scrolling gestures, touch gestures, etc.). The computer system allows the user to control the navigation amount by moving a gaze relative to the user interface (e.g., from a data region (e.g., the first region 7310, in this example) where representations of individual indexed items (e.g., representations 7302 in the first region 7310, in this example) are displayed and scrolled, to an index region (e.g., the second region 7304) that is associated with an index (e.g., ordered sequence of first letters of contact names, ordered sequence of other index items, etc.) of the indexed items) in the three-dimensional environment. In some embodiments, when the user's gaze is directed to the index region, a larger amount of navigation (e.g., navigation through a first number of items) through the indexed items in the data region is achieved by a navigation input, as compared with that achieved when the user's gaze is directed to the data region (e.g., navigation through a second number of items smaller than the first number of items). In some embodiments, the navigation input does not involve the user raising his whole hand to a location that corresponds to the position of the user interface in the three-dimensional environment. For example, in some embodiments, the navigation input involves small movements of one part of a hand relative to another part of the hand while the whole hand is not raised up (e.g., is resting on the table, lowered on the side of the user's body, resting on the user's lap, etc.). In some embodiments, the index region of the user interface is selected and, optionally, activated to display the index (e.g., the sequential list of the alphabet, in this example), by the user's gaze directed to a portion of the user interface that is associated with the index (e.g., the second region 7304, in this example; another region that is blank or not currently displaying an index, etc.). In some embodiments, the amount of navigation that is achieved is further based on the characteristics of the navigation input (e.g., magnitude, extent, distance, speed, frequency, etc. of the gesture, or other types of inputs). Using the user's gaze in conjunction with a navigation input to adjust the amount of navigation through a set of indexed items in a user interface provides an efficient and lightweight way of navigating through a set of indexed items, and reduces the number, extent, and/or nature of the inputs from a user to achieve a desired outcome, thereby creating a more efficient human-machine interface.

In an example, a user interface object (e.g., a day planner with activities divided into subsets corresponding to different weeks, a menu of selectable options divided into subsets corresponding to different groupings of options (e.g., groupings corresponding to types of application functions, device types, etc.), a contact list (e.g., divided into subsets by the first letter of the contact names), etc.) has an item region (also referred to as a "data region" or "first region") that displays representations of items from a set of items (e.g., activities, selectable options, contacts, etc.) and an index region that corresponds to an index of the set of items (e.g., index based on week, function type, contact name, etc.). Depending on whether or not the user's gaze is directed to the item region or the index region (e.g., a region that is currently blank without index items that correspond to respective subsets of the set of items, or is currently displaying the index items (e.g., representations of the weeks, function types, contact names, etc.)), a user input (or separate inputs with the same magnitudes and other characteristics) causes different amounts of navigation through the representations of the items in the item region, in accordance with some embodiments.

In some embodiments, when the data items are displayed in the item region, the data items are displayed in accordance with a preset sequential order; and when navigating through the data items in response to the user input, the data items are displayed in the same preset sequential order as well. In some embodiments, the subsets of data items corresponding to different index items are ordered in accordance with a preset sequential order of their corresponding index items, and when navigating through the data items in the item region, the different subsets of data items appear in the item region in the order of their corresponding index items. In some embodiments, a respective subset of data items may be called up into the item region directly if its corresponding index item is selected in the index region by a user input. In some embodiments, the navigation direction through the data items and the navigation direction through the index items are parallel to each other in the user interface. In some embodiments, the navigation direction through the data items and the navigation direction through the index items are perpendicular to each other in the user interface. In some embodiments, the item region and the index region are displayed sided by side in the user interface. In some embodiments, the item region is directly above or below the index region in the user interface. In some embodiments, the index region is displayed or expanded to show index items in response to a user input directed to the edge region of the item region in the user interface object displaying the data items.

In some embodiments, the user interface object that displays the data items from the set of data items is displayed in a three-dimensional environment (e.g., a virtual three-dimensional environment, a mixed reality environment, an augmented reality environment, etc.). In some embodiments, the user input is an input gestures performed by the user's hand for interacting with a virtual or mixed-reality environment, in accordance with some embodiments. In some embodiments, the movement of the hand includes discrete, small motion gestures performed by movement of the user's finger(s) relative to other finger(s) or part(s) of the user's hand, optionally, without requiring major movement of the user's whole hand or arm away from their natural location(s) and posture(s) to perform operations immediately prior to or during the small motion gestures. In some embodiments, the user input include an in-air gesture performed by the user's hand or hands that involve movement of the entire hand (e.g., translation and/or rotations) from one location to another location in the physical environment. In some embodiments, the user input is a voice command. In some embodiments, the user input is a touch input detected on a touch-sensitive surface. In some embodiments, other types of user input are optionally used to cause navigation through the data items in the user interface object.

As show in FIG. 7A, a first display generation component (e.g., display 7100, or other types of display generation component) displays a three-dimensional environment (e.g., a virtual three-dimensional environment, or a mixed reality environment, or an augmented reality environment 7104, etc.) in which the user interface object (e.g., user interface object 7300, or another user interface object, surface, etc.) is displayed. In some embodiments, a viewpoint corresponding to a currently displayed view of a three-dimensional environment refers to a virtual position, a vantage point, and/or a viewing perspective in the virtual three-dimensional environment from which the currently displayed view would be seen by a virtual viewer placed at the virtual position, vantage point and/or viewing perspective (e.g., with his/her eyes or head at the virtual position, standing at the virtual position, sitting at the virtual position, etc.). In some embodiments, the viewpoint corresponding to a currently displayed view of a virtual three-dimensional environment moves in the virtual three-dimensional environment in accordance with the movement (e.g., rotation, and/or translation, etc.) of the head of a user (e.g., movement of the head relative to the torso, movement of the head as due to movement of the torso, etc.) who is in a position to view content displayed via the first display generation component. In some embodiments, the position of the user or a portion thereof (e.g., head, eyes, face, torso, etc.) in the physical environment has a corresponding position in the virtual three-dimensional environment (e.g., the virtual position that corresponds to the viewpoint of the currently displayed view of the virtual three-dimensional environment), and the movement (e.g., rotation, and/or translation, etc.) of the user as a whole or the portion thereof in the physical environment, optionally, causes a corresponding movement (e.g., rotation and/or translation, etc.) of the viewpoint of the currently displayed view of the virtual three-dimensional environment. In some embodiments, the correspondence between the movement of the user as a whole or the portion thereof in the physical environment and the movement of the viewpoint allows the user to experience the spatial relationships in the virtual three-dimensional environment and/or augmented reality environment in a more physical and realistic way.

In some embodiments, as shown in FIG. 7A, the first display generation component is a display that is placed in front of a user and is optionally supported by the user's hand 7204. In some embodiments, the display is a head-mounted display that has a display side facing toward the user's face and eyes and does not move relative to the user's face or eyes when the user moves his/her head or body in the physical environment. In some embodiments, when a head-mounted display is used as the display generation component, the virtual position of the viewpoint of the currently displayed view of the physical environment corresponds to (e.g., having a preset spatial relationship to, having a constant spatial relationship to, overlaps with, is in proximity to, etc.) a virtual position of the user's eyes or head in the virtual three-dimensional environment. In the examples shown in FIGS. 7A-7D, the user as a whole is stationary relative to a physical environment, in accordance with some embodiments. In some embodiments, the user as a whole may be moving in the physical environment, but the viewpoint is not updated based on the movement of the user as a whole in the physical environment. In some embodiments, the user as a whole or the user's head may be moving in the physical environment which causes a movement of the viewpoint in the three-dimensional environment, which causes the user interface object 7300 to be displayed from a different perspective or position relative to the viewpoint.

In some embodiments, as shown in FIG. 7A, the computer system detects a user's gaze input (e.g., gaze input 7320) being directed to a respective portion of the three-dimensional environment. In some embodiments, as the user's eyes move around while the user is facing the display side of the first display generation component, the computer system tracks the movement of the user's eyes and determines the user's line of sight and the position of the user's focal point in the three-dimensional environment. For example, in some embodiments, in accordance with a determination that the user's line of sight and focal point have localized within a threshold area of a first position in the three-dimensional environment for at least a threshold amount of time, a gaze input is detected; and a virtual object present at the first position is, optionally, recognized as a target of the user's gaze input. In some embodiments, the object that is selected as the target of the user's gaze input gains input focus for subsequent inputs received from the user, until the input focus is moved away from the object (e.g., when another object is selected as target by the user's gaze, or other selection input). In some embodiments, the computer system displays a visual marker to show the current location of the user's gaze input. In some embodiments, the visual marker is displayed in accordance with a determination that the user's gaze input has met preset criteria (e.g., remained within a threshold area of a virtual position for at least a threshold amount of time (e.g., a threshold amount of time for detecting the gaze input (e.g., a gaze detection threshold), another threshold amount of time (e.g., a dwell time threshold) after the gaze input is detected), etc.).

In some embodiments, the input gestures described with regard to FIGS. 7A-7D are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 as illustrated in FIG. 7A or an HMD)) that includes the display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads-up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7202), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether or not to execute large motions or remaining relatively stationary when providing the input gestures with his/her hand, without experiencing constraints imposed by a specific input device or input region.

FIG. 7A illustrates an example user interface context (e.g., a two-dimensional environment, the three-dimensional environment 7104, etc.) showing an example user interface object 7300 (e.g., a list, a menu, a contact list, etc.) that corresponds to a set of data items that are divided into subsets with corresponding index items. As shown in FIG. 7A, the user interface object 7300 (e.g., a contact list in this example) includes the first region 7310 (e.g., the item region, or data region) that displays some of the data items from the set of data items (e.g., some of the contact names under letter A from the contact list are displayed, in this example), and the second region 7304 (e.g., the index region) that displays index items that correspond to different subsets of the data items from the set of data items (e.g., letters A-Z that correspond to different subsets of contact names with different first letters). In some embodiments, the second region 7304 is optionally blank without the index items when the user interface object 7300 is initially displayed, and the index items are later displayed in the second region 7304 in response to a user's gaze being detected on the second region 7304 of the user interface object 7300. In some embodiments, the second region 7304 displays the index items at all times while the user interface object 7300 is displayed in the three-dimensional environment 7104. In some embodiments, the second region 7304 displays the index items in response to detection of a preset user input (e.g., a user's gaze and/or preset gesture input) directed to the user interface object 7300 (e.g., directed to the first region 7310, and/or the second region 7304, etc.).

In the examples shown in FIGS. 7A-7D, a contact list is used as the example of a user interface object. It should be understood that other types of browsable or scrollable objects that display representations of multiple items that are grouped into subsets corresponding different indices may implement analogous behaviors as described herein. In some embodiments, the user interface object 7300 represents a user interface object of a communication application, the data items are respective representations (e.g., avatars) of users of remote devices, which when selected, optionally cause performance of an operation to initiate communication with the respective users of the remote devices. In some embodiments, the user interface object 7300 represents a user interface object of a media viewer application, and the data items are media items (e.g., images, virtual objects, audio files, and/or video files), which when selected, optionally, cause display or playback of the media items in the three-dimensional environment (e.g., at a location that corresponds to a surface in a physical environment or at a location that corresponds to a surface displayed in virtual space, etc.).

In the example shown in FIGS. 7A-7D, a representation 7202' of the user's hand 7202 is shown in the currently displayed view of the three-dimensional environment 7104, in accordance with some embodiments. In some embodiments, the representation of the user's hand is not displayed as part of the environment that includes the user interface object 7300.

As shown in FIG. 7A, in some embodiments, the user interface object 7300 is displayed in a mixed reality environment (e.g., floating in the air or at positions corresponding to a physical object or surface in a physical environment). In this example, the user interface object 7300 is displayed upright on a representation 7120' of a floor surface, at a position between a viewpoint of the currently displayed view of the three-dimensional environment and a representation 7124' of a wall in the physical environment, and to the right of a representation 7122' of another wall in the physical environment. In some embodiments, the user interface object 7300 is displayed at a position that overlays, replaces display of, or blocks the view of the representation of a physical surface in the mixed reality environment. In some embodiments, the computer system displays the user interface object 7300 in response to a user input that corresponds to a user's request to display the user interface object 7300 in the three-dimensional environment.

While displaying the user interface object 7300 including the first region 7310 and the second region 7304, the computer system detects a user input of a first type. In some embodiments, the user input of the first type corresponds to a request to scroll or navigate through the data items shown in the first region 7310 of the user interface object 7300. In this example, the user input of the first type is movement of the user's hand 7202 in the physical environment in a first direction (e.g., upward, downward, leftward, rightward, etc.) that corresponds to a first navigation direction through the set of items (e.g., increasing alphabetically, decreasing alphabetically, forward through the default sequence in the set of items, backward through the default sequence in the set of items, forward through the index, backward through the index, etc.)). In some embodiments, the user input of the first type includes movement of the user's hand as a whole while the hand maintains a preset hand posture (e.g., a predefined navigation posture, thumb resting on the side of index finger, index finger extended toward the user interface object, etc.). In some embodiments, the user input of the first type includes movement of a first portion of the user's hand relative to another portion of the user's hand in a preset manner (e.g., thumb pushing forward across the side of the index finger on the same hand, tapping of the thumb on the side of the index finger on the same hand, swiping of the thumb along the side of the index finger of the same hand, thumb and middle finger rubbing across each other, etc.). In some embodiments, the user input of the first type is a preset hand gesture detected in conjunction with a user's gaze input directed to the user interface object 7300 (e.g., to the data region, to the central region, etc.).

Figure 7B:
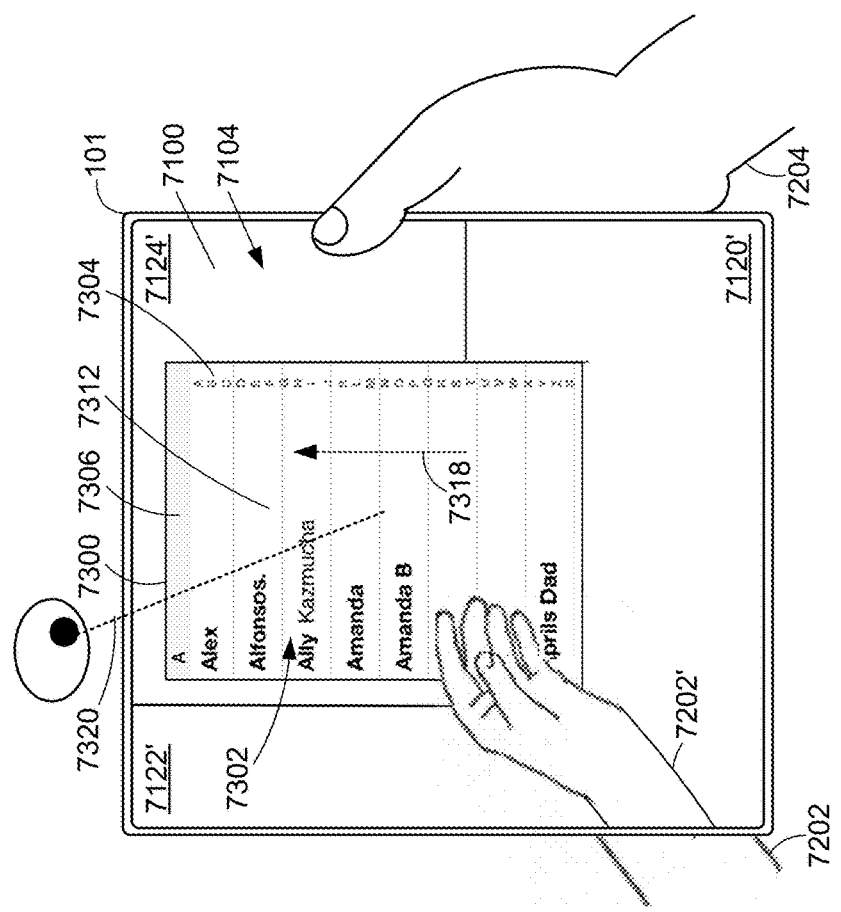
FIGS. 7A-7D are block diagrams illustrating user interactions for navigating through a set of indexed items (e.g., a contact list, a collection of media objects, a set of documents, etc.) in a user interface, in accordance with some embodiments.
Figure 7A:
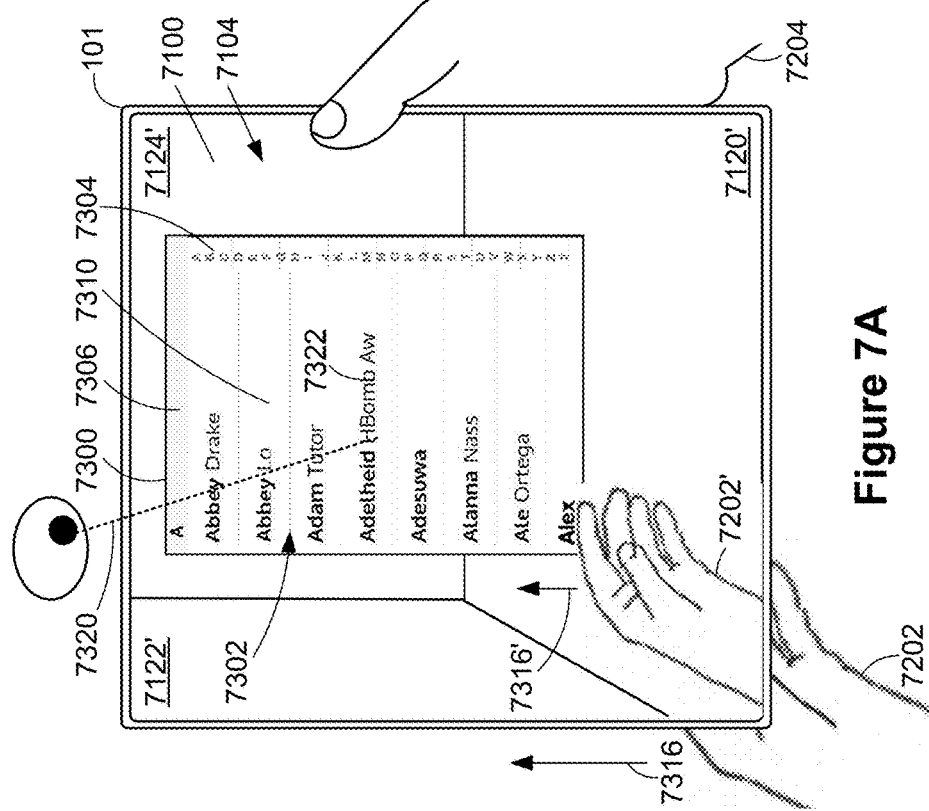

In the example scenario shown in FIGS. 7A-7B, the first input of the first type is detected in conjunction with the user's gaze input 7320 at a position inside the first region 7310 of the user interface object 7300 while a first plurality of data items from the set of data items (e.g., a sequence of eight contact names under the letter A, in this example) are being displayed in the first region 7310. In some embodiments, representations of the index item(s) (e.g., the letter A, in this example) of the currently displayed data items are also shown in the first region 7310 as the header(s) of subset(s) of the displayed items and/or divider(s) between adjacent subsets of the displayed items (e.g., header 7306 for contact names that start with the letter A is shown above the contact names that start with the letter A, in this example). In response to detecting the first input of the first type, in accordance with one or more characteristics (e.g., characteristics of the hand or finger movement, such as speed, distance, direction, acceleration, etc.; characteristics of a press input (e.g., intensity, duration, etc.), etc.) of the first input, and in accordance with a determination that the position of the user's gaze input 7320 is in the first region 7310 of the user interface object 7300 (e.g., on or near a data item (e.g., contact name 7322, in this example) currently shown in the first region 7310, away from a peripheral region of the user interface object 7300, etc.), the computer system performs a first navigation operation through the set of data items by a first amount (e.g., scroll through the list of contact names by a first number of names, a first number of pages, a first number of quantities that is not dependent on a number of index items, etc.). As shown in FIGS. 7A-7B, for a first amount of upward movement 7316 of the user's hand 7202 in the physical environment (e.g., represented as a first amount of movement 7316' of the representation 7202' in the three-dimensional environment 7104), the computer system scrolls through the contact names in the first region 7310 by a first amount 7318. The first amount 7318 of navigation corresponds to the first amount of movement 7316 of the user's hand (e.g., the movement of the hand causes the computer system to scroll through the first seven contact names and displays the eighth contact name (e.g., Alex, in this example) at the top of the user interface object 7300, in this example). In some embodiments, the first input of the first type is a gesture input that involves movement of a first portion of the user's hand (e.g., thumb, index fingers, one or more fingers, etc.) moving relative to another portion of the user's hand (e.g., side of index finger, middle flange of the index finger, palm, etc.) in a preset manner (e.g., swipes forward, swipes sideways, flick upward, tap down, tap and hold, etc.), and the characteristics of the gesture input (e.g., movement speed, movement duration, movement distance, acceleration, etc.) are used to determine the amount of navigation to be performed to navigate through the data items in the first region 7310. For example, a bigger amount of movement, a faster speed, etc. will cause a correspondingly bigger amount of navigation through the data items in the first region 7310, in accordance with some embodiments.

Figure 7D:
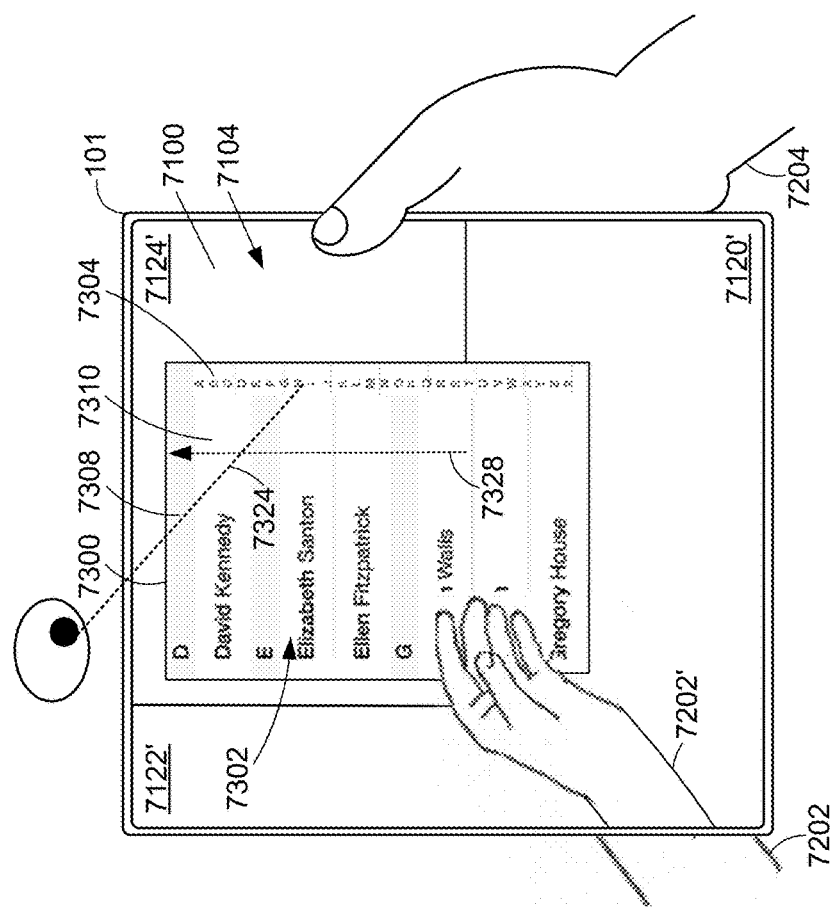
Figure 7C:
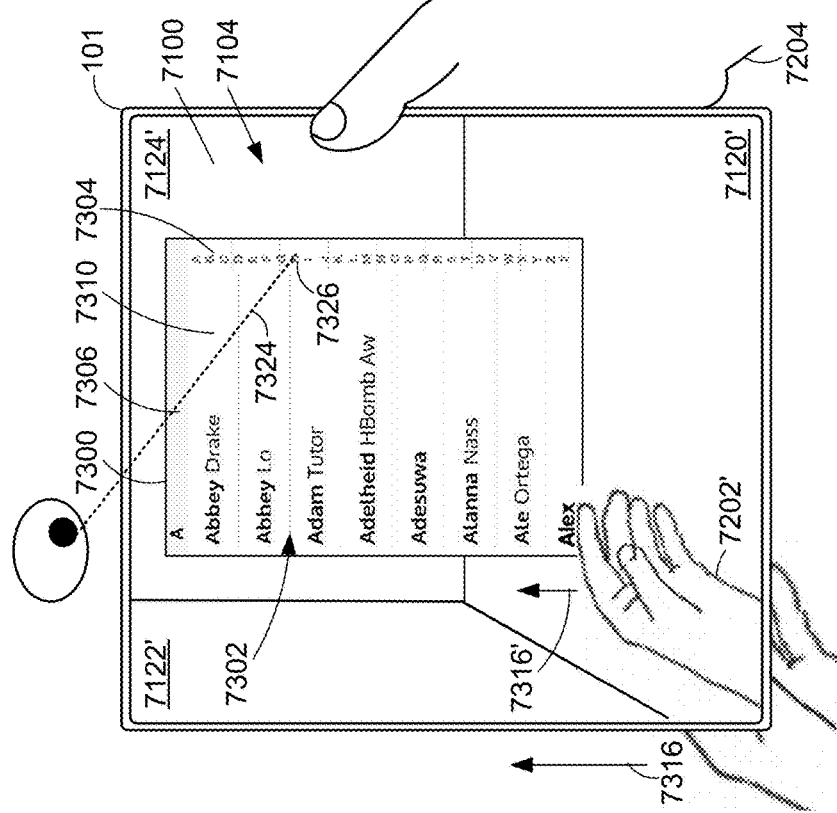

In contrast to the example scenario shown in FIGS. 7A-7B, FIGS. 7C-7D illustrate the same first input of the first type that is detected in conjunction with a user's gaze input 7324 in the second region 7304 of the user interface object 7300 (e.g., on or near an index item (e.g., a letter 7326, in this example) currently shown in the second region 7304, in a peripheral region of the user interface object 7300, etc.). In response to detecting the first input of the first type, in accordance with the one or more characteristics (e.g., characteristics of the hand or finger movement, such as speed, distance, direction, acceleration, etc., characteristics of a press input (e.g., intensity, duration, etc.), etc.) of the first input, and in accordance with a determination that the position of the user's gaze input 7324 is in the second region 7304 of the user interface object 7300 (e.g., on or near an index item (e.g., letter 7326, in this example) currently shown in the second region 7304, away from the item region 7310, inside a peripheral region of the user interface object 7300, etc.), the computer system performs a second navigation operation through the set of data items by a second amount (e.g., scroll through the list of contact names by a second number of names, a second number of pages, a second number of quantities that is based on a number of index items, etc.). As shown in FIGS. 7C-7D, for the first amount of upward movement 7316 of the user's hand 7202 in the physical environment (e.g., represented as a first amount of movement 7316' of the representation 7202' in the three-dimensional environment 7104), the computer system scrolls through the contact names in the first region 7310 by a second amount 7328. The second amount 7328 of navigation corresponds to the first amount of movement 7316 of the user's hand (e.g., scrolls through all the contact names under the index letters A-C and displays a contact under the letter D (e.g., David Kennedy, in this example) at the top of the user interface object 7300, in this example). The index item "D" is represented in the header 7308 at the top of the user interface object 7300. The second amount of navigation 7328 shown in the example in FIGS. 7C-7D is greater than the first amount of navigation 7318 in the example shown in FIGS. 7A-7B, because the user's gaze input is directed to the index region as opposed to the data region of the user interface object 7300.

In this example, the characteristics of the gesture input (e.g., movement speed, movement duration, movement distance, acceleration, etc.) are also used to determine the amount of navigation to be performed to navigate through the items in the first region 7310, as done in the example in FIGS. 7A-7B, in accordance with some embodiments. For example, a bigger amount of movement, a faster speed, etc. will cause a correspondingly bigger amount of navigation through the data items in the first region 7310, in accordance with some embodiments. With the user's gaze being detected in the second region 7304, the amount of navigation is even greater (e.g., based on the number of index items, as opposed to being based on the number of data items), as compared to that shown the example in FIGS. 7A-7B.

In some embodiments, the user interface object 7300 is displayed at a location in the mixed reality environment that corresponds to a predefined portion of the user's hand (e.g., the tip of the thumb, the palm of the hand, etc.) and having an orientation that corresponds to the orientation of the user's hand (e.g., orientation of the thumb, orientation of the palm, etc.). In some embodiments, when the user's hand moves (e.g., laterally moves or rotates) relative to the physical environment (and/or relative to the camera that captures the user's hand, or the user's eyes, or a physical object or wall surrounding the user), the user interface object 7300 is shown to move in the mixed reality environment with the user's hand. In some embodiments, the user interface object 7300 moves in accordance with movement of the user's body, but not with the movement of the user's head or the user's gaze directed to the mixed reality environment. In some embodiments, the user interface object 7300 is displayed at a fixed location on the display, irrespective of the view of the physical environment shown on the display (e.g., when the view changes with movement of the user's head or torso).

In some embodiments, the first input of the first type includes a predefined gesture (e.g., an in air finger swipe gesture, a movement of a contact on a touch-sensitive surface, or a swipe gesture that includes movement of a first finger along the side of a second finger of the same hand, etc.) that is detected in conjunction with a user's gaze input directed to the user interface object (e.g., the user interface object 7300, in this example). Without the user's gaze input being directed to the user interface object within a threshold amount of time of the predefined gesture, the gesture does not cause the navigation operation to be performed with respect to the data items in the user interface object.

In some embodiments, the index is displayed at a location that is selected based on the location of the user's gaze input outside of the item region. For example, there are more than one peripheral edge regions of the user interface object 7300 (e.g., all of which are sub-regions of the index region 7304) in which the index of the items can be displayed, and the index is displayed in a respective peripheral edge region of the multiple peripheral edge regions depending on the location of the user's gaze input inside the user interface object 7300. For example, in accordance with a determination that the user's gaze input is in the bottom edge region of the user interface object 7300, the index items are displayed at or moved to the bottom edge portion of the user interface object 7300; and in accordance with a determination that the user's gaze input is in the right edge portion of the user interface object 7300, the index items are displayed at or moved to the right edge portion of the user interface object 7300. In some embodiments, the display of the index items in the index region (e.g., in a single index region, in a respective one of multiple sub-regions of an index region, etc.) is triggered by the detection of the user's gaze input in the index region, optionally, while the user's hand is in a ready state for performing the predefined navigation gesture. In some embodiments, after respective representations of the index items are displayed in the index region in accordance with detection of the user's gaze input in the index region, the respective representations of the index items will cease to be displayed if the user's gaze input is no longer detected on the index region or if there are no interactions with the user interface object for a predetermined period of time.

In some embodiments, before the representations of index items are displayed in the index region in response to a user's gaze input, the index region may be occupied by some of the data items that are currently displayed in the user interface object. In other words, the portion of the environment that is occupied by the index region at a first time (e.g., a time when the index region is displaying the index) optionally overlaps with or is a sub-portion of the portion of the environment that is occupied by the item region at a second time (e.g., a time when the index region is not displaying the index, and is optionally displaying data items), in some embodiments. For example, in FIG. 7A, at a time when the index is not displayed in the user interface object 7300 (e.g., in the right edge region 7304), a contact name (e.g., contact name 7322) that is particularly long may extend into the right edge region of the user interface object 7300; and when the user's gaze is detected in the right edge region 7304 which triggers display of the index at the location of the user's gaze (e.g., in the right edge region 7304), the extra-long contact name would be obscured by the newly displayed index. In some embodiments, irrespective of whether or not the items extends into the index region (e.g., right edge region 7304, or index region in another area of the user interface object, etc.) of the user interface object and irrespective of whether or not an index is ever displayed in the index region, the computer system performs the greater, second amount of navigation in response to the first input of the first type in accordance with a determination that a user's gaze input is detected in the index region.

In some embodiments, a user input of a second type is used to select and/or activate a respective item that is currently displayed in the data region of the user interface object. In some embodiments, the second input of the second type is different from the first input of the first type in terms of input type. In some embodiments, the second input of the second type includes a gesture input that is detected in conjunction with a user's gaze input that is directed to a respective data item currently displayed in the data region. In some embodiments, selecting or activating the respective data item includes triggering performance of an operation associated with the respective data item (e.g., displaying a preview of information associated with the respective data item while maintaining display of the respective representation of the respective data item, launching an application corresponding to the respective data item and/or performing an operation (e.g., displaying a media item, starting a communication session, displaying a contact card, etc.) within the application that is specific to the respective data item (e.g., as opposed to performing an operation specific to other items among the set of items), etc.).

In some embodiments, while the user interface object is displaying data items from a set of indexed data items, the computer system optionally displays one or more additional user interface objects that display data items from other sets of index data items (e.g., other different types of items or items with different types of indices, etc.). In some embodiments, while displaying the user interface object 7300, the computer detects movement of the detected gaze from the user interface object 7300 to a location corresponding to a second user interface object different from the user interface object 7300, wherein the second user interface object displays other indexed data items (e.g., a different type of data items from those shown in the user interface object 7300, a different set of data items of the same type as those shown in user interface object 7300, etc.) or the same set of data items with a different index (e.g., contacts indexed by locations as opposed to first letters of last names, media items indexed by genre as opposed to filename, etc.). In some embodiments, in response to detecting movement of the user's gaze to the second user interface object, the computer system displays a change in appearance of the second user interface object to indicate that input focus has shifted from the user interface object to the second user interface object. In some embodiments, a subsequent user input of the first type (e.g., in conjunction with the user's gaze input at different portions of the second user interface object) would cause navigation in the item region of the second user interface object in a manner similar to that described with respect to the user interface object 7300. In some embodiments, the second user interface object includes only a data region that includes representations of data items and does not include an index region; and the same amount of navigation is achieved irrespective of the location the detected gaze in the second user interface object. In some embodiments, the second user interface object includes both a data region that includes representations of data items and an index region that includes representations of index items that correspond to different subsets of the data items associated with the second user interface object; and a greater amount of navigation is achieved when the detected gaze is directed to the index region than when the detected gaze is directed to the data region of the second user interface object. In some embodiments, the second user interface object includes different levels of indexes for the same set of data items, such as an additional index region that includes subsets of the index items with corresponding indices, and an even greater amount of navigation is achieved when the detected gaze is directed to the additional, higher level index region. As described herein, the behaviors described with respect to the second user interface object are not predicate on the existence of the user interface object 7300. In some embodiments, the user interface object 7300 has the behaviors described with respect to the second user interface object.

In some embodiments, the user interface object 7300 is body locked but not head locked. For example, in response to detecting the movement of the user relative to the physical environment: in accordance with a determination that the movement of the user includes movement of at least a portion of the user's torso (e.g., parts other than a head and hands of the user) relative to the physical environment, the computer system moves the user interface object 7300 (e.g., the first region 7310 and the second region 7304 stay stationary relative to each other) in accordance with the movement of the at least the portion the user's torso. For example, as the user moves around in the physical environment, the whole user interface object 7300 moves within the three-dimensional environment 7104 to maintains a fixed spatial relationship with the viewpoint corresponding to the currently displayed view of the three-dimensional environment. In accordance with a determination that the movement of the user includes movement of the user's head relative to the user's torso without movement of at least a portion of the torso (e.g., the user turns his/her head while remaining fixed in position and/or orientation as a whole in the physical environment), the computer system does not move the user interface object 7300 in accordance with the movement of the user's head. For example, as the user moves his/her head without additional whole body movement, the first and the second region may move in the user's field of view and/or move outside of the user's field of view, in accordance with some embodiments.

In some embodiments, the user interface object (e.g., user interface object 7300, or another user interface object displaying indexed items, etc.) follows the movement of the user's gaze when the last items in the navigation direction has been reached (e.g., due to navigation, or as displayed, etc.) and are currently displayed in the user interface object, and the user interface object does not follow the movement of the user's gaze if the items displayed in the user interface object are not the last items in the navigation direction. In some embodiments, when the user's gaze is directed to the user interface object, a repetition of multiple inputs of the first type causes navigation to the end of the set of data items (e.g., if the navigation direction is a forward direction through the sequence of data items) or the beginning of the set of items (e.g., if the navigation direction is a backward direction through the sequence of data items) in the first region of the user interface object. A subsequent movement of the user's gaze input while the end of the items are being displayed in the first region of the user interface object causes the computer system to move the user interface object as a whole in accordance with the movement of the user's gaze input in the three-dimensional environment, in accordance with some embodiments. In some embodiments, another input of predefined type (e.g., a pinch and move gesture detected in conjunction with the user's gaze on the user interface object (e.g., the user interface object 7300, or another user interface object displaying indexed items, etc.), a user's gaze input on a grab bar or corner on the user interface object, etc.) is used to move the user interface object within the three-dimensional environment. In some embodiments, the user interface object follows the movement of the user's hand 7202 as a whole (e.g., the user interface object 7300 appears to have a fixed spatial relationship to the representation 7202' of the user's hand 7202, where the hand 7202, optionally, is also the hand that provides the gesture input for navigation through the data items). In some embodiments, the navigation through the data items in the user interface object occur concurrently with the movement of the user interface object as a whole in accordance with the movement of the hand as a whole and in accordance with the gesture performed by the hand while moving as a whole. In some embodiments, the user's gaze does not need to be maintained on the user interface object once navigation has started and/or is continuing in response to repetition of the user's gesture inputs.

FIGS. 7E-7J are block diagrams illustrating display and interaction with a user interface object (e.g., a dock, a menu, an app tray, a control panel, a virtual three-dimensional object, etc.) in a three-dimensional environment in response to inputs involving movements of a user's hand, in accordance with some embodiments.

Figure 7F:
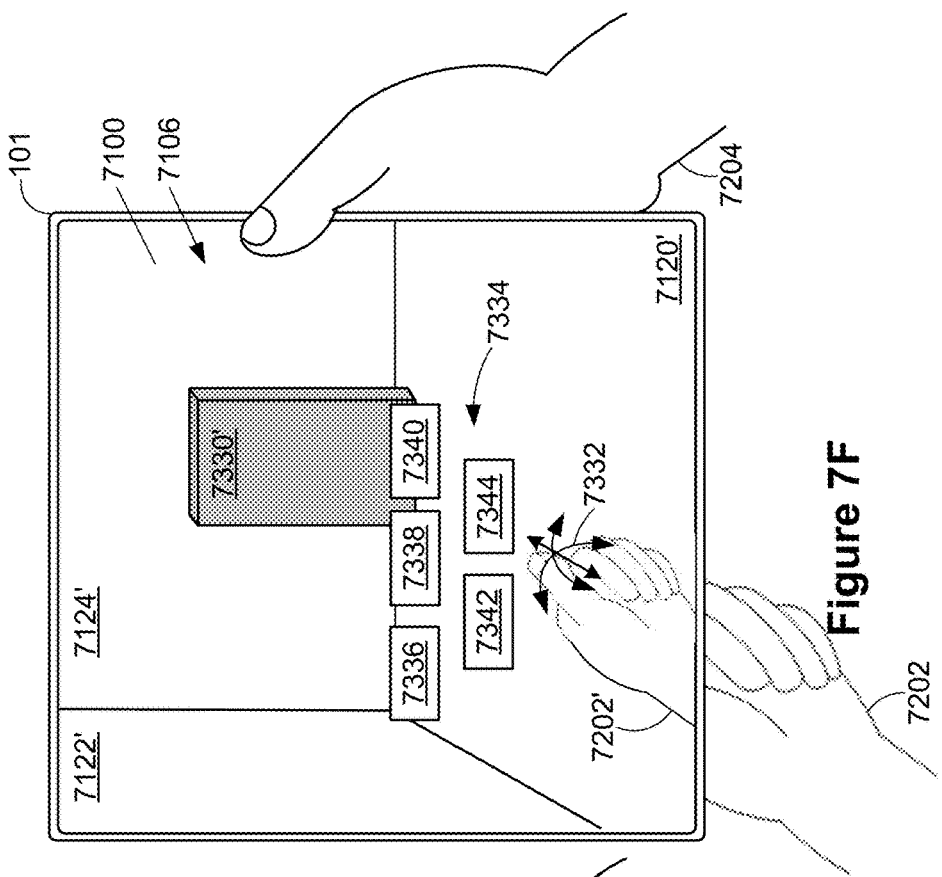

In some embodiments, the computer system displays a virtual object (e.g., user interface object 7334, or another virtual object, etc.) that includes multiple selectable controls (e.g., controls 7336, 7338, 7340, 7342, 7344, or other controls, etc.) (e.g., application icons for launching applications, menu options for displaying submenus or performing operations, selectable objects for triggering performance application functions, device functions, adjustment of device settings, etc.) in a three-dimensional environment (e.g., environment 7106, or another three-dimensional environment) (e.g., a virtual environment, an augmented reality environment, etc.) in response to a user input that includes movement of a user's hand that meets preset criteria (e.g., dock display criteria, menu display criteria, etc.). The computer system selects the initial position of the virtual object based on the location of the user's hand (e.g., hand 7202, or another hand, etc.) at the conclusion of the movement that met the preset criteria. Accordingly, the user can influence the initial position of the virtual object in the three-dimensional environment by choosing the location of his/her hand when providing the required movement of the hand to trigger display of the virtual object. Subsequently, the computer system decouples the position of the virtual object from the location of the user's hand, so that the user can use the same hand (and optionally, using a different hand, or a combination of both hands, etc.) to provide gestures to interact with the virtual object and the controls contained therein. In some embodiments, different types of gestures (e.g., swipe, flick, tap, push, etc.) that involve small movements of one part of a hand relative to another part of the hand are used to interact with (e.g., scrolling, switching input focus, making selection, adjusting value, etc.) the virtual object and the controls contained therein (e.g., while the whole hand is not raised up (e.g., resting on the table, lowered on the side of the user's body, resting on the user's lap, etc.), while the hand is raised to a location that corresponds to the current position of the virtual object, etc.). In some embodiments, movement of the hand as a whole while in various preset hand postures cause a different set of operations to be performed with respect to the virtual object than those caused by different types of small movements within the same hand. In some embodiments, after the computer system decouples the position of the virtual object from the location of the user's hand following the initial display of the virtual object in the three-dimensional environment (e.g., displayed in response to the movement of the user's hand that met the preset criteria, as shown in FIG. 7F), the computer system optionally couples the position of the virtual object to the viewpoint of the currently displayed view of the three-dimensional environment (e.g., as shown in FIG. 7G), such that the virtual object maintains a spatial relationship between the virtual object and the viewpoint of the currently displayed view of the three-dimensional environment during movement of the viewpoint (e.g., as caused by the movement of the user carrying the display generation component, movement of the user's head wearing the HMD, etc.) relative to the three-dimensional environment. Allowing the virtual object containing selectable controls to be displayed at a position that corresponds to the location of the user's hand when the display of the virtual object is invoked by preset movement of the user's hand, and then subsequently decoupling the position of the virtual object from the location of the user's hand make it possible for the user to influence the display position of the virtual object (e.g., selecting which portion of the field of view the virtual object should be displayed in, selecting how far away the virtual object should be displayed from the viewpoint, selecting which orientation the virtual object should be displayed relative to the viewpoint, etc.), without unnecessarily tying the virtual object to the user's hand to prevent the user from utilizing the same hand to provide gestures to interact with the virtual object. This makes user interaction with the virtual object more efficient, and reduces the number, extent, and/or nature of the inputs from a user to achieve a desired outcome, thereby creating a more efficient human-machine interface.

In particular, in some embodiments, the display of the user interface object and the interaction with the user interface object after the display of the user interface object are caused by movement of the same hand of the user (e.g., the hand 7202, in this example) in the physical environment. In some embodiments, the user interface object (e.g., user interface object 7334, or another user interface object with the behaviors described here, etc.) is a dock or menu that includes selectable objects (e.g., application icons, avatars of users, representations of different computer-generated experiences, etc.) corresponding to different operations. In some embodiments, the operations include system-level operations such as launching an application, configuring a device function, displaying a multitasking user interface that shows representations of multiple active or recently displayed applications or experiences, displaying a communication user interface showing avatars of different users with different types of communication capabilities, etc. In some embodiments, the operations include application-level operations such as navigate to another user interface within the currently displayed application, performing an application-specific operation within the currently displayed application (e.g., starting a new email in an email application, playing back a song in a media player application, starting a chat with a user in a currently displayed chat program, etc.). In some embodiments, the user interface object is displayed at a position in a three-dimensional environment that corresponds to a location of the user's hand that performed the gesture that triggered display of the user interface object, and does not follow the subsequent movement of the user's hand, so that the user can use the same hand to interact with the user interface object. In some embodiments, the user interface object is displayed at a position in a three-dimensional environment that corresponds to a location of the user's hand that performed the predefined gesture that triggered display of the user interface object, and follows the subsequent movement of the user's hand until the user's hand ceases to maintain a predefined posture (e.g., a posture at the end of the predefined gesture, a ready state posture for performing system-level operations, etc.). Once the user's hand ceases to maintain the predefined posture, the user interface object is fixed in position relative to the three-dimensional environment and no longer moves in accordance with the movement of the user's hand as a whole in the physical environment. In some embodiments, the user interface object, optionally, remains displayed at the same position even after the position exits and then returns to the field of view of the three-dimensional environment provided by the display generation component due to movement of the user as a whole or due to movement of the user's head in the physical environment. In some embodiments, the computer performs operations corresponding to the selectable options in the user interface object in accordance with subsequently detected inputs provided by the user's hand that are directed to the selectable options.

In some embodiments, the user interface object (e.g., the user interface object 7334, another user interface object that has behaviors described herein, etc.) is displayed in a virtual three-dimensional environment that includes virtual content without a representation of a physical environment. In some embodiments, the user interface object is displayed in a mixed-reality environment that includes virtual objects with spatial relationships corresponding to spatial relationships of physical objects in the physical environment (e.g., a view of a room with virtual wallpapers and virtual windows on the representation of physical walls) without a representation of the physical environment being visible in the three-dimensional environment (e.g., without a pass-through view of the physical environment viewed from a transparent portion of the display generation component, and without a camera view of the physical environment, etc.). In some embodiments, the user interface object is displayed in an augmented reality environment that includes a representation of a physical environment as well as virtual objects at positions that correspond to locations of various portions of the physical environment (e.g., mid-air, on a wall surface, on a table top, etc.).

In some embodiments, a representation of the user's hand (e.g., hand 7202, or another hand, etc.) is visible in the same three-dimensional environment as the user interface object (e.g., user interface object 7334, or another user interface object with similar behaviors described herein, etc.). In some embodiments, the representation of the hand is visible in the view of the three-dimensional environment before the user interface object is displayed, while the user interface object is displayed, and/or after the user interface object is displayed, in the three-dimensional environment. In some embodiments, the representation of a user's hand is a stylized version of the user's hand, a segmented image from a camera view of the user's hand without the surrounding physical environment, or an image of the user's hand as part of a camera view or pass-through view of the physical environment, etc.) that is displayed at a position in the three-dimensional environment that corresponds to the location of the user's hand in the physical environment, and optionally blocks, replaces display of, overlays, etc. a portion of the virtual content or physical environment that used to be displayed or visible at that position in the three-dimensional environment.

In the example shown in FIG. 7E-7J, the computer system displays a view of a three-dimensional environment 7106. In some embodiments, the view of the three-dimensional environment is an augmented reality environment that includes representations 7122' and 7124' of two adjacent walls in a physical environment of the user, a representation 7120' of a floor in the physical environment of the user, and a representation 7330' of a physical object in the physical environment of the user. In some embodiments, the view of the three-dimensional environment 7106 represents a virtual environment with virtual walls, virtual floor, and one or more virtual objects.

Figure 7E:
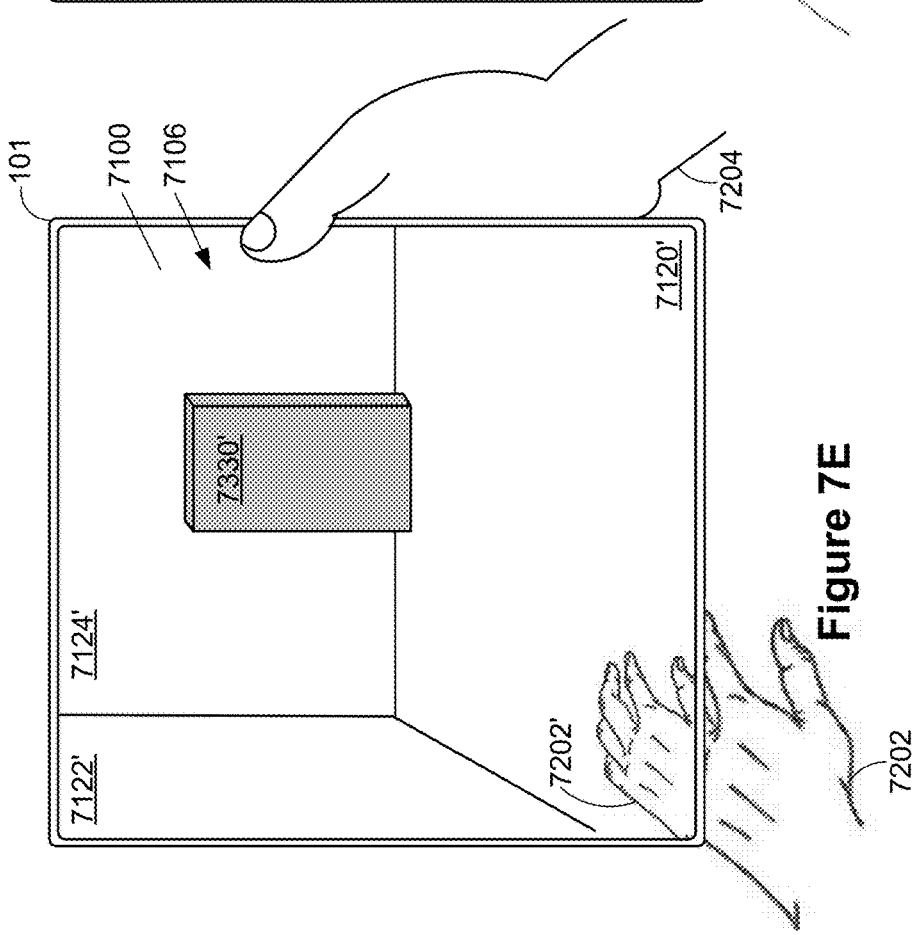

As shown in FIG. 7E, before the user's hand makes the movement to meet first preset criteria (e.g., moving into a preset posture or enter into a ready state for providing gestures to interact with the three-dimensional environment (e.g., the user's hand 7202' is in a relaxed state, not in a preset posture or ready state, not moving or changing posture, not facing a required direction, etc.), making a required movement as a whole, etc.), there is no user interface object displayed on or next to the representation 7202' of the user's hand 7202. In fact, in some embodiments, the representation 7202' may be outside of the field of view provided via the display generation component 7100 at this time. At this stage, if the display generation component 7100 (e.g., in the hand 7204, or on the user's head, etc.) is moved relative to the physical environment, the computer system will move the viewpoint corresponding to the currently displayed view of the three-dimensional environment 7106, such that the three-dimensional environment can be viewed from a different vantage point in the three-dimensional environment, in accordance with some embodiments. If movement of the user's hand 7202 is detected, but the movement does not meet the first preset criteria, the computer system also does not display an interactive user interface object with selectable options (e.g., the user interface object 7334, in this example) at or next to the representation 7202' of the user's hand, in accordance with some embodiments.

FIG. 7F follows FIG. 7E, and illustrates that, the user's hand 7202 has made the requirement movement 7332 (e.g., whole hand movement, and/or movement of one part of the hand relative to another part of the hand, etc.) in the physical environment that satisfies the first preset criteria. In some embodiments, the first preset criteria require that the user's hand 7202 forms a preset ready-state posture (e.g., opened with a palm facing the user's face, hand closed and oriented with the thumb resting on the side of the index finger and facing the user's face, etc.). In some embodiments, the first preset criteria require that the user's hand moves as a whole in a preset manner (e.g., upward, toward the user's face, etc., optionally, with the hand in a preset posture). In some embodiments, the first preset criteria require that the user's hand moves in a preset manner while a user's gaze input is directed to the user's hand. Additional variations of the first preset criteria are described with respect to FIG. 9, in accordance with various embodiments.

In FIG. 7F, in response to detecting the user's hand 7202 making the required movement to meet the first preset criteria, the computer system displays a user interface object 7334 at a position that corresponds to the location of the user's hand 7202 (e.g., at a position on or next to the representation 7202' of the user's hand 7202). In some embodiments, the user interface object 7334 overlays, replaces display of, or blocks the view of at least a portion of the representation 7202' of the user's hand 7202, depending on the particular ways that virtual content and representation of the physical environment (e.g., using camera view, using a transparent display, etc.) are displayed or made visible via the display generation component 7100. In some embodiments, the user interface object 7334 includes one or more interactive elements (e.g., selectable objects 7336, 7338, 7340, 7342, 7344 that correspond to different functions or operations of the computer system or a currently displayed application or experience, etc.).

In some embodiments, the computer system does not move the user interface object 7334 in accordance with further movement of the user's hand 7202 after user interface object 7334 is displayed in accordance with the first preset criteria being met by the movement of the user's hand. In some embodiments, while the first preset criteria are still met (e.g., a user's gaze is still on the user's hand 7202 while the user's hand maintains the required posture, or the user's hand is still in the preset posture required by the first preset criteria, etc.), the computer system maintains display of the user interface object 7334, and optionally, moves the user interface object 7334 as a whole in accordance with movement of the user's hand as a whole in the physical environment. For example, in some embodiments, the first preset criteria require that the user's hand is open with the palm side facing the user and a user's gaze directed to the palm; in response to determining that the first preset criteria are met by the user opening his hand and looking at the representation of the hand via the display generation component, the computer system displays the user interface object 7334 at a position on or next to the representation 7202' of the user's open hand. Subsequently, the computer system moves the user interface object 7334 in accordance with the movement of the representation 7202' of the user's hand 7202 as long as the user's hand remains open with the palm facing toward the user's face. The computer system ceases to move the user interface object 7334 when the user closes his hand or turns his hand such that the palm is no longer facing the user's face, in accordance with some embodiments.

In another example, in some embodiments, the first preset criteria require that the user's hand form a preset ready-state posture with the thumb resting on the side of the index finger of the same hand; in response to determining that the first preset criteria are met by the user forming the required hand posture, the computer system displays the user interface object 7334 at a position on or next to the representation 7202' of the user's hand in the preset ready-state. Subsequently, the computer system moves the user interface object 7334 in accordance with the movement of the representation 7202' of the user's hand 7202 as long as the user's hand remains in the preset ready state posture. The computer system ceases to move the user interface object 7334 when the user changes his hand posture such that the hand is no longer in the preset ready-state posture. In some embodiments, after the computer system stops moving the user interface object 7334 in accordance with the movement of the user's hand 7202, the user interface object 7334 is optionally displayed at (e.g., displayed without further movement, or moved to, etc.) a preset position in the three-dimensional environment. In some embodiments, the preset position is the position of the user interface object 7334 at the end of its movement in accordance with the movement of the user's hand as a whole. In some embodiments, the preset position is a preset portion of the user's field of view (e.g., the center of the user's field of view, the lower left corner of the field of view, etc.) that is selected based on the last position of the user's hand before the hand ceases to meet the first preset criteria (e.g., hand changes out of the preset posture, hand ceases to hold the ready state posture, gaze is no longer directed to the hand, etc.).

In some embodiments, the computer system decouples the position of the first user interface object 7334 from the location of the user's hand as soon as the first user interface object 7334 is displayed at the position that corresponds to the location of the user's hand after the movement of the hand met the first preset criteria. So, the subsequent movement of the hand in the physical environment does not change the position of the first user interface object 7334, and the representation of the hand can be seen to move freely relative to the first user interface object 7334 in the view of the three-dimensional environment.

In FIG. 7G, after the user interface object 7334 is displayed in the three-dimensional environment at a position that is selected in accordance with the position of the representation 7202' of the user's hand 7202 (e.g., in accordance with a determination that the movement of the hand 7202 meets the first preset criteria), the user interface object 7334 remains displayed at the position while the user's hand 7202 moves away or changes posture in the physical environment. At this point, the user interface object 7334 is fixed relative to the three-dimensional environment 7106 (or, optionally, to the viewpoint or field of view) and does not move in accordance with the movement of the user's hand 7202 as a whole.

Figure 7H:
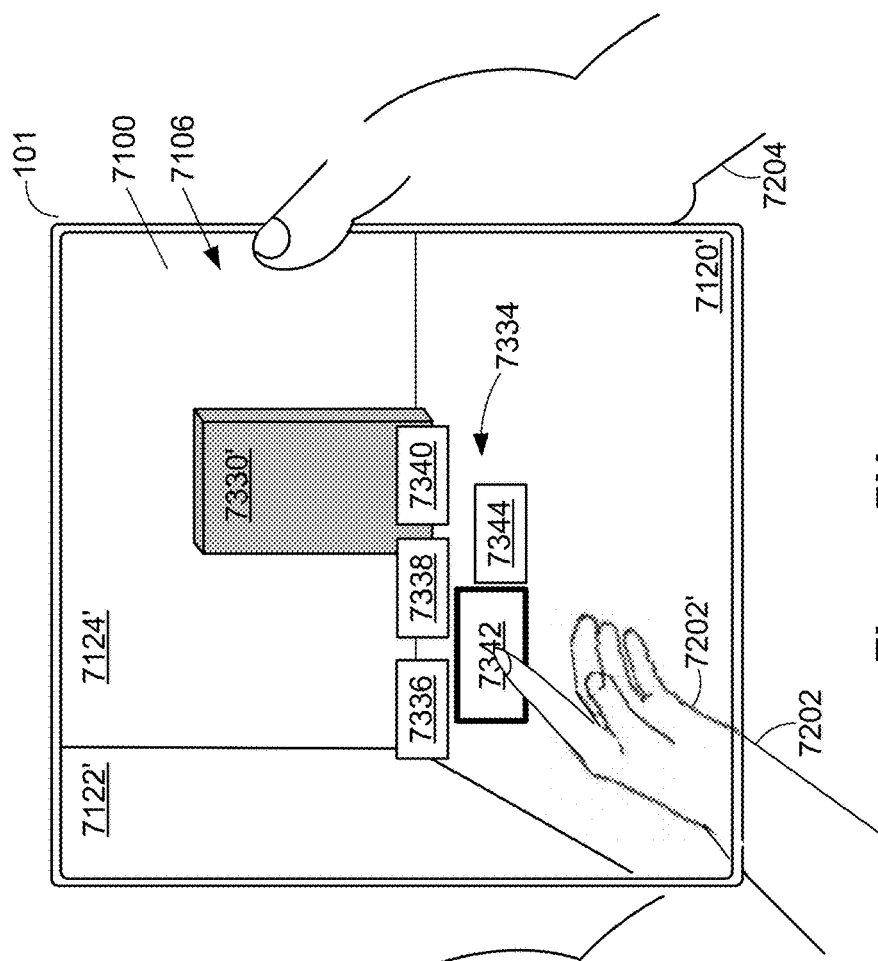
Figure 7G:
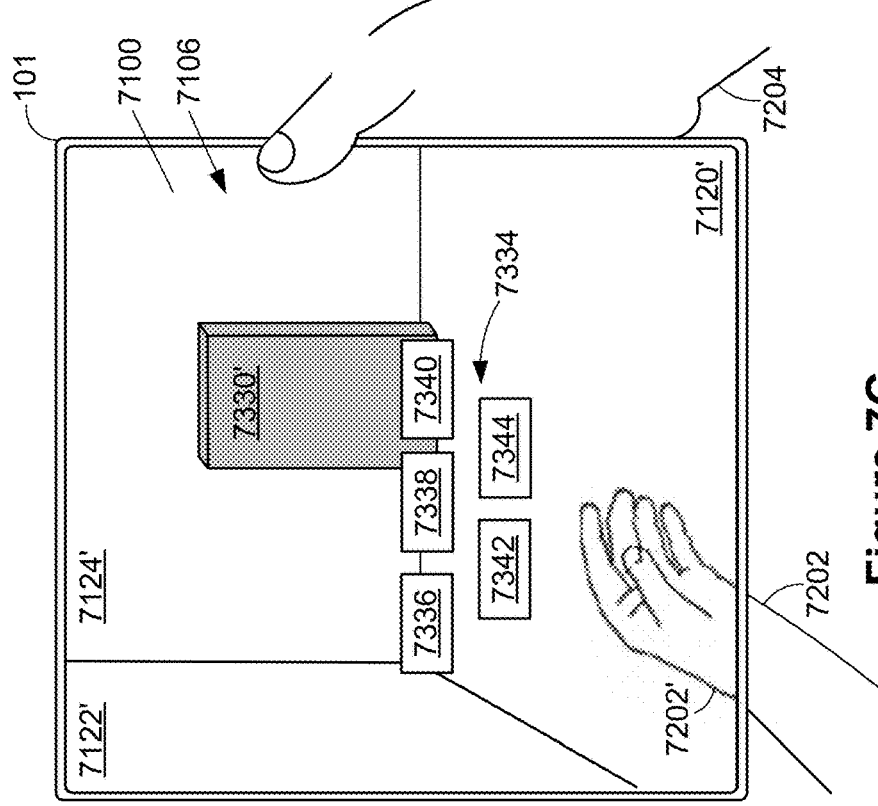

In FIG. 7H, as the user interface object 7334 is fixed relative to the three-dimensional environment (or, optionally, to the viewpoint or field of view), movement of the user's hand toward a location that corresponds to the position of the user interface object 7334 is represented in the view of the three-dimensional environment 7106 as movement of the representation 7202' toward the user interface object 7334. The movement of the user's hand 7202 in the physical environment can be adjusted such that it moves toward a location corresponding to the position of a respective selectable object within the user interface object 7334. In some embodiments, interaction with the user interface object 7334 or a selectable object within the user interface object 7334 require the user's hand to meet preset interaction criteria. For example, the interaction criteria require that movement of the hand needs to meet the criteria for an in-air tap gesture at a location that corresponds to the position of the user interface object 7334 or the selectable option, in accordance with some embodiments. In some embodiments, the interaction criteria require that the movement of the hand meets the criteria for detecting a micro tap gesture (e.g., thumb tap on side of index finger) while a user's gaze is directed to the user interface object 7334 or the selectable object within the user interface object 7334 or while the selectable option has input focus.

As shown in FIG. 7H, the user's hand 7202 has made the required movement for interacting with the user interface object 7334 (e.g., met the requirement for selecting the selectable option 7342 of the user interface object 7334, met the requirement for otherwise interacting with the user interface object 7334, etc.). In response to detecting that the user's hand 7202 has made the required movement for interacting with the user interface object 7334, the computer system performs a corresponding operation in the three-dimensional environment 7106. For example, as shown in FIG. 7I, a virtual object 7348 (e.g., another user interface object, a user interface or window of an application, a control panel, a selection user interface for selecting a contact to start a communication session, etc.) corresponding to the selected option 7342 is added to the three-dimensional environment 7106. In some embodiments, the computer system performs an operation that corresponds to a selectable option and replaces the currently displayed three-dimensional environment with another environment (e.g., an application environment, a computer-generated experience, a virtual room of a communication session, etc.). In some embodiments, the user interface object 7334 remains displayed in the three-dimensional environment (e.g., at the same position, or at a different position, etc.) after the user interaction with the user interface object 7334.

In some embodiments, while the user interface object 7334 is displayed at a respective position in the three-dimensional environment (e.g., displayed at an initial display position without movement, or another position selected in accordance with the movement of the user's hand while the first preset criteria remain met, etc.) that does not change with the movement of the user's hand (e.g., because the first preset criteria are no longer met), the computer system moves the user interface object 7334 in accordance with the movement of the display generation component (e.g., display generation component 7100, an HMD that is worn by the user, etc.) in the physical environment, such that the user interface object 7334 has a fixed position relative to the field of view provided by the display generation component. For example, in some embodiments, the user interface object 7334 is head locked to the user's head, and when the computer system detects movement of the user's head relative to the physical environment, the computer system moves the viewpoint of the currently displayed view of the three-dimensional environment and moves the user interface object 7334 relative to the three-dimensional environment such that the user interface object 7334 has a fixed spatial relationship to the viewpoint rather than to the three-dimensional environment.

In some embodiments, the user interface object 7334 is fixed to the three-dimensional environment and, optionally, remains displayed at a position fixed to the three-dimensional environment even if the position exits and returns to the field of view provided by the display generation component.

In some embodiments, the computer system ceases to display the user interface object 7334 in response to detecting more than a threshold amount of movement of the display generation component (e.g., display generation component 7334, an HMD worn by the user, etc.) in the physical environment. In some embodiments, the computer system ceases to display the user interface object 7334 in response to detecting more than a threshold amount of movement of the display generation component (e.g., display generation component 7334, an HMD worn by the user, etc.) in the physical environment, only after the user has interacted with the user interface object 7334.

In some embodiments, the computer system ceases to display the user interface object 7334 in response to detecting the user's hand movement that corresponds to a request to dismiss the user interface object (e.g., moving the user's hand 7202 to cause the representation 7202' out of the field of view of the display generation component, hand movement with a posture that neither in the ready state posture (e.g., thumb resting on the side of the index finger, palm open, etc.) or an interaction posture (e.g., index finger extended out, thumb resting on the side of the index finger, etc.), a hand wave that swipes away the user interface object, etc.).

As shown in FIG. 7J, in some embodiments, movement of the display generation component while the hand does not meet the requirement for maintaining display of the user interface object causes the computer system to cease display of the user interface object 7334 in the three-dimensional environment.

In some embodiments, while the user interface object 7334 is displayed at a position in the three-dimensional environment that corresponds to the location of the user's hand 7202, the computer system detects a swipe gesture by the user's hand 7202, and the computer system shifts an input focus from a first selectable option to a second selectable option in accordance with the swipe gesture. For example, in some embodiments, the computer system displays the user interface object 7334 at a position at or near the representation 7202' of the user's hand 7202 in accordance with a determination that the user's hand 7202 has moved into a preset ready state posture (e.g., resting the thumb on the side of the index finger of a closed or semi-closed hand, facing the palm of the hand toward the user's face, etc.). While the user interface object 7334 is displayed at the position at or near the representation 7202' of the user's hand 7202, the computer system detects movement of the user's thumb swiping along the side of the user's index finger (e.g., while maintaining the preset ready state posture); and in response to detecting the movement of the user's thumb swiping along the side of the user's index finger, the computer system shifts an input focus from one selectable object (e.g., control 7336, control 7342, etc.) to another selectable object (e.g., control 7338, control 7344, etc.) within the user interface object 7334.

In some embodiments, in response to detecting that the user has provided a selection input (e.g., a tap, a double tap, a tap and hold, a flick, a push, etc.) using the index finger of the hand 7202 directly at a position that corresponds to a selectable option having input focus or using a thumb on the side of the index finger of the hand 7202, the computer system performs the operation corresponding to the selectable option having input focus. In some embodiments, the swipe input that changes the input focus is performed while the hand 7202 is not in the preset posture used to cause display of the user interface object 7334, but in the posture that is required to interact with the user interface object 7334. For example, the posture required for interacting with the user interface object 7334 is a hand posture with the index finger extended out and other fingers curled toward the palm, in accordance with some embodiments. In response to swiping movement (e.g., sideways movement) of the index finger in this posture, the computer system shifts input focus from object to object within the user interface object 7334; and in response to an in-air tap movement (e.g., up and down movement) of the index finger in this posture, the computer system performs an operation that corresponds to the object that has input focus, in accordance with some embodiments.

In some embodiments, the user interface object 7334 is a multipage user interface object or a multi-section user interface object, where the multiple pages or sections of the user interface object are not all displayed at the same time. For example, in some embodiments, when the user interface object 7334 is initially displayed in accordance with a determination that the first preset criteria are met by the user's hand 7202, the computer system only displays a first page or first section of the user interface object 7334, and does not display the second page or second section of the user interface object 7334. Later, while the user interface object 7334 is displayed, the computer system detects a swipe gesture of the user's hand 7202 (e.g., the swipe gesture of the whole hand as opposed to the swipe gesture used to change input focus within the currently displayed selectable objects of the user interface object 7334); and in accordance with the swipe gesture of the user's hand 7202, the computer system switches to displaying the second page or second section of the user interface object, wherein the second page or second section of the user interface object includes a different set of selectable objects from that included in the first page or first section of the user interface object 7334. In some embodiments, a swipe gesture by an extended finger or a thumb touching the side of index finger causes input focus to shift between selectable objects currently displayed within the user interface object 7334; and a swipe gesture by the whole hand causes display of one page or section of the user interface object 7334 to replace display of another page or section of the user interface object 7334. In some embodiments, when switching between pages or sections of the user interface object 7334 in response to the swiping movement of the user's hand 7334, the overall position of the user interface object 7334 is not changed in accordance with the movement of the user's hand 7202 (e.g., the different pages or sections may have different sizes and/or include different numbers of selectable objects, but the different pages or sections observe the same alignment origins (e.g., same top edge, same left edge, same center position, etc.)) in the three-dimensional environment. In some embodiments, the user interface object 7334 includes multiple pages or sections that are concurrently displayed in the three-dimensional environment, but with different visual prominence levels. For example, a page or section that has the greatest visual prominence has input focus; while other page(s) or section(s), although visible with a lower visual prominence level, do not have input focus until they gain input focus in response to the user's swipe gesture provided by the user's hand 7202. For example, when a first page or section of the user interface object 7334 is displayed with more visual prominence (e.g., in the central region of the user interface object 7334, optionally with greater visual details, greater color saturation, not blurred, brighter, etc.) with one or more second pages or sections of the user interface object 7334 displayed with less visual prominence (e.g., in the peripheral region of the user interface object, and optionally with less details, less color saturation or resolution, dimmer, darker, etc.), the first page or section of the user interface object 7334 has general input focus, and user's swipe input using an index finger or thumb on the side of the index finger of the hand 7202 causes specific input focus to shift within the selectable objects in the first page or section of the user interface object 7334. In response to a user's swipe input by the whole hand, the computer ceases to display the first page or section of the user interface object 7334 with the greater visual prominence and switches to displaying one of the second page(s) or section(s) with the greater visual prominence (e.g., by rotating the display positions of the pages or sections within the user interface object 7334, changing the visual properties of the pages or sections, etc.). One of the second page(s) or section(s) of the user interface object 7334 now has the general input focus, and user's swipe input using an index finger or thumb on the side of the index finger of the hand 7202 causes specific input focus to shift within the objects in the second page or section of the user interface object 7334 that currently has the general input focus and the greater visual prominence. In some embodiments, the computer system allows the user to interact with the second page or section of the user interface object 7334 is manners analogous to those described above, and the details of which are not repeated in the interest of brevity.

In some embodiments, while the user interface object 7334 is displayed at a position in the three-dimensional environment that corresponds to the location of the user's hand 7202, and optionally after the hand has moved away from that location, the computer system detects a push gesture by the user's hand 7202, and the computer system selects a selectable object (e.g., control 7342, control 7344, etc.) within the user interface object 7334 in accordance with a determination that the push gesture meets preset interaction criteria, and performs an operation corresponding to the selectable object. For example, in some embodiments, the computer system displays the user interface object 7334 at a position at or near the representation 7202' of the user's hand 7202 in accordance with a determination that the user's hand 7202 has moved into a preset ready state posture (e.g., resting the thumb on the side of the index finger of a closed or semi-closed hand, facing the palm of the hand toward the user's face, etc.). While the user interface object 7334 is displayed at the position at or near the representation 7202' of the user's hand 7202, and optionally, after the hand has moved away from that location, the computer system detects movement of the user's thumb pushing forward across the side of the user's index finger (e.g., while maintaining the preset ready state posture) toward the user interface object 7334, and in response to detecting the movement of the user's thumb pushing forward across the side of the user's index finger, the computer system selects or activates a selectable option that has input focus (e.g., the input focus having been selected in accordance with a user's gaze input or an in-air swipe input by an index finger, a sideway swipe by a thumb along the side of the index finger, etc.). In some embodiments, the computer system detects a movement of the user's index finger extended and pushing toward a location that corresponds to a respective position of a selectable option in the user interface object 7334, and selects or activates the selectable option in response to detecting the movement of the index finger pushing past a location that corresponds to a threshold position at or near the respective position of the selectable option in the three-dimensional environment.

In some embodiments, in response to detecting the movement of the user's hand 7202 that corresponds to the push gesture to activate a selected object in the user interface object 7334, the computer system displays movement of the user interface object as a whole and/or the movement of the selectable object in the direction of the push gesture (e.g., moving the user interface object 7334 or the selectable object away from the viewpoint in the direction of the movement of the representation 7202' of the user's hand 7202. It is as if the user interface object 7334 or the selectable option is pushed backward by the user's hand, while the selectable option is selected by the user's push gesture. In some embodiments, the movement of the user interface object 7334 or the selectable option away from the viewpoint that is cause by the push gesture of the user's hand is started before the push gesture meets preset activation criteria, and optionally, is reversed after the selectable object is selected by the push gesture in accordance with a determination that the preset activation criteria are met by the push gesture.

As described above, in some embodiments, movements of the user's hand as a whole while in different hand postures (e.g., pushing with index finger extended vs. pushing with all fingers extended, swiping with index finger extended, swiping with all fingers extended, etc.) optionally cause the computer system to perform different types of operations with respect to the user interface object or a selectable object that has input focus (e.g., switching pages or sections, switching input focus among currently displayed selectable objects, enlarging and sending the user interface object into the three-dimensional environment away from the initial display position, selecting a selectable object that has input focus, etc.). In some embodiments, movement of the user's hand into different postures (e.g., a posture with index finger extended out and other fingers curled toward the palm, a posture with the thumb resting on the side of the index finger, a relaxed hand with palm facing away from the user, palm facing toward the user, etc.) optionally cause the computer system to perform different operations with respect to the user interface object or a selectable object that has input focus (e.g., display the user interface object near the representation of the hand, place input focus on a selectable option, ceasing the display the user interface object, place input focus on the user interface object as a whole to move or adjust the user interface object, etc.).

In some embodiments, the user interface object 7334 is a system-level user interface object that can be displayed in a variety of contexts, such as while the computer system concurrently displays any of a number of different applications and/or experiences. In some embodiments, the three-dimensional environment is a mixed reality environment of a first application that includes virtual content and a representation of a physical environment. As the user interface object is displayed at different positions in the three-dimensional environment, e.g., due to different positions of the representations 7202' of the user's hand at the time that the first preset criteria are met by the movement of the user's hand, or due to subsequent movement of the user interface object in accordance with user's input (e.g., an input that corresponds to a request to push the user interface object into the environment away from the viewpoint, an input that drags the user interface object, movement of the user's hand while continuing to meet the first preset criteria, etc.), etc., the user interface object optionally overlays, replaces display of, or blocks the view of, different portions of the virtual content and/or representations of the physical environment previously displayed or made visible in the view of the three-dimensional environment. In some embodiments, the user interface object 7334 is optionally displayed while the three-dimensional environment changes in accordance with the movement of the display generation component relative to the physical environment and/or changes in the virtual content due to preset progression of the mixed-reality experience.

In some embodiments, the user interface object 7334 and the selectable options available in the user interface object 7334 is selected or customized in accordance with the three-dimensional environment that is displayed with the user interface object 7334. For example, three-dimensional environment corresponding to different applications or computer-generated experiences causes the computer system to select different sets of selectable objects to be included in the user interface object 7334, and optionally customize the look and feel of the user interface object 7334 to provide a consistent and non-distracting appearance of the user interface object 7334 within the currently displayed three-dimensional environment. In some embodiments, while the user interface object 7334 is displayed in the three-dimensional environment, the computer system detects a user input that corresponds to a request to cease to display the three-dimensional environment, the computer system ceases to display the three-dimensional environment and displays an augmented reality view of the user's physical environment that includes a representation of the user's physical environment and a home menu (e.g., a more complete version of the user interface object 7334 if the user interface object is a dock that includes only selected application icons for applications and experiences, a user interface object that includes application icons for applications and experiences if the user interface object 7334 is a dock that includes selectable options corresponding to the three-dimensional environment (e.g., a particular application or experience), etc.).

FIGS. 7K-7N are block diagrams illustrating displaying a virtual menu (e.g., a home user interface, a launch pad, a command center user interface, etc.) in a three-dimensional environment at a position that corresponds a preset portion of a physical environment (e.g., a home location, a dock location, etc.) based on whether or not the preset portion of the physical environment is within the field of view provided by a display generation component (e.g., when the display generation component is first turn on or placed in front of the user's eyes, or while the display generation component is moving around in the physical environment, etc.), in accordance with some embodiments.

In some embodiments, a computer system designates (e.g., in accordance with user input, without user input, etc.) a location or area in a physical environment as a "home location" (or "dock location") for displaying a frequently used user interface object (e.g., virtual menu 7352, or another user interface object having analogous features described herein, etc.), such that, when the user views the physical environment through a field of view provided by a display generation component (e.g., display generation component 7100, or another type of display generation component, etc.), the user can easily and predictably locate the user interface object by adjusting the field of view provided by the display generation component relative to the physical environment so that the position that corresponds to the designated location or area is within the field of view. The computer system, when displaying a three-dimensional environment (e.g., environment 7108, or another three-dimensional environment, etc.) that includes a representation of the physical environment, displays the user interface object at the position that corresponds to the "home location" of the user interface object in accordance with a determination that the position that corresponds to the designated location or area is within the field of view provided by the display generation component. This occurs when the display generation component is placed into a state or a position that allows the user to view the physical environment through the display generation component (e.g., when the HMD is turned on, when the HMD is placed on the user's head, when the display is placed in front of the user's eyes, when the user walked in front of a heads-up display, etc.), in some embodiments. In some embodiments, this also occurs when the field of view is changed due to movement of the display generation component (and/or the cameras that capture the view of the physical environment) relative to the physical environment (e.g., movement caused by the user walking around carrying a display generation component, turning his/her head while wearing an HMD, etc.). In some embodiments, the user interface object is a home user interface that includes icons and avatars (e.g., represented by selectable objects 7354, 7356, 7358, 7360, etc.) for applications, experiences, and/or users using which the user can start corresponding application, computer-generated experiences, and share experiences or communication with other users. Another example user interface object (e.g., represented by the user interface object 7352, in this example) is a control panel for controlling device functions of the computer system, such as functions of and settings for display generation component(s), network connection component(s), audio output component(s), flashlight, camera, audio and video output routing, etc. Another example user interface object (e.g., represented by the user interface object 7352, in this example) is a contextual menu which automatically changes its constituent controls and elements (e.g., represented by selectable objects 7354, 7356, 7358, 7360, etc.) based on the current context, such as the current time, a currently displayed application, a current location, a current schedule, upcoming events on a calendar, user's previous interaction with the computer system, etc. In some embodiments, the user interface object is a combination of one or more of the above. In some embodiments, the location or area designated as the "home location" for the user interface object (e.g., represented by the user interface object 7352, in this example) is all or a portion of a physical surface, such as the surface of a wall, furniture, appliance, a tabletop, a countertop, a window, a poster, a TV screen, or a picture frame, etc. In some embodiments, the location or area designated as the "home location" for the user interface object is not occupied by any physical object or surface. For example, the designated "home location" is optionally in the empty region above the countertop, in the middle of a room, above the computer screen of a desktop computer, etc.

By utilizing the user's familiarity with a physical environment and the user's intuitive sense of position and orientation in the physical environment, the computer system provides a predictable access point for frequently used functions of the computer system, but does not unnecessarily clutter the user's field of view by persistently displaying the user interface object in the user's field of view (e.g., the user interface object is not displayed when the "home location" is not in the field of view). Furthermore, the home location is stored persistently across multiple usage sessions which are separated by the display generation component being in an off-state, a sleep state, a dormant state, and/or other low-power states (e.g., a low power always-on state, a screen-locked state, a screen-protected state, etc.) of the display generation component. This provides an intuitive and predicable way of providing access to frequently used functions without cluttering the limited field of view available for viewing virtual content and the physical environment, which reduces user mistakes and confusion when the user interacts with the computer system, thereby creating a more efficient human-machine interface.

In some embodiments, the computer system automatically starts a configuration process to prompt the user to select the "home location" when the computer system receives a request to display a physical environment that has not been associated with the user interface object (e.g., the user interface object 7352, in this example) (e.g., when the display generation component is turned on or put on the user's head while in a new physical environment). In some embodiments, the computer system scans and highlights available surfaces or regions in the view of the new physical environment to allow the user to select the location or area in the new physical environment from among the highlighted surfaces or regions to as the "home location" for the user interface object.

As disclosed herein, in some embodiments, the computer-system displays a three-dimensional environment that includes virtual content and a representation of a physical environment surrounding the user; and among the virtual content is a virtual menu (e.g., virtual menu 7352, in this example) that includes selectable objects (e.g., selectable objects 7354, 7356, 7358, 7360, etc.) that correspond to different functions of the computer system, different applications, and/or different experiences. In some embodiments, the virtual menu (e.g., virtual menu 7352, in this example) includes selectable objects (e.g., selectable objects 7354, 7356, 7358, 7360, etc.) that correspond to different functions, applications, and/or experiences that are selected by the user to be easily accessible at a preset position in the three-dimensional environment that corresponds to a preset portion of the physical environment. In some embodiments, the virtual menu includes selectable objects that correspond to different functions, applications, and/or experiences that are selected by the computer system to be easily accessible at a preset position in the three-dimensional environment that corresponds to a preset portion of the physical environment. In some embodiments, the preset portion of the physical environment is a user-selected location. In some embodiments, the preset portion of the physical environment is wholly selected by the computer system or at least partially selected by the computer system (e.g., by imposing restrictions on which portions of the physical environment are eligible to be selected by the user as the portion to associate with the virtual menu). In some embodiments, after the virtual menu is associated with a respective portion of a physical environment, the virtual menu is displayed at the position corresponding to the respective portion of the physical environment in accordance with a determination that the respective portion of the physical environment is within the field of view provided by the display generation component in communication with the computer system, in response to a request to display a view of the three-dimensional environment. For example, as the user moves the display generation component relative to the physical environment, different portions of the physical environment may come into the field of view provided by the display generation component; and as soon as the respective portion of the physical environment come into the field of view (e.g., based on the virtual position of the respective portion of the physical environment being within the region of the three-dimensional environment included in the field of view), the virtual menu is displayed in the field of view overlaying, replacing display of, or blocking the view of the respective portion of the physical environment in the three-dimensional environment. In some embodiments, only a portion of the virtual menu is visible in the field of view provided by the display generation component if only a portion of the respective portion of the physical environment has come into the field of view (e.g., based on the virtual position of the portion of the respective portion of the physical environment being within the region of the three-dimensional environment included in the field of view) due to the movement of the display generation component. In some embodiments, the movement of the display generation component relative to the physical environment is a result of movement of the user's hand holding the display generation component, or movement of the user's head that is wearing the display generation component (e.g., the display generation component is an HMD), etc. In some embodiments, the virtual position of the respective portion of the physical environment comes into the field of view provided by the display generation component when the user turns on the display generation component or wakes the display generation component from a sleep state, a dormant state, a screen-locked state, one or more types of low-power states (e.g., an display-off state, an always-on dimmed state, a locked state, a screen-locked state, etc.). In some embodiments, the request to display a view of the three-dimensional environment corresponds to a user input that turns on or wakes the display generation component, or putting the display generation component into a state or spatial position where the content shown via the display generation component can be seen by a user. In some embodiments, the respective portion of the physical environment that is associated with the virtual menu (e.g., virtual menu 7352, in this example) is part of a larger physical surface in the physical environment (e.g., (e.g., the entire empty portion of the wall represented by representation 7124), an entire tabletop, an entire window, etc.), and the virtual menu is displayed at the virtual region corresponding to the respective portion of the physical environment in accordance with a determination that the larger physical surface is within the field of view provided by the display generation component. In some embodiments, when an entirely new physical environment is included in the field of view of the display generation component, the computer system provides an opportunity for the user to associate the virtual menu with a respective portion of the new physical environment, optionally, without disassociating the virtual menu from the respective portion of the previous physical environment (e.g., so the computer system can still display the virtual menu at the previous position when the previous physical environment is displayed in the field of view of the display generation component).

Figure 7L:
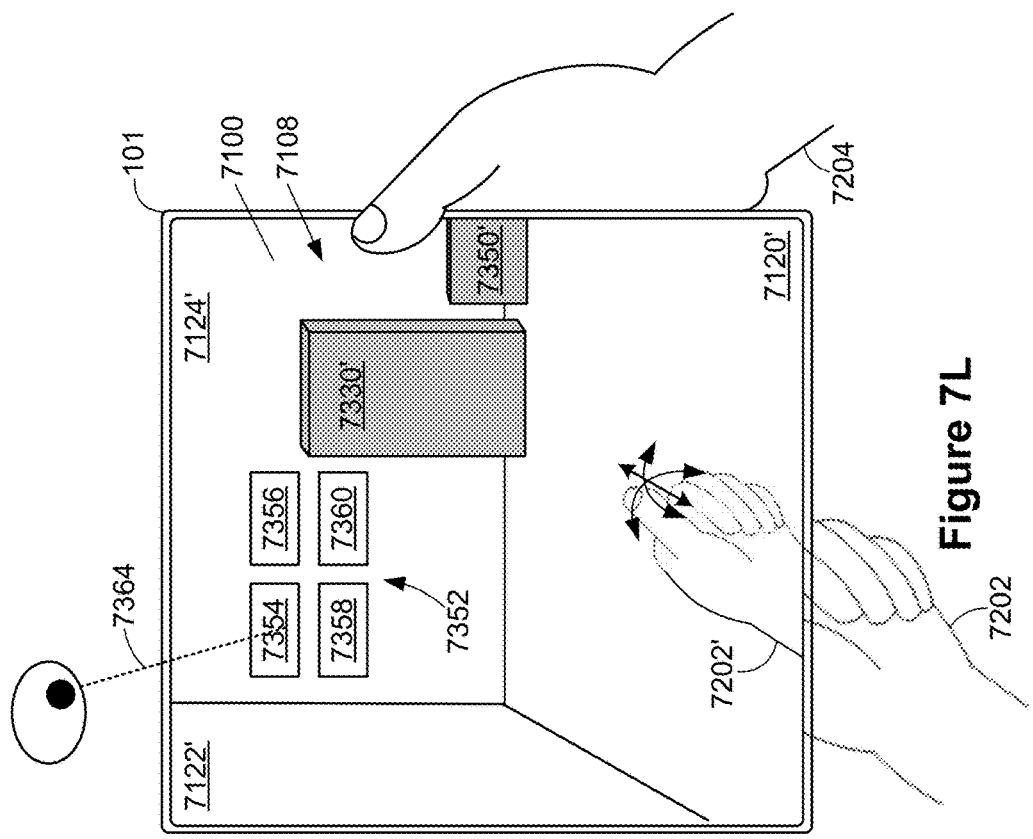
FIGS. 7K-7N are block diagrams illustrating displaying a virtual menu (e.g., a home user interface, a launch pad, a command center user interface, etc.) in a three-dimensional environment at a position that corresponds a preset portion of a physical environment (e.g., a home location, a dock location, etc.) based on whether or not the preset portion of the physical environment is within the field of view provided by a display generation component (e.g., when the display generation component is first turn on or placed in front of the user's eyes, or while the display generation component is moving around in the physical environment, etc.), in accordance with some embodiments.
Figure 7K:
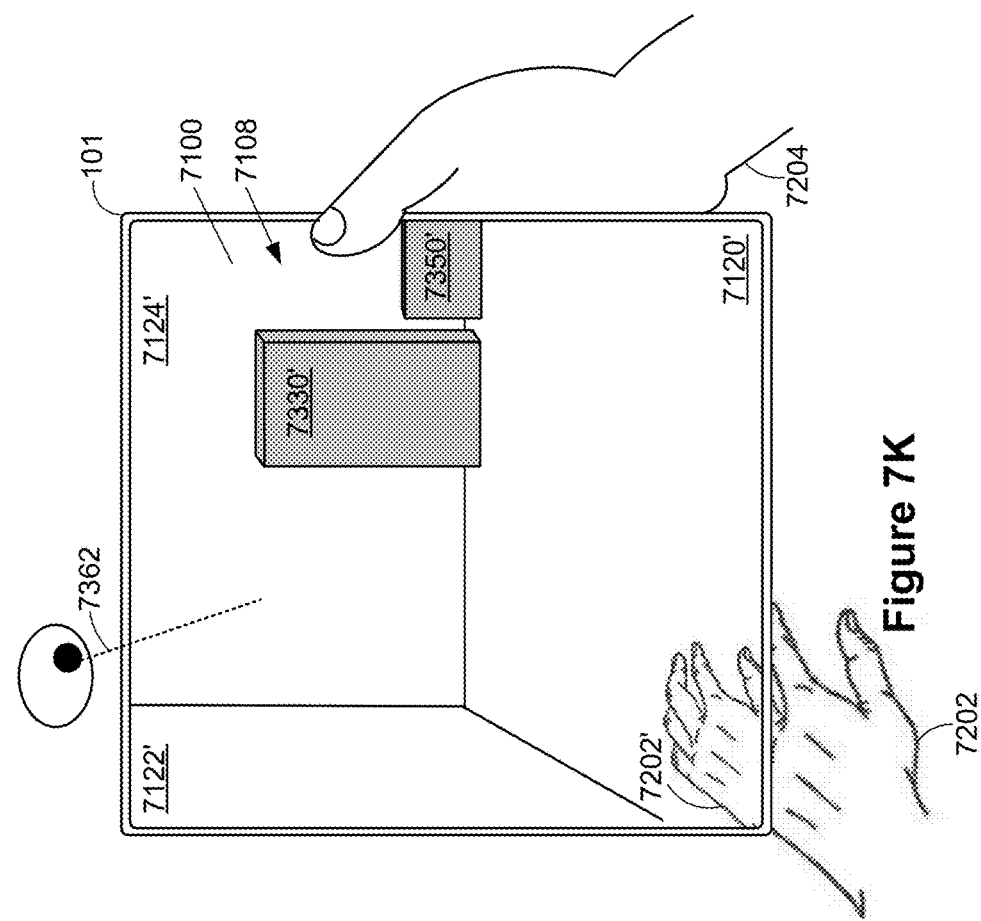

FIGS. 7K-7L illustrate an example process for associating a virtual menu 7352 with a respective portion of a physical environment. In some embodiments, this process occurs when the display generation component 7100 is placed in a physical environment that has not previously been scanned and calibrated by the computer system. In some embodiments, this process occurs when the user wishes to add an additional place for displaying the virtual menu in a known physical environment and/or reset the location for displaying the virtual menu in the known physical environment.

As shown in FIG. 7K, before the virtual menu 7352 is associated with the physical environment represented in the three-dimensional environment 7108, the computer system displays a view of the three-dimensional environment 7108 via the display generation component 7100. The view of the three-dimensional environment 7108 includes representations of physical surfaces and objects in a portion of the physical environment from a viewing perspective of a viewpoint that corresponds to the location of the display generation component 7100 in the physical environment (e.g., a location that also corresponds to the user's eyes or head when the display generation component 7100 is an HMD). In FIG. 7K, the view of the three-dimensional environment 7108 includes representations 7122' and 7124' of two adjacent walls in the physical environment of the user and the display generation component, a representation 7102' of a floor, and representations 7330' and 7350' of two physical objects (e.g., furniture, objects, appliances, etc.) in the physical environment. The spatial relationships among the physical surfaces and physical objects in the physical environment are represented in the three-dimensional environment by the spatial relationships among the representations of the physical surfaces and physical objects in the three-dimensional environment, in accordance with some embodiments. When the user moves the display generation component relative to the physical environment, the viewpoint of the currently displayed view is moved in the three-dimensional environment, resulting a different view of the three-dimensional environment 7108 from a different viewing perspective. In some embodiments, when the physical environment is an unknown environment for the computer system, the computer system performs a scan of the environment to identify surfaces and planes and builds a three-dimensional model for the physical environment. The computer system defines positions of virtual objects relative to the three-dimensional model, so that the virtual objects can be positioned in the three-dimensional environment with various spatial relationships to the representations of the physical surfaces and objects in the three-dimensional environment, in accordance with some embodiments. For example, a virtual object is optionally given an upright orientation relative to the three-dimensional environment, and may be displayed at a position and/or with an orientation that simulates a certain spatial relationship (e.g., overlaying, standing on, parallel to, perpendicular to, etc.) with a representation of a physical surface or object. In some embodiments, the computer system displays visual feedback indicating progress of the scan across the physical surfaces and objects of the physical environment. In some embodiments, the computer system optionally highlights one or more areas (e.g., the representation 7124' of the wall in front of the viewpoint, the surface of the representation 7330' of the physical object, etc.) in the view of the three-dimensional environment that are available for placing the virtual menu, e.g., during or after the scanning process.

In some embodiments, the computer system detects a user's gaze input (e.g., gaze input 7362, in this example) directed to a portion of the three-dimensional environment. In some embodiments, the computer system highlights an eligible surface or position for placing the virtual menu (e.g., virtual menu 7352, in this example) when the computer system detects the user's gaze at the surface or position. In some embodiments, during the set up stage, as the user moves the display generation component around the physical environment and looking at different surfaces or objects through the display generation component in search of a suitable position to place the virtual menu, the computer provides real-time feedback to indicate to the user which portion of the physical environment currently within the field of view provided by the display generation component is an eligible surface or position for placing the virtual menu. In some embodiments, the computer system determines whether or not a detected surface or object is eligible based on various requirements, such as whether or not the surface or portion thereof has more than a threshold size or area, whether or not the surface or portion thereof is blocked by other objects existing between the viewpoint and the surface, whether or not the surface or portion thereof has varying visual content overtime (e.g., a window, a TV screen, a doorway, etc.) or is mostly static (e.g., a wall, a fridge door, etc.), whether or not the surface or portion thereof has been designated for other functions of the computer system, etc.

In FIG. 7K-7L, while the user's gaze 7362 is directed to the representation 7124' of the wall in front of the viewpoint, the computer system detects that the user provided an input that corresponds to a request for associating the virtual menu (e.g., virtual menu 7352, in this example) with the portion of the physical environment that is currently selected by the user's gaze. In response to detecting the user's input (e.g., a preset hand gesture performed by the hand 7202', or another preset input, etc.) that corresponds to a request to associate the virtual menu with the portion of the physical environment that is currently selected by the user's gaze, the computer system displays the virtual menu (e.g., virtual menu 7352, including selectable objects 7354-7356, 7358, and 7360, etc.) at a position in the three-dimensional environment that corresponds to the location of the portion of the physical environment. In this example, the virtual menu 7352 is displayed with an orientation that is parallel to the surface of the representation 7124' of the wall, and a position that is on or at the position of the representation 7124' of the wall. As a result, the virtual menu 7352 appears to be plastered or overlaid on the representation 7122' of the wall.

In some embodiments, the representation 7124' of the wall is provided by a camera view of the physical environment, and the virtual menu replaces display of at least a portion of the representation 7124' of the wall in the view of the three-dimensional environment displayed via the display generation component. In some embodiments, the representation 7124' of the wall is provided by a camera view of the physical environment, and the virtual menu is projected onto the wall and overlays a portion of the wall in the physical environment and is viewed as part of camera view of the physical environment. In some embodiments, the representation 7124' of the wall is part of a view of the physical environment that is visible through a transparent or semi-transparent portion of the display generation component, and the virtual menu is displayed by the display generation component at a position that blocks the view of at least a portion of the representation 7124' of the wall. In some embodiments, the representation 7124' of the wall is part of a view of the physical environment that is visible through a transparent or semi-transparent portion of the display generation component, and the virtual menu is projected onto the wall and overlays a portion of the wall in the physical environment and is viewed as part of the physical environment through the transparent or semi-transparent portion of the display generation component.

In some embodiments, the user input that corresponds to a request to associate the virtual menu with a respective portion of the physical environment includes moving the display generation component such that a marker object placed in the respective portion of the physical environment is captured in the field of view provided by the display generation component. The computer system, upon recognizing the marker object in the field of view, associates the location or surface at the location of the marker object with the virtual menu and displays the virtual menu at a position in the three-dimensional environment that corresponds to the location or surface marked by the marker object.

In some embodiments, computer system automatically identifies a portion of the physical environment that is within the currently displayed portion of the physical environment to associated with the virtual menu. In such embodiments, the user input that corresponds to a request to associate the virtual menu with a respective portion of the physical environment is optionally a gesture input or a voice command ("Find home location," "Establish menu location,",", etc.), without a selection input such as a user's gaze or a pointing gesture directed to the respective portion of the physical environment. In some embodiments, the computer selects the respective portion of the physical environment to associate with the virtual menu after the user's input is received and as the user moves the display generation component relative to the physical environment such that the computer system can evaluate the surface or object in the currently displayed view to see if any surface or object is suitable. Once a suitable surface or object is identified, the computer system provides an output to signal that the computer system has identified a position for the virtual menu and displays the virtual menu at the position. In some embodiments, the computer system waits for the user's confirmation of the selection (e.g., a voice confirmation, a gesture confirmation, etc.), or waits for the user's movement of the display generation component to continue to search for a more desirable position in the field of view.

In some embodiments, once the virtual menu is displayed at the position that corresponds to the location of the respective portion of the physical environment that is associated with the virtual menu, the computer system monitors user inputs directed to the selectable objects (e.g., gaze, in-air gestures at the location that corresponds to a position of the selectable objects of the user interface object, gestures that involve movement of one part of the hand relative to another part of the hand (e.g., while the hand is, optionally, held away from the selectable objects or outside of the field of view, or while the hand is resting on the side of the user, on a desktop, on the lap, etc. rather than raised in front of the user), etc.) and performs corresponding operations based on interaction with the selectable objects.

Figure 7N:
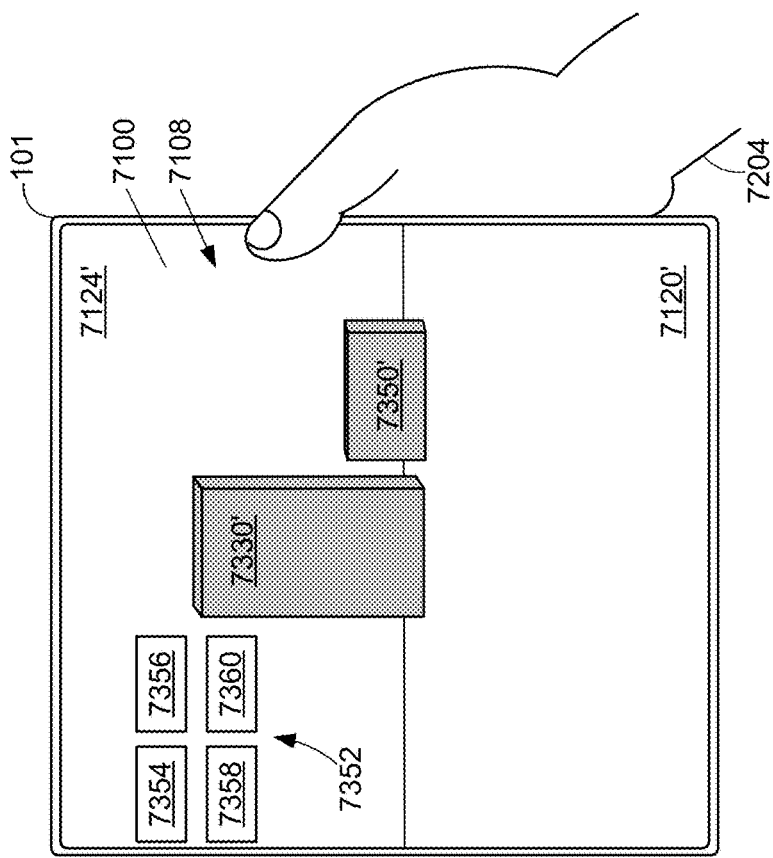
Figure 7M:
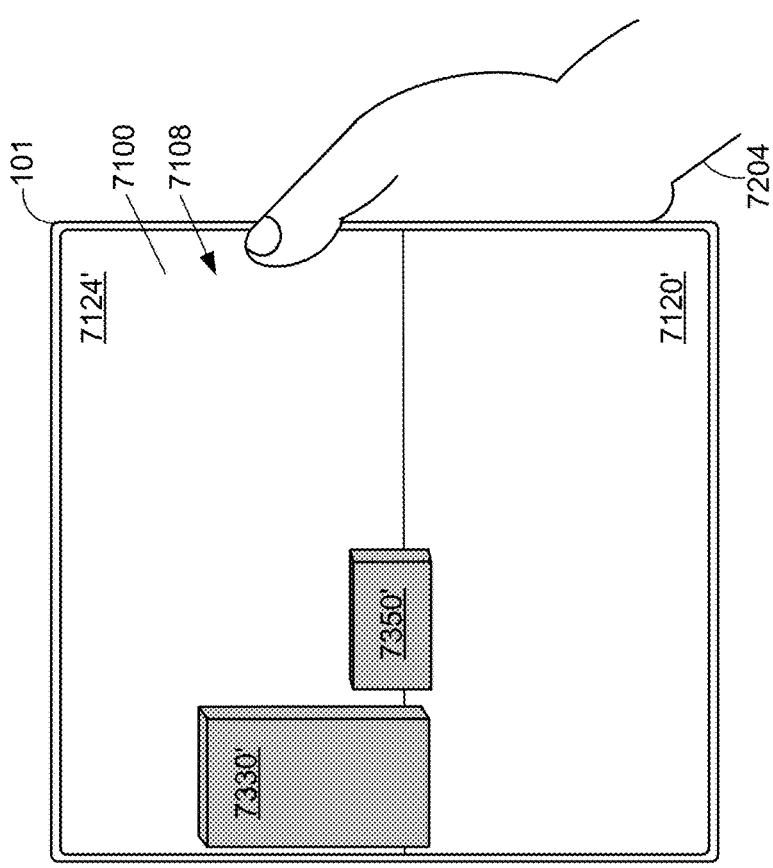

FIG. 7M illustrates that, after the virtual menu is associated with a respective portion of the physical environment (e.g., the portion of the wall left of the physical object represented by representation 7330') (e.g., the virtual menu is assigned a virtual position on the representation 7124' that is to the left of the representation 7330', in this example), the respective portion of the physical environment ceases to be displayed in the field of view provided by the display generation component (e.g., because the display generation component had been turned off or entered into a low power state, and/or moved away from the previous location, etc.). FIGS. 7M and 7N, illustrates that, a request to display a view of the three-dimensional environment has been received by the computer system. For example, in some embodiments, FIGS. 7M and 7N represents that, the computer system displays a view of the three-dimensional environment 7108 in response to receiving a request to display a view of the three-dimensional environment. In some embodiments, receiving the request includes detecting a user input that turns on the display generation component, putting the head-mounted display in front of the user's eyes, putting the head-mounted device on the user's head, waking the display generation component from a dormant state, a sleep state, or another low-power state, detecting the user walking to a position in front of a heads-up display to view the content of the display, etc. FIGS. 7M and 7N shows two contrasting scenarios where the virtual menu 7352 is not displayed in the view of the three-dimensional environment if the virtual position of the "home location" assigned to the virtual menu is not within the view of the three-dimensional environment (e.g., as shown in FIG. 7M); and the virtual menu 7352 is displayed in the view of the three-dimensional environment at the position of the "home location if the virtual position of the "home location" assigned to the virtual menu is within the view of the three-dimensional environment.

In some embodiments, the display generation component has been moved relative to the physical environment, e.g., as illustrated in FIG. 7M, such that a different portion of the physical environment is moved into or shown in the field of view of the display generation component. In this example, the representations 7330' and 7350' of the physical objects in front of the representation 7124' are still in the field of view provided by the display generation component, and a portion of the representation 7124' that was previously not in the field of view is moved into or shown in the field of view of the display generation component. The respective portion of the representation 7124' for the portion of the physical environment that is associated with the virtual menu 7352 is no longer visible in the field of view provided by the display generation component. As a result, the virtual menu 7352 is not displayed by the display generation component with the representation of the physical environment in the view of the three-dimensional environment 7108, in FIG. 7M.

In some embodiments, the reason that the respective portion of the physical environment is not visible in the field of view provided by the display generation component is because the display generation component is displaying a virtual environment, and the request to display a view of the three-dimensional environment is a user input that causes the computer system to cease to display the virtual environment. In some embodiments, the respective portion of the physical environment is not visible in the field of view provided by the display generation component is because the display generation component is turned off or in a low-power state, such that the representation of the physical environment is not fully visible (e.g., dimmed, blurred, etc.) through the display generation component; and the request to display a view of the three-dimensional environment is a user input that causes the computer system to transition the display generation component out of the off or low-power state.

In FIG. 7N, when the virtual region corresponding to the portion of the physical environment that has been associated with the virtual menu 7352 is within the field of view provided by the display generation, the computer system redisplays the virtual menu 7352 at the position corresponding to the respective portion of the physical environment (e.g., at the position of the portion of the representation 7120' where the virtual menu was previously displayed in FIG. 7L). In some embodiments, the respective portion of the physical environment (e.g., the portion of the representation 7124 that previously displayed the virtual menu) comes into the field of view as a result of the movement of the display generation component relative to the physical environment, after earlier movement of the display generation component had caused the position of the respective portion of the physical environment to be moved out of the field of view provided by the display generation component. In some embodiments, the position of the respective portion of the representation 7120' comes back into the field of view as a result of the display generation component being turned on or restored to a normal operational state while in front of the respective portion of the physical environment. In some embodiments, the position of the respective portion of the representation 7120' comes back into the field of view as a result of the computer system ceasing to display a virtual environment.

As shown in FIG. 7N, the computer system displays the virtual menu 7352 at the position of the representation 7124' of the wall corresponding to the portion of the physical environment with which the virtual menu is associated, such that the virtual menu appears to overlay the representation 7124' of the wall. In some embodiments, the virtual menu is partially shown as only a sub-region of the portion of the physical environment that is associated with the virtual menu has moves into the field of view provided by the display generation component. In some embodiments, the virtual menu is only displayed when the virtual region corresponding to the portion of the physical environment that is associated with the virtual menu is fully within the field of view. In such a scenario, the virtual menu can be fully displayed in the field of view overlaying, replacing display of, or blocking the view of the portion of the physical environment that is associated with the virtual menu.

As disclosed above, in some embodiments, the virtual menu is a home user interface or launch pad that includes selectable icons for launching applications and experiences in the three-dimensional environment. It is analogous to a home screen or springboard in a two-dimensional operating environment. In some embodiments, the display generation component is a head-mounted device through which the user is provided with a view of his/her physical environment with virtual augmentations (e.g., virtual wall decors, virtual scenery, etc.) when the user puts the head-mounted device on. The FIGS. 7K-7N illustrate an example scenario where, after the user establishes a home location for the home user interface at a position corresponding to a selected portion of the physical environment through a set up process (e.g., illustrated in FIGS. 7K-7L), when the user is wearing the HMD in the physical environment and wishes to gain access to the home user interface at a later time, the user simply needs to turn toward the selected portion of the physical environment, and the computer system will display the virtual menu at the position of the selected portion of the physical environment. This is also true when the user puts the HMD on while facing the respective portion of the physical environment. The user can choose a portion of the physical environment that he or she typically sees or faces when he/she is first putting on the HMD, such that he/she is always oriented to know where the home user interface is located in the virtually augmented physical environment seen through the display generation component. In some embodiments, when a completely virtual experience is terminated, the computer system also displays a view of the virtually augmented physical environment with the home user interface at the position corresponding to the selected portion of the physical environment, such that the user can easily start another application or experience. In some embodiments, the respective portion of the physical environment that is associated with the virtual menu or home user interface is, optionally, suspended in a respective portion of the physical environment, and the virtual menu or home user interface is displayed facing toward the viewpoint of the currently displayed view of the three-dimensional environment irrespective of from which direction the user is looking at the respective portion of the physical environment.

In some embodiments, after the virtual menu is associated with a first respective portion of the physical environment, the computer system optionally associates the virtual menu with another portion of the physical environment or a respective portion of another physical environment in accordance with user request. For example, in some embodiments, the computer system detects a pinch and drag gesture directed to the virtual menu 7352 or home user interface (e.g., while a user's gaze is directed to the virtual menu or home user interface, or after the special gesture or voice command for selecting the virtual menu or home user interface as a whole is detected, etc.), and repositions the virtual menu or home user interface in the three-dimensional environment in accordance with the movement of the hand that provides the pinch and drag gesture. In some embodiments, the computer system visually emphasizes eligible positions for placing the virtual menu or home user interface (e.g., highlight the eligible portions relative to other portions of the physical environment in the field of view, dim other portions of the physical environment in the field of view relative to the eligible portions, etc.) in the currently displayed view of the three-dimensional environment (e.g., as the user drags the virtual menu in the three-dimensional environment, and/or turning his/her head to bring different portions of the physical environment into the field of view, etc.). In some embodiments, the computer system moves the virtual menu to the position corresponding to a location of a second physical surface that is different from the surface with which the virtual menu is originally associated. In some embodiments, the second surface has a different orientation than the first surface. In some embodiments, the second surface has the same orientation as the first surface. In some embodiments, the second surface and the first surface are concurrently within the field of view provided by the display generation component. In some embodiments, the second surface and the first surface are not concurrently within the field of view provided by the display generation component. In some embodiments, the computer system automatically activates a configuration mode to prompt the user to select a portion of the physical environment to associated with the virtual menu or home user interface when the computer system detects that the physical environment in the field of view of the display generation component is not the same physical environment that has been associated with the virtual menu (e.g., a new physical environment unknown to the computer system, a physical environment located at a different location from the physical environment that has been associated with the virtual menu or home user interface, etc.).

In some embodiments, the selectable objects that are included in the virtual menu are selected from a larger set of selectable objects based on contextual information. In some embodiments, the set of application icons or experiences represented in the home user interface are selected based on contextual information (e.g., the current time, the recently accessed applications and experiences, etc.). In some embodiments, the virtual menu or home user interface includes avatars of other users that are currently available for communication or shared experiences with the user of the computer system and/or display generation component.

In some embodiments, in accordance with detecting a user input (e.g., an in-air tap input directed to the selectable object, a tap input performed by a thumb tapping on the side of the index finger while a user's gaze is directed to the selectable object, etc.) that selects a selectable object of the virtual menu (e.g., object 7354, object 7356, etc.), the computer system performs an operation corresponding to selection of the selectable object. In some embodiments, the selectable object is an application icon, and the operation is launching an application corresponding to the application icon. In some embodiments, the selectable object is an icon corresponding to a computer-generated experience (e.g., a virtual experience, an immersive movie, an immersive meditation experience, etc.), and the operation is starting the experience in the three-dimensional environment (e.g., gradually increasing the level of immersion by which the experience is provided to the user, providing the experience at a level selected by the computer system based on current context (e.g., user's physiological and emotional state, whether or not the user is alone, etc.), etc.). In some embodiments, the selectable object is an avatar of another user, and the operation is starting a process to establish a communication session with said other user (e.g., displaying a user interface for the user to select a mode (e.g., co-presence in the same virtual environment, a network call, a virtual chat, etc.) by which the communication session is to be established, initiating the communication session, etc.).

In some embodiments, the computer system displays a user interface object corresponding to the selected object at a position of a representation of the user's hand. For example, in some embodiments, the user's hand is part of a camera view of the physical environment that is visible in the field of view provided by the display generation component, and the user interface object corresponding to the selected object is displayed to replace a portion of the representation of the user's hand or a portion of the physical environment that is near the user's hand. In some embodiments, the user's hand is visible in the field of view as part of the physical environment that is visible through a transparent or semi-transparent portion of the display generation component, and the user interface object corresponding to the selected object is displayed at a position that blocks the view of the user's hand or a portion of the physical environment that is near the user's hand. In some embodiments, the user's hand is part of the physical environment that is visible in the field of view through a transparent or semi-transparent portion of the display generation component, and the user interface object corresponding to the selected object is projected onto the user's hand or a portion of the physical environment that is near the user's hand.

In some embodiments, as the user's hand moves as a whole in the physical environment, the user interface object also moves in the three-dimensional environment in accordance with the movement of the user's hand, such that the user interface object maintains a stable, relatively fixed, spatial relationship with the representation of the user's hand (e.g., fixed to, attached to each other with less than a threshold amount of relative movement, etc.) in the three-dimensional environment during the movement of the user's hand in the physical environment. In some embodiments, the computer system detects user interaction with the user interface object (e.g., selecting selectable options contained therein, navigating within the user interface object to see additional selectable options, etc.) displayed at the position corresponding to the location of the user's hand, and performs additional operations corresponding to the user interaction. In some embodiments, the user interface object is a user interface corresponding to the selected object in the virtual menu. In some embodiments, the selected object in the virtual menu is an application icon of an application, and the user interface object displayed at the position corresponding to the user's hand is an application user interface for the application with selectable options corresponding to operations within the application. In some embodiments, the selected object in the virtual menu is an icon for a computer-generated experience, and the user interface object displayed at the position corresponding to the user's hand is a configuration user interface for configuring the experience before the experience is started. In some embodiments, the selected object in the virtual menu is an avatar of another user or user group, and the user interface object displayed at the position corresponding to the user's hand is a communication user interface for selecting the mode of communication to be used and initiating a communication request to establish a communication session with the other user or user group.

In some embodiments, while the user interface object is displayed at a position that corresponds to the location of the user's hand, the computer system detects a preset user input provided by the user's hand (e.g., a throw or toss gesture, turning the user's hand and pushing the user interface object away from the viewpoint, swiping or flicking the thumb of the hand forward away from the viewpoint across the side of the index finger, etc.); and in response to detecting the preset input, the computer system displays an environment or experience that corresponds to the user interface object in the three-dimensional environment. For example, in some embodiments, the user interface object is a user interface of an application, and the computer system displays a three-dimensional view of the user interface of the application in the three-dimensional environment in response to detecting the preset input. In some embodiments, the user interface object is a configuration user interface or preview of a computer-generated experience, and the computer system displays the computer-generated experience in the three-dimensional environment or display the computer-generated experience with an increased level of immersion (e.g., expand the spatial extend of the computer-generated experience in the three-dimensional environment, adding additional virtual content to the computer-generated experience, changing the audio output mode to spatial audio output mode, etc.) in response to detecting the preset input. In some embodiments, the user interface object is a user interface for initiating a communication session with another user, and the computer system displays a three-dimensional environment in which co-presence with another user will be established.

In some embodiments, the computer system displays the virtual menu in accordance with a determination that the display generation component (e.g., the display of device

7100 or the HMD) is placed in a predefined position relative to the user (e.g., worn on the user's head, strapped onto the user's head, placed in front of the user's face, etc.), and that position of the preset portion of the physical environment that is associated with the virtual menu is in the user's field of view provided by the display generation component (e.g., the respective portion of the physical environment would be in the user's field of view if the display generation component were removed). For example, in some embodiments, the computer system determines that the display generation component is placed in the predefined position relative to the user in accordance with a determination that the display generation component (e.g., an HMD) is placed on the user's head, such that the user's view of the physical environment is only possible through the display generation component. In some embodiments, the computer system determines that the display generation component is placed in the predefined position relative to the user in accordance with a determination that the user has been seated in front of a heads-up display of the computer system. In some embodiments, placing the display generation component in the predefined position relative to the user, or placing the user in the predefined position relative to the display generation component allow the user to view content (e.g., real or virtual content) through the display generation component. In some embodiments, once the display generation component and the user are in the predefined relative position, the user's view of the physical environment can be blocked at least partially (or completely) by the display generation component. In some embodiments, if the user is not in the predefined position relative to the display generation component, the computer system does not display the virtual menu even if the display generation component is placed in a position relative to the respective portion of the physical environment to provide the view of the respective portion of the physical environment. In some embodiments, the virtual menu is associated with a specific user, and the virtual menu is displayed when the specific user is in the predefined position relative to the display generation component and the virtual position of the respective portion of the physical environment is within the field of view provided by the display generation component, but not when other users are in the predefined position relative to the display generation component and the virtual position of the respective portion of the physical environment is within the field of view provided by the display generation component.

In some embodiments, placement of the display generation component of the computer system is determined based on analysis of data captured by a sensor system. In some embodiments, the sensor system includes one or more sensors that are components of the computer system (e.g., internal components that are enclosed in the same housing as the display generation component of device 7100 or the HMD). In some embodiments, the sensor system is an external system and not enclosed in the same housing as the display generation component of the computer system (e.g., the sensors are external cameras that provide captured image data to the computer system for data analysis. In some embodiments, the sensor system includes one or more imaging sensors (e.g., one or more cameras) that track movement of the user and/or the display generation component of the computer system. In some embodiments, the one or more imaging sensors track position and/or movement of one or more features of the user, such as the user's hand(s) and/or the user's head to detect placement of the display generation component relative to the user or a predefined part of the user (e.g., head, eyes, etc.). For example, the image data is analyzed in real time to determine whether or not the user is holding the display of the device 7100 in front of the user's eyes or whether or not the user is putting the head-mounted display on the user's head. In some embodiments, the one or more imaging sensors track the user's eye gaze to determine where the user is looking at (e.g., whether or not the user is looking at a particular portion of the user interface). In some embodiments, the sensor system includes one or more touch-based sensors (e.g., mounted on the display) to detect the user's hand grip of the display, such as holding the device 7100 with one or two hands and/or on the edges of the device, or holding the head-mounted display using two hands to put the head-mounted display on the user's head. In some embodiments, the sensor system includes one or more motion sensors (e.g., accelerometer) and/or position sensors (e.g., gyroscope, GPS sensors, and/or proximity sensors) that detect motion and/or positional information (e.g., location, height, and/or orientation) of the display of the electronic device to determine the placement of the display relative to the user. For example, the motion and/or positional data is analyzed to determine whether or not the mobile device is being raised and facing toward the user's eyes, or whether or not the head-mounted display is being lifted and put onto the user's head. In some embodiments, the sensor system includes one or more infrared sensors that detect positioning of the head-mounted display on the user's head. In some embodiments, the sensor system includes a combination of different types of sensors to provide data for determining the placement of the display generation component relative to the user. For example, the user's hand grip on the housing of the display generation component, the motion and/or orientation information of the display generation component, and the user's eye gaze information are analyzed in combination to determine the placement of the display generation component relative to the user.

FIGS. 7O-7T are block diagrams illustrating displaying a control object (e.g., a control panel including one or more controls, a user interface object including one or more interactive elements, etc.) associated with an object (e.g., a virtual object, a representation of a physical object, etc.) at different distances away from an initial position of the control object at or near the object in a three-dimensional environment, depending on whether or not the object is selected by a user input and/or whether or not a user's gaze directed to the object or its associated control object has moved away from a region corresponding to the object and its associated control object, in accordance with some embodiments.

Figure 7P:
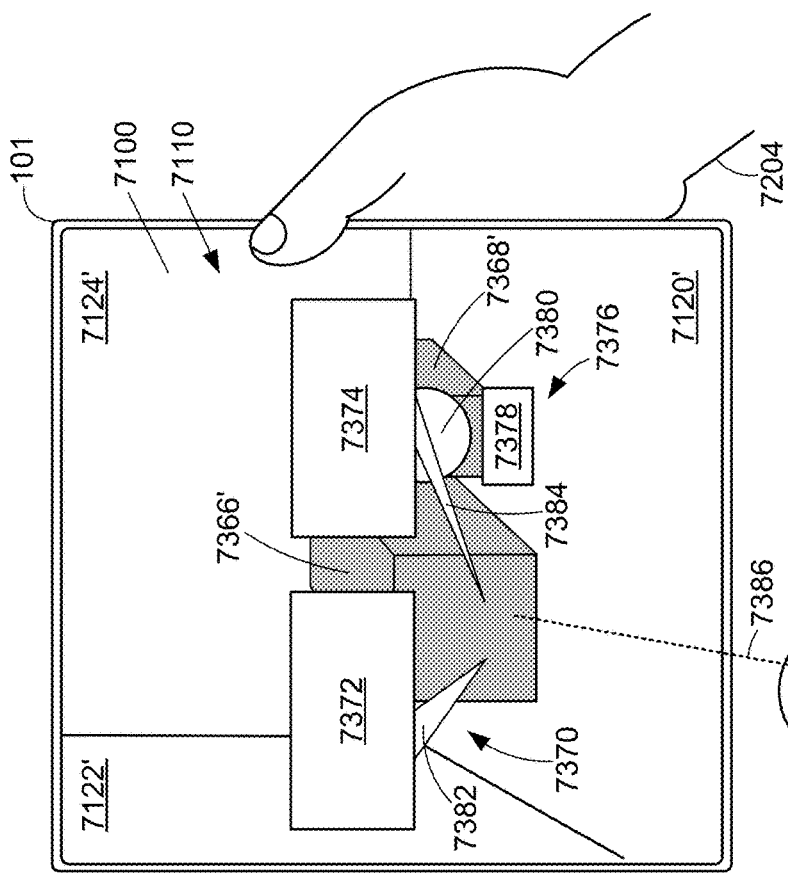
FIGS. 7O-7T are block diagrams illustrating displaying a control object (e.g., a control panel including one or more controls, a user interface object including one or more interactive elements, etc.) associated with an object (e.g., a virtual object, a representation of a physical object, etc.) at different distances away from an initial position of the control object at or near the object in a three-dimensional environment, depending on whether or not the object is selected by a user input and/or whether or not a user's gaze directed to the object or its associated control object has moved away from a region corresponding to the object and its associated control object, in accordance with some embodiments.

In some embodiments, the computer system displays a virtual menu (also referred to as a "control object") (e.g., control object 7370, control object 7376, etc.) that includes one or more controls (e.g., controls 7372, 7374, 7380, 7378, etc.) for triggering performance of respective operations corresponding to an object (e.g., a virtual object, a representation of a physical object (e.g., representation 7366', representation 7368'), a physical object (e.g., physical object represented by representation 7366', physical object represented by representation 7368', etc.), etc.) in a three-dimensional environment. In some embodiments, the virtual menu is displayed at a position corresponding to the location of the object (e.g., at or near the position of a virtual object, or a representation of a physical object, etc.) in the three-dimensional environment (e.g., a virtual environment, a three-dimensional environment 7110, etc.). The virtual menu pops up from its original position in the three-dimensional environment toward a position closer to the virtual position of the user (e.g., the viewpoint of the currently displayed view of the three-dimensional environment, the virtual position of the user's hand in the user's field of view, etc.) in response to selection of the object by the user. In some embodiments, the selection of the object (e.g., a virtual object, a representation of a physical object, a physical object, etc.) is based on interaction with the object or representation thereof in the three-dimensional environment. In some embodiments, selecting the object includes selecting the virtual object or representation of the physical object using a user's gaze directed to the virtual object or representation of the physical object, providing a preset gesture at the position of the virtual object or representation of the physical object, providing a gesture remote from the position of the virtual object or representation of the physical object while the virtual object or representation of the physical object has input focus, providing a gesture remote from the position of the virtual object or representation of the physical object while the virtual object or representation of the physical object is selected by the user's gaze, etc. In some embodiments, the selection of the object (e.g., a physical object, a representation of a physical object, etc.) is based on interaction with the object or a physical object represented by the object in the physical environment (e.g., touching, manipulating, picking up, opening, otherwise changing the state of the physical object, etc.) that results in selection of the object or representation thereof in the three-dimensional environment. In some embodiments, the object is a virtual menu that includes one or more selectable controls (e.g., controls 7372, 7374, 7380, 7378, etc.) for performing operations (e.g., launching a user interface, displaying a corresponding virtual experience, displaying a submenu, performing a respective application function, activating a respective device function of the computer system, adjusting a respective device setting of the computer system, etc.) corresponding to the object in the three-dimensional environment (e.g., a virtual environment, an augmented reality environment, etc.). In some embodiments, the object is a physical object with a representation thereof in the three-dimensional environment (e.g., an augmented reality environment, etc.), and the virtual menu includes one or more selectable controls (e.g., controls 7372, 7374, 7380, 7378, etc.) for performing operations (e.g., displaying related virtual content or experiences, launching a user interface, displaying a submenu, activating a respective device function, adjusting a respective device setting, etc.) corresponding to the physical object in the three-dimensional environment. In some embodiments, when the user moves their gaze away from the position of the object, and the user's gaze (e.g., gaze 7392 in FIG. 7S) is no longer directed to the region associated with the virtual menu (e.g., control object 7370) and the object (e.g., representation 7366', the physical object represented by the representation 7366', etc.), the computer moves the virtual menu (e.g., control object 7370) away from the position close to the virtual position of the user (e.g., the viewpoint, or the position of the user's hand, etc.) and back toward its original position that corresponds to the position of the object in the three-dimensional environment (as shown by the transitions illustrated in FIG. 7S following FIGS. 7P, 7Q, and/or 7R). It is as if the virtual menu was snapping back to its original position after it is released by the departure of the user's gaze from the virtual menu and the object. In some embodiments, a visual link (e.g., a virtual rubber band, a dotted line, etc.) (e.g., virtual tethers 7382, 7384, 7396, 7398, etc.) is displayed between the virtual menu (e.g., control object 7370, control object 7376, etc.) and its original position while the virtual menu is displayed at a distance away from its original position due to the selection of the object (e.g., representation 7366', representation 7368', etc.). In some embodiments, while the virtual menu (e.g., control object 7370) is displayed away from its original position and closer to the virtual position of the user (e.g., close to the viewpoint, close to the user's hand in the user's field of view, etc.), it can serves as the start position of individual controls (e.g., controls 7372, 7374, etc.) contained therein to further move closer to the virtual position of the user when gaze is directed to the individual controls (e.g., as illustrated in FIGS. 7Q and 7R) or when the controls are otherwise selected but not activated. In some embodiments, when the user's gaze is moved away from the individual controls (e.g., controls 7372, 7374, etc.), the individual controls retreat back to their original positions in the virtual menu (e.g., as illustrated in FIGS. 7Q and 7R). In some embodiments, the movement of the virtual menu and the individual controls contained therein are based on the movement of the user's gaze toward and away from the virtual menu and/or the object. In some embodiments, while the virtual menu is still coupled to the user's gaze (e.g., gaze has not moved out of the range of the virtual menu and the object), it moves toward and away from the viewpoint with movement characteristics (e.g., with speed, direction, distances, etc.) that depend on the movement of the user's gaze (e.g., speed, direction, distances, etc. of the movement of the user's gaze); and once the user's gaze is outside of the region corresponding to the object and virtual menu, the virtual menu snaps back to its original position quickly. Moving the virtual menu (e.g., control object 7370, control object 7376, etc.) associated with an object (e.g., representation 7366', representation 7368', etc.) closer to the virtual position of the user (e.g., closer to the viewpoint, closer to the user's hand in the field of view, etc.) in response to selection of the object, and then subsequently moving the virtual menu back to its original position in the three-dimensional environment when the user's gaze moves away from the virtual menu and the object (e.g., representation 7366', representation 7368', etc.) allow the user to easily inspect the options included in the virtual menu, and/or interact with the virtual menu at a more accessible position in the three-dimensional environment (e.g., within arm's reach, or near the user's hand, etc.). This makes user interaction with the object more efficient, and reduces the number, extent, and/or nature of the inputs from a user to perform operations associated with the object, thereby creating a more efficient human-machine interface.

In some embodiments, the object that is associated with the selectable control or control object is a virtual object (e.g., a virtual menu, a selectable object, a user interface object that includes selectable elements, a virtual three-dimensional object, etc.) that is displayed at a position in a three-dimensional environment (e.g., a virtual environment, an augmented reality environment, etc.) that is away from the viewpoint of the currently displayed view of the three-dimensional environment. In some embodiments, the object that is associated with the selectable control or control object is a physical object (e.g., a smart appliance, a smart home control panel, a media console, a gaming device, a portable electronic device, etc.) that has a corresponding representation in a three-dimensional environment (e.g., a virtual environment, an augmented reality environment, etc.) that is away from the viewpoint of the currently displayed view of the three-dimensional environment, where the position of the representation of the physical object corresponds to the location of the physical object in the physical environment. Although it is sometimes possible to move the viewpoint toward the position of the object (e.g., by moving the display generation component in the physical environment toward a location corresponding to the position, providing an input that corresponds to a request for locomotion to navigate within the three-dimensional environment toward the object (e.g., in the case that the environment is a virtual environment), etc.), such that the object and its associated selectable control appear closer and more accessible for inspection or interaction, moving the viewpoint relative to the object in the three-dimensional environment is cumbersome and time-consuming. This enables inspection of the selectable control to enable a user to make a decision as to whether or not to select the selectable control or options contained therein prior to making a selection. This is especially true when the user has not decided to select the selectable control or options contained therein and only wished to conduct a cursory inspection of the selectable control to make that decision. In some embodiments, a virtual object can be brought closer to the viewpoint by selecting and dragging the virtual object with a hand gesture or controller, but such a mode of interaction is again time-consuming and cumbersome, especially when the virtual object needs to be placed back to its original position by additional inputs after inspecting or activating the virtual object. As disclosed herein, a selectable control or control object that is associated with a virtual object or physical object is displayed at a position at or near the virtual object or the representation of the physical object is automatically moved away from its original position and brought closer toward the viewpoint of the currently displayed view of a three-dimensional environment, in accordance with a determination that the virtual object, the representation of the physical object, or the physical object has been selected by the user (e.g., by preset input interacting with the virtual object, the physical object, or the representation of the physical object, etc.). Afterwards, in accordance with a determination that a user's gaze is moved away from a region associated with the selectable control or control object and the object (e.g., away from the new position of the selectable control, away from the original position of the virtual object, and away from intermediate positions between the new position and the original positions of the selectable control, etc.), the selectable control or control object moves back toward its original position in the three-dimensional environment. It is as if the selectable control (or control object) were attached to its original position by a virtual rubber-band that pulled the selectable control (or control object) back to its original position after the user's gaze is not maintained on the virtual region associated with the selectable control (or control object) and the object. In some embodiments, the computer system determines that the user's gaze is no longer in the virtual region associated with the selectable control (or control object) and the object in accordance with a determination that the user's gaze has moved to a position that does not correspond to a preset interactive region occupied by the selectable control (or control object) (e.g., moved into a region occupied by another virtual object or selectable control or control object, moved beyond the boundary of the selectable control or control object, moved beyond the boundary of the selectable control or control object by at least a preset distance, moved outside of a preset central region of the selectable control or control object, etc.). As disclosed herein, the user can easily inspect a selectable control by directing their gaze toward it or provide another selection input selecting the object, and the selectable control will automatically move toward the viewpoint, e.g., along a trajectory of the user's gaze that corresponds to a path between the viewpoint and the original position of the virtual object, moving in a straight line to a position in the center of the field of view provided by the display generation component, etc. In some embodiments, when the selectable control (or control object) is moved toward the viewpoint in response to the user's gaze or other preset selection input being directed to it, and when the selectable control (or control object) is returned to its original position in response to the user's gaze being moved away from the region associated with the selectable control (or control object) and the object, the computer system displays the selectable control (or control object) moving through a series of intermediate positions that are at different distances away from the original position of the virtual object and at different distances away from the viewpoint. Although the examples in FIGS. 7O-7T show representations 7366' and 7368' of physical objects as examples of objects with corresponding virtual menus, it is to be understood that the representations may be virtual objects without corresponding physical objects, in accordance with some embodiments. In addition, the virtual objects with corresponding virtual menus may be displayed in a virtual three-dimensional environment in some embodiments; and the virtual objects with corresponding virtual menus may be displayed in an augmented reality environment in some embodiments.

Figure 7O:
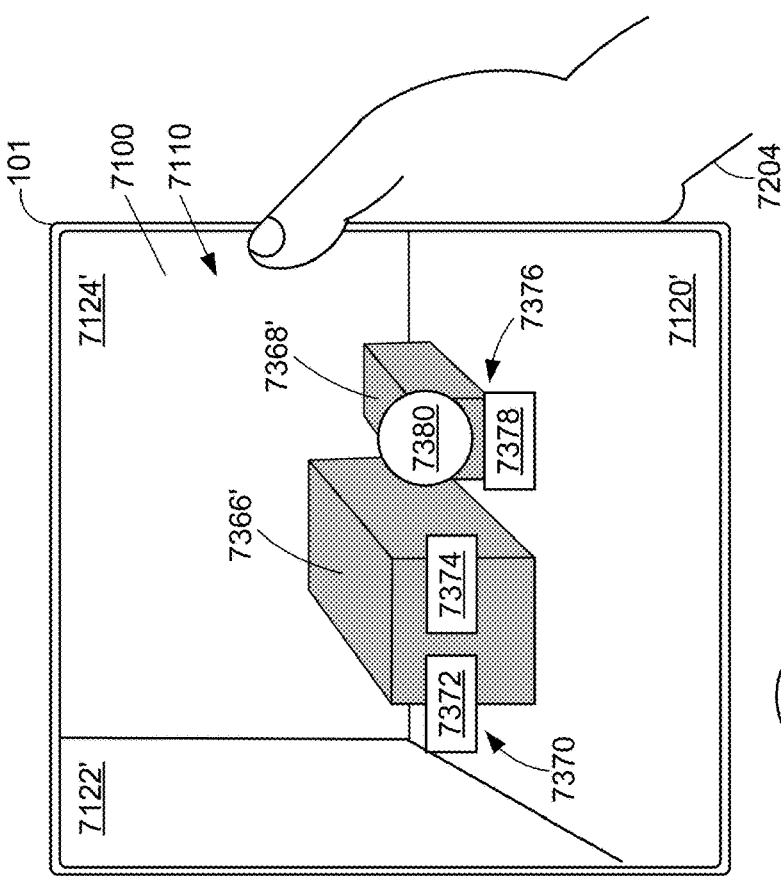
Figure 7R:
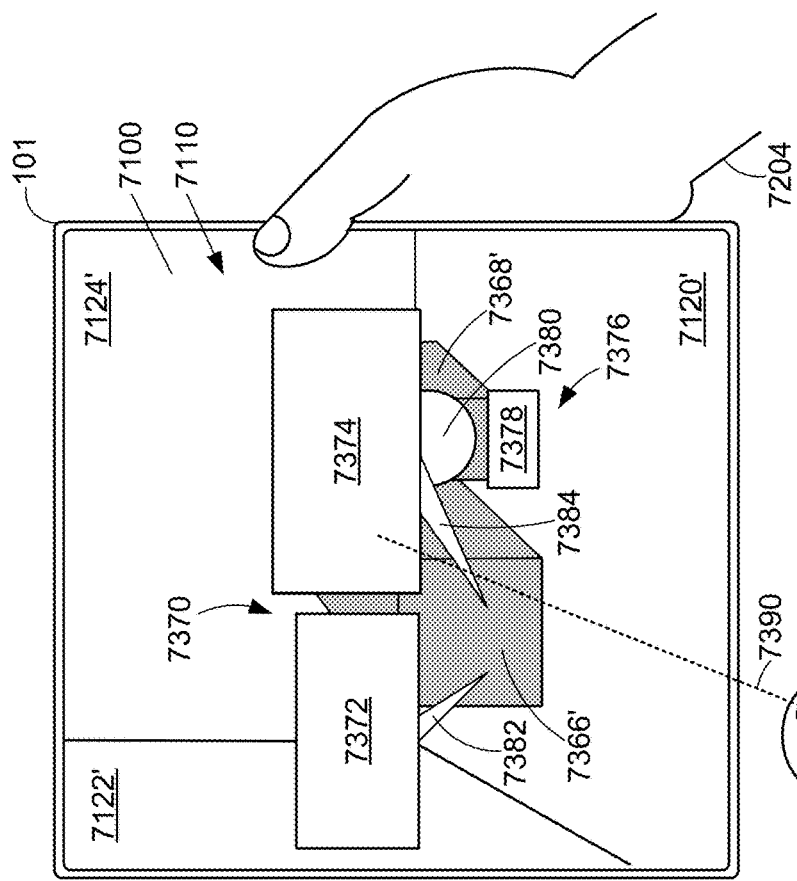
Figure 7Q:
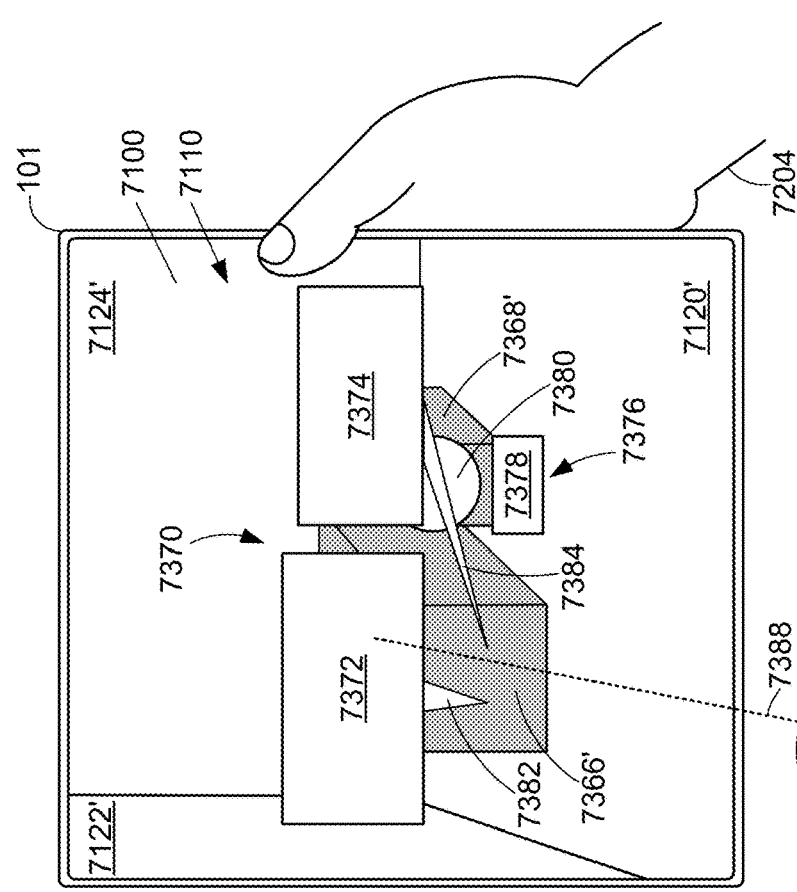

FIG. 7O illustrates an example three-dimensional environment 7110, in accordance with some embodiments. In this example, the three-dimensional environment 7100 is an augmented reality environment that includes a representation of a physical environment in which the display generation component 7100 is located. In some embodiments, the three-dimensional environment is a virtual three-dimensional environment and does not include a representation of a physical environment. In some embodiments, the three-dimensional environment is a virtual environment that includes a representation of a physical environment that is not the physical environment in which the display generation component is located (e.g., the representation of the physical environment in this case is virtual content).

As shown in FIG. 7O, a user is in a physical environment operating a computer system (e.g., computer system 101) (e.g., holding the display generation component 7100 or wearing an HMD). In some embodiments, the display generation component 7100 is a handheld device (e.g., a cell phone, tablet, or other mobile electronic device) that includes a display, a touch-sensitive display, or the like. In some embodiments, the display generation component 7100 represents and is optionally replaced with a wearable headset that includes a heads-up display, a head-mounted display, or the like. In some embodiments, the physical environment includes one or more physical surfaces and physical objects (e.g., walls of a room, furniture, physical objects (e.g., represented by shaded 3D boxes)) surrounding the user. In the example shown in FIG. 7O, the computer-generated three-dimensional environment that corresponds to the physical environment (e.g., the portion of physical environment that is within the field of view of one or more cameras of the display generation component 7100, or visible through a transparent portion of the display of display generation component 7100) is visible on the display side of the display generation component. The physical environment includes two physical objects, which are respectively represented by the representation 7366' and 7368' in the computer-generated environment shown via the display generation component. In some embodiments, the representations 7366' and 7368' are virtual objects, and the environment 7110 is a virtual environment. In some embodiments, the control objects 7370 and 7376 are displayed in the three-dimensional environment. For example, the control object 7370 includes two or more controls (e.g., controls 7372 and 7374, etc.) and is displayed at a position that is at or near the representation 7366' of a first physical object. The control object 7376 includes two or more controls (e.g., controls 7378 and 7380, etc.) and is displayed at a position that is at or near the representation 7368' of a second physical object in the three-dimensional environment. In some embodiments, the control object 7370 is a control panel or user interface object that includes selectable controls that, when activated in accordance with various criteria, cause the computer system to perform corresponding operations with respect to the physical object represented by the representation 7366' and/or with respect to the control object 7370. In some embodiments, the control object 7376 is a control panel or user interface object that includes selectable controls that, when activated in accordance with various criteria, cause the computer system to perform corresponding operations with respect to the physical object represented by the representation 7368' and/or with respect to the control object 7376. In some embodiments, the operations include adjusting respective values of various preset parameters of the physical object corresponding to the controls that are activated, switching one or more preset states of the physical object, causing the physical object to perform one or more functions of the physical object that correspond to the activated controls, etc. In some embodiments, when the representations 7366' and 7368' are virtual objects without corresponding physical objects, the operations that are performed include adjusting respective values of various preset parameters of the virtual object corresponding to the controls that are activated, switching one or more preset states of the virtual object, perform one or more operations that correspond to the activated controls with respect to the virtual object, etc. In some embodiments, the control objects 7370 and 7376 are virtual objects that appear affixed to their respective objects 7366' and 7368' (e.g., overlaying a flat front surface of the objects, standing on top of the objects, etc.) in the three-dimensional environment 7110.

FIG. 7P following FIG. 7O illustrates that the computer system detects a user input corresponding to a request to select the representation 7366'. In some embodiments, the representation 7366' has a corresponding physical object in the physical environment. In some embodiments, the user input includes picking up the physical object represented by the representation 7366' in the physical environment or manipulating it in a preset way (e.g., opening a lid on it, tapping on it, touching it, etc.). In some embodiments, the user input includes looking at the representation 7366' or the control object 7370 through the display generation component for a preset amount of time (e.g., providing a gaze input directed to the region occupied by the representation 7366' and the control object 7370), pointing at the physical object using a user's hand in the physical environment, or manipulating it in a preset way (e.g., opening a lid on it, tapping on it, touching it, etc.), etc. In some embodiments, the user input includes looking at the representation 7366' or the control object 7370 through the display generation component for a preset amount of time (e.g., providing a gaze input 7386 directed to the region occupied by the representation 7366' and the control object 7370) in conjunction with providing a gesture that involves movement of one portion of the user's hand relative to another portion of the user hand (e.g., thumb flicking upward across the side of the index finger toward the direction of the representation 7366' or control object 7370, thumb tapping on the side of the side of the index finger, index finger rotate around the knuckle of the index finger, etc.). In some embodiments, other types of selection inputs are possible. In some embodiments, in response to detecting the selection input directed to the representation 7366', the computer system selects the representation 7366' or its associated physical object, and moves the control object 7370 to away from its original position toward the viewpoint of the currently displayed view of the three-dimensional environment or toward a representation of the user's hand in the field of view of the display generation component.

In some embodiments, the representation 7366' is a virtual object without a corresponding physical object. In some embodiments, the user input corresponding to a request to select the representation 7366' includes looking at the representation 7366' or the control object 7370 through the display generation component for a preset amount of time (e.g., providing a gaze input directed to the region occupied by the representation 7366' and the control object 7370). In some embodiments, the user input includes looking at the representation 7366' or the control object 7370 through the display generation component for a preset amount of time (e.g., providing a gaze input directed to the region occupied by the representation 7366' and the control object 7370) in conjunction with providing a gesture that involves movement of one portion of the user's hand relative to another portion of the user hand (e.g., thumb flicking upward across the side of the index finger toward the direction of the representation 7366' or control object 7370, thumb tapping on the side of the side of the index finger, index finger rotate around the knuckle of the index finger, etc.). In some embodiments, other types of selection input are possible. In some embodiments, in response to detecting the selection input directed to the representation 7366', the computer system selects the representation 7366', and moves the control object 7370 to away from its original position toward the viewpoint of the currently displayed view of the three-dimensional environment or toward a representation of the user's hand in the field of view of the display generation component.

In FIG. 7P, in response to detecting the selection input that selects the representation 7366' (e.g., a representation of a physical object, a virtual object without a corresponding physical object, etc.), the computer system displays the control object 7370 at a new position in the three-dimensional environment that is closer to the viewpoint than the original position of the control object 7370 (e.g., the position at or near the representation 7366'). In some embodiments, the control object 7370 including its constituent controls (e.g., controls 7372 and 7374, etc.) appears to move toward the viewpoint, and in the process, appears to increase in size (e.g., due to the shorter viewing distance to the viewpoint, and, optionally, enlarged relative to its original size as well). In FIG. 7P, at the end of the movement, the control object 7370 is moved away from its original position at or near the representation 7366' and is separated from the original position by a first distance. In some embodiments, the first distance is a fixed distance determined by the computer system. In some embodiments, the first distance is an adjustable distance that is selected by the computer system on the fly based on a total distance between the original position of the control object 7370 and the viewpoint of the currently displayed view of the three-dimensional environment. In some embodiments, the new position of the control object 7370 is in the central region of the field of view provided by the display generation component and at a preset distance from the viewpoint. In some embodiments, as the display generation component is moved relative to the physical environment, the computer system maintains the spatial relationship between the control object 7370 and the viewpoint (e.g., the control object is locked to the viewpoint or the user's head), where the distance between the control object 7370 and the representation 7366' is adjusted to maintain the spatial relationship. In some embodiments, the computer system displays one or more virtual tethers (e.g., virtual tethers 7382 and 7384) that link the control object 7370 and its original position at or near the representation 7366'. In some embodiments, the length, and optionally, shape and width of the virtual tethers are adjusted when the distance between the control object 7370 and its original position is adjusted. In some embodiments, the control object 7370 is a container object and includes a background plane on which the controls contained therein are overlaid. In some embodiments, the control object 7370 has a transparent background plane, and portions of the three-dimensional environment (e.g., portions of the representation 7366' and portions of the representation 7368', portions of the representation 7124' of the wall, etc.) can be visible in the space between controls (e.g., controls 7372 and 7374, etc.) of the control object 7370. In some embodiments, the control object 7370 and/or the controls contained therein visually blocks portions of the three-dimensional environment (e.g., portions of the representation 7366', portions of the representation 7368', portions of the representation 7124' of the wall, etc.).

In some embodiments, as shown in FIG. 7Q, while the control object 7370 is displayed at a position that is the first distance away from the original position of the control object 7370 (e.g., the position at or near the representation 7366') (e.g., as a result of the selection of the representation 7366', as a result of being repositioned due to movement of the display generation component relative to the physical environment, etc.), the computer system detects that the user's gaze 7388 shifted from the representation 7366' to the first control 7372. In response to the movement of the user's gaze 7388 to the first control 7372, the computer system enlarges the first control 7372 and/or moves the first control 7372 even closer toward the viewpoint of the currently displayed view of the three-dimensional environment 7110. As shown in FIG. 7Q, the first control 7372 appears to be larger and closer to the viewpoint than the second control 7374 of the control object 7370. The distance between the first control 7372 and the representation 7366' is now greater than the first distance, while the distance between the second control 7374 and the representation 7366' is maintained at the first distance. In some embodiments, if the computer system displays a virtual tether object connecting the first control 7372 to the control object 7370 (e.g., while the control object 7370 is at the first distance from the representation 7366') or to the first control's original position at or near the representation 7366', the tether object (e.g., virtual tether 7382, or another type of connection, etc.) is stretched longer as well.

In FIG. 7R, the computer system detects that the user's gaze 7390 shifts from the representation 7366' to the second control 7374, and the computer system enlarges the second control 7374 and/or moves the second control 7374 even closer toward the viewpoint of the currently displayed view of the three-dimensional environment 7110. As shown in FIG. 7R, the second control 7374 appears to be larger and more close to the viewpoint than the first control 7372 of the control object 7370. The distance between the second control 7374 and the representation 7366' is greater than the first distance, while the distance between the first control 7372 and the representation 7366' is maintained at the first distance. In some embodiments, if the computer system displays a virtual tether object connecting the second control 7374 to the control object 7370 (e.g., while the control object 7370 is at the first distance from the representation 7366') or to the second control's original position at or near the representation 7366', the tether object (e.g., virtual tether 7384, or another type of connection, etc.) is stretched longer as well.

In some embodiments, the computer detects that the user's gaze shifts from the first control 7372 (FIG. 7Q) to the second control 7374 (FIG. 7R). In response, the computer system moves the first control 7372 from the position that is closer to the viewpoint than the second control 7374 and the control object 7370 back to its previous position within the control object 7370 (e.g., the previous position is at the first distance away from the representation 7366', or a distance slightly adjusted based on the first distance and the position of the first control within the control object 7370, etc.), as shown in FIG. 7R. The computer system further moves the second control 7374 from its position in the control object 7370 (e.g., at the first distance away from the representation 7366' or a distance adjusted based on the first distance of the position of the second control within the control object 7370, etc.) to a new position that is even closer to the viewpoint (as shown in FIG. 7R).

In a comparison of the states shown in FIGS. 7Q and 7R, as the computer system detects that the user's gaze has shifted from the first control 7372 to the second control 7374, the first control 7372 moves away from the viewpoint back into the control object 7370 that is at the first distance away from the representation 7366' and appears smaller than that shown in FIG. 7Q (and same as that shown in FIG. 7P); and the second control 7374 moves even closer toward the viewpoint and becomes larger than that shown in FIGS. 7P and 7Q. In some embodiments, if tether objects (e.g., tether objects 7382 and 7384, or tether objects connecting the respective controls to their positions within the control object 7370 that is at the first distance away from the representation 7366', etc.) are displayed connecting the controls 7372 and 7374 to the control object 7370 or to their respective original positions at or near the representation 7366', the tether objects are adjusted as well (e.g., tether object 7382 is shrunken, and tether object 7382 is stretched longer; a tether object connecting the first control 7372 to the control object 7370 ceases to be displayed when first control 7372 moves back into the control object 7370, a new tether object connecting the second control 7374 to the control object 7370 is displayed when the second control 7374 pops out of the control object 7370 toward the viewpoint, etc.).

Figure 7T:
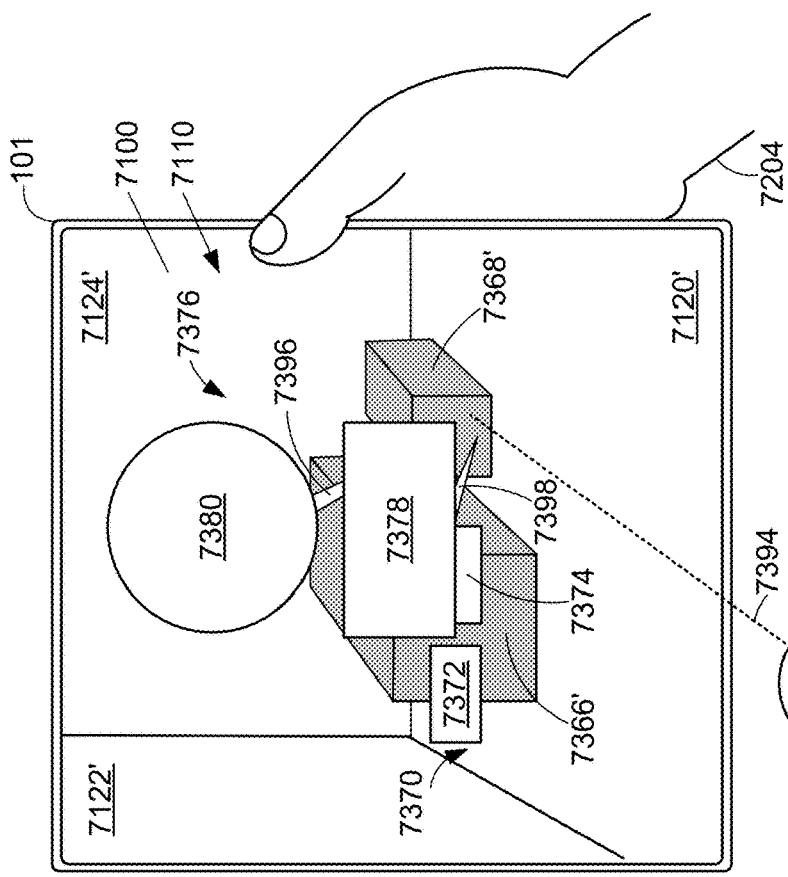
Figure 7S:
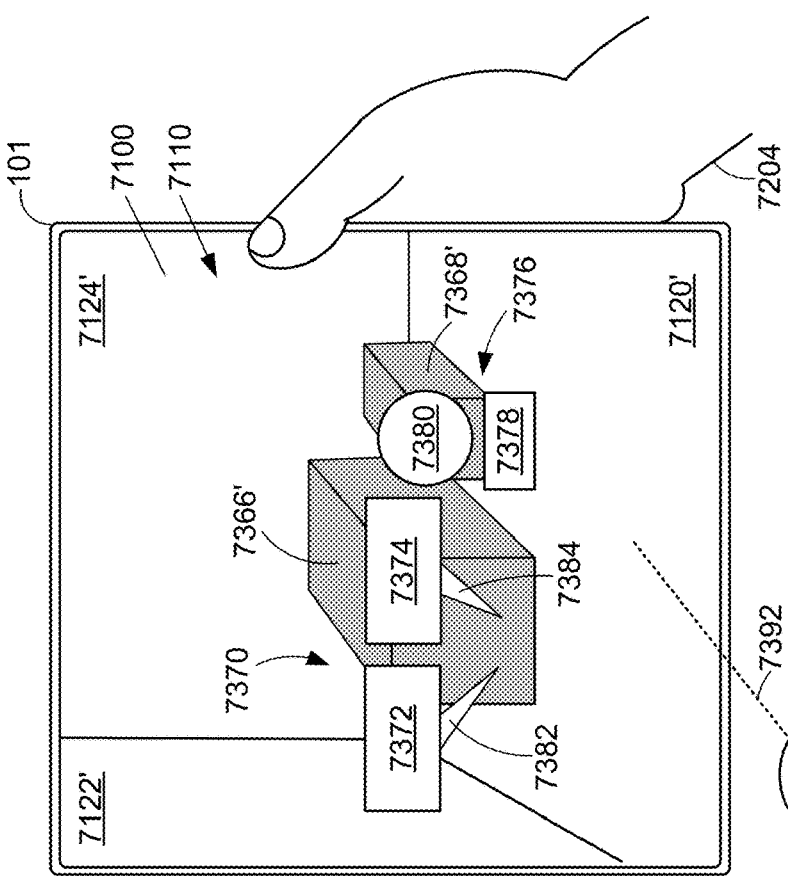

In FIG. 7S which shows a scenario that may follow any of those shown in FIG. 7P, 7Q, or 7R, the computer system detects that the user's gaze 7392 has moved away from the region associated with the control object 7370 and the representation 7366'. For example, the computer system detects that the user's gaze 7392 is at a position in the three-dimensional environment 7110 that is outside of the area occupied by the control object 7370, the controls of the control object 7370, and the area occupied by the representation 7366', for at least a threshold amount of time. Optionally, the computer system detects that the user's gaze is on another control object separate from the control object 7370. In response to detecting that the user's gaze 7392 has moved away from the region associated with the control object 7370 and the representation 7366', the computer system moves the control object 7370 back to its original position at or near the representation 7366', as shown in FIG. 7T. In some embodiments, when the control object 7370 moves back to its original position, the control object 7370 is displayed at a sequence of intermediate positions that are progressively closer to its original position at or near the representation 7366' and progressively farther away from the viewpoint of the currently displayed view of the three-dimensional environment. For example, as shown in FIG. 7S, the control object 7370 is on the path to return to its original position at or near the representation 7366', and has a distance that is less than the first distance (e.g., the distance shown in FIG. 7P-7R) away from its original position at or near the representation 7366'.

In FIG. 7T, which may follow any of the scenarios shown in FIGS. 7O-7S, the computer system has moved the control object 7376 from its original position at or near the representation 7368' in the three-dimensional environment 7110 to a new position that is closer to the viewpoint of the currently displayed view of the three-dimensional environment. In some embodiments, the computer system moves the control object 7376 in accordance with a determination that a selection input corresponding to selection of the representation 7368' has been detected. In some embodiments, the user input corresponding to selection of the representation 7368' is the same type of input that was required to select the representation 7366' but is directed to the representation 7368' instead of the representation 7366'. In some embodiments, the user input corresponding to selection of the representation 7378' is a different type of input from the user input that was required to select the representation 7666'. In some embodiments, in accordance with a preset relationship between the representation 7366' and the representation 7368' (e.g., the representations 7366' and 7368' corresponds to the same category of objects, the representation 7366' and 7368' are within a threshold distance of each other, etc.), the representation 7368' becomes selected if the user's gaze input moves directly (e.g., without dwelling at another position for more than a threshold amount of time, reaching the representation 7368' within a threshold amount of time after leaving the representation 7366' and control object 7370, etc.) from another currently selected object (e.g., the representation 7366', another object that have controls that pop toward the viewpoint when selected, etc.) to the representation 7368'. In some embodiments, under some preset conditions such as those described above, the representation 7368' can become selected without requiring the selection input to be provided again with respect to the representation 7368'. For example, in some embodiments, when the user's gaze 7392 in FIG. 7S continues to move to the representation 7368' in FIG. 7T (e.g., now shown as gaze 7394), the representation 7368' becomes selected and the control object 7376 moves toward the viewpoint without requiring a selection input to be separately provided for the representation 7368'. In some embodiments, the computer system does require a new selection input to be provided with respect to the representation 7368' in order to trigger movement of the control object 7376 toward the viewpoint in the manner as described with respect to the representation 7366' and control object 7370. In some embodiments, the control object 7376 will return to its original position at or near the representation 7368' in a manner analogous to that described with respect to control object 7370 when the user's gaze is moved away from the region occupied by the control object 7376 and the representation 7368'. In some embodiments, the controls 7380 and 7378 move closer to the viewpoint and recede back to the control object 7376 in a manner analogous to those described with respect to controls 7372 and 7374. In some embodiments, the tether objects 7396 and 7398 associated with the controls 7380 and 7378 behave similarly to the tether objects 7382 and 7384 of the controls 7372 and 7374 described above.

In some embodiments, when moving a control object (e.g., control object 7370, control object 7376, etc.) from its original position at or near the object (e.g., representation 7366', representation 7368', etc.) to which it is associated closer to the viewpoint or the position corresponding to the user's hand, the computer system also changes one or more display properties of the control object (e.g., making the control object more clear, enlarging its size, making it more opaque, more detailed, etc.). In some embodiments, when moving a control object (e.g., control object 7370, control object 7376, etc.) toward its original position at or near the object (e.g., representation 7366', representation 7368', etc.) to which it is associated, the computer system also changes one or more display properties of the control object (e.g., blurring the control object, shrinking its size, making it more transparent, less detailed, restoring to its original appearance, etc.).

In some embodiments, after the user has moved the user's gaze away from the object (e.g., representation 7366', the representation 7368', another object that has a corresponding control object, etc.), while the control object associated with the object is receding away from the viewpoint toward the original position of the control object at or near the object, and before the control object fully settles back to the original position at or near the object, if the computer system detects that the user is moving the user's gaze back to the region corresponding to the control object or the object, the computer system reverses the movement of the control object and moves toward the viewpoint or the position corresponding to the user's hand again. In some embodiments, the speed at which the control object moves toward or away from the viewpoint or the position corresponding to the user's hand is based on the speed by which the user's gaze is moved away or toward the region corresponding to the control object and the object. In some embodiments, other characteristics of the movement of the control object (e.g., direction of movement, magnitude of movement, etc.) are based on the characteristics of the movement of the user's gaze away or toward the region corresponding to the control object and the object.

In the illustrations in FIGS. 7O-7T, the location of the user's gaze is indicated by the end of the dotted line originating from the user's eyeball. In some embodiments, display generation component 7100 uses one or more cameras that face toward the user (e.g., front-facing cameras) to track the movement of user's eye (or to track the movement of both of the user's eyes), in order to determine the direction and/or object of user's gaze. More details of eye tracking or gaze tracking technologies are provided in FIGS. 1-6, in particular FIGS. 5-6, and accompanying descriptions. In some embodiments, the location of the user's gaze is determined when the user's gaze meets duration and stability requirements at the location. In some embodiments, the computer system provides visual feedback indicating the location of the user's gaze at the present time.

In some embodiments, the object that has the associated control object is a virtual object that corresponds to a control panel for controlling device functions of the computer system and associated hardware (e.g., the display generation component, audio output device, etc.). For example, the control object includes a slider control that adjusts an operation property (e.g., the brightness, the transparency, the color spectrum, etc.) of the display generation component through a series of values in accordance with progress and characteristics of a continuous user input (e.g., a swipe input, a touch-hold input, a slow flick input, etc.). In some embodiments, the control object includes a toggle control that switches between two or more discrete operational states (e.g., on/off states, minimum/medium/maximum levels, etc.) in response to a discrete input (e.g., a tap input, a quick flick input, a clap input, etc.). In some embodiments, the control object includes a control that provides the sliding control function or the toggle control function depending on the type of input (e.g., swipe vs. tap; slow flick vs. fast flick, touch-hold vs. clap, etc.) that is directed to the control. In some embodiments, the object is a representation of a physical object or the physical object itself, and the control object includes controls for performing operations with respect to the physical object. For example, the physical object is a media player, and the control object is a media player control user interface that includes controls corresponding to one or more operations associated with the media player. For example, the controls include volume controls for changing an output volume of the media player (e.g., in response to a thumb swipe gesture or pinch and twist gesture in a first direction, etc.), decreasing the output volume (e.g., in response to a thumb swipe gesture or pinch and twist gesture in a second direction opposite the first direction, etc.), toggling playback of the media (e.g., playing or pausing the playback in response to a thumb tap gesture, etc.), fast-forwarding, rewinding, browsing through media for playback (e.g., in response to multiple consecutive thumb swipe gestures in the same direction, etc.), or otherwise controlling media playback (e.g., performing menu navigation in response to thumb flick gesture followed by thumb swipe gestures, etc.).

FIGS. 7U-7Z are block diagrams illustrating displaying a three-dimensional preview of a computer-generated experience (e.g., a preview with a spatial extend that is greater than the displayed portion of the preview) in response to first interaction with an object (e.g., a virtual object, a representation of a physical object, a physical object, etc.), before transitioning to displaying the computer-generated experience in response to additional input, in accordance with some embodiments.

In some embodiments, the computer system displays a preview of a computer-generated experience (e.g., a preview 7412, or another preview, etc.) in a three-dimensional environment (e.g., environment 7112, or another three-dimensional environment, etc.) when a virtual object (e.g., representation 7400', virtual object 7404, etc.) corresponding to the computer-generated experience (e.g., experience shown in environment 7116, another virtual experience, augmented reality experience, mixed reality experience, etc.) is invoked by a user input in the three-dimensional environment (e.g., environment 7112, or another three-dimensional environment, etc.). The preview has spatial extent that is greater than the portion of the preview that is displayed in the view of the three-dimensional environment provided by the display generation component (e.g., display generation component 7100, another type of display generation component, such as an HMD, etc.). The computer system displays a different spatial portion of the preview adjacent to the previously displayed portion of the preview in accordance with relative movement between the display generation component (and/or, optionally, the cameras that capture the representation of the physical environment shown in the three-dimensional environment, and/or other location sensing components of the computer system, etc.) and the physical environment (e.g., scene 105). In some embodiments, since the preview occupies a portion of the view of the three-dimensional environment (e.g., environment 7112, or another three-dimensional environment, etc.), the view of the three-dimensional environment (e.g., in regions not occupied by the preview) is also updated in accordance with the relative movement between the display generation component (and/or, optionally, the cameras that capture the representation of the physical environment shown in the three-dimensional environment, and/or other location sensing components of the computer system, etc.) and the physical environment. In some embodiments, the computer system displays the computer-generated experience which has a greater spatial extent than the preview in response to a preset user input for triggering display of the computer-generated experience is detected while the preview is displayed. In some embodiments, the preview expands to become the initial view of the computer-generated experience. Displaying a preview of a computer-generated experience with spatial characteristics and spatial navigation properties that are analogous to those of the computer-generated experience provides the user with an opportunity to experience the environment of the computer-generated experience and explore within the environment (e.g., through interaction, locomotion, and/or navigation, etc.) without actually starting the computer-generated experience (which may completely replacing the currently displayed three-dimensional environment). This allows the user to make a more informed decision about whether or not to proceed with starting the computer-generated experience, reducing user mistakes for accidentally trigger the computer-generated experience, and easing the transition from the currently displayed environment into the fully immersive version of the computer-generated experience, etc., thereby creating a more efficient human-machine interface. In some embodiments, the preview also serves as a transition point for when the user exits the computer-generated experience (e.g., after it is started from the preview or started directly from the virtual object) and returning back to the original three-dimensional environment.

The following example in FIGS. 7U-7Z illustrates that, in some embodiments, a three-dimensional environment (e.g., environment 7112, or another environment, etc.) is displayed via a display generation component, and the three-dimensional environment includes an object that is associated with a computer-generated experience that can be displayed in the three-dimensional environment. In some embodiments, the object is a physical object (e.g., physical object 7400, or another physical object) that has a corresponding representation (e.g., representation 7400', or another representation, etc.) in the three-dimensional environment. In some embodiments, the object is a virtual object (e.g., virtual object 7404, or another virtual object, etc.) in the three-dimensional environment that does not have a corresponding physical object in the physical environment. In some embodiments, the object is a representation of a physical object (e.g., representation 7400', or another representation, etc.) in the physical environment. In some embodiments, the three-dimensional environment is a virtual environment that does not include a representation of the physical environment. In some embodiments, the three-dimensional environment is an augmented reality environment (e.g., environment 7112, or another augmented reality environment, etc.) that includes virtual content (e.g., user interface objects, virtual three-dimensional object, virtual scenery, controls, etc.) as well as a representation of the physical environment (e.g., representation in a camera view of the physical environment, representation as seen through a transparent portion of the display generation component, etc.), and spatial relationships between positions in the three-dimensional environment corresponds to the spatial relationship in the physical environment. In some embodiments, the three-dimensional environment is a virtual environment that includes only virtual content and not a representation of the physical environment. In some embodiments, the virtual three-three-dimensional environment includes at least some virtual objects (e.g., virtual walls, virtual desktop, viewpoint, etc.) that have spatial relationships within the virtual three-dimensional environment that correspond to the physical relationships between certain physical objects (e.g., walls, desktop, user, etc.) within the physical environment. In some embodiments, the computer-generated experiences is a computer-generated three-dimensional experience. In some embodiments, the computer-generated three-dimensional experience includes a virtual three-dimensional environment that is different from the three-dimensional environment that includes the object. In some embodiments, the computer-generated three-dimensional experience includes an augmented reality environment (e.g., environment 7116, or another three-dimensional environment, etc.) that is different from the three-dimensional environment that includes the object (e.g., environment 7112, or another three-dimensional environment, etc.). In some embodiments, the computer-generated three-dimensional experience includes a mixed reality environment that is different from the three-dimensional environment that includes the object. In some embodiments, the type of environment that is used to display the object is the same as the type of environment that is displayed in the computer-generated experience. In some embodiments, the type of environment that is used to display the object is different from the type of environment that is displayed in the computer-generated experience. For example, the environment that displays the object is an augmented reality environment, and the environment in the computer-generated experience is optionally a virtual environment. In another example, the environment that displays the object is a virtual environment, and the environment in the computer-generated experience is optionally an augmented reality environment. In some embodiments, the environment that displays the object and the environment in the computer-generated experience are optionally both augmented reality environments with the representation of the same physical environment. In some embodiments, the environment that displays the object and the environment in the computer-generated experience are optionally both virtual environments, but different virtual environment. In some embodiments, the computer-generated experience is a three-dimensional environment, and has a corresponding preview that is also a three-dimensional experience. For example, the three-dimensional preview allows the user to view the three-dimensional environment of the computer-generated experience from different viewpoint or viewing perspective or view different portions of the three-dimensional environment in response to movement of the display generation component or the user relative to the physical environment. After the user is shown the three-dimensional preview of the computer-generated experience, the computer system displays the full computer-generated experience in accordance with detection of preset input that corresponds to a user's request to start the computer-generated experience. In some embodiments, the transition from the preview to the computer-generated experience includes expanding an area (e.g., a two-dimensional area, a three-dimensional area, etc.) occupied by the preview of the three-dimensional environments to replace the environment that displayed the object and the preview.

Figure 7V:
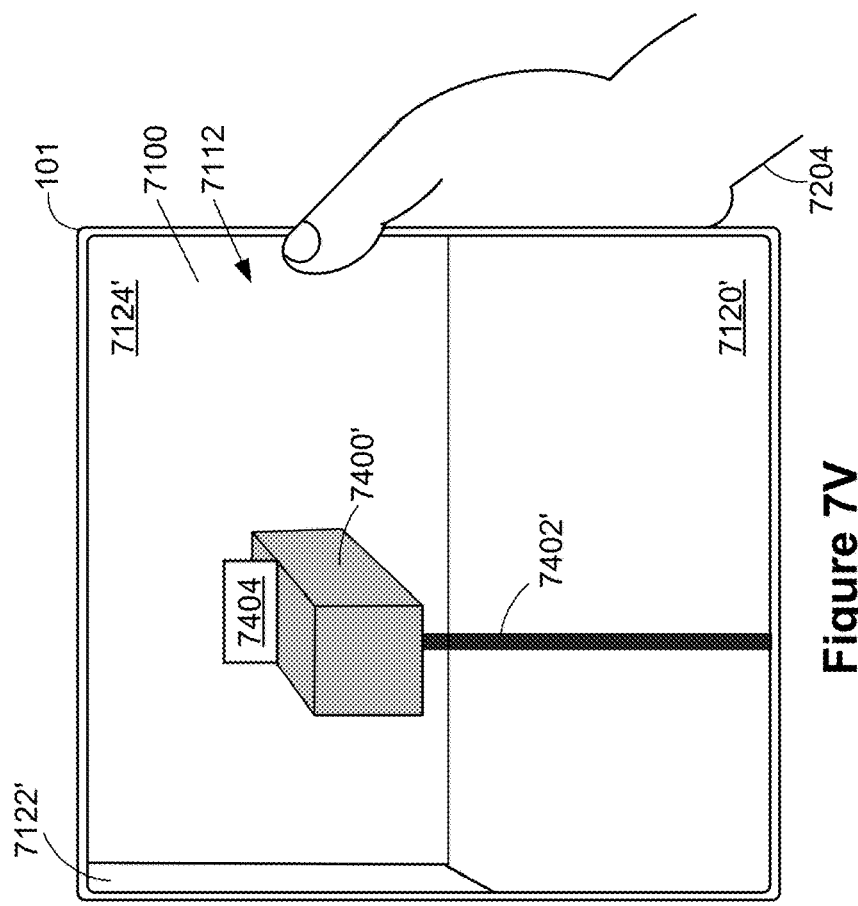
Figure 7U:
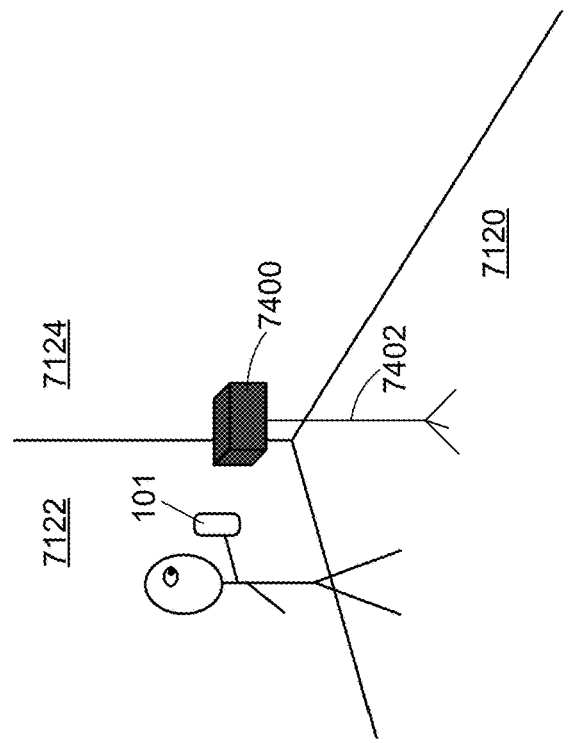
Figure 7A:
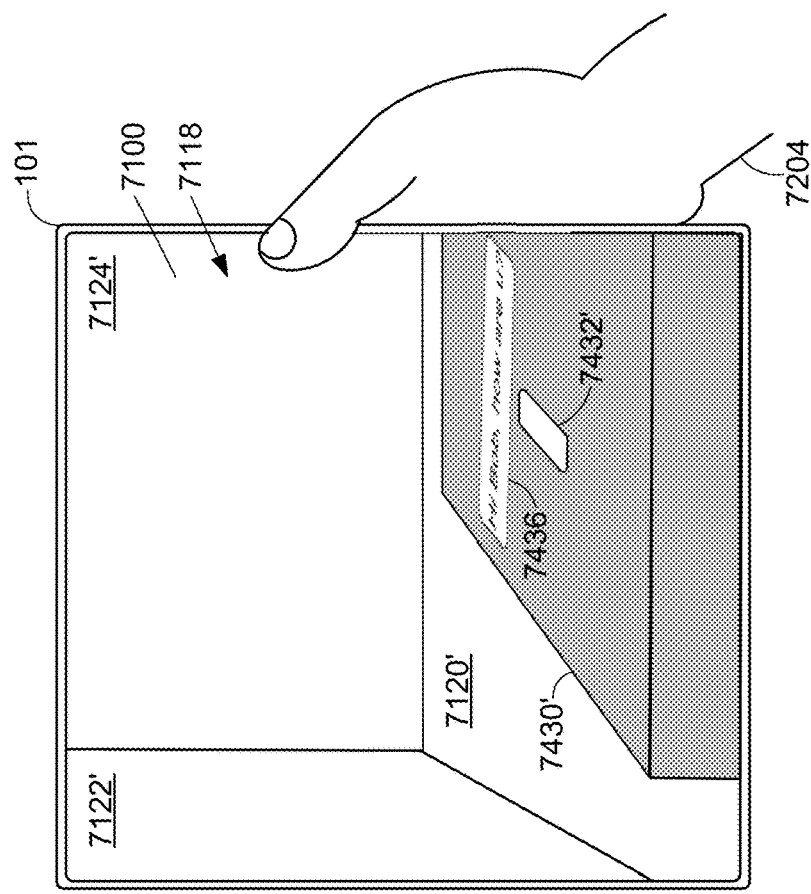
Figure 7A:
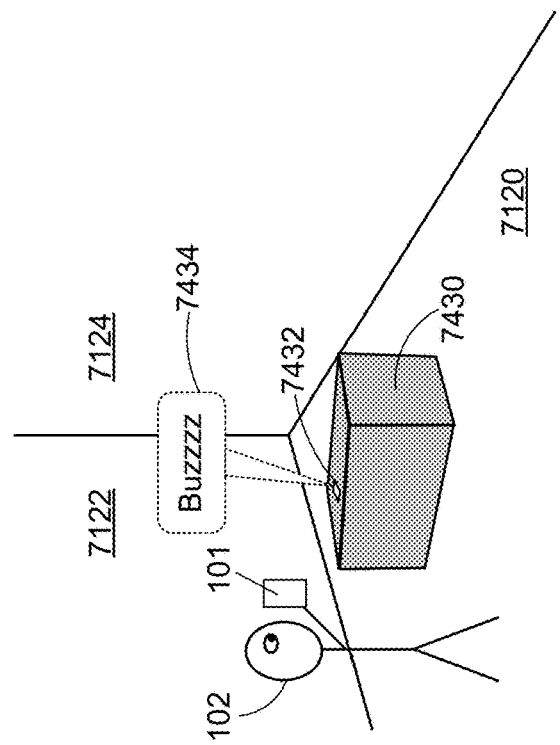

In the example scenario shown in FIG. 7U-7V, the display generation component 7100 displays a view of the three-dimensional environment 7112 that includes a representation of the physical environment, e.g., including representations 7122' and 7124' of the walls 7122 and 7124, the representation 7120' of the floor 7120, representation 7400' of the physical object 7400, and representation 7402' of the physical object 7402, etc. In addition, the three-dimensional environment also includes a virtual object (e.g., visual indication 7404, another virtual object that corresponds to the three-dimensional experience, etc.) that is associated with the computer-generated experience. In some embodiments, the virtual object is displayed at a position that corresponds to the location of the physical object 7400 to indicate that a computer-generated experience associated with the physical object 7400 is available for display by the display generation component. In some embodiments, the three-dimensional environment is a virtual environment (e.g., without the representations of the physical objects and the physical environment shown in FIG. 7V), and direct interaction with the virtual object (e.g., visual indication 7404, another virtual object that corresponds to the three-dimensional experience, etc.) itself causes display of the preview of the computer generated experience.

In FIGS. 7W and 7X, the computer system detects interaction with the object (e.g., the representation 7400', the physical object 7400, the virtual object 7404, etc.) that is associated with the computer-generated experience that meets preset criteria for triggering display of the preview (e.g., preview 7412, or another preview, etc.) of the computer-generated experience, in accordance with some embodiments. In some embodiments, the preset criteria for triggering display of the preview of the computer-generated experience includes a preset direct interaction with the object (e.g., the physical object 7400) or a physical object represented by the object (e.g., representation 7400') in the physical environment (e.g., making physical contact with the physical object, picking up the physical object, tapping on the physical object, etc.). In some embodiments, the preset criteria for triggering display of the preview of the computer-generated experience includes a preset interaction (e.g., a user's gaze input directed to the representation of the physical object in conjunction with a hand gesture remote from the physical object, a point and select input with a pointer object controlled by the user, etc.) with a representation (e.g., representation 7400') of the object (e.g., the physical object 7400) in the three-dimensional environment that displays the representation of the object. In some embodiments, the preset criteria for triggering display of the preview of the computer-generated experience includes a preset interaction (e.g., a user's gaze input directed to the virtual object associated with the computer-generated experience for a preset threshold amount of time, a hand gesture detected at a position of the virtual object, a hand gesture performed remote from a location corresponding to the virtual object in conjunction with a user's gaze directed to the virtual object, etc.) with a virtual object (e.g., the virtual object 7404, a virtual object without a corresponding physical object, etc.) in the three-dimensional environment that displays the virtual object.

In some embodiments, the preview 7412 of the computer-generated experience includes at least a portion of the three-dimensional environment (e.g., environment 7116) that will be displayed in the computer-generated experience.

In some embodiments, the preview 7412 includes at least some of the virtual content (e.g., virtual objects 7406, 7408, 7410, 7416, etc.) that will be displayed in the computer-generated experience. In some embodiments, the preview 7412 provides at least some aspects of the experiences and functions available in the computer-generated experience. In some embodiments, the preview 7412 occupies a sub-portion of the three-dimensional environment (e.g., the three-dimensional environment 7112) which displayed the object (e.g., representation 7400', virtual object 7404, etc.) prior to the display of the preview 7412. In some embodiments, as shown in FIG. 7W, the preview 7412 provides a viewport into the three-dimensional environment (e.g., environment 7116) of the computer-generated experience, and replaces display of a portion of the three-dimensional environment (e.g., environment 7112) that previously displayed the object (e.g., the representation 7400' of the object 7400, the virtual object 7404, etc.). In some embodiments, the preview 7412 has a preset spatial relationship to the viewpoint of the currently displayed view of the three-dimensional environment (e.g., the three-dimensional environment 7112) that displayed the object or representation of thereof. In some embodiments, as shown in FIGS. 7W and 7X, when the display generation component 7100 is moved relative to the physical environment, the computer system updates the view of the three-dimensional environment 7112 in accordance with the movement of the display generation component 7100 relative to the physical environment. For example, in FIG. 7X, a different portion of the physical environment (e.g., a portion of the physical environment that is higher and more to the left than that shown in FIG. 7W, or a different portion of the physical environment, etc.) is represented in the view of the three-dimensional environment 7112 in accordance with movement (e.g., movement in the up-left direction, movement in a different direction, etc.) of the display generation component relative to the physical environment. In some embodiments, the computer system maintains display of the preview 7412 as long as the preset criteria for triggering display of the preview are still met. In some embodiments, the computer system maintains display of the preview 7412 in accordance with a determination that the criteria for dismissing the preview are met (e.g., a dismissal input is detected, the position of the object is no longer in the field of view provided by the display generation component due to movement of the display generation component, etc.).

As shown in FIG. 7X, in response to movement of the display generation component 7100 relative to the physical environment, the preview 7412 is also updated to show a different view of the three-dimensional environment (e.g., environment 7116) of the computer-generated experience. A different portion of the three-dimensional environment (e.g., environment 7116) of the computer-generated experience is displayed in the preview 7412, as compared to that shown in FIG. 7W, as a result of the movement of the display generation component. For example, the portion of the three-dimensional environment of the computer-generated experience (e.g., environment 7116) includes a portion of the preview 7412 that was not visible prior to the movement of display generation component 7100 in the physical environment.

In this example, the computer-generated experience is an augmented reality experience, including a representation of the physical environment (e.g., including representation 7124" of the wall 7124, representation 7120" of the floor 7120, representation 7400" of the physical object 7400, representation 7402" of the physical object 7402, representation 7202" of the user's hand 7202, etc.) along with virtual content (e.g., virtual objects 7406, 7408, 7410, 7416, etc.). In some embodiments, the virtual content in the augmented reality experience is updated (e.g., virtual objects change and move in the preview, new virtual objects are added in the preview, virtual objects are removed from the preview, etc.) in accordance with user interaction with the object (e.g., turning the physical object 7400, holding the physical object 7400, providing hand gestures directed to the object or preview (e.g., directed to the virtual objects within the preview, directed to the representations of physical object(s) within the preview, etc.), and/or movement of the display generation component relative to the physical environment, etc.). In some embodiments, the interactions with the preview are analogous to the interactions with the computer-generated experience corresponding to the preview, and provides the user with an opportunity to experience the computer-generated experience to a limited but meaningful extent.

In some embodiments, the computer-generated experience is a virtual experience that includes a virtual three-dimensional environment without including a representation of the physical environment. In some embodiments, the virtual content in the virtual three-dimensional experience is updated (e.g., virtual objects change and move in the preview, new virtual objects are added in the preview, virtual objects are removed from the preview, etc.) in accordance with user interaction with the object (e.g., using gestures, voice command, and/or other input interfaces, etc.), and/or movement of the display generation component relative to the physical environment, etc.). In some embodiments, the interactions with the preview are analogous to the interactions with the computer-generated experience, and provides the user with an opportunity to experience the computer-generated experience to a limited but meaningful extent.

FIGS. 7Y and 7Z illustrate that, the computer system detects interaction with the object (e.g., the representation 7400', the physical object 7400, the virtual object 7404, etc.) that is associated with the computer-generated experience or interaction with the preview. In accordance with a determination that the interaction meets preset criteria for triggering display of the computer-generated experience (e.g., experience 7116), the computer system ceases to display the preview and displays the computer-generated experience. In some embodiments, the preset criteria for triggering display of the computer-generated experience include a preset direct interaction with the object (e.g., the physical object 7400) or a physical object represented by the object (e.g., representation 7400') in the physical environment (e.g., opening the physical object, swiping on the physical object, flipping the physical object to the side, etc.). In some embodiments, the preset criteria for triggering display of the computer-generated experience includes a preset interaction with (e.g., via gaze, gesture, pointer device, etc.) a representation (e.g., representation 7400') of the object (e.g., the physical object 7400) or the preview (e.g., preview 7412) in the three-dimensional environment that displays the representation of the object or the preview of the object. In some embodiments, the preset criteria for triggering display of the computer-generated experience includes a second preset interaction (e.g., a user's gaze input directed to the virtual object or preview associated with the computer-generated experience for a preset threshold amount of time, a hand gesture detected at a position of the virtual object or preview, a hand gesture performed remote from a location corresponding to the virtual object in conjunction with a user's gaze directed to the virtual object or preview, etc.) with a virtual object (e.g., the virtual object 7404, a virtual object without a corresponding physical object, etc.) or the preview in the three-dimensional environment (e.g., environment 7112) that displays the virtual object and the preview.

In some embodiments, the computer-generated experience includes a view of a three-dimensional environment (e.g., environment 7116, or another three-dimensional environment, etc.), including virtual content that was displayed in the preview (e.g., preview 7412, or another preview, etc.) and additional virtual content that was not displayed in the preview of the computer-generated experience. In some embodiments, the computer-generated experience provides the experiences and functions available in the preview as well as additional experiences and functions that were not available in the preview. In some embodiments, the computer-generated experience occupies a larger portion of the field of view than the preview, and optionally, fully replaces the view of the three-dimensional environment (e.g., the three-dimensional environment 7112) which displayed the object and the preview. In some embodiments, as shown in FIG. 7Y, the preview 7412 expands and occupies the entire field of view provided by the display generation component and becomes the computer-generated experience associated with the object, and replaces display of the three-dimensional environment 7112 that previously displayed the object and the preview (e.g., the representation 7400' of the object 7400, virtual object 7404, the preview 7412, etc.).

In some embodiments, as shown in FIGS. 7Y and 7Z, when the display generation component 7100 is moved relative to the physical environment, the computer system updates the view of the three-dimensional environment of the computer-generated experience (e.g., the environment 7116) in accordance with the movement of the display generation component 7100 relative to the physical environment. For example, in FIG. 7Z, a different portion of the physical environment (e.g., a portion of the physical environment that is higher and more to the right than that shown in FIG. 7Y, or a different portion of the physical environment, etc.) is represented in the view of the three-dimensional environment (e.g., environment 7116) in accordance with movement (e.g., movement in the up-left direction, movement in a different direction, etc.) of the display generation component relative to the physical environment.

In this example, the computer-generated experience is an augmented reality experience, including a representation of the physical environment (e.g., including representation 7124" of the wall 7124, representation 7120" of the floor 7120, representation 7400" of the physical object 7400, representation 7402" of the physical object 7402, representation 7202" of the user's hand 7202, etc.) along with virtual content (e.g., virtual objects 7406, 7408, 7410, 7418, 7420, 7422, 7424, 7426, 7428, etc.). In some embodiments, the virtual content in the augmented reality experience is updated (e.g., virtual objects change and move in the three-dimensional environment 7116 of the computer-generated experience, new virtual objects are added in the three-dimensional environment 7116, virtual objects are removed from the three-dimensional environment 7116, etc.) in accordance with user interaction with the object (e.g., turning the physical object 7400, holding the physical object 7400, providing hand gestures directed to the object (e.g., directed to the virtual objects within the preview, directed to the representations of physical object(s) within the preview, etc.), movement of the display generation component relative to the physical environment, etc.).

In some embodiments, the computer-generated experience is a virtual experience that includes a virtual three-dimensional environment without including a representation of the physical environment. In some embodiments, the virtual content in the virtual three-dimensional experience is updated (e.g., virtual objects change and move in the three-dimensional environment of the experience, new virtual objects are added in the environment, virtual objects are removed from the environment, etc.) in accordance with user interaction with the object or virtual content (e.g., using gestures, voice command, and/or other input interfaces, etc.), and/or movement of the display generation component relative to the physical environment, etc.).

In some embodiments, the object that is associated with the computer-generated experience is a selectable virtual object, such as an icon, a selectable option in a virtual menu, a graphical object, a virtual three-dimensional object, etc., that corresponds to the computer-generated experience. The computer system provides the preview of the computer-generated experience in response to a first input while the object has input focus (e.g., is currently selected, has a user's gaze input directed to it, has a cursor object at its position, etc.) or in response to a first input that has a location component corresponding to the position of the object. In some embodiments, the preview is a three-dimensional preview that includes a three-dimensional environment with a spatial extent that is greater than the portion shown in the preview at a given time. The computer system updates the viewpoint corresponding to the portion of the three-dimensional environment shown in the preview in accordance with user input (e.g., movement of the display generation component relative to the physical environment, providing a swiping gesture (e.g., an in-air swipe gesture, a swipe gesture by one part of the hand across another part of the hand, etc.) while gazing at the preview, etc.) and displays a different portion of the three-dimensional environment in the preview that corresponds to the updated viewpoint. While providing the preview, the computer system transitions to displaying the computer-generated experience and expanding the portion of the three-dimensional environment that is visible in the field of view provided by the display generation component, in accordance with a determination that a user input corresponding to a request to start the computer-generated experience has been detected.

In some embodiments, the input that corresponds to the request to display the preview includes a gesture input (e.g., a swipe in a preset direction, such as a direction away from the user, an upward direction, etc.; a flick in a preset direction, etc.) performed by a portion of the user's hand relative to another portion of the user's hand (e.g., thumb relative to the side of the index finger, tip of the index finger relative to the first knuckle, etc.) that is detected in conjunction with a user's gaze input directed to the selectable virtual object. In some embodiments, the input that corresponds to a request to start the computer-generated experience includes a gesture input (e.g., a tap input, a double tap input, a flick input, etc.) performed by a portion of the user's hand relative to another portion of the user's hand (e.g., thumb relative to the side of the index finger, tip of the index finger relative to the first knuckle, etc.) that is detected in conjunction with a user's gaze input directed to the selectable virtual object. In some embodiments, the input that corresponds to the request to display the preview and the input that corresponds to the request to display the computer-generated experience are the same type of input, but the input meets the requirement to display the preview if it is detected at a time when the preview is not displayed, and the input meets the requirement to display the computer-generated experience if it is detected while the preview is displayed. In some embodiments, the input that corresponds to the request to display the preview and the input that corresponds to the request to display the computer-generated experience are two different types of input. In some embodiments, the computer system displays the computer-generated experience that occupies a greater spatial extent than the preview of the first computer-generated experience.

In some embodiments, after the computer-generated experience is started and while the three-dimensional environment of the computer-generated experience is displayed via the display generation component, the computer system detects an input that corresponds to a request to exit the computer-generated experience. In response to detecting the input that corresponds to the request to exit the computer-generated experience, the computer system redisplays the preview (e.g., shrinking the view of the three-dimensional environment of the computer-generated experience to that of the preview). The computer system dismisses the preview and returns to displaying the original environment that displayed the object corresponding to the computer-generated experience, in response to detecting an input that corresponds to a request to dismiss the preview.

In some embodiments, the computer-generated experience includes a first sequence of computer-generated content that corresponds to a first playback duration, and the preview includes a second sequence of computer-generated content that corresponds to a second playback duration that is shorter than the first playback duration. In some embodiments, the second sequence of computer-generated content is a partial subset of the first sequence of computer-generated content.

In some embodiments, the computer-generated experience includes a three-dimensional environment that that surrounds the viewpoint (e.g., occupying an angular span of 135 degrees, 180 degrees, 270 degrees, 360 degrees, etc.), and the preview includes a three-dimensional environment that spans a lesser angular or spatial extent than the computer-generated experience (e.g., occupying an angular span of 55 degrees of 135 degrees, occupying 90 degrees of 180 degrees, occupying 180 degrees of 270 degrees, occupying 180 degrees of 360 degrees, etc.)

FIGS. 7AA-7AD are block diagrams illustrating displaying a representation of a notification in a three-dimensional environment at a position that has a predetermine spatial relationship (e.g., location, orientation, distance, etc.) relative to a representation of an electronic device (e.g., the electronic device at which the notification was generated or received), in accordance with some embodiments.

In some embodiments, the computer system displays a representation of an electronic device (e.g., representation 7432' of device 7432) in a three-dimensional environment (e.g., environment 7118, or another three-dimensional environment) at a position that corresponds to the location of the electronic device (e.g., device 7432) in the physical environment (e.g., scene 105). When the computer system receives an indication that a notification is generated or received at the electronic device, the computer system displays a representation of the notification (e.g., representation 7436, or another representation of the notification) at a preset location relative to the representation of the electronic device in the three-dimensional environment. The computer system performs operations with respect to the representation of the notification (e.g., displaying a larger version thereof, dismissing the representation of the notification, playing back the content of the notification, composing a reply to a message corresponding to the notification, etc.) in the three-dimensional environment (and, optionally, causing corresponding operations to be performed with respect to the notification at the electronic device as well) in accordance with user inputs interacting with the representation of the notification. Displaying the representation of the electronic device at a preset location relative to the representation of the electronic device allows the user to easily spot the representation of the notification in the three-dimensional environment and/or locate the electronic device in the physical environment so that the user does not miss the notification when the electronic device is at a location or has an orientation that make notifications on the display of the electronic device hard to see via the display generation component (e.g., display generation component 7100, or another type of display generation component, such as an HMD, etc.). Furthermore, in some embodiments, the computer system allows the user to interact with the notification through the representation of the notification (e.g., representation 7436, or another type of representation, etc.) in the three-dimensional environment by using gestures provided without requiring physical contact or proximity to the electronic device to the user. This makes user interaction with the notification more efficient, and reduces the number, extent, and/or nature of the inputs from a user to perform operations associated with the notification, thereby creating a more efficient human-machine interface. It also means the user does not have to interrupt an on-going computer-generated experience (e.g., an experience displayed in the environment 7118, or another environment, etc.) to reach and grab the electronic device to interact with the notification using the electronic device. Furthermore, in some embodiments, the computer system allows the user to interact with the notification by physical manipulation (e.g., touching, turning, rotating, tapping, swiping, etc.) of the electronic device (e.g., electronic device 7432) with the visual aid (e.g., visual prompt, visual enhancement, virtual keyboard, and virtual controls, etc.) provided in the three-dimensional environment (e.g., environment 7118, or another environment, etc.). This way, the user does not have to see the notification using only the small display of the electronic device, and optionally, can still utilize the more accurate touch sensors (e.g., touchscreen, touch-pad, etc.) located on the electronic device to detect more refined inputs (e.g., typing, fine tuning, etc.) to interact with the notification. For example, the computer system maps the locations of the user's touches on the touch-screen of the electronic device to the positions of the virtual keys displayed in the three-dimensional environment (e.g., on a virtual keyboard displayed in the central region of the field of view, at a position corresponding to the touch-screen of the electronic device, etc.) to output text of a reply to a message that triggered the notification. The flexibility of choosing between different modalities of interactions and the integration of the advantages provided by the different modalities of interactions reduce user mistakes when interacting with notifications and reduce the number, extent, and/or nature of the inputs from a user to perform operations associated with the notification, thereby creating a more efficient human-machine interface.

In the example shown in FIGS. 7AA-7AD, in some embodiments, the computer system that is in communication with a display generation component (e.g., the display generation component 7100, an HMD, etc.) is also in communication with another electronic device (e.g., the electronic device 7432, in this example). The electronic device is optionally a device that is associated with a user of the display generation component. In some embodiments, the electronic device is a handheld device, a mobile telephone, a smartphone, a tablet device, a gaming device, a smart remote control, a smart appliance, a portable computer, a wearable device such as a smartwatch, a smart accessory, a smart pendent, etc. In some embodiments, the electronic device has a display that displays a graphical user interface and is capable of generating and displaying notifications that corresponds to events occurring at the electronic device on the display of the electronic device. In some embodiments, the computer system and the electronic device communicate with each other via a local area network, Bluetooth, and/or other wireless communication pathways. In some embodiments, when a user is placed into a predefined position relative to the display generation component of the computer system, the computer system displays a three-dimensional environment (e.g., environment 7118) that includes a representation of the electronic device (e.g., representation 7432') at a position that corresponds to the location of the electronic device (e.g., device 7432) in the physical environment (e.g., scene 105). For example, when the electronic devices (e.g., device 7432) moves from location to location and/or changes orientation relative to the physical environment (e.g., scene 105), the computer system changes the position and/or the orientation of the representation of the electronic device (e.g., representation 7432') in the currently displayed view of the three-dimensional environment according to the movement and/or change in orientation of the electronic device in the physical environment. Although, in some embodiments, the user is provided with a view of the representation of the electronic device in the three-dimensional environment displayed via the display generation component, and the user can see a representation of the content shown on the display of the electronic device as part of the representation of the electronic device, it can be very inconvenient and difficult for the user to interact with the content if the electronic device is not located in close proximity to the user, or if the displayed content does not appear with sufficient resolution in the view of the three-dimensional environment. Furthermore, when the electronic device is not oriented with the display toward the user's eyes, even if the electronic device is relatively close to the user, the user would have to move the electronic device to reorient the electronic device to face the user's eyes in order to see its content. Sometimes, the electronic device is in a locked state or low power state with a dimmed or dark screen, a notification arriving at the electronic device or generated by the electronic device is only displayed on display of the electronic device briefly unless the user is in close proximity to the electronic device to quickly interact with the notification through the input interface of the electronic device. This means that, frequently the user who is engaged with viewing the three-dimensional environment displayed via the display generation component does not see the notification coming in or cannot reach and interact with notification using the electronic device in time. As described herein, a notification received or generated at the electronic device is displayed by the computer system in the three-dimensional environment at a position that is near the representation of the electronic device, and not confined to the limited display area of the electronic device. In some embodiments, the notification is displayed with a larger size than the area of the display on the representation of the electronic device. In some embodiments, when the notification is initially displayed, the notification has an orientation that is based on orientation of the representation of the electronic device in the three-dimensional environment, and, optionally, has a new orientation that is based on viewpoint of the currently displayed view of the three-dimensional environment once the user interacts with the notification through the display generation component or the electronic device. In some embodiments, the notification is display with an orientation facing toward the viewpoint of the currently displayed view of the three-dimensional environment at a position near the representation of the electronic device, irrespective of the orientation of the electronic device. In some embodiments, the notification is displayed at a position that is selected to have a predetermined location relative to the representation of the electronic device (e.g., the notification hovers over the representation of the display of the electronic device, the notification is displayed above the top of the representation of the electronic device in a plane that is parallel to the plane of the representation of the electronic device, the notification is display with a first distance from a preset edge of the representation of the electronic device, etc.).

In FIG. 7AA, the scene 105 shows a physical environment with the user (e.g., a user 102). A computer system (e.g., a computer system 101, a computer system that is not portable, etc.) is present in the physical environment, and is in communication with a display generation component (e.g., display generation component 7100, an HMD, etc.). In some embodiments, the display generation component and the computer system form an integrated system in the same housing (e.g., a handheld device, a computer system with an integrated display, a display generation component with built in processors and memory, etc.). In some embodiments, the computer system and the display generation component are separate devices that communicate with each other via one or more networks or connections. The physical environment includes one or more physical surfaces and physical objects (e.g., walls 7122 and 7124, floor 7120, physical object 7430, etc.). The physical environment also includes the electronic device (e.g., the electronic device 7432, or any of the electronic device described above, etc.) that is associated with the user of the computer system (e.g., the user 102, another user, etc.). At the moment shown in FIG. 7AA, an event has occurred at the electronic device (e.g., the electronic device 7432, or any of the electronic device described above, etc.) that causes a notification to be generated or received at the electronic device. An alert (e.g., an audio alert, a haptic alert (e.g., a buzz 7434), a visual alert, etc.) is optionally output by the electronic device to indicate the arrival of the notification at the electronic device.

In FIG. 7AB, while the display generation component (e.g., the display generation component 7100 or an HMD, etc.) of the computer system is displaying a view of a three-dimensional environment (e.g., environment 7118, another environment that is a virtual environment, an augmented reality environment, or mixed reality environment, etc.) that includes a representation of the electronic device (e.g., the representation 7432') at a position that corresponds to the location of the electronic device (e.g., electronic device 7432) in the physical environment. Before the notification is received or generated at the electronic device 7432, the representation of the electronic device 7432 is displayed without an accompanying representation of a notification. In some embodiments, the representation of the electronic device 7432 is optionally not visible or displayed in the view of the three-dimensional environment until the notification is received or generated at the electronic device.

As shown in FIG. 7AB, in accordance with a determination that the notification is received or generated at the electronic device 7432, the computer system displays the representation 7436 of the notification at a predetermined location relative to the representation 7432' of the electronic device 7432 in the three-dimensional environment. In this example, the electronic device 7432 is lying flat on the top surface of the physical object 7430 that is parallel to the floor 7120, and the top edge of the electronic device (e.g., the top edge when the electronic device is held upright relative to the floor) is farther away from the viewpoint of the currently displayed view of the three-dimensional environment than the bottom edge of the electronic device. In this example, the top edge of the electronic device 7432 is parallel to the far edge of the top surface of the physical object 7430. In the view of the three-dimensional environment 7118, the respective spatial relationships between the representation 7432' of the electronic device and the representations of other objects in the three-dimensional environment correspond to the respective spatial relationships between the electronic device 7432 and other objects in the physical environment, in accordance with some embodiments. In addition, the spatial relationship between the electronic device 7432 and the display generation component 7100 corresponds to the spatial relationship between the representation 7432' of the electronic device and the viewpoint of the currently displayed view of the three-dimensional environment 7118, in accordance with some embodiments. As shown in FIG. 7AB, the view of the three-dimensional environment 7118 includes the representations 7122' and 7124' of the walls 7122 and 7124, the representation 7120' of the floor 7120, the representation 7430 of the physical object 7430, and the representation 7432' of the electronic device 7432. The spatial relationships between the viewpoint and these representations of objects in the three-dimensional environment correspond to the spatial relationships between the display generation component 7100 (or the user's eyes) and the objects in the physical environment.

In some embodiments, the representation of the electronic device 7432' optionally includes the representation of the display of the electronic device 7432 and shows the content that is displayed on the display of the electronic device 7432. In FIG. 7AB, in response to detecting an indication that a notification has been received or generated at the electronic device 7432, the computer system displays a representation 7436 of the notification at a position above the top edge of the representation 7432' of the electronic device. In some embodiments, the representation 7436 of the notification is displayed parallel to the surface of the representation 7432' of the electronic device and at a first distance away from the top edge of the representation 7432' of the electronic device. In some embodiments, the relative position and orientation between the representation 7436 of the notification to the representation 7432' of the electronic device is preset by the computer system. Thus, when the electronic device 7432 is placed in the physical environment at different locations and/or with different orientations relative to the display generation component or the user, the relative position and orientation between the representation 7436 of the notification to the representation 7432' of the electronic device do not change. For example, in FIG. 7AB, if the electronic device is placed on the wall or on the floor, the representation 7436 of the notification will be displayed with the same spatial relationship with the representation 7432' of the electronic device as that shown in FIG. 7AB. In some embodiments, only some aspect of the spatial relationship remain fixed, while other aspects of the spatial relationship are adjusted based on the location and/or orientation of the electronic device in the physical environment. For example, in some embodiments, the representation 7436 of the notification is displayed a fixed distance above the representation 7432 of the electronic device with an upright orientation facing toward the viewpoint of the currently displayed view of the three-dimensional environment, irrespective of the orientation of the electronic device in the physical environment. In some embodiments, while displaying the representation 7436 of the notification at a preset distance away from a preset edge of the representation of the electronic device 7432, the computer system displays the representation of the notification in a plane parallel to the plane of the representation of the electronic device if the representation of the electronic device is within a first threshold distance of the viewpoint; and the computer system displays the representation of the notification in a vertical plane if the representation of the electronic device is more than the first threshold distance away from the viewpoint. Other preset spatial relationships are possible and are not enumerated in the interest of brevity.

As shown in FIGS. 7AB, the display generation component displays an augmented reality environment (e.g., environment 7118) that includes a representation of the physical environment (e.g., scene 105) and the representation of the electronic device (e.g., representation 7432') is part of the representation of the physical environment. In some embodiments, the display generation component displays a virtual three-dimensional environment, without displaying a pass-through portion (e.g., camera view, a transparent or semi-transparent portion of the display generation component, etc.) showing the physical environment surrounding the user, but includes a representation of the electronic device whose position in the virtual environment corresponds to its location in the physical environment. In some embodiments, the virtual three-dimensional environment optionally includes one or more virtual surfaces (e.g., virtual table, virtual walls, etc.) whose position and orientation correspond the location and orientation of physical surfaces (e.g., a table surface, wall surfaces, etc.) in the physical environment, even though the appearance of the virtual surfaces do not resemble those of the physical surfaces.

In some embodiments, the display generation component 7100 represents and can be replaced by an HMD or other computer system that includes a display generation component that at least partially blocks the user's view of the physical environment when displaying the three-dimensional environment. In some embodiments, the HMD or display generation component of the computer system encloses at least the user's eyes, and the user's view of the physical environment is partially or completely blocked by the virtual content displayed by the display generation component and other physical barriers formed by the display generation component or its housing.

FIGS. 7AC and 7AD illustrate exemplary user interactions with the notification while the representation 7436 of the notification is displayed at the preset location relative to the representation 7432' of the electronic device. In FIG. 7AC, the computer system detects a first user input (e.g., a preset hand gesture 7440 (e.g., performed by the hand 7202, or another type of input (e.g., gaze, voice command, touch inputs, etc.), etc.) directed to the first representation of the notification. For example, the first input is a gesture that is detected at a location that corresponds to the position of the first representation 7436 of the notification, a gesture that is detected at a location that corresponds to a position that is away from the position of the representation 7436' of the notification, a voice command, a user's gaze input directed to the representation of the notification, etc. In response to detecting the first user input and in accordance with a determination that the first user input meets first preset criteria for interacting with the representation 7436 of the notification, the computer system displays a second representation 7438 of the notification in the three-dimensional environment. In some embodiments, the second representation 7438 of the notification is displayed at a position that is facing toward the viewpoint of the currently displayed view of the three-dimensional environment, and, optionally, is moved and reoriented in the three-dimensional environment to continue to face toward the viewpoint as the viewpoint is moved relative to the three-dimensional environment (e.g., due to movement of the display generation component in the physical environment, or due to movement of the user's head or whole person in the physical environment as the user holds or wears the display generation component, etc.). In some embodiments, the second representation 7438 of the notification moves toward the viewpoint from the position of the first representation 7436 of notification in response to the first user input (e.g., the input gesture 7440 by the user's hand 7202, or another type of input, etc.). In some embodiments, the second representation 7438 of the notification displays the content of the notification. In some embodiments, the second representation 7438 of the notification is concurrently displayed with the first representation 7436 of the notification in the view of the three-dimensional environment. In some embodiments, the first representation 7436 of the notification is transformed into the second representation 7438 of the notification and moved to the position of the second representation 7438 of the notification in response to detecting the first user input.

In some embodiments, as shown in FIG. 7AD, the computer system detects a second user input (e.g., a preset hand gesture 7442 (e.g., performed by the hand 7202), another type of input (e.g., gesture, gaze, voice command, touch input, etc.), etc.) directed to the first representation 7436 of the notification and/or the second representation 7438 of the notification. In some embodiments, the second user input is a gesture that is detected at a location that corresponds to the position of the first representation 7436 of the notification or the position of the second representation 7438 of the notification, a gesture that is detected at a location that corresponds to a position that is away from the position of the first representation 7436 of the notification and/or the position of the second representation 7438 of the notification, a voice command, a user's gaze input directed to the representation 7438 or 7436 of the notification, etc. In some embodiments, in response to detecting the second input, in accordance with a determination that the second user input meets second preset criteria for interacting with the representation of the notification (e.g., the first representation 7436, the second representation 7438, or another representation of the notification, etc.), the computer system automatically playbacks an audio version of the notification. As shown in FIG. 7AD, in some embodiments, in response to the user's hand 7202 moving upward while the user's gaze is directed to the first representation 7436 of the notification, the computer system displays a user interface object 7446 that shows playback controls for playing the audio version of the notification, and outputs the audio 7444 of the audio version of the notification. In some embodiments, the user interface object 7446 is displayed close to the viewpoint of the currently displayed view of the three-dimensional environment (e.g., within an arm's reach of the representation 7202' of the user's hand, in the center of the field of view, locked to a fixed position relative to the viewpoint, etc.). In some embodiments, the first representation 7436 remains displayed at the predetermined position relative to the representation 7432' of the electronic device (and optionally, moves with the representation 7432' of the electronic device as the electronic device 7432 is moved in the physical environment) while the user interface object 7446 is displayed with a preset relationship with the viewpoint (e.g., at a preset distance from the viewpoint and moves with the movement of the viewpoint, etc.). In some embodiments, the user interface object 7446 is displayed at a position that is facing toward the viewpoint of the currently displayed view of the three-dimensional environment, and is moved and reoriented in the three-dimensional environment to continue to face toward the viewpoint as the viewpoint is moved relative to the three-dimensional environment (e.g., due to movement of the display generation component in the physical environment, or due to movement of the user's head or whole person in the physical environment as the user holds or wears the display generation component, etc.). In some embodiments, the user interface object 7446 includes user interface elements that correspond to different operations that can be performed with respect to the notification (e.g., deleting the notification, replying to a message corresponding to the notification, dismissing the notification and store it for later review, opening an application that corresponds to the notification in the three-dimensional environment, etc.).

In some embodiments, the computer system detects other user inputs that meet the respective criteria for performing other types of operations with respect to the notification, such as dismissing the notification, expanding the notification to review additional content of the notification (e.g., showing full content of the notification in the second representation 7438 of the notification, showing attachments of a message that caused the generation of the notification, etc.) or provide additional selectable objects for interacting with the notification (e.g., a reply button, a virtual keyboard, a button for opening a notification management user interface, etc.), and performs said other types of operations in accordance with the received user inputs.

In some embodiments, when the first representation 7436 of the notification is displayed at the predetermined location relative to the representation of the electronic device, the computer system detects that the orientation of the electronic device 7432 has changed from a first orientation (e.g., portrait orientation, an orientation that is parallel to the floor, etc.) to a second orientation (e.g., a landscape orientation, an orientation that is perpendicular to the floor, etc.) relative to the user (e.g., because the user rotated the electronic device in the physical environment, because the user has moved himself relative to the physical environment (e.g., from a lying posture to a sitting posture, etc.), etc.). In response to detecting the change in orientation of the electronic device relative to the user (e.g., because electronic device is moved relative to the physical environment, and/or the user is moved relative to the physical environment, etc.), the computer system, in accordance with a determination that the change in orientation of the electronic device meets preset criteria, the computer system maintains display of the second representation 7438 of the notification (e.g., while the second representation 7438 of the notification is spatially locked to the viewpoint) or the first representation 7436 of the notification (e.g., while the first representation 7436 is displayed at its original position), and the computer system displays a virtual keyboard for entering textual input into an input region associated with the second representation 7438 of the notification. In some embodiments, the virtual keyboard is displayed at a position that corresponds to the location of the electronic device 7432. In some embodiments, the virtual keyboard overlays at least a portion of the representation 7432' of the electronic device in the view of the three-dimensional environment. In some embodiments, the display generation component displays the physical environment through a transparent or semitransparent portion of the display generation component and projects virtual content (e.g., the virtual keyboard, the representations of notification, etc.) directly on the physical objects (e.g., table top, surface of the electronic device 7432, etc.) in the physical environment. In some embodiments, the display generation component displays a camera view or graphical representation of the physical environment. In some embodiments, the virtual keyboard replaces display of at least a portion of the representation of the physical environment in the view of the three-dimensional environment. In some embodiments, when the display generation component displays a camera view or graphical representation of the physical environment, the display of virtual content replaces display of at least a portion of the camera view or graphical representation of the physical environment. In some embodiments, when the display generation component displays a camera view or graphical representation of the physical environment, the display of virtual content replaces display of at least a portion of the electronic device in the camera view or graphical representation of the physical environment. In some embodiments, the virtual keyboard blocks the view of at least a portion of the representation of the electronic device in the view of the three-dimensional environment, when the display generation component displays the physical environment through a transparent or semitransparent portion of the display generation component and displays virtual content on the transparent or semitransparent portion of the display generation component to block the view of at least a portion of the physical objects in the physical environment.

In some embodiments, the electronic device 7432 is a wearable device that is affixed to a mobile part of the user's body (e.g., the user's hand, the user's wrist, the user's finger, etc.). When the first representation 7436 of the notification is displayed at a predetermined location relative to the representation 7432' of the electronic device (e.g., the position of the representation 7432' of the electronic device during a time period that the notification is received or generated at the electronic device), the first representation 7436 of the notification also moves with the representation 7432' of the electronic device in accordance with the movement of the electronic device 7432 within the physical environment. However, in some embodiments, the portion of the user's body to which the electronic device 7432 is affixed makes a preset movement relative to the user which causes the electronic device 7432 to make a preset movement relative to the user as well. In response to detecting the preset movement of the portion of the user and/or the movement of the electronic device 7432 in the physical environment, in accordance with a determination that the movement meets preset criteria for playing back an audio version of the notification (e.g., an audio version of the message for which the notification is generated, an audio version of the text in the notification, or an audio description of the content of the notification, etc.), the computer system plays back the audio version of the notification (e.g., optionally, also showing the user interface object 7446 with playback controls, etc.). In some embodiments, the preset criteria includes a requirement that the movement of the portion of the user or the movement of the electronic device 7432 is toward the user's face in order for the preset criteria to be met. In some embodiments, the preset criteria includes a requirement that the movement of the portion of the user or the movement of the electronic device 7432 is paused in front of the user's face for at least a threshold amount of time in order for the preset criteria to be met. In some embodiments, the preset criteria includes a requirement that a user's gaze input is directed to the representation 7432' of the electronic device 7432 or the first representation 7436 of the notification in conjunction with a preset movement of the part of the user or the electronic device 7432 in order for the preset criteria to be met. In some embodiments, once automatic playback of the audio version of the notification is completed, the computer system starts an mode to capture user input that corresponds to a reply to a message that cause the generation of the notification. In some embodiments, the computer system provides a textual input interface to receive textual inputs from the user (e.g., a via a virtual keyboard and an input field). In some embodiments, the computer system captures voice input and optionally converts it to textual input to generate a reply to the message that cause the generation of the notification. In some embodiments, the preset portion of the user is the user's hand or wrist, and the electronic device is affixed to the user's hand or wrist (e.g., the hand is holding the electronic device, the electronic device is strapped to the hand or wrist, etc.). In some embodiments, in response to the user raising his/her hand toward his/her face while the first representation 7436 of the notification is displayed at the preset location relative to the representation 7432' of the electronic device, the computer system automatically start to playback an audio version of the notification. In some embodiments, the representation 7432 of the notification has a different appearance and content from that shown in the examples in FIGS. 7AA-7AD. In some embodiments, the representation of the user's hand does not need to visible in the view of the three-dimensional environment, when the representation of the electronic device is displayed or made visible in the view of the three-dimensional environment based on the location of the electronic device in the physical environment. In some embodiments, the computer system requires a user's gaze input to be directed to a representation of the notification in the view of the three-dimensional environment in order to trigger performance of an operation with respect to the notification in the three-dimensional environment. In some embodiments, the second representation of the notification (e.g., representation 7438) is displayed at a position that corresponds to the location of the user's hand (e.g., the location of the user's palm), in response to a second user input that includes raising the user's hand toward the user's face and opening the hand or turning the hand to face the palm of the hand toward the user.

In some embodiments, input gestures used in the various examples and embodiments described herein (e.g., with respect to FIGS. 7A-7AD, and FIGS. 8-13) optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7200), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether or not to execute large motions or remaining relatively stationary when providing the input gestures with his/her hand, without experiencing constraints imposed by a specific input device or input region.

In some embodiments, a micro tap input is a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a micro flick gesture is a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a micro swipe gesture is a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A micro tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7AD are provided below in references to methods 8000, 9000, 10000, 11000, 12000, and 13000 described with respect to FIGS. 8-13 below.

Figure 8:
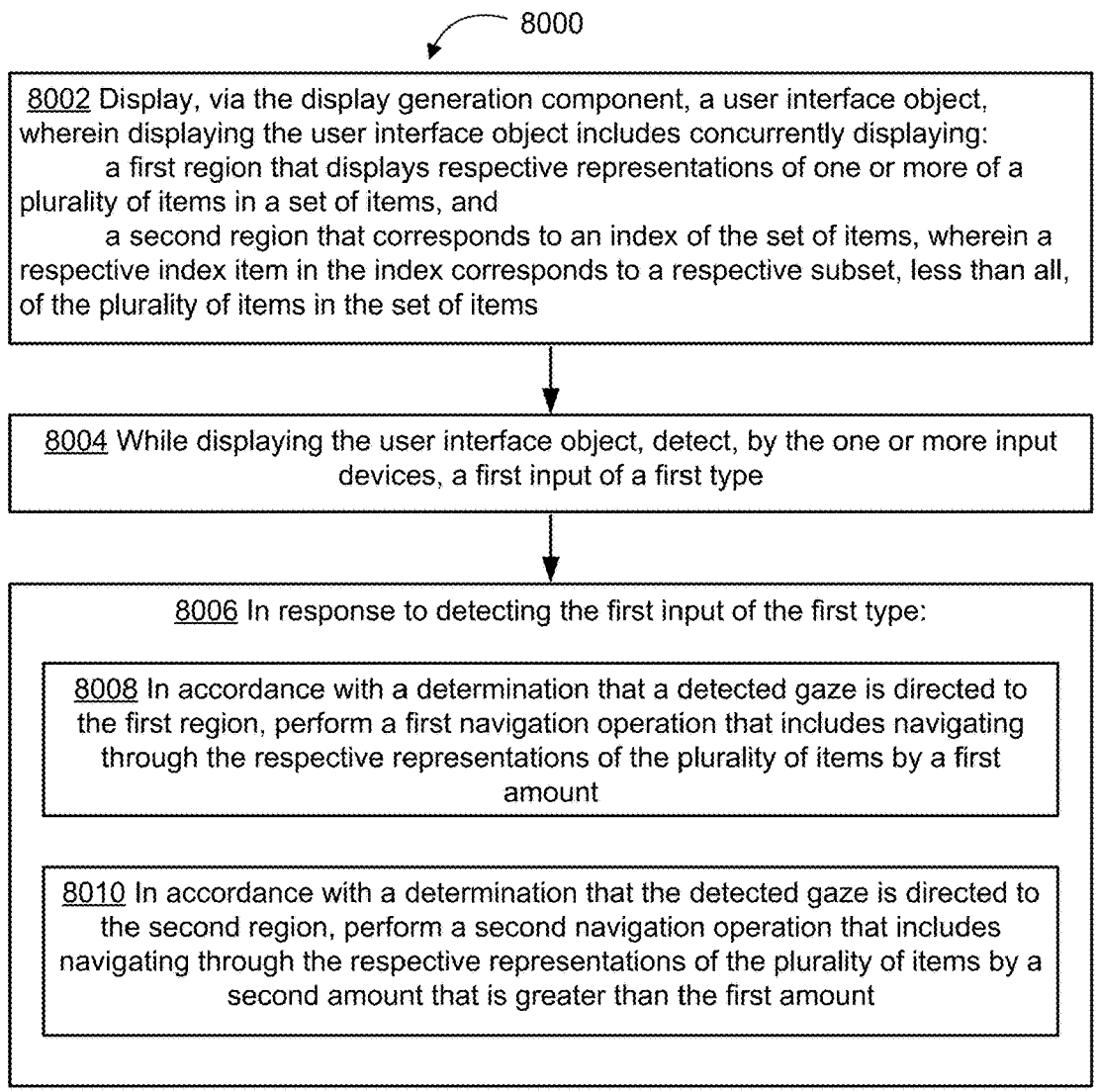
FIG. 8 is a flowchart of a method of navigating through a set of indexed items in a user interface, in accordance with some embodiments, in accordance with some embodiments.

FIG. 8 is a flowchart of a method 8000 of navigating through a set of indexed items in a user interface, in accordance with some embodiments, in accordance with some embodiments.

In some embodiments, the method 8000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

In some embodiments, the method 8000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.).

The computer system displays (8002), via the display generation component, a user interface object (e.g., user interface object 7300 in FIGS. 7A and 7C) (e.g., displaying a scrollable list, a scrollable menu, etc., within a view of at least a portion of a three-dimensional environment (e.g., a view of a simulated three-dimensional environment or a representation of a field of view of one or more cameras)), wherein displaying the user interface object includes con-currently displaying: a first region (e.g., data region 7310 in FIGS. 7A and 7C) (e.g., a data region that displays representations of data items (e.g., list items, menu options, etc.) in accordance with a predefined arrangement such as a list or grid) that displays respective representations of one or more of a plurality of items in a set of items (e.g., contacts, content items (such as audio files, text files, video files, images, etc.), and/or communication items (such as e-mail, messages, voicemail, call records, etc.)), and a second region (e.g., index region 7304 in FIGS. 7A and 7C) (e.g., an index region that corresponds to an index of the set of items, wherein a respective index item in the index corresponds to a respective subset, less than all, of the plurality of items in the set of items (e.g., the index items are a set of letters, numbers, and/or other symbols that are used to categorize or divide the plurality of data items into the respective subsets of data items)). For example, in some embodiments a first index item corresponds a first subset of the set of items; a second index item corresponds to a second subset of the set of items; and a third index item corresponds to a third subset of the set of items; and a sequential order of the first, second, and third index items in the second region, optionally, corresponds to a sequential order of the first, second, and third subsets of the set of items shown in the first region. While displaying the user interface object, the computer system detects (8004), by the one or more input devices, a first input of a first type (e.g., movement 7316 of the hand 7202, another input that corresponds to the request to navigate through the data items in the user interface object 7300, etc.). In some embodiments, the first input of the first type is an input that corresponds to a user's request to navigate through the items in the user interface object. In some embodiments, the first input of the first type is an in-air gesture input, a swipe input on a touch-sensitive surface, or gesture input (e.g., a flick, a swipe, etc.) with one portion of a hand moving relative to another portion of the hand, etc., that is detected in conjunction with a user's gaze input directed to the user interface object. In some embodiments, the first input of the first type includes movement in a first direction that corresponds to a navigation direction of the first region (e.g., up and down, left and right, away and toward the user, etc.) and a navigation direction of the second region (e.g., up and down, left and right, away and toward the user, etc.). In some embodiments, the first region and the second region have the same navigation directions. In some embodiments, the first region and the second region have different, and/or independent navigation directions. In response to detecting (8006) the first input of the first type (e.g., in response to detecting that the first input of the first type corresponds to a user's request to scroll or page through the data items in the user interface object): in accordance with a determination that a detected gaze (of the user who provided the first input of the first type) (e.g., the user's gaze 7320 in FIGS. 7A-7B) is directed to the first region (e.g., the data region), the computer system performs (8008) a first navigation operation (e.g., as shown in FIG. 7B) that includes navigating through the respective representations of the plurality of items by a first amount (e.g., scroll through the representations one by one (or five by five, or by other fixed numbers) in accordance with a magnitude of the first input (e.g., a first speed, duration, and/or distance of the first input)); and in accordance with a determination that the detected gaze (e.g., the user's gaze 7324 in FIGS. 7C-7D) is directed to the second region (e.g., the index region), the computer system performs (8010) a second navigation operation (e.g., as shown in FIG. 7D) that includes navigating through the respective representations of the plurality of items by a second amount that is greater than the first amount. In some embodiments, the computer system navigates from a first subset of the plurality of data items to a second subset of the plurality of data items, wherein the first subset of the plurality of data items corresponds to a first index item of the plurality of index items, and the second subset of the plurality of data items corresponds to a second index item of the plurality of index items that is different from the first index item, irrespective of the number of data items in the subset of data items for each index item.

In some embodiments, the computer system detects, by the one or more input devices, the first input of the first type includes detecting a predefined gesture (e.g., an in air finger swipe gesture, a movement of a contact on a touch-sensitive surface, or a swipe gesture that includes movement of a first finger along the side of a second finger of the same hand, etc.) in conjunction with detecting a user's gaze input (e.g., gaze 7320, gaze 7324, etc.) directed to the user interface object. In some embodiments, the user's gaze is detected at the first or the second region on the display and the user's gaze meets predefined stability and duration criteria for identifying the user interface object as a target for the user's gaze input. In some embodiments, the predefined gesture and the user's gaze input are detected at the same time, or within a threshold amount of time of each other (e.g., the first input is detected before the user's gaze input, or the user's gaze input is detected before the first input), such that the first input and the user's gaze input are determined to be a pair of associated input corresponding to the same request (e.g., a user's request to navigate within the user interface object to scroll or page through the data items). Detecting a predefined gesture in conjunction with detecting a gaze input directed to the user interface object reduces the number of inputs needed to perform a first or second navigation operation (e.g., the user does not need to perform additional inputs to first select whether to perform the first or second navigation operation). Reducing the number of inputs needed to perform an operation enhances the operability of the device, which, additionally, reduces power usage and improves battery life of the device by enabling the user to use the device more quickly and efficiently.

In some embodiments, navigating through the respective representations of the plurality of items by the first amount (e.g., in accordance with the detected gaze being directed to the first region) and navigating through the respective representations of the plurality of items by the second amount (e.g., in accordance with the detected gaze being directed to the second region) are respectively based on a magnitude of the first input of the first type (e.g., a first speed, duration, and/or distance of the first input). For example, in some embodiments, a first swipe input with a first swipe magnitude (e.g., calculated based on a first speed, duration, and/or distance, etc. of the first swipe input) causes navigation through a first number of items in the first region in accordance with the user's gaze input being directed to the first region, and navigation through a second number of items in the first region in accordance with the user's gaze input being directed to the second region, where navigating through the second number of items in the first region corresponds to navigating through a third number of index items in the second region, and the first number and the third number are determined based on the first swipe magnitude. Correspondingly, a second swipe input with a second swipe magnitude (e.g., calculated based on a second speed, duration, and/or distance, etc. of the second swipe input), different from the first swipe magnitude, causes navigation through a fourth number of items in the first region in accordance with the user's gaze input being directed to the first region, and navigation through a fifth number of items in the first region in accordance with the user's gaze input being directed to the second region, where navigating through the fifth number of items in the first region corresponds to navigating through a sixth number of index items in the second region, the fourth number and the sixth number are determined based on the second swipe magnitude, the first number is different from the fourth number, and the third number is different from the sixth number. Navigating through the respective representations of the plurality of items by a first or second amount, based on a magnitude of the first input of the first type, reduces the number of inputs needed to navigate through the respective representations of the plurality of items by the desired amount (e.g., the user does not need to perform additional inputs to move between each respective representation of the plurality of items). Reducing the number of inputs needed to perform an operation enhances the operability of the device, which, additionally, reduces power usage and improves battery life of the device by enabling the user to use the device more quickly and efficiently.

In some embodiments, concurrently displaying the first region and the second region includes concurrently displaying (e.g., during at least some (e.g., all, less than all, etc.) of the time that the respective representations of the one or more of the plurality of items in the set of items are displayed in the first region) the respective representations of the one or more of the plurality of items in the set of items in the first region (e.g., data region 7310, or another data region, etc.) of the user interface object and respective representations of one or more of a plurality of index items in the index in the second region (e.g., index region 7304, or another index region, etc.). In some embodiments, the index items are not displayed initially in the second region and the second region is unoccupied when the user interface object is displayed; and the index items are displayed in the second region only after a user's gaze input is detected at a location that corresponds to the location of the user interface object (e.g., anywhere on the user interface object, in the second region, or in the first region, etc.). Concurrently displaying the respective representations of the one or more of the plurality of items in the set of items in the first region, and respective representations of one or more of a plurality of index items in the index in the second region, reduces the number of inputs needed to navigate through the respective representations of the plurality of items (e.g., the index items in the index can allow for navigation through different subsets (e.g., letters A-Z corresponding to the first letter of the respective representations of the plurality of items), without requiring the user to navigate through each respective representation of the plurality of items individually). Reducing the number of inputs needed to perform an operation enhances the operability of the device, which, additionally, reduces power usage and improves battery life of the device by enabling the user to use the device more quickly and efficiently.

In some embodiments, concurrently displaying the first region and the second region includes: in accordance with a determination that a user's gaze input is absent from (e.g., not detected within a threshold amount of time of the current time) a predefined portion (e.g., any region, the first region, the second region, etc.) of the user interface object, displaying the respective representations of the one or more of the plurality of items in the set of items in the first region of the user interface object without displaying respective representations of index items in the index in the second region; and in accordance with a determination that a user's gaze input is detected (e.g., detected within a threshold amount of time of the current time) on the predefined portion of the user interface object (e.g., any region, the first region, the second region, etc.), concurrently displaying the respective representations of the one or more of the plurality of items in the set of items in the first region of the user interface object and respective representations of one or more of a plurality of index items in the index in the second region. In some embodiments, after respective representations of the index items are displayed in the second region in accordance with detection of the user's gaze input in the predefined region, the respective representations of the index items will cease to be displayed if the user's gaze input is no longer detected on the predefined region or if there is no interactions with the user interface object for a predetermined period of time. Displaying the respective representations of the one or more of the plurality of items in the set of items in the first region, without displaying the respective representations of index items in the index in the second region, in accordance with a determination that a gaze input is absent, and displaying the respective representations of the one or more of the plurality of items in the set of items in the first region and respective representations of one or more of a plurality of index items in the second region, in accordance with a determination that a gaze input is detected on the predefined portion of the user interface object, provides additional control options without cluttering the user interface with additional displayed controls (e.g., additional displaying controls for displaying or not displaying respective representations of index items in the index in the second region). Providing additional control options without cluttering the user interface with additional displayed controls enhances the operability of the device, which, additionally, reduces power usage and improves battery life of the device by enabling the user to use the device more quickly and efficiently.

In some embodiments, while displaying the respective representations of the one or more of the plurality of items in the set of items in the first region of the user interface object without displaying respective representations of index items in the index in the second region, the computer system detects a user's gaze input directed to a respective portion of the user interface object. In response to detecting the user's gaze input directed to the respective portion of the user interface object and in accordance with a determination that the respective portion of the user interface object corresponds to (e.g., at a location that is inside or within a threshold distance of) a first sub-portion (e.g., a side, top, or bottom, etc.) of the first region (e.g., the data region) of the user interface object, the computer system concurrently displays the respective representations of the one or more of the plurality of items in the set of items in the first region of the user interface object and respective representations of one or more of a plurality of index items in the index in the second region. In some embodiments, in response to detecting the user's gaze input directed to the respective portion of the user interface object: in accordance with a determination that the respective portion of the user interface object corresponds to (e.g., at a location that is inside or within a threshold distance of) a second sub-portion of the first region different from the first sub-portion (e.g., a side, top, or bottom, etc.) of the first region (e.g., the data region) of the user interface object, maintaining display of the respective representations of the one or more of the plurality of items in the set of items in the first region of the user interface object and forgoing displaying the respective representations of the one or more of the plurality of index items in the index in the second region. Concurrently displaying the respective representations of the one or more of the plurality of items in the set of items in the first region and respective representations of the one or more of a plurality of index items in the index in the second region, in response to detecting the gaze input directed to the respective portion of the user interface object that corresponds to a first sub-portion of the first region of the user interface object, provides additional control options without cluttering the user interface with additional displayed controls (e.g., additional displayed controls for displaying the respective representations of index items in the index in the second region). Providing additional control options without cluttering the user interface with additional displayed controls enhances the operability of the device, which, additionally, reduces power usage and improves battery life of the device by enabling the user to use the device more quickly and efficiently.

In some embodiments, the second region has a first predetermined spatial relationship to the first region. For example, in some embodiments, the computer system displays the second region along a preset side (e.g., left side, right side, a user-selected side, a side that is automatically selected based on the location of the user's gaze input directed to the user interface object, a side that is automatically selected based on a layout virtual elements and/or representations of physical elements in the three-dimensional environment, etc.) of the first region. Concurrently displaying the respective representations of the one or more of the plurality of items in the set of items in the first region, and respective representations of one or more of a plurality of index items in the index in the second region, wherein the second region has a first predetermined spatial relationship to the first region, reduces the number of inputs needed to navigate through the respective representations of the plurality of items (e.g., the index items in the index can allow for navigation through different subsets (e.g., letters A-Z corresponding to the first letter of the respective representations of the plurality of items), without requiring the user to navigate through each respective representation of the plurality of items individually). Reducing the number of inputs needed to perform an operation enhances the operability of the device, which, additionally, reduces power usage and improves battery life of the device by enabling the user to use the device more quickly and efficiently.

In some embodiments, while displaying respective representations of a first item and a second item of the plurality of items (e.g., before one or more navigation operations, after one or more navigation operations, etc.), the computer system detects a second input of a second type different from the first input of the first type (e.g., the second input corresponds to a request for selecting item in the user interface object, and the second input of the second type includes a gesture input that is different from the gesture in the first input of the first type, such as an in-air tap gesture, a pinch gesture, a tap or tap-hold gesture by a first portion of a hand on another portion of the hand, etc.)). In some embodiments, the second input of the second type includes a gesture input that is detected in conjunction with a user's gaze input that selects an item in the first region. In response to detecting the second input of the second type and in accordance with a determination that the respective representation of the first item has input focus, the computer system selects the first item of the plurality of items without selecting the second item. In some embodiments, the respective representation of the first item has input focus when a user's gaze input is detected at a location that corresponds to the location of the respective representation of the first item in conjunction with (e.g., concurrently with, or within a threshold amount of time of) the detecting of the gesture input of the second input of the second type, when the respective representation of the first item has been scrolled into a preset selected position within the user interface object, and/or when a selection object has been moved to the respective representation of the first item (e.g., by another user input), etc. In some embodiments, in response to detecting the second input of the second type: in accordance with a determination that the respective representation of the second item has input focus (e.g., a user's gaze input is detected at a location that corresponds to the location of the respective representation of the second item in conjunction with (e.g., concurrently with, or within a threshold amount of time of) the detecting of the gesture input of the second input of the second type, the respective representation of the second item has been scrolled into a preset selected position within the user interface object, a selection object has been moved to the respective representation of the second item (e.g., by another user input), etc.), the computer system selects the second item of the plurality of items without selecting the first item. In some embodiments, selecting a respective item (e.g., the first item, the second item, etc.) includes displaying visual feedback indicating that the selection state of the respective item has changed from an unselected state to a selected state (e.g., visually highlighting (e.g., enlarging, resizing, changing display property of, adding an outline, animate, etc.) the respective representation of the respective item relative to respective representations of other items in the first region). In some embodiments, selecting the respective item includes triggering performance of an operation associated with the respective item (e.g., displaying a preview of information associated with the respective item while maintaining display of the respective representation of the respective item, launching an application corresponding to the respective item and/or performing an operation within the application that is specific to the respective item (e.g., as opposed to performing an operation specific to other items among the set of items)). Selecting the first item of the plurality of items without selecting the second item, in response to detecting the second input of the second type and in accordance with a determination that the respective representation of the first item has input focus, provides additional control options without cluttering the user interface with additional displayed controls (e.g., additional displayed controls for switching between navigation operations and selection operations). Providing additional control options without cluttering the user interface with additional displayed controls enhances the operability of the device, which, additionally, reduces power usage and improves battery life of the device by enabling the user to use the device more quickly and efficiently.

In some embodiments, detecting the second input of the second type includes detecting movement of a first preset portion of a hand (e.g., thumb, index finger, etc.) relative to a second preset portion of the hand (e.g., side of the index finger, tip of the index finger, tip of the thumb, etc.), and the movement meets preset movement criteria. In some embodiments, the preset movement criteria is criteria based on start and/or end location(s) of the movement, speed of the movement, direction of the movement, etc., for recognizing a respective type of gesture (e.g., a tap gesture, a swipe gesture, etc.). Selecting the first item of the plurality of items without selecting the second item, in response to detecting the second input of the second type that includes movement of a first preset portion of a hand relative to a second preset portion of the hand that meets preset criteria and in accordance with a determination that the respective representation of the first item has input focus provides additional control options without cluttering the user interface with additional displayed controls (e.g., additional displayed controls for switching between navigation operations and selection operations). Providing additional control options without cluttering the user interface with additional displayed controls enhances the operability of the device, which, additionally, reduces power usage and improves battery life of the device by enabling the user to use the device more quickly and efficiently.

In some embodiments, while displaying the user interface object including concurrently displaying the first region and the second region, the computer system detects movement of the detected gaze from the user interface object to a location corresponding to a second user interface object different from the user interface object, wherein displaying the second user interface object includes respective representations of one or more of a second plurality of items in a second set of items (e.g., the second user interface object includes a different list of items, and optionally, an index associated with the list of items). In response to detecting the movement of the detected gaze from the user interface object to the second user interface object and that the detected gaze meets preset criteria (e.g., preset stability and duration criteria for switching input focus from one object to another object in the three-dimensional environment), the computer system changes an appearance of the second user interface object (and/or changing an appearance of the user interface object) to indicate that input focus has shifted from the user interface object to the second user interface object. Changing an appearance of the second user interface object to indicate that input focus has shifted from the user interface object to the second user interface object, in response to detecting the movement of the detected gaze from the user interface to the second user interface object and that the detected gaze meets preset criteria, provides improved visual feedback to the user (e.g., improved visual feedback regarding which user interface object the electronic device detects the user's gaze as directed towards). Providing improved feedback enhances the operability of the device, which, additionally, reduces power usage and improves battery life of the device by enabling the user to use the device more quickly and efficiently.

In some embodiments, while the second user interface object has input focus (e.g., the detected gaze remains on the second user interface object, or the detected gaze has not shifted to another user interface object in the three-dimensional environment, etc.), the computer system detects a third input of the first type. In some embodiments, the third input of the first type includes an input that corresponds to a user's request to navigate through the items in the second user interface object. In some embodiments, the third input of the first type includes an in-air gesture input, a swipe input on a touch-sensitive surface, or gesture input (e.g., a flick, a swipe, etc.) with one portion of a hand moving relative to another portion of the hand, etc., that is detected in conjunction with a user's gaze input directed to the second user interface object. In some embodiments, the third input of the first type includes movement in a first direction that corresponds to a navigation direction of the data region (e.g., up and down, left and right, away and toward the user, etc.) of the second user interface object. In some embodiments, other third input of the first type are possible. In response to detecting the third input of the first type, and in accordance with a determination that the detected gaze is directed to the second user interface object (e.g., a data region of the second user interface object, an index region of the second user interface object, any region of the second user interface object, etc.), the computer system performs a third navigation operation that includes navigating through respective representations of the second plurality of items by an amount that corresponds to a magnitude of the third input of the first type. In some embodiments, the second user interface object includes only a data region that includes representations of items and does not include an index region; and the same amount of navigation is achieved irrespective of whether or not the detected gaze is directed to which sub-portion of the user interface object. In some embodiments, the second user interface object includes both a data region that includes representations of items and an index region that includes representations of index items that corresponds to different subsets of the data items associated with the second user interface object; and a greater amount of navigation is achieved when the detected gaze is directed to the index region than when the detected gaze is directed to the data region of the second user interface object. In some embodiments, the second user interface object includes different levels of indexes for the same data, such as an additional index region that includes subsets of the index items in a lower level index region, and an even greater amount of navigation is achieved when the detected gaze is directed to the additional, higher level index region. Performing a third navigation operation that includes navigating through respective representations of the second plurality of items by an amount that corresponds to a magnitude of the third input of the first type, in response to detecting the third input of the first type and in accordance with a determination that the detected gaze is directed to the second user interface object, reduces the number of inputs needed to navigate through the respective representations of the second plurality of items by the desired amount (e.g., the user does not need to perform additional inputs to move between each respective representation of the second plurality of items). Reducing the number of inputs needed to perform an operation enhances the operability of the device, which, additionally, reduces power usage and improves battery life of the device by enabling the user to use the device more quickly and efficiently.

In some embodiments, while displaying the user interface object, the computer system detects, by the one or more input devices, movement of a user relative to a physical environment (e.g., movement of the user's head as a result of the movement of the user's body as a whole within the physical environment, movement of the user's head as a result of the movement of the user's head relative to the user's body, etc.). In response to detecting the movement of the user relative to the physical environment: in accordance with a determination that the movement of the user includes movement of at least a portion of the user's torso (e.g., parts other than a head and hands of the user) (e.g., change in position and/or orientation of the overall body or the torso of the user, e.g., when the user has walked or rotated his/her body) relative to the physical environment, the computer system moves the user interface object (e.g., the first region and the second region stays stationary relative to each other) in accordance with the movement of the at least the portion the user's torso (e.g., as the user moves around in the physical environment, the whole user interface object including the first and the second regions moves within the three-dimensional environment to maintains a fixed spatial relationship with a viewpoint of the user corresponding to a currently displayed view of the three-dimensional environment (e.g., the user interface object is body locked)). In response to detecting the movement of the user relative to the physical environment and in accordance with a determination that the movement of the user includes movement of the user's head relative to the user's torso without movement of at least a portion of the torso (e.g., the user turns his/her head while remaining fixed in position and/or orientation as a whole in the physical environment), the computer system forgoes moving the user interface object in accordance with the movement of the user's head (e.g., as the user moves his/her head without additional whole body movement, the first and the second region may move in the user's field of view and/or move outside of the user's field of view). Moving the user interface object in accordance with the movement of the at least the portion of the user's torso and in accordance with a determination that the movement of the user includes movement of at least a portion of the user's torso relative to the physical environment, and forgoing moving the user interface object in accordance with the movement of the user's head and in accordance with a determination that the movement of the user includes movement of the user's head relative to the user's torso without movement of at least a portion of the torso, provides additional control options without cluttering the user interface with additional displayed controls (e.g., additional displayed controls for moving the user interface object). Providing additional control options without cluttering the user interface with additional displayed controls enhances the operability of the device, which, additionally, reduces power usage and improves battery life of the device by enabling the user to use the device more quickly and efficiently.

In some embodiments, while displaying the user interface object, the computer system detects movement of the detected gaze from a first location that corresponds to a location of the user interface object to a second location different from the first location. In response to detecting the movement of the detected gaze, in accordance with a determination that the respective representations of items currently displayed in the first region includes at least a first preset subset of items in the set of items (e.g., the first item, the last item, etc.) (e.g., the beginning and/or end of the list is displayed in the first region (e.g., as a result of the navigation operations or as the user interface object is initially displayed)), the computer system moves the user interface object in accordance with the movement of the detected gaze from the first location to the second location. For example, in some embodiments, when the end or beginning of the data region has been reached after scrolling or as initially displayed, the whole user interface object follows the movement of the user's gaze input to be repositioned in the three-dimensional environment. In response to detecting the movement of the detected gaze, and in accordance with a determination that the respective representations of items currently displayed in the first region does not include at least the first preset subset of items in the set of items (e.g., the first item, the last item, etc.) (e.g., the beginning and/or end of the list is displayed in the first region (e.g., as a result of the navigation operations or as the user interface object is initially displayed)), the computer system maintains the user interface object at the first location. For example, when the end or beginning of the data region has not been reached, the user can move the user's gaze away from the user interface object. Moving the user interface object in accordance with the movement of the detected gaze from the first location to the second location and in accordance with a determination that the respective representations of items currently displayed in the first region includes at least a first preset subset of items in the set of items, and maintaining the user interface object at the first location in accordance with a determination that the respective representations of items currently displayed in the first region does not include at least the first preset subset of items in the set of items, provides additional control options without cluttering the user interface with additional displayed controls (e.g., additional displayed controls for moving the user interface object and/or maintaining the user interface object at the first location). Providing additional control options without cluttering the user interface with additional displayed controls enhances the operability of the device, which, additionally, reduces power usage and improves battery life of the device by enabling the user to use the device more quickly and efficiently.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, 12000, and 13000) are also applicable in an analogous manner to method 8000 described above with respect to FIG. 8. For example, the gestures, gaze inputs, physical objects, user interface objects, controls, movements, criteria, three-dimensional environment, display generation component, surface, representation of physical object, virtual objects, and/or animations described above with reference to method 8000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 9000, 10000, 11000, 12000, and 13000). For brevity, these details are not repeated here.

Figure 9:
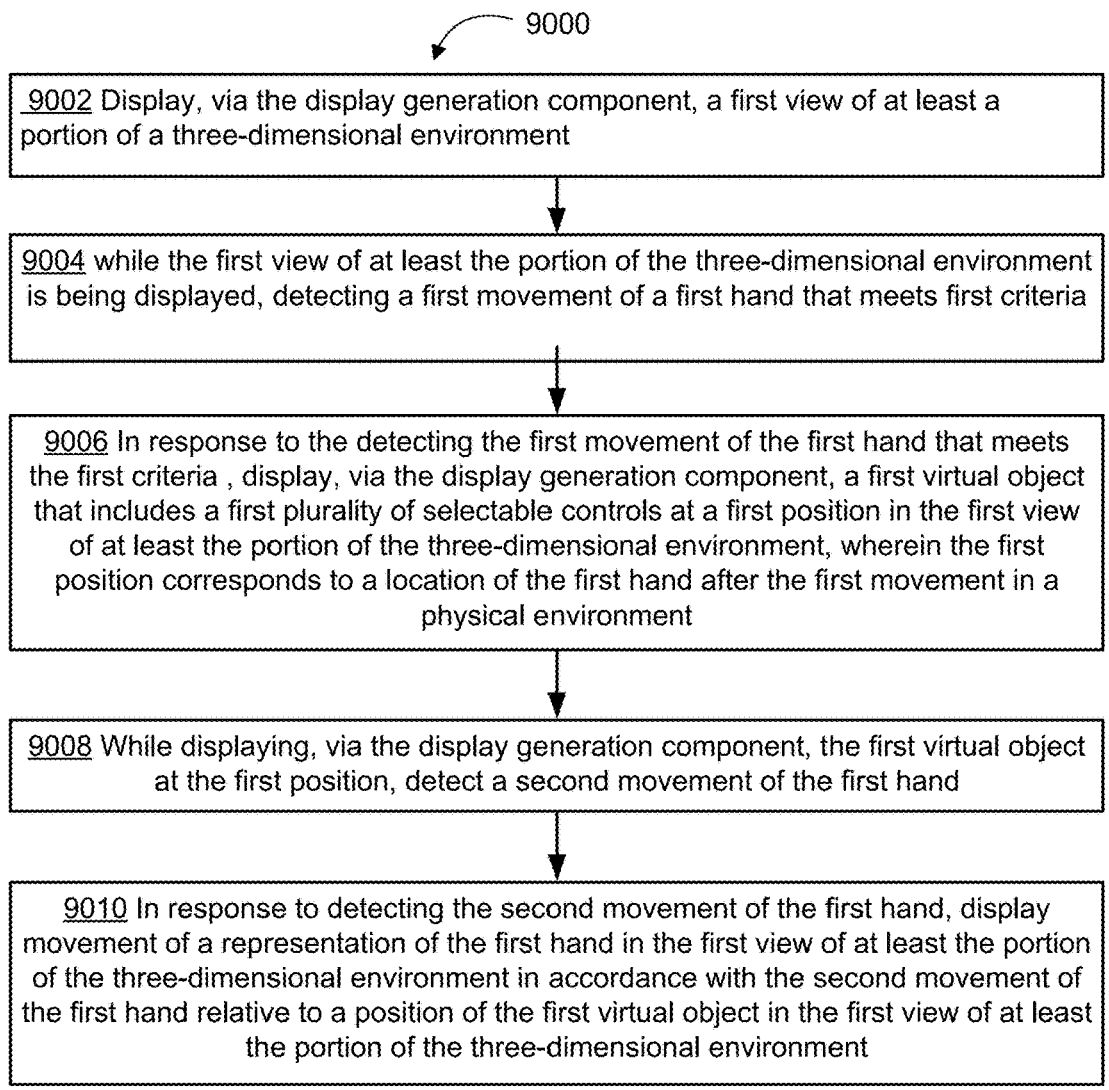
FIG. 9 is a flowchart of a method of displaying and interacting with a user interface object in a three-dimensional environment in response to user inputs involving movements of a user's hand, in accordance with some embodiments.

FIG. 9 is a flowchart of a method 9000 of displaying and interacting with a user interface object in a three-dimensional environment in response to user inputs involving movements of a user's hand, in accordance with some embodiments.

In some embodiments, the method 9000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 9000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 9000 are, optionally, combined and/or the order of some operations is, optionally, changed.

In some embodiments, the method 9000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.). The computer system displays (9002), via the display generation component, a first view of at least a portion of a three-dimensional environment (e.g., a view of the three-dimensional environment 7106 in FIG. 7E, or a view of another three-dimensional environment, etc.) (e.g., a view of a simulated three-dimensional environment, such as a virtual environment or an augmented reality environment that includes a transparent pass-through portion or a representation of a field of view of one or more cameras). In some embodiments, a representation of a physical hand of a user is optionally displayed in the view of the at least a portion of the three-dimensional environment, e.g., when the hand is located within a view of a physical environment represented in the portion of the three-dimensional environment. While the first view of at least the portion of the three-dimensional environment is being displayed, the computer system detects (9004) a first movement of a first hand (e.g., movement 7332 of the hand 7202 in FIG. 7F, or another movement of the hand, etc.) (e.g., the hand that is within the view of the one or more cameras of the computer system, and/or within the view of the portion of the three-dimensional environment) that meets first criteria. In some embodiments, the first criteria optionally include a movement criterion that requires the first movement of the first hand to meet movement criteria (e.g., upward movement of the first hand and/or movement of the hand that is less than a threshold speed) in conjunction with posture criteria (e.g., with the palm open and facing toward the user or facing away from the user, and/or includes a pose criterion that requires the first hand to have a predetermined pose such as the hand having its index finger extended in a pointing posture or clenched in a fist with a thumb on top or some other predetermined pose), in order for the first criteria to be met. In some embodiments, the first criteria are met when the first hand is raised toward the body of the user, the hand is raised into the displayed view, the hand is raised to a predefined position within the displayed view, and/or the hand has a predefined hand configuration (palm-side of hand visible in displayed view user with fingers extended, back side of hand facing user visible in displayed view with fingers extended, palm-side of hand visible in displayed view user without fingers extended, and/or back side of hand visible in displayed view without fingers extended). In one example, the first criteria are met in accordance with a determination that the hand is rotated such that the forearm has a horizontal position (as if the user was looking at a physical watch, or as if the user is lifting up an object with his palm). In another example, the first criteria are met in accordance with a determination that the hand is pushing away from the user with the palm facing away from the user. In some embodiments, the first criteria are met in accordance with a determination that the hand is raise with a pointing posture (e.g., hand closed with index finger extended). In response to the detecting the first movement of the first hand that meets the first criteria (e.g., the movement 7332 of the hand 7202 in FIG. 7F, or another movement of the hand, etc.), the computer system displays (9006), via the display generation component, a first virtual object (e.g., a virtual object 7334, or another virtual object, etc.) (e.g., a dock, a menu, etc.) that includes a first plurality of selectable controls (including, e.g., a control for displaying a sub-menu, a control for initiating an application, a control for performing an application function, and/or a control for adjusting a setting) at a first position in the first view of at least the portion of the three-dimensional environment, wherein the first position corresponds to a location of the first hand after the first movement in a physical environment (e.g., as shown in FIG. 7F, the virtual object 7334 is displayed at a position that corresponds to the location of the hand 7202 in the physical environment after the movement 7332). In some embodiments, the first position in the view of at least a portion of the three-dimensional environment is at or near a second position in the view of at least a portion of the three-dimensional environment at which a representation of the first hand is located at the end of the first movement. In some embodiments, the first position does not correspond to the locations of other physical objects (e.g., a wall or tabletop) in the physical environment, and the first position does not correspond to a preset fixed position on the display, but rather, the first position is dynamically determined based on the final location of the user's hand at the end of the gesture that meets the first criteria for invoking the first virtual object (e.g., the dock). While displaying, via the display generation component, the first virtual object at the first position, the computer system detects (9008) a second movement of the first hand (e.g., movement of the hand 7202 shown in FIGS. 7G and 7H) (e.g., a movement in the physical environment that causes a movement of the representation of the hand to a different position in the three-dimensional environment and/or a change in configuration of the first hand). In response to detecting the second movement of the first hand, the computer system displays (9010) movement of a representation of the first hand in the first view of at least the portion of the three-dimensional environment in accordance with the second movement of the first hand relative to a location corresponding to a position of the first virtual object in the first view of at least the portion of the three-dimensional environment (e.g., as shown in FIGS. 7G and 7H, the representation 7202' of the hand is moved relative to the virtual object 7334 in accordance with the movement of the hand in the physical environment). In some embodiments, the computer system maintains display of the first virtual object at the first position in view of at least the portion of the three-dimensional environment. In some embodiments, the first virtual object is fixed in location in the three-dimensional environment after being displayed in response to the first movement of the hand that meets the predefined first criteria, while the user adjusts the position and posture of his hand to prepare for interaction with the first virtual object.

In some embodiments, after detecting the second movement of the first hand, and while displaying the first virtual object at the first position in the first view of at least the portion of the three-dimensional environment (e.g., the dock remains displayed at the position in the view of the physical environment that corresponds to the prior location of the first hand before the second movement of the first hand was started), the computer system detects movement of at least a first portion of the computer system. In some embodiments, the computer system detects movement of the display generation component or one or more cameras that captures a view of the physical environment shown via the display generation component. In some embodiments, movement of the first portion of the computer system is due to movement of the user in the physical environment. In response to detecting the movement of at least the first portion of the computer system (e.g., the display generation component, one or more cameras that captures a view of the physical environment shown via the display generation component (e.g., due to movement of the user that moves the portion of the computer system in the physical environment), the computer system updates the first view of at least the portion of the three-dimensional environment and moves the first virtual object (e.g., virtual object 7334, or another virtual object displayed in response to the first movement of the hand that met the first criteria, etc.) in the first view of at least the portion of the three-dimensional environment in accordance with the movement of at least the first portion of the computer system. In some embodiments, a different view of the three-dimensional environment is constructed based on a different viewpoint that corresponds to the new location of the first portion of the computer system (e.g., the display generation component or the camera(s)) in the physical environment. In some embodiments, the first virtual object stays at the same location relative to the field of view provided by the display generation component as the display generation component moves to display a different portion of AR environment or displaying a closer view of a currently displayed portion of the AR environment. For example, the first virtual object may replace or block the representation of different portions of the three-dimensional environment during movement of the first portion of the computer system, but stays fixed relative to the user's field of view (e.g., remains in the lower left quadrant of the field of view, or in the center of the field of view, or any other position that corresponds to the position of the first hand in the field of view at the end of the first movement of the first hand, etc.). Updating the view of at least the portion of the three-dimensional environment and moving the first virtual object in the view of at least the portion of the three-dimensional environment in accordance with the movement of at least the first portion of the computer system updates the view and moves the first virtual object when a set of conditions has been met without requiring further user input (e.g., further user inputs to update the view and move the first virtual object each time the computer system is moved). Performing an operation when a set of conditions has been met without requiring further user input enhances the operability of the device, which, additionally, reduces power usage and improves battery life of the device by enabling the user to use the device more quickly and efficiently.

In some embodiments, detecting the second movement of the first hand includes detecting a swipe gesture by the first hand (e.g., the first hand or a portion of the first hand moves in a single continuous motion (e.g., in a respective direction) from a first location to a different location in the physical environment) (e.g., while the first hand is in a first configuration (e.g., extending the index finger and closing the other fingers)) in the physical environment, and in response to detecting the swipe gesture by the first hand and in accordance with a determination that the first hand is in a first configuration (e.g., extending the index finger and closing the other fingers) during the swipe gesture, the computer system moves input focus from a first selectable control (e.g., control 7342, control 7336, etc.) (e.g., when the first virtual object appears due to the first movement of the first hand, the focus selector is placed on a default selectable control based on the selectable control's position in the first virtual object) in the first virtual object to a second selectable control (e.g., control 7338, control 7334, etc.) different from the first selectable control in the first virtual object in accordance with the second movement of the first hand (e.g., the movement of a focus selector, including the direction, speed, and/or displacement of the movement, depends on one or more characteristics of the second movement of the first hand such as the direction, speed, and/or displacement, etc.). Moving input focus from a first selectable control in the first virtual object to a second selectable control in accordance with the second movement of the first hand provides additional control options without cluttering the user interface with additional displayed controls (e.g., additional displayed controls for navigating between selectable controls). Providing additional control options without cluttering the user interface with additional displayed controls enhances the operability of the device, which, additionally, reduces power usage and improves battery life of the device by enabling the user to use the device more quickly and efficiently.

In some embodiments, detecting the second movement of the first hand includes detecting a swipe gesture by the first hand (e.g., the first hand or a portion of the first hand moves in a single continuous motion (e.g., in a respective direction) from a first location to a different location in the physical environment) (e.g., while the first hand is in a second configuration (e.g., an open hand with three or more fingers extended, or another hand configuration that is different from the first configuration used for moving the focus selector between selectable controls)) in the physical environment. In response to detecting the swipe gesture by the first hand and in accordance with a determination that the first hand is in a second configuration (e.g., an open hand with three or more fingers extended, or another hand configuration that is different from the first configuration used for moving the focus selector between selectable controls) during the swipe gesture, the computer system displays a second plurality of selectable controls that were not included in the first virtual object prior to detecting the swipe gesture by the first hand in the second configuration. In some embodiments, the first plurality of selectable controls are on a first page and the second plurality of selectable controls are on a second page different from the first page, and the computer system transitions from displaying the first page to displaying the second page of the dock in accordance with the swing gesture by the first hand. In some embodiments, the first plurality of selectable controls are moved off to a less prominent position (e.g., a back row or side portion) in the first virtual object, and the second plurality of selectable controls are displayed in the previous positions of the first plurality of selectable controls in the first virtual object, etc. Displaying a second plurality of selectable controls that were not included in the first virtual object, in response to detecting the swipe gesture by the first hand and in accordance with a determination that the first hand is in a second configuration during the swipe gesture, provides additional control options without cluttering the user interface with additional displayed controls (e.g., the second plurality of selectable controls is not always displayed, and the user interface does not need to include additional displayed controls for displaying the second plurality of selectable controls). Providing additional control options without cluttering the user interface with additional displayed controls enhances the operability of the device, which, additionally, reduces power usage and improves battery life of the device by enabling the user to use the device more quickly and efficiently.

In some embodiments, detecting the second movement of the first hand includes detecting a push gesture by the first hand. In some embodiments, the second movement include moving the first hand or a portion of the first hand away from the user and towards a location in the physical environment that corresponds to the position of a selectable control in the first virtual object in the view of the three-dimensional environment, optionally, while the first hand is in a predefined configuration such as a single finger pointing forward, two fingers pointing forward, thumb pointing forward, etc. In some embodiments, displaying the movement of the representation of the first hand in the view of the at least the portion of the three-dimensional environment includes displaying the representation of the first hand moving towards one or more selectable controls in the first virtual object (e.g., the representation of the first hand in the virtual environment is moving towards the one or more selectable controls but not moving past the one or more selectable controls) in accordance with the second movement of the first hand (e.g., the displacement, direction, and speed of movement of the first hand in the physical environment is translated into a corresponding displacement, direction, and speed of movement of the representation of the first hand in the virtual environment. In some embodiments, in response to detecting the push gesture by the first hand and in accordance with a determination that the push gesture meets activation criteria (e.g., a representation of the first hand or a portion thereof has moved within a first distance from at least one of the selectable controls in the first virtual object, or the movement speed of the hand exceeds a threshold speed (e.g., the representation of the first hand is touching, or close to touching, or is quickly approaching one of the selectable controls in the three-dimensional environment), the computer system selects a respective selectable control of the first plurality of selectable controls in the first virtual object (e.g., placing the focus selector over the selectable controls and/or activate corresponding functions of the one or more selectable controls. In some embodiments, selecting a selectable control causes an application associated with the selectable control to be activated). Selecting a respective selectable control of the first plurality of selectable controls, in response to detecting the push gesture by the first hand and in accordance with a determination that the push gesture meets activation criteria, provides additional control options without cluttering the user interface with additional displayed controls (e.g., additional displayed controls for selecting a respective selectable control). Providing additional control options without cluttering the user interface with additional displayed controls enhances the operability of the device, which, additionally, reduces power usage and improves battery life of the device by enabling the user to use the device more quickly and efficiently.

In some embodiments, in response to detecting the push gesture by the first hand (e.g., in accordance with a determination that the representation of the first hand moves within a second distance (e.g., the second distance threshold is smaller than the first distance threshold and the selectable control is activated before the second distance threshold is reached; or the second distance threshold is larger than the first distance threshold, and the selectable control is not yet activated when the second distance threshold is reached) from the one or more selectable controls in the first virtual object), the computer system moves the first virtual object (e.g., the whole menu or dock, as opposed to an individual selectable control) in the first view of at least the portion of the three-dimensional environment in accordance with the movement of the first hand during the push gesture. In some embodiments, the first virtual object is moving away from the representation of the first hand with the same speed as the movement of the representation of the first hand to avoid the representation of the first hand passing through the first virtual object. When the representation of the first hand stops moving in the virtual environment, the first virtual object also stops moving. Moving the first virtual object in the first view of at least the portion of the three-dimensional environment in accordance with the movement of the first hand during the push gesture provides additional control options without cluttering the user interface with additional displayed controls (e.g., additional displayed controls for toggling between moving the first virtual object and selecting a respective selectable control in the first virtual object). Providing additional control options without cluttering the user interface with additional displayed controls enhances the operability of the device, which, additionally, reduces power usage and improves battery life of the device by enabling the user to use the device more quickly and efficiently.

In some embodiments, in response to detecting the second movement of the first hand: in accordance with a determination that the second movement of the first hand corresponds to placing the first hand into a third configuration (e.g., pointing the index finger up, pointing two fingers forward, etc.), the computer system performs a first operation with respect to the first virtual object (e.g., moving the focus selector between selectable controls in the first virtual object until the hand posture changes again); and in accordance with a determination that the second movement of the first hand corresponds to placing the first hand into a fourth configuration (e.g., a closed fist, or open palm) that is different from the third configuration, the computer system performs a second operation that is different from the first operation with respect to the first virtual object (e.g., moving to a different page of selectable controls of the first virtual object, or expand the menu, etc.). Performing a first operation with respective to the first virtual object in accordance with a determination that the second movement of the first hand corresponds to placing the first hand into a third configuration, and performing a second operation, different from the first operation, with respect to the first virtual object in accordance with a determination that the second movement of the first hand corresponds to placing the first hand into a fourth configuration different from the third configuration, provides additional control options without cluttering the user interface with additional displayed controls (e.g., additional displayed controls for performing the first and second operations). Providing additional control options without cluttering the user interface with additional displayed controls enhances the operability of the device, which, additionally, reduces power usage and improves battery life of the device by enabling the user to use the device more quickly and efficiently.

In some embodiments, displaying, via the display generation component, the first view of at least the portion of the three-dimensional environment includes displaying a mixed-reality environment of a first application (e.g., a three-dimensional mixed reality environment of an application such as a gaming application, an augmented reality application for viewing virtual furniture in a physical setting, a virtual office application augmented with virtualized physical objects such as a physical desk, or a video application), and displaying the first virtual object includes replacing or blocking a view of at least a portion of the mixed-reality environment of the first application (e.g., the first virtual object overlays a portion of the application user interface or application experience but does not close the first application). Displaying, in a mixed-reality environment of a first application, a first virtual object that replaces or blocks a view of at least a portion of the mixed-reality environment of the first application, provides improved visual feedback to the user (e.g., provides improved visual contrast between the first virtual object and the three-dimensional environment). Providing improved feedback enhances the operability of the device, which, additionally, reduces power usage and improves battery life of the device by enabling the user to use the device more quickly and efficiently.

In some embodiments, displaying the first virtual object that includes the first plurality of selectable controls includes: in accordance with a determination that the three-dimensional environment corresponds to an environment of a first application, including a first set of selectable controls corresponding to the first application among the first plurality of selectable controls; and in accordance with a determination that the three-dimensional environment corresponds to an environment of a second application different from the first application, including a second set of selectable controls corresponding to the second application, different from the first set of selectable controls corresponding to the first application, among the first plurality of selectable controls. In some embodiments, the selectable controls included in the virtual object is selected for inclusion in accordance with a predefined characteristic (e.g., an identity (e.g., application A vs. application B), a type of application (e.g., an application providing an interactive three-dimensional environment vs. an application providing a media consumption environment), etc.) of the currently displayed application (e.g., the plurality of selectable controls of the first virtual object include commands to interact with or control the first application that is currently displayed. A different application would cause the first virtual object with a different set of selectable controls to be displayed). In some embodiments, the first virtual object displays only system-level selectable controls, and the selectable controls shown in the first virtual object do not change depending on the application that is currently displayed. In some embodiments, different hand postures and/or movement are used to trigger either display of the application-specific menu or the system menu in the application environment. Including a first set of selectable controls corresponding to the first application in accordance with a determination that the three-dimensional environment corresponds to an environment of a first application, and including a second set of selectable controls, different from the first set, in accordance with a determination that the three-dimensional environment corresponds to an environment of a second application different from the first application, displays the appropriate set of selectable controls when a set of conditions has been met without requiring further user input (e.g., further user input to select the correct set of selectable controls for a particular application). Performing an operation when a set of conditions has been met without requiring further user input enhances the operability of the device, which, additionally, reduces power usage and improves battery life of the device by enabling the user to use the device more quickly and efficiently.

In some embodiments, the three-dimensional environment includes a mixed reality environment of a first application. While displaying the first virtual object within the first view of at least the portion of the three-dimensional environment (e.g., within a view of at least a portion of the mixed reality environment that is included in the three-dimensional environment), the computer system detects a third movement of the first hand. In response to detecting the third movement of the first hand and in accordance with a determination that the third movement of the first hand meets preset criteria for exiting the first application (e.g., a special hand configuration or movement of the hand that corresponds to a request to dismiss the first virtual object), the computer system ceases to display the first virtual object and the first view of at least the portion of the three-dimensional environment, and displays a view of a physical environment and a home menu that includes respective selectable controls for activating different applications (e.g., the home menu is displayed at a position that corresponds to the location of a physical surface (e.g., a wall, a refrigerator door, etc.) in the physical environment). Ceasing to display the first virtual object and the first view, and displaying a view of a physical environment and a home menu, in response to detecting that the third movement of the first hand meets preset criteria for exiting the first application, reduces the number of inputs needed to exit the application and display the view of the physical environment and the home menu (e.g., the user does not need to perform separate inputs to exit the application, to display the view of the physical environment, and to display the home menu). Reducing the number of inputs needed to perform an operation enhances the operability of the device, which, additionally, reduces power usage and improves battery life of the device by enabling the user to use the device more quickly and efficiently.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, 11000, 12000, and 13000) are also applicable in an analogous manner to method 9000 described above with respect to FIG. 9. For example, the gestures, gaze inputs, physical objects, user interface objects, controls, movements, criteria, three-dimensional environment, display generation component, surface, representation of physical object, virtual objects, and/or animations described above with reference to method 9000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 10000, 11000, 12000, and 13000). For brevity, these details are not repeated here.

Figure 10:
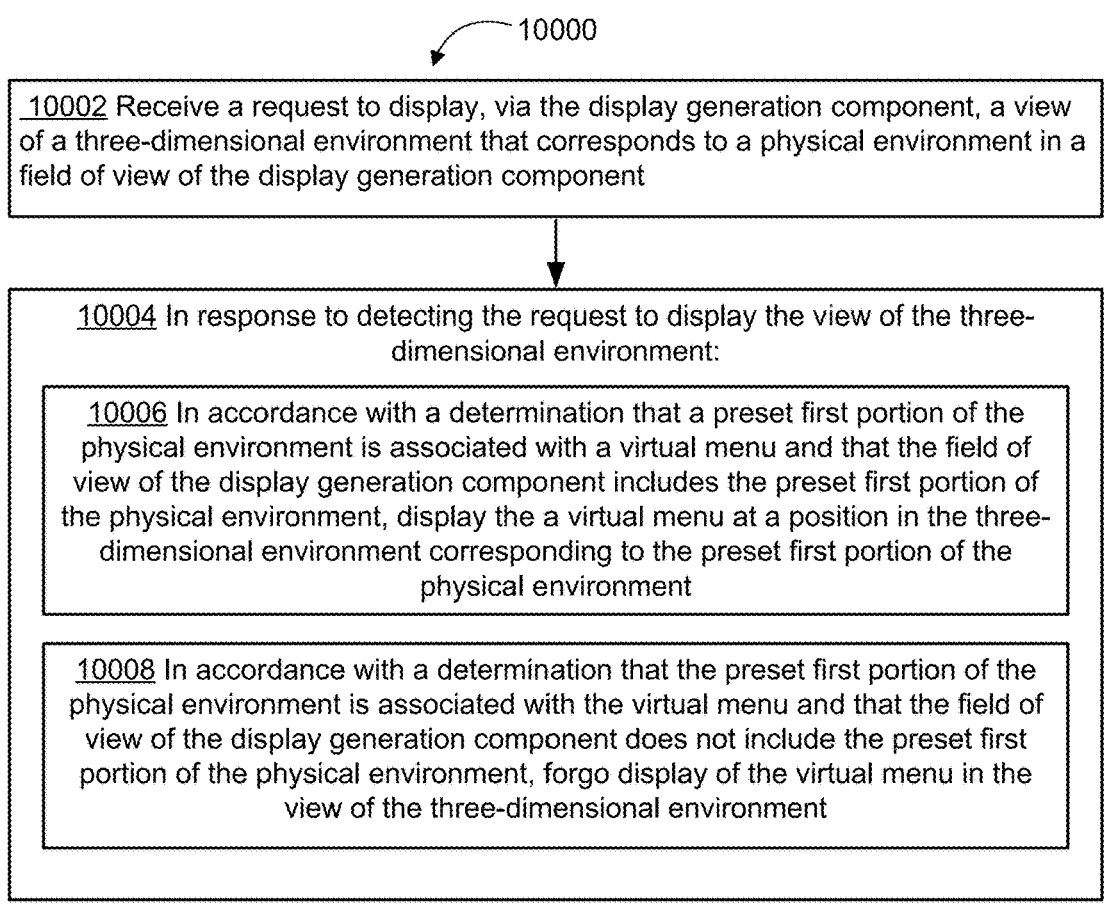
FIG. 10 is a flowchart of a method of displaying a virtual menu in a three-dimensional environment at a position that corresponds a preset portion of a physical environment based on whether or not the preset portion of the physical environment is within the field of view, in accordance with some embodiments.

FIG. 10 is a flowchart of a method of displaying a virtual menu in a three-dimensional environment at a position that corresponds a preset portion of a physical environment based on whether or not the preset portion of the physical environment is within the field of view, in accordance with some embodiments.

In some embodiments, the method 10000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 10000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 10000 are, optionally, combined and/or the order of some operations is, optionally, changed.

In some embodiments, the method 10000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.).

The computer system receives (10002) a request to display, via the display generation component, a view of a three-dimensional environment (e.g., the three-dimensional environment 7108 shown in FIGS. 7M-7N) that corresponds to a physical environment in a field of view of the display generation component (e.g., the display generation component 7100 in FIGS. 7M and 7N). In some embodiments, a respective portion of the physical environment (e.g., a surface such as a wall, floor, or table) is already associated with a virtual menu (e.g., a home screen, an application launcher, etc.) as the home location for the virtual menu, or no portion of the physical environment has been established as the home location for the virtual menu yet. In some embodiments, the request is a user input that puts the display generation component in front of the user's eyes, turning the display generation component on or waking the display generation component from a low-power, a locked state, a screen locked state, a sleep state, etc. In some embodiments, at the time that the request to display the view of the three-dimensional environment is received by the computer system, the computer system is not displaying a view of the three-dimensional environment. In some embodiments, at the time that the request to display a pass-through view of the physical environment without substantial virtual elements concurrently displayed with the pass-through view of the physical environment. In some embodiments, the pass-through view of the physical environment is augmented with virtual content in response to the request for displaying the view of the three-dimensional environment. In response to detecting (10004) the request to display the view of the three-dimensional environment: in accordance with a determination that a preset first portion of the physical environment (e.g., a surface such as a wall, floor, or table, etc.) is associated with a virtual menu (e.g., virtual menu 7352 in FIG. 7N) (e.g., a home screen, an application launcher, etc.) and that the field of view of the display generation component (and, optionally a field of view of one or more cameras that are capturing the physical environment) includes the preset first portion of the physical environment, the computer system displays (10006) the virtual menu at a position in the three-dimensional environment corresponding to the preset first portion of the physical environment (e.g., as illustrated in FIG. 7N); and in accordance with a determination that the preset first portion of the physical environment is associated with the virtual menu and that the field of view of the display generation component (and, optionally a field of view of one or more cameras that are capturing the physical environment) does not include the preset first portion of the physical environment, the computer system forgoes (10008) display of the virtual menu in the view of the three-dimensional environment (e.g., as illustrated in FIG. 7M, the virtual menu 7352 is not displayed in the view of the three-dimensional environment 7108).

In some embodiments, in response to receiving the request to display a view of the three-dimensional environment: in accordance with a determination that the field of view of the display generation component (and, optionally a field of view of one or more cameras that are capturing the physical environment) includes the preset first portion of the physical environment, the computer system displays, via the display generation component, a first view of the three-dimensional environment (e.g., an augmented reality environment or a pass through view of a physical environment) that corresponds to a respective portion of the physical environment that includes the preset first portion of the physical environment; and in accordance with a determination that the field of view of the display generation component (and, optionally a field of view of one or more cameras that are capturing the physical environment) does not include the preset first portion of the physical environment, the computer system displays, via the display generation component, a second view of the three-dimensional environment (e.g., an augmented reality environment or a pass through view of a physical environment) that corresponds to a respective portion of the physical environment that does not include the preset first portion of the physical environment (e.g., a portion of the physical environment that is not concurrently visible with the first preset portion of the physical environment in the field of view of the display generation component). In some embodiments, after displaying the virtual menu in the first view of the three-dimensional environment that corresponds to a portion of the physical environment that includes the preset first portion of the physical environment (e.g., after displaying the virtual menu at the position corresponding to the preset first portion of the physical environment), the device, optionally displays a second, different view of the three-dimensional environment, where the second view of the three-dimensional environment does not include a representation of the preset first portion of the physical environment and does not include the virtual menu (e.g., the second view of the three-dimensional environment is displayed in response to first relative movement of the one or more cameras and the physical environment (e.g., the user turned his/her head to look at a different portion of the physical environment), and the preset first portion of the physical environment is outside of the field of view of the one or more cameras as a result of the first relative movement). In some embodiments, after displaying the second view of the three-dimensional environment, the device, optionally, in response to additional movement of the one or more cameras relative to the physical environment, displays a third view of the three-dimensional environment, where the third view of the three-dimensional environment again includes a representation of a portion of the physical environment that includes the preset first portion of the physical environment (e.g., from a different viewing angle) and the virtual menu displayed at a position corresponding to the preset first portion of the physical environment, when the preset first portion of the physical environment is within the field of view of the one or more cameras as a result of the additional movement. Displaying a first view of the three-dimensional environment that corresponds to a respective portion of the physical environment that includes the preset first portion of the physical environment, in accordance with a determination that the field of view of the display generation component includes the preset first portion of the physical environment, and displaying a second view of the three-dimensional environment that corresponds to a respective portion of the physical environment that does not include the preset first portion of the physical environment, in accordance with a determination that the field of view of the display generation component does not include the preset first portion of the physical environment, displays the appropriate view of the three-dimensional environment when a set of conditions has been met without requiring further user input (e.g., further user input to select the first or second view of the three-dimensional environment). Performing an operation when a set of conditions has been met without requiring further user input enhances the operability of the device, which, additionally, reduces power usage and improves battery life of the device by enabling the user to use the device more quickly and efficiently.

In some embodiments, receiving the request to display, via the display generation component, a view of the three-dimensional environment includes detecting that the display generation component is placed into a preset spatial relationship relative to a user. For example, when the display generation component is an HMD, detecting the request includes detecting that the HMD is placed on the user's head, or held in front of the user's eyes, etc.; when the display generation component is a heads-up display, detecting the request includes detecting a user is standing or sitting in front the display side of the heads-up display; when the display generation component is a touch-screen display, detecting the request includes detecting that the display is raised to the user's eye level and facing the user, etc. In some embodiments, the computing system requires other conditions to be met before displaying the view of the three-dimensional environment, such as the charge level and on/off state of the display generation component, etc. Displaying a view of the three-dimensional environment in response to detecting that the display generation component is placed into a preset spatial relationship relative to a user provides additional control options without cluttering the user interface with additional displayed controls (e.g., additional displayed controls for displaying the view of the three-dimensional environment). Providing additional control options without cluttering the user interface with additional displayed controls enhances the operability of the device, which, additionally, reduces power usage and improves battery life of the device by enabling the user to use the device more quickly and efficiently.

In some embodiments, prior to receiving the request for displaying a view of the three-dimensional environment that corresponds to the physical environment in the field of view of the display generation component, in accordance with a determination that the virtual menu is not currently associated with the physical environment in the field of view of the display generation component (e.g., the physical environment is a new environment for the computing system), the computer system displays a representation of a respective portion of the physical environment that is within the field of view of the display generation component, concurrently with visual indications at positions corresponding to one or more physical surfaces (e.g., tabletop, walls, windows, etc.) detected in the respective portion of the physical environment (e.g., the visual indications include outlines, wire meshes, visual effects such as shimmering, increased translucency, darkening, etc., at the portions of the representation of the physical environment at which the physical surfaces are identified). In some embodiments, the computing system activates a configuration mode that allows the user to select a placement location for the virtual menu such that the next time the user views the physical environment through the display generation component, the virtual menu can still be seen at the same placement location. In some embodiments, the computing system, in addition to displaying the visual indication for physical surfaces detected in the physical environment, also provides visual and/or audio outputs prompting the user to select a placement location for the virtual menu. In some embodiments, the computing system selectively displays the visual indication at positions that correspond to some of the physical surfaces that are sufficiently large and/or planar for the virtual menu, and forgoes displaying the visual indications for detected physical surfaces that do not meet the size, orientation, and/or flatness requirements for menu placement. In some embodiments, after a surface in the portion of the physical environment is selected as the preset first portion of the physical environment that will serve as the home location for the virtual menu, the computing system ceases to display the visual indications while maintaining display of a representation of the portion of the physical environment (e.g., now overlaid with the virtual menu). Displaying a representation of a respective portion of the physical environment that is within the field of view, concurrently with visual indications at positions corresponding to one or more physical surfaces detected in the respective portion of the physical environment, provides improved visual feedback to the user (e.g., improved visual feedback regarding the surfaces detected by the computer system in the field of view of the display generation component). Providing improved feedback enhances the operability of the device, which, additionally, reduces power usage and improves battery life of the device by enabling the user to use the device more quickly and efficiently.

In some embodiments, while displaying the representation of the respective portion of the physical environment via the display generation component (e.g., with the visual indications of detected physical surfaces) (e.g., before the virtual menu is associated with the preset first portion of the physical environment within the respective portion of the physical environment, or any other portion of the physical environment), the computer system detects, by the one or more input devices, a first input that meets first criteria (e.g., menu placement criteria), wherein the first criteria include at least a first criterion that is met when the first input includes a selection input directed to a first surface in the respective portion of the physical environment, and a second criterion that is met when the first input includes a configuration input that corresponds to a request to establish a home location for the virtual menu (e.g., a home screen, a springboard or application launch menu that includes a plurality of virtual menu options (e.g., application launch icons which, when activated, start a corresponding application or computer-generated experience using the computer system)), in order for the first criteria to be met. In some embodiments, the first criteria include a first criterion that is met when the first input includes a user's gaze input that meets preset stability and duration criteria while being directed to a representation of an acceptable target surface in the representation of the respective portion of the physical environment (e.g., a user's gaze input directed to a planar physical surface in the physical environment and kept stationary for at least a threshold amount of time) and the first criteria include a second criterion that is met when the user's gaze input detected in conjunction with a gesture of a first gesture type (e.g., an in-air tap input, a tap input of one portion of a hand on another portion of the hand, a finger snap input, etc.). In response to the detecting the first input that meets the first criteria, the computer system displays the virtual menu at a first position in the representation of the respective portion of the physical environment that corresponds to a location of the first surface in the respective portion of the physical environment (e.g., the virtual menu options appear to overlay the first surface in a preset arrangement (e.g., a grid, a row, etc.)), wherein the first surface is associated with the virtual menu as the preset first portion of the physical environment that serves as the home location for the virtual menu in the physical environment (e.g., the physical environment that is presently in the field of view of the display generation component). The process for establishing the home location for the virtual menu is illustrated in FIGS. 7K-7L, for example.

Displaying, in response to detecting the first input that includes a selection input directed to a first surface in the respective portion of the physical environment, the virtual menu at a first position in the representation of the respective portion of the physical environment, wherein the first surface is associated with the virtual menu as the preset first portion of the physical environment that serves as the home location for the virtual menu in the physical environment, reduces the number of inputs needed to interact with the virtual menu (e.g., the user does not need to perform additional inputs to move or redisplay the virtual menu). Reducing the number of inputs needed to perform an operation enhances the operability of the device, which, additionally, reduces power usage and improves battery life of the device by enabling the user to use the device more quickly and efficiently.

In some embodiments, while displaying the virtual menu at a respective position in the three-dimensional environment corresponding to the preset first portion of the physical environment, the computer system detects, by the one or more input devices, a second input that meets second criteria (e.g., menu option selection criteria), wherein the second criteria include at least a third criterion that is met when the second input includes a selection input directed towards a respective menu item of the virtual menu, and a fourth criterion that is met when the second input includes an activation input that corresponds to a request to activate a selected menu item in the virtual menu, in order for the second criteria to be met. In some embodiments, the respective position in the three-dimensional environment corresponding to the preset first portion of the physical environment includes the respective position that corresponds to the location of the first surface that has been selected as the home location for the virtual menu. In some embodiments, the virtual menu is displayed at the respective position in the three-dimensional environment, while the virtual menu is being displayed right after the selection of the home location, or after the home location has been moved out of the field of view of the display generation component and back into the field of view again, or after the display generation component is turned off and then turned back on again, or after the display generation component is removed from the preset physical relationship relative to the user and returned to the preset physical relationship relative to the user, etc. In some embodiments, the second criteria include a third criterion that is met when the second input includes a user's gaze input that meets preset stability and duration criteria while being directed to a respective menu item in the virtual menu, and the second criteria include a fourth criterion that is met when the user's gaze input is detected in conjunction with a gesture of a second gesture type (e.g., an in-air tap input, a tap input of one portion of a hand on another portion of the hand, a finger snap input, a flick input, etc.). In some embodiments, the first gesture type used for the configuration input for placing the virtual menu at a selected home location and the second gesture type used for the activation input for activating a selected menu item are the same type of gesture input. In some embodiments, other types of inputs are used to select and commit to the selection (e.g., selecting and committing to the selected home location, selecting and committing to the selected menu option, etc.). In some embodiments, different types of gesture inputs are used to select and commit to a home location for the virtual menu, and to select and commit to a menu item in the virtual menu after the menu is placed at the home location. In response to the detecting the second input that meets the second criteria, the computer system selects the respective menu item in the virtual menu (e.g., and displaying a pop-up of the respective menu item at a position in the view of the three dimensional environment that corresponds to a location of a user's hand in the physical environment).

Selecting the respective menu item in the virtual menu in response to detecting the second input that includes a selection input directed towards a respective menu item of the virtual menu and an activation input that corresponds to a request to activate a selected menu item in the virtual menu, provides additional control options without cluttering the user interface with additional displayed controls (e.g., additional displayed control options for navigating between menu items, additional displayed control options for selecting a menu item, etc.). Reducing the number of inputs needed to perform an operation enhances the operability of the device, which, additionally, reduces power usage and improves battery life of the device by enabling the user to use the device more quickly and efficiently.

In some embodiments, the preset first portion of the physical environment includes a physical surface that is substantially planar. In some embodiments, the preset first portion of the physical environment that is established as a home location for the virtual menu includes a detected plane of a room in the physical environment (e.g., a floor, a wall, a window, etc.), a plane of an object in the room (e.g., a table, a cupboard, a countertop, etc.), a plane of a device (e.g., a side of a refrigerator, microwave, stove, washing machine, TV, etc.), etc. In some embodiments, the preset first portion of the physical environment includes a plane that is substantially perpendicular to a substantially horizontal ground plane of the physical environment. In some embodiments, the preset first portion of the physical environment includes a plane that is substantially parallel to a substantially horizontal ground plane of the physical environment. Displaying the virtual menu at a first position in the respective portion of the physical environment that corresponds to a location of a physical surface that is substantially planar reduces the number of inputs needed to interact with the virtual menu (e.g., the user does not need to perform additional inputs to move or redisplay the virtual menu). Reducing the number of inputs needed to perform an operation enhances the operability of the device, which, additionally, reduces power usage and improves battery life of the device by enabling the user to use the device more quickly and efficiently.

In some embodiments, while displaying the virtual menu at a respective position in the view of the three-dimensional environment that corresponds to a location of the preset first portion of the physical environment, the computer system detects, by the one or more input devices, a third input that meets third criteria (e.g., reconfiguration criteria), wherein the third input identifies a preset second portion of the physical environment as a new home location for the virtual menu (e.g., a second surface in the physical environment (e.g., in the same portion of the physical environment shown in the field of view of the display generation component as the first surface, or in a different portion of the physical environment from the first surface)). In some embodiments, the third criteria for changing the home location of the virtual menu are different from the first criteria for establishing the home location of the virtual menu in a new physical environment, and different from the second criteria for activating a menu item in the virtual menu displayed at its home location. In some embodiments, the third criteria include at least a fifth criterion that is met when the third input includes a reconfiguration input that is directed to the virtual menu (e.g., a user's gaze input directed at the virtual menu in conjunction with a predetermined gesture input (e.g., a pinch and drag input)), followed by a selection input directed to a second surface in the respective portion of the physical environment or a different portion of the physical environment (e.g., the user can bring different portions of the physical environment into the field of view of the display generation component by moving the display generation component relative to the physical environment after the reconfiguration input has been detected and the virtual menu has been dislodged from the position that corresponds to the first preset portion of the physical environment), and sixth criterion that is met when the third input includes a commitment input that corresponds to a request to establish the home location for the virtual menu (e.g., a configuration input to establish a new home location) at the newly selected home location. In some embodiments, while displaying the virtual menu at a respective position in the view of the three-dimensional environment that corresponds to a location of the preset first portion of the physical environment and in response to detecting the third input that meets the third criteria, the computer system displays the virtual menu at a respective position in the view of the three-dimensional environment that corresponds to at a location of the preset second portion of the physical environment (e.g., the second surface in the respective portion of the physical environment, or a different portion of the physical environment currently shown in the field of view of the display generation component) (e.g., the virtual menu options appear to overlay the second surface in a preset arrangement (e.g., a grid, a row, etc.)).

Displaying the virtual menu at a respective position in the view of the three-dimensional environment that corresponds to a location of a preset second portion of the physical environment, in response to detecting a third input that identifies the preset second portion of the physical environment as a new home location for the virtual menu, provides additional control options without cluttering the user interface with additional displayed controls (e.g., additional displayed controls for identifying the new home location or for moving the virtual menu). Providing additional control options without cluttering the user interface with additional displayed controls enhances the operability of the device, which, additionally, reduces power usage and improves battery life of the device by enabling the user to use the device more quickly and efficiently.

In some embodiments, in response to detecting the request to display the view of the three-dimensional environment, and in accordance with a determination that the physical environment, including one or more portions within the field of view of the display generation component and one or more portions outside of the field of view of the display generation component, is not associated with the virtual menu (e.g., the physical environment is a new environment for the computing system (e.g., a new room, a new house, etc.)), the computer system activates (e.g., automatically or in response to a user input) a configuration mode (e.g., to identify and visually indicate a plurality of new surfaces in the new physical environment, and to receive user inputs to specify the home location for the virtual menu from among the identified surfaces in the new physical environment). Activating a configuration mode in accordance with a determination that the physical environment is not associated with the virtual menu provides additional control options without cluttering the user interface with additional displayed controls (e.g., additional displayed controls for activating the configuration mode, or for identifying a new surface as the home location). Providing additional control options without cluttering the user interface with additional displayed controls enhances the operability of the device, which, additionally, reduces power usage and improves battery life of the device by enabling the user to use the device more quickly and efficiently.

In some embodiments, the virtual menu includes a plurality of application icons corresponding to different applications or computer-generated experiences (e.g., an augmented reality experience, a virtual reality experience, etc.), wherein a respective application icon, when activated in accordance with preset activation criteria, starts a respective application or a respective computer-generated experience in the three-dimensional environment. Displaying a virtual menu that includes a plurality of application icons corresponding to different applications or computer-generated experiences reduces the number of inputs needed to start a desired application or computer-generated experience (e.g., the user does not need to navigate between separate menus for applications and computer-generated experiences). Reducing the number of inputs needed to perform an operation enhances the operability of the device, which, additionally, reduces power usage and improves battery life of the device by enabling the user to use the device more quickly and efficiently.

In some embodiments, the plurality of application icons includes respective application icons for a first set of applications and computer-generated experiences in accordance with a determination that first contextual criteria are met, and the plurality of application icons includes respective application icons for a second set of applications and computer-generated experiences in accordance with a determination that second contextual criteria are met, the first set of applications and computer-generated experiences being different from the second set of applications and computer-generated experiences, and the first contextual criteria being different from the second contextual criteria. For example, in some embodiments, the computing system displays application icons for recently used or recommended applications (e.g., contextually selected applications based on the current time, user identity, recent system events, etc.) and experiences in the virtual menu, in addition to one or more default applications. Displaying a virtual menu that includes respective application icons for a first set of applications and computer-generated experiences in accordance with a determination that the first contextual criteria are met, and a second set of application and computer-generated experiences, different from the first set of applications and computer-generated experiences, in accordance with a determination that second contextual criteria are met, displays the appropriate set of applications and computer-generated experiences when a set of conditions has been met without requiring further user input (e.g., further user input to select the first or second set of applications and computer-generated experiences). Performing an operation when a set of conditions has been met without requiring further user input enhances the operability of the device, which, additionally, reduces power usage and improves battery life of the device by enabling the user to use the device more quickly and efficiently.

In some embodiments, the virtual menu includes a respective application icon that corresponds to a respective computer-generated experience that is configured to be shared among multiple users (e.g., to support co-presence in a virtual reality experience, to support a joined online communication session, etc.), and displaying the virtual menu includes displaying the respective application icon with a corresponding co-presence indication, wherein the corresponding co-presence indication includes representations (e.g., names, avatars, identifiers, etc.) of one or more users (e.g., nearby users and/or users known to each other) that are available to participate in the respective computer-generated experience (e.g., currently immersed in the respective experience, and/or having made themselves available for joining the respective experience upon request by a user of the computing system). Displaying the virtual menu that includes a respective application icon that corresponds to a respective computer-generated experience that is configured to be shared among multiple users, with a corresponding co-presence indication that includes representations of one or more users that are available to participate in the respective in the respective computer-generated experience, provides improved visual feedback to the user (e.g., regarding the availability of other users to participate in a respective computer-generated experience). Providing improved feedback enhances the operability of the device, which, additionally, reduces power usage and improves battery life of the device by enabling the user to use the device more quickly and efficiently.

In some embodiments, the menu includes a first application icon corresponding to a first application or computer-generated experience. While displaying the virtual menu at a respective position in the three-dimensional environment corresponding to the preset first portion of the physical environment, the computer system detects, by the one or more input devices, a fourth input that meets fourth criteria (e.g., application launch criteria) (e.g., a user's gaze input directed at the first application icon in conjunction with an in-air tap input or a tap input of one portion of a hand on another portion of the hand, etc.), wherein the fourth criteria include at least a seventh criterion that is met when the fourth input includes a selection input that is directed to the first application icon in the virtual menu, in order for the fourth criteria to be met. In response to detecting the fourth input that meets the fourth criteria, the computer system maintains display of the virtual menu in the view of the three-dimensional environment at the respective position corresponding to the preset first portion of the physical environment and the computer system displays the first application or computer-generated experience associated with the first application icon in the view of the three-dimensional environment at a respective position that corresponds to a location of a hand in the physical environment (e.g., a user's hand that provided at least part of the fourth input (e.g., the hand that performed the in-air tap input or a tap input (e.g., one or more taps by one or more fingers of the hand on another part of the same hand, etc.), the palm of the user's hand, etc.). In some embodiments, the hand that provided part of the fourth input that triggered display of the first application or experience turns to face toward a viewpoint corresponding to the view of the three-dimensional environment (e.g., turns to face toward the user), and the computing system displays the user interface of the first application, and/or a limited preview of the first experience in a window presented at a position corresponding to the user's palm.

Maintaining display of the virtual menu of the three-dimensional environment at the respective position corresponding to the preset first portion of the physical environment, and displaying the first application or computer-generated experience associated with the first application icon in the view of the three-dimensional environment at a respective position that corresponds to a location of a hand in the physical environment, reduces the number of inputs needed to interact with the virtual menu (e.g., the user does not need to dismiss, move, or minimize the display of the first application or computer-generated experience to interact with the virtual menu). Reducing the number of inputs needed to perform an operation enhances the operability of the device, which, additionally, reduces power usage and improves battery life of the device by enabling the user to use the device more quickly and efficiently.

In some embodiments, while displaying the first application or computer-generated experience at the respective position that corresponds to a location of the hand in the physical environment, the computer system detects, by the one or more input devices, a fifth input that meets fifth criteria (e.g., application immersion criteria), wherein the fifth criteria include at least an eighth criterion that is met when the fifth input includes movement of the hand in the physical environment in a first direction in order for the fifth criteria to be met. In accordance with a determination that the fifth input meets the fifth criteria, the computer system expands display of the first application or computer-generated experience in three dimensions in the three-dimensional environment (e.g., launching an immersive view of the first application). In some embodiments, the fifth criteria have a first directional criterion (e.g., requiring upward movement of the whole hand, or movement of a finger (e.g., thumb, index finger, etc.) relative to other parts of the hand (e.g., another finger, palm, side of hand, etc.), etc.), a first velocity criterion (e.g., requiring the speed of the hand movement to exceed a first threshold speed, etc.), a location criterion requiring that the hand movement starts at a location corresponding to the position of the input device and moving toward the location of the virtual menu, and/or a first time criterion (e.g., requiring that the hand movement be maintained for at least a threshold amount of time, etc.) to prevent accidentally launching the application.

Expanding display of the first application or computer-generated experience in three dimensions in the three-dimensional environment in accordance with a determination that the fifth input includes movement of the hand in the physical environment in a first direction, provides additional control options without cluttering the user interface with additional displayed controls (e.g., additional displayed controls for expanding display of the first application or computer-generated experience). Providing additional control options without cluttering the user interface with additional displayed controls enhances the operability of the device, which, additionally, reduces power usage and improves battery life of the device by enabling the user to use the device more quickly and efficiently.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 11000, 12000, and 13000) are also applicable in an analogous manner to method 10000 described above with respect to FIG. 10. For example, the gestures, gaze inputs, physical objects, user interface objects, controls, movements, criteria, three-dimensional environment, display generation component, surface, representation of physical object, virtual objects, and/or animations described above with reference to method 10000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 11000, 12000, and 13000). For brevity, these details are not repeated here.

Figure 11:
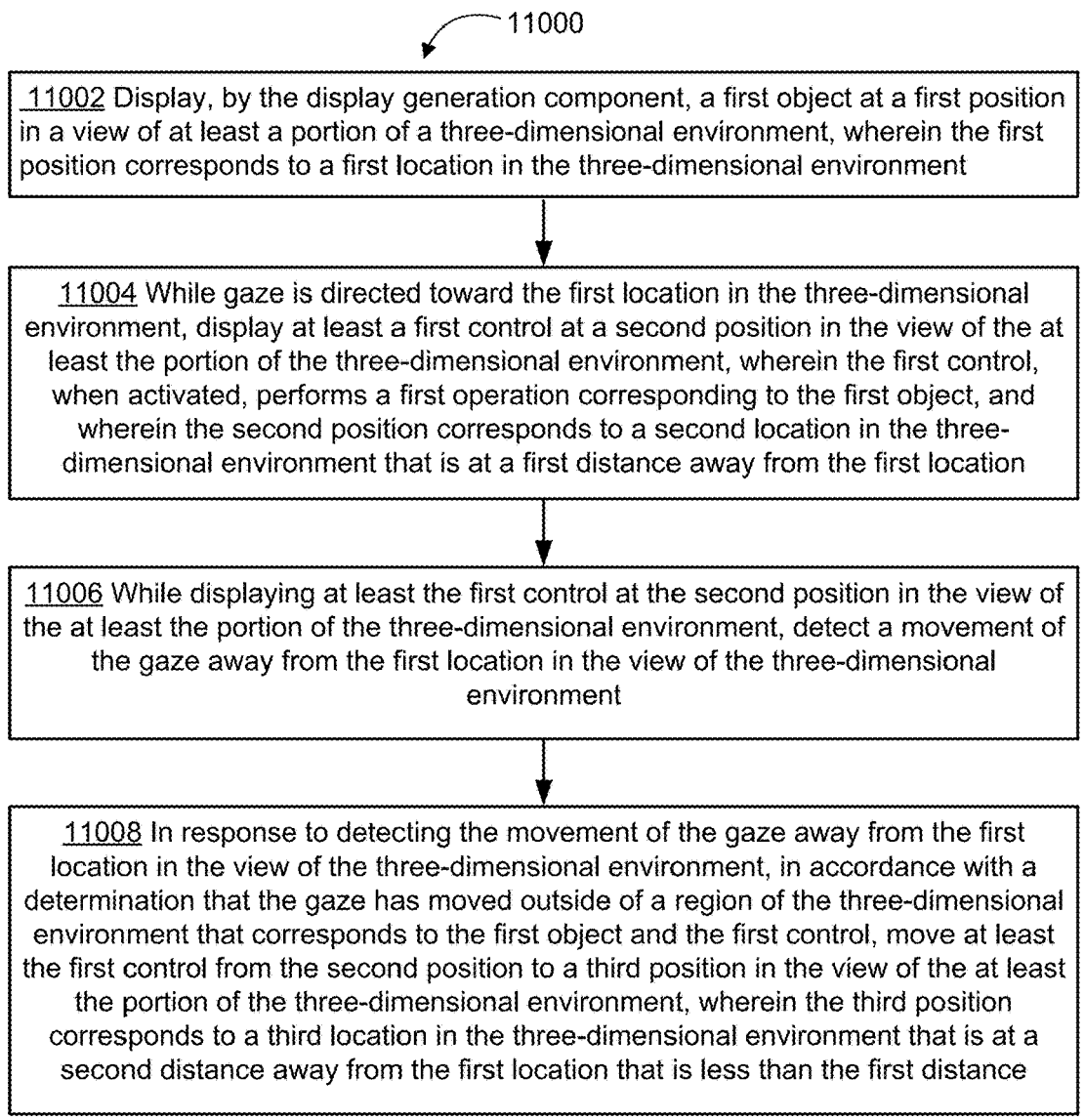
FIG. 11 is a flowchart of a method of displaying a control object including one or more controls associated with an object at different distances from an initial position of the control object at or near the object in a three-dimensional environment, depending on whether or not the object is selected by a user input and/or whether or not a user's gaze directed to the object or its associated control object has moved away from a region corresponding to the object and its associated control object, in accordance with some embodiments.

FIG. 11 is a flowchart of a method of displaying a control object including one or more controls associated with an object at different distances from an initial position of the control object at or near the object in a three-dimensional environment, depending on whether or not the object is selected by a user input and/or whether or not a user's gaze directed to the object or its associated control object has moved away from a region corresponding to the object and its associated control object, in accordance with some embodiments.

In some embodiments, the method 11000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 11000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 11000 are, optionally, combined and/or the order of some operations is, optionally, changed.

In some embodiments, the method 11000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.).

In some method 11000, the computer system displays (11002), via the display generation component, a first object (e.g., representation 7366', physical object 7366, representation 7368', physical object 7368, a virtual object, etc.) (e.g., a virtual object or representation of a physical object) at a first position (e.g., a display position) in a view of at least a portion of a three-dimensional environment (e.g., environment 7110 in FIG. 7O, or another environment) (e.g., a view of a virtual environment, an augmented reality environment that includes a representation of a physical environment as seen through a pass-through portion of the display generation component or captured in the field of view of one or more cameras of the computer system), wherein the first position corresponds to a first location in the three-dimensional environment. While gaze (e.g., gaze input 7386, in FIG. 7P, gaze input 7390 in FIG. 7R, etc.) is directed toward the first location in the three-dimensional environment (e.g., while the user's gaze input is maintained on the first object (e.g., the user's gaze is directed to the first position in the view of the three-dimensional environment while the first object is displayed at the first position, and the user's gaze is directed to a different position in the view of the three-dimensional environment while the first object is displayed at the different position due to movement of the cameras or the user relative to the physical environment)), the computer system displays (11004) at least a first control at a second position in the view of the at least the portion of the three-dimensional environment, wherein the first control, when activated, performs a first operation corresponding to the first object, and wherein the second position corresponds to a second location in the three-dimensional environment that is a first distance away from the first location (e.g., control 7372, control 7374, control 7378, control 7380, etc. in FIGS. 7P and 7T are displayed at a position away from their respective original locations shown in FIG. 7O) (e.g., the first control is part of a menu associated with the first object, and the first control and/or menu was displayed at the second position in response to an earlier selection input directed to the first object (e.g., a tap input directed to the first object, a user's gaze input directed to the first object in conjunction with a tap input with one portion of a hand on another portion of the hand, etc.)). While displaying at least the first control at the second position in the view of the at least the portion of the three-dimensional environment, the computer system detects (11006) a movement of the user's gaze away from the first location in the view of the three-dimensional environment (e.g., as illustrated in FIGS. 7S and 7T, gaze 7392 has moved away from the region corresponding to the control object 7370 and the object 7366'). In response to detecting the movement of the user's gaze away from the first location in the view of the three-dimensional environment, in accordance with a determination that the user's gaze has moved outside of a region of the three-dimensional environment that corresponds to the first object and the first control (e.g., the user's gaze is detected moving away from the first object, optionally, for at least a threshold amount of time; and the user's gaze has not moved toward or reached the first control (or the menu that is associated with the first object and including the first control), optionally, for at least the threshold amount of time), the computer system moves (11008) at least the first control from the second position to a third position in the view of the at least the portion of the three-dimensional environment, wherein the third position corresponds to a third location in the three-dimensional environment that is at a second distance away from the first location that is less than the first distance (e.g., the first control is part of a menu associated with the first object, and the first control and/or menu moves back toward the first object and away from the user in response to the user's gaze moving away from the first object and the first control and/or menu). This is illustrated in FIGS. 7S, and 7T, where, after the user's gaze is moved away from the region corresponding to the control object 7370 and the representation 7366', the control object 7370 is moved back toward its original position at or near the representation 7366'.

In some embodiments, prior to displaying at least the first control at the second position in the view of the at least the portion of the three-dimensional environment (e.g., prior to detecting the input that changes the selection state of the first object from an unselected state to a selected state, and prior to displaying the first control and/or the menu containing the first control at the second location that is closer to the user than the first location), the computer system displays at least the first control at a fourth position in the view of the at least the portion of the three-dimensional environment (optionally, the first control displayed at the fourth position is merely a representation of the control and is activatable for performing the first operation), wherein the fourth position corresponds to a fourth location in the three-dimensional environment that is a third distance away from the first location that is less than the first distance (e.g., the third distance is less than the second distance or equal to the second distance, etc.). In some embodiments, the third distance is zero, where the first control and/or menu containing the first control appears to be displayed on the surface of the first object. In some embodiments, the first distance is a small, non-zero distance, where the first control and/or menu containing the first control appears to hover slightly above the surface of the first object. In some embodiments, in response to detecting the input that changes the selection state of the first object from an unselected state to a selected state, the computer system displays the first control and/or the menu containing the first control at the second position in the view of the at least the portion of the three-dimensional environment that corresponds to the second location (e.g., the first control and/or the menu containing the first control towards from its original location on or near the first object toward the user). Displaying at least the first control at a fourth position that corresponds to a fourth location in the three dimensional environment that is a third distance away from the first location that is less than the first distance, prior to displaying at least the first control at the second position, provides improved visual feedback to the user (e.g., that the first control is activatable). Providing improved feedback enhances the operability of the device, which, additionally, reduces power usage and improves battery life of the device by enabling the user to use the device more quickly and efficiently.

In some embodiments, prior to displaying at least the first control at the second position in the view of the at least the portion of the three-dimensional environment, the computer system detects an input that corresponds to a request to select the first object (e.g., as illustrated in FIG. 7P), wherein displaying at least the first control at the second position in the view of at least the portion of the three-dimensional environment is performed in response to detecting the input that corresponds to the request to select the first object. In some embodiments, the first control or a representation thereof is not displayed in the three-dimensional environment prior to detection of the input that corresponds to the request to select the first object. In some embodiments, the first control or a representation thereof is displayed in the three-dimensional environment at a position in the view of the three-dimensional environment that corresponds to a surface or close vicinity of the first object in the three-dimensional environment. Displaying at least the first control at the second position in the view of at least the portion of the three-dimensional environment in response to detecting the input that corresponds to the request to select the first object reduces the number of inputs needed to interact with the first control (e.g., the user does not need to perform additional inputs to move or re-display the first control after selecting the first object). Reducing the number of inputs needed to perform an operation enhances the operability of the device, which, additionally, reduces power usage and improves battery life of the device by enabling the user to use the device more quickly and efficiently.

In some embodiments, the input that corresponds to the request to select the first object includes detecting a hand moving into a predefined posture at a respective location in a physical environment that corresponds to a location of the first object in the three-dimensional environment (e.g., the first location in the first object in the three-dimensional environment, or an earlier location of the first object before the first object is moved to the first location (e.g., the first object is grabbed and moved closer toward the user or toward the viewpoint of the currently displayed view, etc.)). In some embodiments, the first object is a virtual object, and the hand moving into the predefined posture includes the thumb and one or more other fingers of the hand closing from an open posture to a closed posture at a location in the physical environment that corresponds to the virtual position of the virtual object in the three-dimensional environment. In some embodiments, the first object is a physical object, and the hand moving into the predefined posture includes the thumb and one or more other fingers of the hand closing from an open posture to a closed posture at a location of the first object in the physical environment grabbing the physical object. In some embodiments, a representation of the hand is displayed via the display generation component in the view of the three-dimensional environment at a position that corresponds to the location of the first object in the three-dimensional environment when the hand moves into the predefined posture.

Displaying at least the first control at the second position in the view of at least the portion of the three-dimensional environment in response to detecting the input that corresponds to the request to select the first object and that includes detecting a hand moving into a predefined posture at a respective location in a physical environment that corresponds to a location of the first object in the three-dimensional environment, reduces the number of inputs needed to interact with the first control (e.g., the user does not need to perform additional inputs to move or re-display the first control after selecting the first object). Reducing the number of inputs needed to perform an operation enhances the operability of the device, which, additionally, reduces power usage and improves battery life of the device by enabling the user to use the device more quickly and efficiently.

In some embodiments, the input that corresponds to the request to select the first object includes detecting a first predefined portion of a hand making a predefined movement relative to a second predefined portion of the hand (e.g., thumb tapping the side of the index finger, tip of the thumb touching the tip of the index finger, index finger rotating around the joint that connects the index finger to the palm of the hand, etc.) in conjunction with (e.g., concurrently with, within a threshold time window of, etc.) the user's gaze being directed to a respective location of the first control in the three-dimensional environment before the first control was displayed at the second position in the view of the three-dimensional environment (e.g., when the first control was displayed at or near a position of the surface of the first object (e.g., the first position of the first object, or an earlier position of the first object before the first object is moved to the first position (e.g., the first object is in motion or is being grabbed and moved closer toward the user or toward the viewpoint of the currently displayed view, etc.)). In some embodiments, the first object is a virtual object, and the hand making the predefined movement is located at a location in the physical environment that corresponds to a virtual location in the three-dimensional environment that is separate from the location of the first object. In some embodiments, the first object is a physical object, and the hand making the predefined movement is located apart from the first object in the physical environment. In some embodiments, a representation of the hand is not displayed via the display generation component in the view of the three-dimensional environment when the hand performs the predefined movement.

Displaying at least the first control at the second position in the view of at least the portion of the three-dimensional environment in response to detecting the input that corresponds to the request to select the first object and that includes detecting a first predefined portion of a hand making a predefined movement relative to a second predefined portion of the hand in conjunction with the gaze being directed to a respective location of the first control in the three-dimensional environment before the first control was displayed at the second position in the view of the three-dimensional environment, reduces the number of inputs needed to interact with the first control (e.g., the user does not need to perform additional inputs to move or re-display the first control after selecting the first object). Reducing the number of inputs needed to perform an operation enhances the operability of the device, which, additionally, reduces power usage and improves battery life of the device by enabling the user to use the device more quickly and efficiently.

In some embodiments, in response to detecting the movement of the user's gaze away from the first location in the view of the three-dimensional environment, and in accordance with a determination that the user's gaze has moved at least a threshold distance away from the region of the three-dimensional environment that corresponds to the first object and the first control (e.g., the user's gaze is detected moving far enough away from the first object, optionally, for at least a threshold amount of time; and/or the user's gaze has moved far enough away from the first control (or the menu that is associated with the first object and including the first control), optionally, for at least the threshold amount of time, etc.), the computer system moves at least the first control (e.g., the first control and/or the virtual menu that includes the first control and at least one other control, etc.) from the third position in the view of the at least the portion of the three-dimensional environment to a fourth position in the view of the at least the portion of the three-dimensional environment (optionally, the first control displayed at the fourth position is merely a representation of the control and is activatable for performing the first operation), wherein the fourth position corresponds to a fourth location in the three-dimensional environment that is a third distance away from the first location that is less than the first distance (e.g., the third distance is less than the second distance or equal to the second distance, etc.). In some embodiments, the third distance is zero, where the first control and/or menu containing the first control appears to be displayed on the surface of the first object. In some embodiments, the first distance is a small, non-zero distance, where the first control and/or menu containing the first control appears to hover slightly above the surface of the first object. In some embodiments, in response to detecting the input that changes the selection state of the first object from an unselected state to a selected state, the computer system displays the first control and/or the menu containing the first control at the second position in the view of the at least the portion of the three-dimensional environment that corresponds to the second location (e.g., the first control and/or the menu containing the first control towards from its original location on or near the first object toward the user). In some embodiments, in response to detecting the user's gaze moving sufficiently far away from the first object and/or the first control or the menu associated with the first object, the first control and/or the virtual menu snaps back to the original location on or near the first object. In some embodiments, the speed at which the first control moves towards the first object (e.g., first position) is faster than the speed at which the first control moves from the second position to the third position. That is, when the user's gaze has moved away from the region that includes the first location and the second location for at least the threshold distance, the speed at which the first control moves suddenly increases to resemble a "snap back" motion. In some embodiments, the path connecting the second position with the third position and the line connecting the third position with the fourth position are not aligned. That is, the first control starts to move in a different direction (e.g., returning to the first object at first position) when the user's gaze has moved away from the first location and/or the second location for at least the threshold distance.). Moving at least the first control from the third position to a fourth position that corresponds to a fourth location in the three-dimensional environment that is a third distance away from the first location that is less than the first distance, in response to detecting movement of the gaze away from the first location in the view of the three-dimensional environment, moves the first control when a set of conditions has been met without requiring further user input (e.g., further user input to move the first control to the fourth position before or after the user's gaze moves away from the first location). Performing an operation when a set of conditions has been met without requiring further user input enhances the operability of the device, which, additionally, reduces power usage and improves battery life of the device by enabling the user to use the device more quickly and efficiently. In some embodiments, in conjunction with moving at least the first control (e.g., the first control and/or the virtual menu that includes the first control and at least one other control, etc.) from the third position in the view of the at least the portion of the three-dimensional environment to the fourth position in the view of the at least the portion of the three-dimensional environment, the computer system changes one or more display properties of the first control (e.g., fading, shrinking, etc. the first control or the menu containing the first control, etc.) in the view of at least the portion of the three-dimensional environment. In some embodiments, the magnitude of the change in the one or more display properties of the first control (e.g., the amount of fading or shrinking) corresponds to an amount of change in the current distance between the first control and the first object. In some embodiments, as the first control reaches the fourth position, the first control is restored to its previous appearance when it was in the unselected state.

Changing one or more display properties of the first control in the view of at least the portion of the three-dimensional environment in conjunction with moving at least the first control from the third position to the fourth position provides improved visual feedback to the user (e.g., improved visual feedback that computer system has detected movement of the user's gaze away from the first location and that the first control is being moved from the third position to the fourth position). Providing improved feedback enhances the operability of the device, which, additionally, reduces power usage and improves battery life of the device by enabling the user to use the device more quickly and efficiently.

In some embodiments, after moving at least the first control to the third position in the view of the at least the portion of the three-dimensional environment, the computer system detects movement of the user's gaze back toward the first location in the three-dimensional environment, and in response to detecting the movement of the user's gaze toward the first location in the three-dimensional environment, the computer system moves at least the first control toward the second position in the view of the at least the portion of the three-dimensional environment. In some embodiments, when the user's gaze returns to the first location or the second location, the first control returns to the second position with its original appearance at the second position. In some embodiments, the speed at which the first control moves toward the second position is based on the speed at which the user's gaze moves toward the first location). Moving at least the first control toward the second position in the view of the at least the portion of the three-dimensional environment in response to detecting movement of the gaze toward the first location in the three-dimensional environment, and after moving at least the first control to the third position in the view of the at least the portion of the three-dimensional environment, moves the first control toward the second position when a set of conditions has been met without requiring further user input (e.g., further user input to move the first control toward the second position after the user's gaze moves back toward the first location). Performing an operation when a set of conditions has been met without requiring further user input enhances the operability of the device, which, additionally, reduces power usage and improves battery life of the device by enabling the user to use the device more quickly and efficiently.

In some embodiments, while displaying at least the first control at the second position or the third position (and optionally, during the movement of the first control from the second position to the third position) in the view of the at least the portion of the three-dimensional environment, the computer system displays a visual connection (e.g., tether objects 7382, 7384, 7396, 7398, etc.) (e.g., a dotted line, a virtual rubber band, etc.) connecting at least the first control to the first object in the view of at least the portion of the three-dimensional environment (e.g., as the first object and/or the first control move in the three-dimensional environment, the visual connection reorient, expands and/or shrinks accordingly such that the first object and at least the first control remain connected). Displaying a visual connection connecting at least the first control to the first object in the view of at least the portion of the three-dimensional environment, while displaying at least the first control at the second position or the third position in the view of the at least the portion of the three-dimensional environment, provides improved visual feedback to the user (e.g., improved visual feedback that the first control is associated with the first object). Providing improved feedback enhances the operability of the device, which, additionally, reduces power usage and improves battery life of the device by enabling the user to use the device more quickly and efficiently.

In some embodiments, displaying at least the first control includes displaying a user interface object (e.g., a virtual control panel, a menu, a control user interface, etc.) that includes the first control and one or more second controls different from the first control, where a respective control of the one or more second controls, when activated, causes performance of a respective operation that is different from the first operation (e.g., the first control and second controls correspond to control functions associated with the first object). In some embodiments, moving at least the first control includes moving the user interface object including the first control and the one or more second controls together. In some embodiments, moving at least the first control includes moving the first control relative to the one or more second controls in the user interface object (e.g., without moving the whole menu and/or without moving the second controls, etc.). Displaying a user interface object that includes the first control and one or more second controls different from the first control, wherein a respective control of the one or more second controls, when activated, causes performance of a respective operation that is different from the first operation, reduces the number of inputs needed to activate the first or second control (e.g., the user does not need to perform additional inputs to navigate to or display the second control). Reducing the number of inputs needed to perform an operation enhances the operability of the device, which, additionally, reduces power usage and improves battery life of the device by enabling the user to use the device more quickly and efficiently.

In some embodiments, prior to displaying at least the first control at the second position (and the fourth position) in the view of the at least the portion of the three-dimensional environment, the computer system receives one or more user inputs that correspond to a request to display at least the first control at a respective position that corresponds to the first location of the first object in the three-dimensional environment (e.g., the respective position is the fourth position, the initial position at or near the surface of the first object, etc.). In response to detecting the one or more user inputs that correspond to the request to display at least the first control at the respective position that corresponds to the first location of the first object in the three-dimensional environment, the computer system displays at least the first control at the respective position that corresponds to the first location of the first object in the three-dimensional environment (e.g., the respective position is the fourth position, the initial position at or near the surface of the first object, etc.), wherein at least the first control moves to the second position in the view of the at least the portion of the three-dimensional environment in response to selection of the first object (e.g., in response to the user grabbing the first object virtually or in the real world, in response to the user's gaze being directed to the first object, etc.).

Displaying at least the first control at the respective position that corresponds to the first location of the first object in the three-dimensional environment in response to detecting the one or more user inputs that correspond to the request to display at least the first control at the respective position that corresponding to the first location of the first object in the three-dimensional environment, and moving the first control to the second position in the view of the at least the portion of the three-dimensional environment in response to selection of the first object, reduces the number of inputs needed to display the first control at a desired location (e.g., the user can position the first control as desired prior to selecting the first object, and does not need to move the first control after selecting the first object). Reducing the number of inputs needed to perform an operation enhances the operability of the device, which, additionally, reduces power usage and improves battery life of the device by enabling the user to use the device more quickly and efficiently.

In some embodiments, moving at least the first control from the second position to the third position in the view of the at least the portion of the three-dimensional environment includes: in accordance with a first set of characteristics (e.g., direction of movement, speed of the movement, and/or magnitude (e.g., distance) of the movement, etc.) of the movement of the user's gaze away from the first location in the view of the three-dimensional environment (e.g., moving the user's gaze away from the first object and the first control), concurrently with detecting the movement of the user's gaze away from the first location, moving at least the first control in the view of the at least the portion of the three-dimensional environment with a second set of characteristics corresponding to the first set of the characteristics. In some embodiments, the direction of movement of at least the first control, the speed of the movement of at least the first control corresponds to the speed of the movement of the user's gaze. In some embodiments, the magnitude of the movement of the at least the first control corresponds to the direction of the movement of the user's gaze, the speed of the movement of the user's gaze, and/or the magnitude of the movement of the user's gaze. In some embodiments, if the user's gaze returns to the first location after moving away from the first location, the computer system moves at least the first control back to the second position in the view of the at least the portion of the three-dimensional environment (e.g., moving at least the first control back to the second location in the three-dimensional environment).

Moving at least the first control in the view of the at least the portion of the three-dimensional environment with a second set of characteristics corresponding to a first set of characteristics of the movement of the gaze away from the first location in the view of the three-dimensional environment, moves the first control when a set of conditions has been met without requiring further user input (e.g., further user input to move the first control with a second set of characteristics). Performing an operation when a set of conditions has been met without requiring further user input enhances the operability of the device, which, additionally, reduces power usage and improves battery life of the device by enabling the user to use the device more quickly and efficiently.

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 12000, and 13000) are also applicable in an analogous manner to method 13000 described above with respect to FIG. 11. For example, the gestures, gaze inputs, physical objects, user interface objects, controls, movements, criteria, three-dimensional environment, display generation component, surface, representation of physical object, virtual objects, and/or animations described above with reference to method 11000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, 12000, and 13000). For brevity, these details are not repeated here.

Figure 12A:
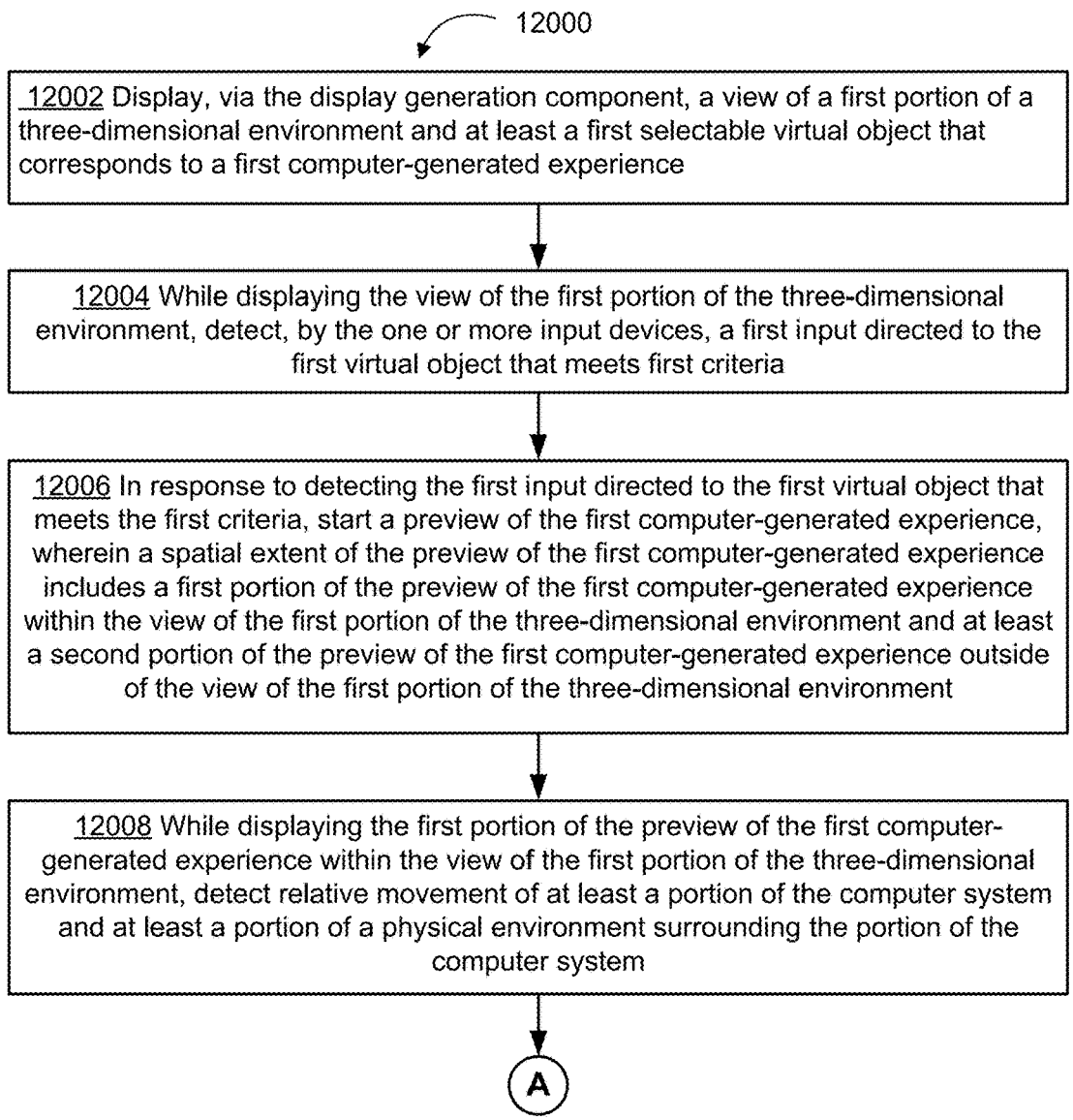
FIGS. 12A-12B are a flowchart of a method of displaying a three-dimensional preview of a computer-generated experience in response to first interaction with an object, before transitioning to displaying the computer-generated experience in response to additional input, in accordance with some embodiments.
Figure 12B:
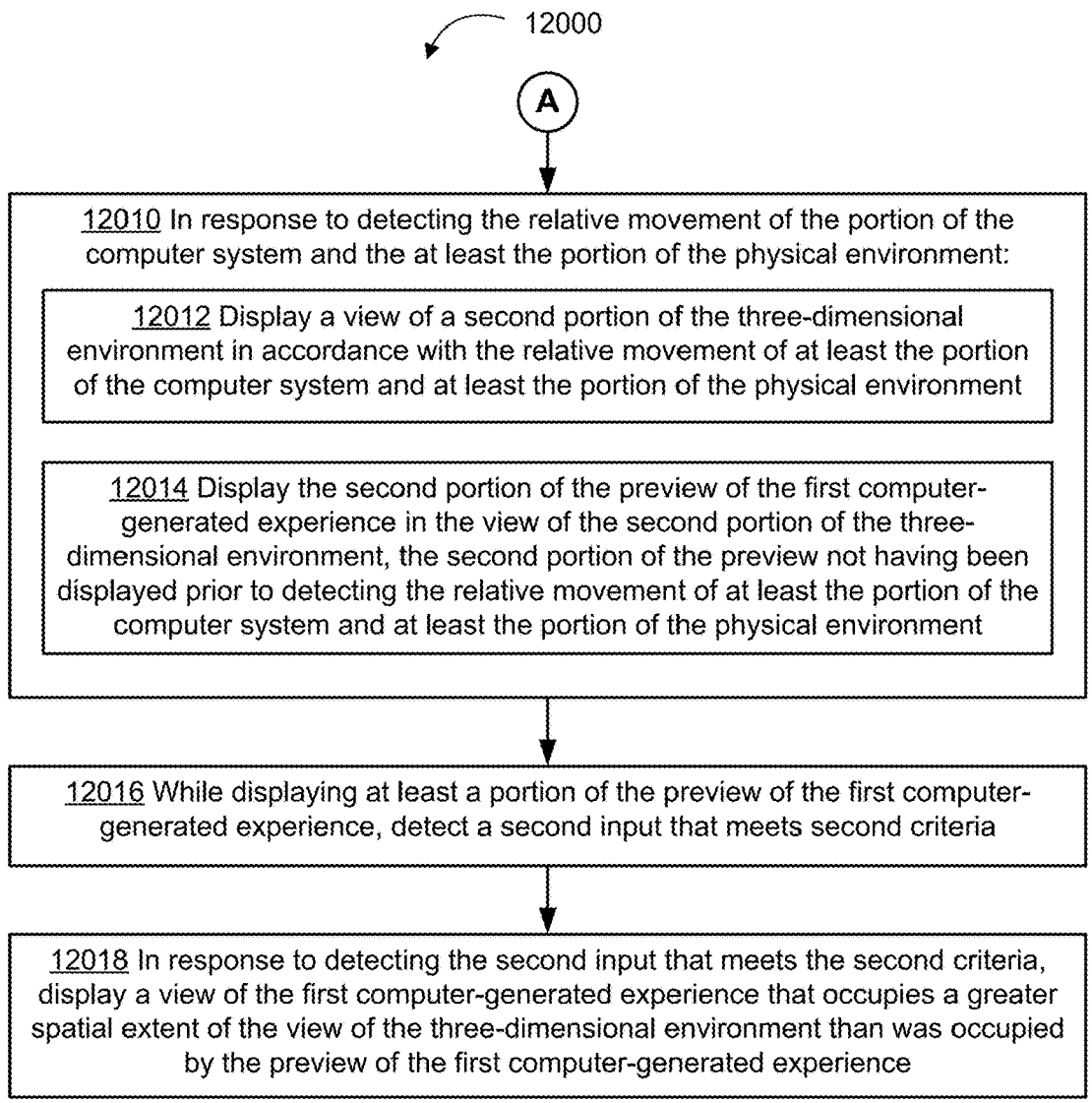

FIGS. 12A-12B are a flowchart of a method of displaying a three-dimensional preview of a computer-generated experience in response to first interaction with an object, before transitioning to displaying the computer-generated experience in response to additional input, in accordance with some embodiments.

In some embodiments, the method 12000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 12000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 12000 are, optionally, combined and/or the order of some operations is, optionally, changed.

In some embodiments, the method 12000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.).

In the method 12000, the computer system displays (12002), via the display generation component, a view of a first portion of a three-dimensional environment (e.g., environment 7112 in FIG. 7V, or another environment, etc.) (e.g., a virtual environment, an augmented reality environment) and at least a first selectable virtual object (e.g., virtual object 7404, representation 7400', etc. in FIG. 7V) (e.g., a first icon or three-dimensional object) that corresponds to a first computer-generated experience (e.g., a first application or first immersive media content). While displaying the view of the first portion of the three-dimensional environment, the computer system detects (12004), by the one or more input devices, a first input directed to the first virtual object that meets first criteria (e.g., the criteria for detecting an upward swipe input by a hand while a user's gaze input is directed to the first virtual object) (e.g., as illustrated in FIG. 7W, the user's input is an interaction with the object 7400, the representation 7400', or the virtual object 7404, in accordance with preset criteria). In response to detecting the first input directed to the first virtual object that meets the first criteria, the computer system starts (12006) a preview of the first computer-generated experience (e.g., preview 7412, or another preview, etc.), wherein a spatial extent of the preview of the first computer-generated experience includes a first portion of the preview of the first computer-generated experience within the view of the first portion of the three-dimensional environment (e.g., as shown in FIG. 7W) and at least a second portion of the preview of the first computer-generated experience outside of the view of the first portion of the three-dimensional environment (e.g., as shown in FIG. 7X).

While displaying the first portion of the preview of the first computer-generated experience within the view of the first portion of the three-dimensional environment (and not displaying the second portion of the preview of the first computer-generated experience that is outside of the view of the first portion of the three-dimensional environment), the computer system detects (12008) relative movement of at least a portion of the computer system (e.g., movement of the one or more cameras of the computer system) and at least a portion of a physical environment surrounding the portion of the computer system (e.g., the user turns the his/her head or moves in space while wearing the HMD, and/or the user moves his/her head relative to a display generation component in the physical environment, etc.) (e.g., relative movement of one or more camera of the computer system and the physical environment surrounding the cameras). In response to detecting (12010) the relative movement of the portion of the computer system and the at least the portion of the physical environment: the computer system displays (12012) a view of a second portion of the three-dimensional environment (e.g., the second portion of the three-dimensional environment are next to the first portion of the three-dimensional environment) in accordance with the relative movement of at least the portion of the computer system and at least the portion of the physical environment (e.g., relative movement of one or more camera of the computer system and the physical environment surrounding the cameras). Optionally, the computer ceases to display at least a portion of the view of the three-dimensional environment that was displayed prior to detecting the movement of the portion of the computer system. In response to detecting (12010) the relative movement of the portion of the computer system and the at least the portion of the physical environment: the computer system displays (12014) the second portion of the preview of the first computer-generated experience in the view of the second portion of the three-dimensional environment, the second portion of the preview not having been displayed prior to detecting the relative movement of at least the portion of the computer system and at least the portion of the physical environment (and, optionally, ceasing to display at least a subset of the first portion of the preview of the first computer-generated experience in the view of the three-dimensional environment). This is illustrated in FIGS. 7W-7X, where a different portion of the three-dimensional environment 7112 and a different portion of the three-dimensional environment 7116 are displayed in response to the movement of the display generation component 7100 relative to the physical environment. In some embodiments, the second portion of the preview of the first computer-generated experience occupies a same or substantially the same spatial extent as the first portion of the preview of the first computer-generated experience within the view of the three-dimensional environment. While displaying at least a portion of the preview of the first computer-generated experience (e.g., while displaying the first portion of the preview, the second portion of the preview, or a third portion of the preview that includes subsets of the content from the first and second portions of the preview, etc.), the computer system detects (12016) a second input that meets second criteria (e.g., a tap input detected while a user's gaze of the user is directed to the preview, a predefined activation gesture, a voice command, etc.) (e.g., as illustrated in FIG. 7Y, the input that meets the second criteria is an interaction with the object 7400, representation 7400', or the preview 7412, etc.). In response to detecting the second input that meets the second criteria, the computer system displays (12018) a view of the first computer-generated experience (e.g., displaying the environment 7116) that occupies a greater spatial extent of the view of the three-dimensional environment (e.g., the environment 7112, or another environment) than was occupied by the preview of the first computer-generated experience (e.g., by expanding the preview of the first computer-generated experience and/or by ceasing to display the preview of the first computer-generated experience and replacing it with a view of the first computer-generated experience).

In some embodiments, the first input directed to the first virtual object that meets the first criteria includes movement of a hand in the physical environment, and the first criteria require that the movement of the hand in the physical environment has a first predefined direction (e.g., an upward direction, a direction toward the first virtual object and/or away from the user, etc.) in order for the first criteria to be met. In some embodiments, the first criteria require that the movement of the hand includes movement of a first predefined portion of the hand (e.g., thumb, tip of the thumb, etc.) relative to a second predefined portion (e.g., side of the index finger, middle finger, etc.) of the hand in the first predefined direction while a user's gaze input is directed to the first virtual object. In some embodiments, the first criteria are met by an upward and forward swipe gesture performed by a thumb of a hand relative to the side of the index finger on the same hand. In some embodiments, the first criteria are met by relative movement of the thumb and index finger while the thumb is pointed toward the general direction of the first virtual object. In some embodiments, detecting the first input directed to the first virtual object includes detecting physical interaction between a user's hand and a first physical object that is associated with the first computer-generated experience (e.g., an artifact associated with an AR experience related to the artifact, a toy that has an associated augmented gaming experience, etc.), and the first criteria require the physical contact between the user's hand without causing movement of the first physical object. In some embodiments, the first virtual object is a visual indicator of the availability of the first computer-generated experience associated with the first physical object and displayed at a location in the three-dimensional environment that corresponds to a location of the first physical object in the physical environment. In some embodiments, the first virtual object is an icon (e.g., a document icon, an application icon, a thumbnail image of content, etc.), and the first input that is directed to the first virtual object is an upward swipe gesture that is detected when a user's gaze input is directed to the icon, or the first input that is directed to the first virtual object is a swipe gesture that is detected at a location in the physical environment that corresponds to the position of the first virtual object within the three-dimensional environment. In some embodiments, the first criteria include a first directional criterion (e.g., requiring upward movement of the hand, or movement toward the location of the first virtual object, etc.), a first velocity criterion (e.g., requiring the speed of the hand movement (or the movement speed of at least a predefined portion of the hand) to exceed a first threshold speed, etc.), a location criterion requiring that the hand movement starts at, moves past, or ends at a location that corresponds to a location of the first virtual object in the three-dimensional environment, and/or a first time criteria (e.g., requiring that the hand movement be maintained for at least a threshold amount of time, etc.) to prevent accidentally launching the preview of the first computer-generated experience), etc.

Starting a preview of the first computer-generated experience in response to detecting the first input that meets first criteria requiring that movement of a hand in the physical environment has a first predefined direction provides additional control options without cluttering the user interface with additional displayed controls (e.g., additional displayed controls for starting a preview of the first computer-generated experience). Providing additional control options without cluttering the user interface with additional displayed controls enhances the operability of the device, which, additionally, reduces power usage and improves battery life of the device by enabling the user to use the device more quickly and efficiently.

In some embodiments, in response to detecting the relative movement of the portion of the computer system and the at least the portion of the physical environment, the computer system continuously updates a first viewpoint corresponding to the view of the three-dimensional environment in accordance with the relative movement of at least the portion of the computer system and at least the portion of the physical environment (e.g., relative movement of one or more camera of the computer system and the physical environment surrounding the cameras). In some embodiments, the computer system optionally displays a continuous sequence of views including respective portions of the three-dimensional environment corresponding to the current first viewpoint. In some embodiments, in response to detecting the relative movement of the portion of the computer system and the at least the portion of the physical environment, the computer system continuously updates a second viewpoint corresponding to the preview of the first computer-generated experience within the (currently displayed) view of the three-dimensional environment in accordance with the relative movement of at least the portion of the computer system and at least the portion of the physical environment (e.g., relative movement of one or more camera of the computer system and the physical environment surrounding the cameras). In some embodiments, optionally, the computer system displays a continuous sequence of views including respective portions of the preview corresponding to the current second viewpoint. Continuously updating a first viewpoint corresponding to the view of the three-dimensional environment and optionally a second viewpoint corresponding to the preview of the first computer-generated experience within the currently displayed view of the three-dimensional environment, in accordance with the relative movement of at least the portion of the computer system and at least the portion of the physical environment, provides additional control options without cluttering the user interface with additional displayed controls (e.g., additional displayed controls for displaying different portions of the view of the three-dimensional environment or preview of the first computer-generated experience). Providing additional control options without cluttering the user interface with additional displayed controls enhances the operability of the device, which, additionally, reduces power usage and improves battery life of the device by enabling the user to use the device more quickly and efficiently.

In some embodiments, the second input directed to the first virtual object that meets the second criteria includes a predefined movement of a hand in the physical environment, and the second criteria require that the movement of the hand in the physical environment has less than a first predefined duration in order for the second criteria to be met. In some embodiments, the second criteria require that the movement of the hand includes a tap of a first predefined portion of the hand (e.g., thumb, tip of the thumb, etc.) on a second predefined portion (e.g., side of the index finger, middle finger, etc.) of the hand while a user's gaze input is directed to the preview. In some embodiments, the second criteria are met by downward tap gesture performed by a thumb of a hand relative to the side of the index finger on the same hand. In some embodiments, the second criteria are met by a tap gesture by the index finger on the thumb while the preview is displayed. In some embodiments, detecting the second input directed to the first virtual object includes detecting physical interaction between a user's hand and a first physical object that is associated with the first computer-generated experience (e.g., an artifact associated with an AR experience related to the artifact, a toy that has an associated augmented gaming experience, etc.), and the second criteria require the physical contact between the user's hand to cause movement of the first physical object in order for the second criteria to be met. In some embodiments, the first virtual object is an icon (e.g., a document icon, an application icon, a thumbnail image of content, etc.), and the first input that is directed to the first virtual object is an upward swipe gesture that is detected when a user's gaze input is directed to the icon, or the first input that is directed to the first virtual object is a swipe gesture that is detected at a location in the physical environment that corresponds to the position of the first virtual object within the three-dimensional environment. In some embodiments, the preview is a window or portal into a three-dimensional world and the second input is a tap input that is detected while the user's gaze input is directed to the window or portal, or the second input is another upward swipe gesture by the hand while the user's gaze is directed to the window or portal. In some embodiments, the second criteria include a second directional criterion (e.g., requiring downward movement of the hand, or downward and upward movement of a first portion of the hand relative to another portion of the hand, etc.), a second velocity criterion (e.g., requiring the speed of the hand movement (or the movement speed of at least a predefined portion of the hand) to exceed a second threshold speed, etc.), a location criterion requiring that the hand movement starts at, moves past, or ends at a location that corresponds to a location of the preview in the three-dimensional environment, and/or a second time criteria (e.g., requiring that the hand movement be maintained for less than a threshold amount of time, etc.), etc.

Displaying a view of the first computer-generated experience that occupies a greater spatial extent of the view of the three-dimensional environment than was occupied by the preview of the first computer-generated experience, in response to detecting the second input that meets second criteria requiring that movement of a hand in the physical environment has less than a first predefined duration, provides additional control options without cluttering the user interface with additional displayed controls (e.g., additional displayed controls for displaying the view of the first computer-generated experience). Providing additional control options without cluttering the user interface with additional displayed controls enhances the operability of the device, which, additionally, reduces power usage and improves battery life of the device by enabling the user to use the device more quickly and efficiently.

In some embodiments, the preview of the first computer-generated experience includes virtual content displayed at positions corresponding to respective locations in a corresponding three-dimensional environment (e.g., the same three-dimensional environment as shown before the display of the preview, a different three-dimensional environment from that shown before the display of the preview, etc.). Starting a preview of the first computer-generated experience that includes virtual content displayed at positions corresponding to respective locations in a corresponding three-dimensional environment reduces the number of inputs needed to display the virtual content at appropriate locations (e.g., the user does not need to perform additional inputs to move the virtual content to different locations for better viewing). Reducing the number of inputs needed to perform an operation enhances the operability of the device, which, additionally, reduces power usage and improves battery life of the device by enabling the user to use the device more quickly and efficiently.

In some embodiments, while displaying the view of the first computer-generated experience, the computer system detects a third input that meets third criteria (e.g., criteria for detecting a request to close, exit, and/or pause the first computer-generated experience, etc.). In response to detecting the third input that meets the third criteria, the computer system ceases display of the view of the first computer-generated experience, and the computer system redisplays the preview within the view of the three-dimensional environment. In some embodiments, the computer system shrinks the spatial extent of the first computer-generated experience to the previous spatial extent of the preview. In some embodiments, the currently displayed content of the first computer-generated experience is at least partially retained in the preview. In some embodiments, the original preview content is redisplayed in the preview. Ceasing display of the view of the first computer-generated experience and redisplaying the preview of the first computer-generated experience, in response to detecting the third input that meets the third criteria, reduces the number of inputs needed to redisplay the preview (e.g., the user does not need to perform separate inputs for ceasing display of the view of the first computer-generated experience and for redisplaying the preview). Reducing the number of inputs needed to perform an operation enhances the operability of the device, which, additionally, reduces power usage and improves battery life of the device by enabling the user to use the device more quickly and efficiently.

In some embodiments, the first computer-generated experience includes a first sequence of three-dimensional content corresponding to a first playback duration, and the preview of the first computer-generated experience includes a second sequence of three-dimensional content corresponds to a second playback duration that is shorter than the first playback duration. For example, in some embodiments, the first computer-generated experience is a full-length three-dimensional movie, and the preview is a redacted version of the full-length three-dimensional movie or a trailer of the three-dimensional movie. In some embodiments, the first computer-generated experience is an electronic game, and the preview is an interactive trial level of the electronic game, an automatic demonstration of the features of the game, etc. Starting a preview of the first computer-generated experience that includes a second sequence of three-dimensional content corresponding to a second playback duration that is shorter than a first playback duration corresponding to a first sequence of three-dimensional content included in the first computer-generated experience, provides improved visual feedback to the user (e.g., improved visual feedback, via the shorter playback duration, that the second sequence of three-dimensional content corresponds is a preview). Providing improved feedback enhances the operability of the device, which, additionally, reduces power usage and improves battery life of the device by enabling the user to use the device more quickly and efficiently.

In some embodiments, the spatial extent of the preview of the first computer-generated experience is less than a spatial extent of the first computer-generated experience. In some embodiments, the first application/first computer-generated experience fully surrounds a user (e.g., fills the three-dimensional environment), and the preview of the first computer generated experience only partially surrounds the user. Starting a preview of the first computer-generated experience, wherein the spatial extent of the preview of the first computer-generated experience is less than a spatial extent of the first computer-generated experience provides improved visual feedback to the user (e.g., improved visual feedback, via the lesser spatial extent, that the user is viewing a preview of the first computer-generated experience rather than the full first computer-generated experience). Providing improved feedback enhances the operability of the device, which, additionally, reduces power usage and improves battery life of the device by enabling the user to use the device more quickly and efficiently.

It should be understood that the particular order in which the operations in FIGS. 12A-12B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, and 13000) are also applicable in an analogous manner to method 12000 described above with respect to FIGS. 12A-12B. For example, the gestures, gaze inputs, physical objects, user interface objects, controls, movements, criteria, three-dimensional environment, display generation component, surface, representation of physical object, virtual objects, and/or animations described above with reference to method 12000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, 11000, and 13000). For brevity, these details are not repeated here.

Figure 13:
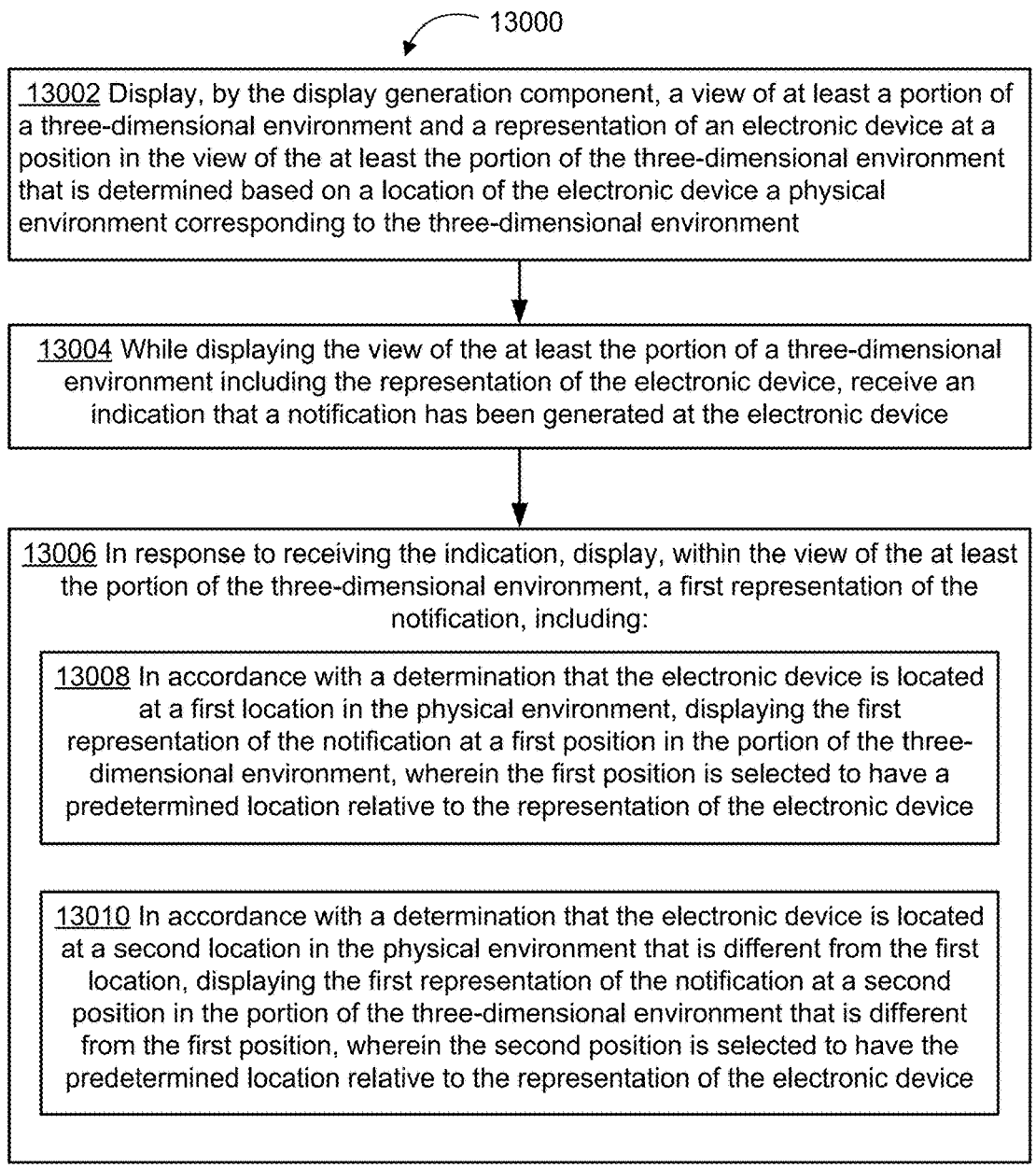
FIG. 13 is a flowchart of a method of displaying a representation of a notification in a three-dimensional environment at a position that has a predetermine spatial relationship relative to a representation of an electronic device, in accordance with some embodiments.

FIG. 13 is a flowchart of a method of displaying a representation of a notification in a three-dimensional environment at a position that has a predetermine spatial relationship relative to a representation of an electronic device, in accordance with some embodiments.

In some embodiments, the method 13000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 13000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 13000 are, optionally, combined and/or the order of some operations is, optionally, changed.

In some embodiments, the method 13000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.).

In the method 13000, the computer system displays (13002), by the display generation component, a view of at least a portion of a three-dimensional environment (e.g., environment 7118 in FIG. 7AB, or another three-dimensional environment, etc.) (e.g., a virtual environment or an augmented reality environment) and a representation of an electronic device (e.g., representation 7432' of the electronic device 7432, or another representation, etc.) at a position in the view of the at least the portion of the three-dimensional environment that is determined based on a location of the electronic device (e.g., electronic device 7432 in FIG. 7AA) in a physical environment (e.g., scene 105 in FIG. 7AA) (e.g., the electronic device is on a desk, on a shelf, on the bed, in a person's hand, on a person's wrist, or on a user's palm, etc.) corresponding to the three-dimensional environment. In some embodiments, the electronic device is a computer system that has a non-immersive display environment (e.g., a touch screen of the computer system) that provides access to a plurality of different applications and that displays notifications for those different applications in the non-immersive display environment. In some embodiments, the computer system is a physical handheld electronic device that displays small pop-up notifications on the touch-screen as the notifications are generated or received by the handheld electronic device in response to predefined trigger events. In some embodiments, the representation of the computer system is displayed at a position in the view of the three-dimensional environment that corresponds to a physical location of computer system in the physical environment (e.g., in a user's head, user's hand, or on a desktop, etc.). While displaying the view of the at least the portion of a three-dimensional environment (e.g., a virtual environment or an augmented reality environment) including the representation of the electronic device, the computer system receives (13004) an indication that a notification has been generated at the electronic device (e.g. in response to the occurrence of a predetermined event) (e.g., the electronic device optionally transmits and the computer system receives the indication that a notification has been generated or received at the electronic device). For example, as illustrated in FIG. 7AA, a notification is received at electronic device 7432, and the electronic device 7432 sends the indication to the computer system. In response to receiving the indication, the computer system displays (13006), within the view of the at least the portion of the three-dimensional environment, a first representation of the notification, including: 54. in accordance with a determination that the electronic device is located at a first location in the physical environment, displaying (13008) the first representation of the notification (e.g., including some or all of the content of the notification) at a first position in the portion of the three-dimensional environment, wherein the first position is selected to have a predetermined location relative to the representation of the electronic device (e.g., the notification is displayed above or over the representation of the computer system, and/or is within a first proximity of the representation of the computer system); and in accordance with a determination that the electronic device is located at a second location in the physical environment that is different from the first location, displaying (13010) the first representation of the notification (e.g., including some or all of the content of the notification) at a second position in the portion of the three-dimensional environment that is different from the first position, wherein the second position is selected to have the predetermined location relative to the representation of the electronic device (e.g., the notification is displayed above or over the representation of the computer system, and/or is within a first proximity of the representation of the computer system). In some embodiments, the first representation of the notification includes a virtual object (e.g., a banner or pop-up overlay) that includes the content of the notification (e.g., a blurb of text and/or a thumbnail image of a communication or event and a corresponding application icon) that would have been or is displayed on the screen of the electronic device. In some embodiments, the first representation of the notification is optionally larger in size than the width of the representation of the electronic device, and thus would not fit within the screen of the electronic device as shown in the three-dimensional environment. In some embodiments, the first representation of the notification is optionally a redacted version of the notification that would have been shown on the electronic device (e.g., the first representation only shows the application icon or the sender's ID, and not the content of the message or event).

In some embodiments, while displaying, within the view of the at least the portion of the three-dimensional environmental, the first representation of the notification, the computer system detects a respective user input that includes movement of a hand in the physical environment, and in response to detecting the respective user input, the computer system performs a respective operation with respect to the notification in accordance with the respective input. Performing a respective operation with respect to the notification in response to detecting the respective user input that includes movement of a hand in the physical environment, and in accordance with the respective user input, provides additional control options without cluttering the user interface with additional displayed controls (e.g., additional displayed controls for performing the respective operation). Providing additional control options without cluttering the user interface with additional displayed controls enhances the operability of the device, which, additionally, reduces power usage and improves battery life of the device by enabling the user to use the device more quickly and efficiently.

In some embodiments, performing the respective operation with respect to the notification in accordance with the respective input includes: in accordance with a determination that the respective user input meets first criteria (e.g., notification-clearing criteria), wherein the first criteria require that the movement of the hand in the physical environment has a first direction in order for the first criteria to be met, ceasing to display the first representation of the notification within the view of the at least the portion of the three-dimensional environment. In some embodiments, the first representation of the notification fades away (or shrinks down into the representation of the electronic device) in the view of the at least the portion of the three-dimensional environment). In some embodiments, in conjunction with ceasing to display the first representation of the notification in the three-dimensional environment, the computer system sends an instruction to the electronic device that causes the electronic device to clear the notification on the electronic device (e.g., clear the notification on the screen of the electronic device, storing the notification in a notification history kept by the electronic device, and/or delete the notification from the electronic device, etc.). In some embodiments, the respective user input that meets the first criteria include an in-air downward wave of the user's hand, optionally in combination with a user's gaze input directed to the first representation of the notification in the three-dimensional environment, a downward swipe gesture on a physical surface at a location corresponding to the position of the first representation of the notification in the three-dimensional environment, a downward swipe on a nearby physical surface (e.g., a desktop, the user's lap, or the user's other hand, etc.) that is not the resting surface of the electronic device, or a downward swipe on a nearby physical surface at a location (e.g., a location near the user's hand) that is not near the location of the electronic device, etc. In some embodiment, the first criteria have a first directional criterion (e.g., requiring downward movement of the hand, or movement toward the location of the electronic device, etc.), a first velocity criterion (e.g., requiring the speed of the hand movement to exceed a first threshold speed, etc.), and/or a location criterion requiring that the hand movement starts at a location corresponding to the position of the first representation of the notification and moving toward the location of the electronic device, or swiping downward past the location corresponding to the position of the first representation of the notification, etc.

Ceasing to display the first representation of the notification in accordance with a determination that the respective user input meets first criteria requiring movement of the hand in the physical environment has a first direction, provides additional control options without cluttering the user interface with additional displayed controls (e.g., additional displayed controls for ceasing to display the first representation of the notification). Providing additional control options without cluttering the user interface with additional displayed controls enhances the operability of the device, which, additionally, reduces power usage and improves battery life of the device by enabling the user to use the device more quickly and efficiently.

In some embodiments, performing the respective operation with respect to the notification in accordance with the respective input includes: in accordance with a determination that the respective user input meets second criteria (e.g., notification-expansion criteria), wherein the second criteria require that the movement of the hand in the physical environment has a second direction (e.g., the second direction is opposite of the first direction) in order for the second criteria to be met, displaying (e.g., replacing the first representation of the notification with, or leaving a reduced version of the first representation next to the representation of the electronic device) a second representation of the notification (e.g., the second representation of the notification includes different font size and displaying enlarged version of the content of shown in the first version of the notification), wherein the second representation of the notification includes an expanded version (e.g., expanded merely in size (e.g., increasing size of the text and graphics), or expanded by including additional textual or graphical content as compared to the first representation of the notification) of the content shown in the first representation of the notification. In some embodiments the respective user input that meets the second criteria is an in-air upward wave of the user's hand, optionally in combination with a user's gaze input directed to the first representation of the notification in the three-dimensional environment, an upward swipe gesture on a physical surface at a location corresponding to the position of the first representation of the notification in the three-dimensional environment, an upward swipe on a nearby physical surface (e.g., a desktop, the user's lap, or the user's other hand, etc.) that is not the resting surface of the electronic device, or an upward swipe on a nearby physical surface at a location (e.g., a location near the user's hand) that is not near the location of the electronic device, etc. In some embodiments, the second criteria have a second directional criterion (e.g., requiring upward movement of the hand, or movement in an upward direction relative to the orientation of the electronic device, etc.), a second velocity criterion (e.g., requiring the speed of the hand movement to exceed a second threshold speed, etc.), and/or a location criterion requiring that the hand movement starts at a location corresponding to a position below the position of the first representation of the notification and moving upward relative to the location of the electronic device, or swiping upward past the location corresponding to the position of the first representation of the notification, etc.

Displaying a second representation of the notification that includes an expanded version of the content shown in the first representation of the notification, in accordance with a determination that the respective user input meets second criteria, requiring movement of the hand in the physical environment in a second direction, provides additional control options without cluttering the user interface with additional displayed controls (e.g., additional displayed controls for displaying an expanded version of the content). Providing additional control options without cluttering the user interface with additional displayed controls enhances the operability of the device, which, additionally, reduces power usage and improves battery life of the device by enabling the user to use the device more quickly and efficiently.

In some embodiments, displaying the second representation of the notification includes displaying an animated transition that shows the first representation of the notification transforming into the second representation of the notification in the three-dimensional environment by moving from a first position (e.g., the position is selected to have the predetermined location relative to the representation of the electronic device) to a second position (e.g., the center of the field of view of the user) within the three-dimensional environment. In some embodiments, moving from a first position to a second position within the three-dimensional environment includes moving closer to a viewpoint corresponding to the view of the three-dimensional environment (e.g., the first representation of the notification becomes larger by moving closer to the user's eyes in the three-dimensional environment (e.g., to the center of the field of view of the user)). Displaying an animated transition that shows the first representation of the notification transforming into the second representation of the notification in the three-dimensional environment by moving from a first position to a second position within the three-dimensional environment provides improved visual feedback to the user (e.g., improved visual feedback that the movement of the user's hand satisfies second criteria, improved visual feedback that the computer system is displaying an expanded version of the content, etc.). Providing improved feedback enhances the operability of the device, which, additionally, reduces power usage and improves battery life of the device by enabling the user to use the device more quickly and efficiently.

In some embodiments, displaying the second representation of the notification includes displaying an animated transition that shows the first representation of the notification transforming into the second representation of the notification in the three-dimensional environment by spatially expanding in the three-dimensional environment (e.g., the first representation of the notification becomes larger by scaling up uniformly). Displaying an animated transition that shows the first representation of the notification transforming into the second representation of the notification by spatially expanding in the three-dimensional environment provides improved visual feedback to the user (e.g., improved visual feedback that the movement of the user's hand satisfies second criteria, improved visual feedback that the computer system is displaying an expanded version of the content, etc.). Providing improved feedback enhances the operability of the device, which, additionally, reduces power usage and improves battery life of the device by enabling the user to use the device more quickly and efficiently.

In some embodiments, while displaying, within the view of the at least the portion of the three-dimensional environmental, the second representation of the notification, the computer system detects a movement of the display generation component relative to the physical environment. In response to detecting the movement of the display generation component relative to the physical environment (e.g., due to movement of the user wearing the HMD (e.g., walking around, or turning his/her head)), the computer system changes the view of the three-dimensional environment in accordance with the movement of the display generation component relative to the physical environment, and in conjunction with changing the view of the three-dimensional environment, the computer system maintains a position of the second representation of the notification relative to a field of view provided by the display generation component. In some embodiments, when the notification is expanded in response to user input, the position of the representation of the notification is dissociated from the location of the electronic device, and is moved to be displayed at a predefined position (e.g., in the center) in the field of view of the display generation component (e.g., locked to the display of the HMD), and when the user subsequent moves the display generation component in the physical environment, the view of the three-dimensional environment changes, but the representation of the notification remains in the center of the field of view of the display generation component (e.g., still displayed at the center of the view and at a fixed distance from the viewpoint corresponding to the view).

Changing the view of the three-dimensional environment in accordance with the movement of the display generation component relative to the physical environment, in conjunction with maintaining a position of the second representation of the notification relative to a field of view provided by the display generation component, in response to detecting the movement of the display generation component relative to the physical environment, reduces the number of inputs needed to display the second representation of the notification at a desired location (e.g., the user does not need to move the second representation of the notification each time the display generation component moves). Reducing the number of inputs needed to perform an operation enhances the operability of the device, which, additionally, reduces power usage and improves battery life of the device by enabling the user to use the device more quickly and efficiently.

In some embodiments, while displaying, within the view of the at least the portion of the three-dimensional environmental, the second representation of the notification, the computer system detects a movement of the electronic device relative to the physical environment (e.g., due to movement of the electronic device, or due to movement of a part of the user's body (e.g., the user's arm, wrist, or hand) on which the electronic device is attached, etc.). In response to detecting the movement of the electronic device relative to the physical environment, the computer system changes a respective position of the representation of the electronic device in the view of the three-dimensional environment in accordance with the movement of the electronic device relative to the physical environment, and in conjunction with changing the respective position of the representation of the electronic device in the view of the three-dimensional environment, the computer system maintains a position of the second representation of the notification relative to a field of view provided by the display generation component. For example, when the notification is expanded in response to user input, the position of the representation of the notification is dissociated from the location of the electronic device, and is moved to be displayed at a predefined position (e.g., in the center) in the field of view of the display generation component (e.g., locked to the display of the HMD); and when the electronic device subsequently moves in the physical environment, the position of the representation of the electronic device changes in the view of the three-dimensional environment changes, but the representation of the notification remains in the center of the field of view of the display generation component (e.g., still displayed at the center of the view and at a fixed distance from the viewpoint corresponding to the view).

Changing a respective position of a representation of the electronic device in the view of the three-dimensional environment in accordance with the movement of the electronic device relative to the physical environment, in conjunction with maintaining a position of the second representation of the notification relative to a field of view provided by the display generation component, in response to detecting the movement of the electronic device relative to the physical environment, reduces the number of inputs needed to display the second representation of the notification at a desired location (e.g., the user does not need to move the second representation of the notification each time the electronic device moves). Reducing the number of inputs needed to perform an operation enhances the operability of the device, which, additionally, reduces power usage and improves battery life of the device by enabling the user to use the device more quickly and efficiently.

In some embodiments, while displaying, within the view of the at least the portion of the three-dimensional environment, the second representation of the notification (e.g., the first representation of the notification is no longer displayed, and the second representation of the notification is not locked to the location of the electronic device), the computer system detects a change in orientation of the electronic device in the physical environment (e.g., the electronic device in the physical world is changed from a landscape orientation to a portrait orientation, or vice versa (e.g., the electronic device is rotated by the user's hand)). In response to detecting the change in the orientation of the electronic device in the physical environment, the computer system maintains display of the second representation of the notification (e.g., at the same position as before the rotation of the electronic device), and the computer system displays (e.g., begins display of) a first virtual keyboard at a predetermined position, wherein the predetermined position corresponds to the location of the electronic device (e.g., displaying the virtual keyboard next to the representation of the electronic device such that the virtual keyboard appears to be attached to the electronic device in the view of the at least the portion of the three-dimensional environment, or replacing the representation of the electronic device with the virtual keyboard). In some embodiments, the virtual keyboard is displayed at a position that corresponds to the location of the electronic device with a touch-sensitive surface or touch-screen, so the locations of the user touch inputs on the touch-sensitive surface or touch-screen can be more accurately determined than touch inputs on a non-touch-sensitive surface such as a table top or locations of in-air gestures; and the user's inputs are more accurately mapped to the virtual keys on the virtual keyboard based on the locations of the touch inputs.

Maintaining display of the second representation of the notification and furthermore displaying a first virtual keyboard at a predetermined position corresponding to the location of the electronic device, in response to detecting the change in orientation of the electronic device, reduces the number of inputs needed to display the first virtual keyboard at an appropriate location (e.g., the user does not need to perform a separate input to display the first virtual keyboard, or a separate input to move the first virtual keyboard to a position that is easy to interact with). Reducing the number of inputs needed to perform an operation enhances the operability of the device, which, additionally, reduces power usage and improves battery life of the device by enabling the user to use the device more quickly and efficiently.

In some embodiments, performing the respective operation with respect to the notification in accordance with the respective input includes: in accordance with a determination that the respective user input meets third criteria (e.g., notification-reply criteria), wherein the third criteria require that the movement of the hand in the physical environment rotates the electronic device (e.g., the electronic device is rotated from a portrait orientation to a landscape orientation, or from a landscape orientation to a portrait orientation) in order for the third criteria to be met, displaying a virtual keyboard with a respective representation of the notification (e.g., the first representation or the second representation of the notification). Displaying a virtual keyboard with a respective representation of the notification in accordance with a determination that the respective user input meets third criteria, requiring that movement of the hand in the physical environment rotates the electronic device, provides additional control options without cluttering the user interface with additional displayed controls (e.g., additional displayed controls for displaying a virtual keyboard). Providing additional control options without cluttering the user interface with additional displayed controls enhances the operability of the device, which, additionally, reduces power usage and improves battery life of the device by enabling the user to use the device more quickly and efficiently.

In some embodiments, the virtual keyboard is displayed at a position in the view of the three-dimensional environment that corresponds to the location of the electronic device (e.g., the virtual keyboard replaces the representation of the electronic device in the view of the three-dimensional environment). In some embodiments, the first representation of the notification is expanded into the second representation of the notification and displayed at with a fixed spatial relationship relative to the virtual keyboard, or in the center of the field of view of the display generation component. In some embodiments, the user can touch the surface of the electronic device at locations corresponding to the positions of the keys on the virtual keyboard to type a reply message for the message represented in the notification. Displaying the virtual keyboard at a position in the first view of the three-dimensional environment that corresponds to the location of the electronic device reduces the number of inputs needed to display the virtual keyboard at an appropriate location (e.g., the user does not need to perform an additional input to move the virtual keyboard to a position that is easy to interact with). Reducing the number of inputs needed to perform an operation enhances the operability of the device, which, additionally, reduces power usage and improves battery life of the device by enabling the user to use the device more quickly and efficiently.

In some embodiments, the virtual keyboard is displayed at a position in the view of the three-dimensional environment that corresponds to a location of a physical object (e.g., a desk surface near the user's hand, the user's hand, etc.) other than the electronic device in the physical environment. In some embodiments, the first representation of the notification is expanded into the second representation of the notification and displayed at with a fixed spatial relationship relative to the virtual keyboard, or in the center of the field of view of the display generation component. In some embodiments, the user can touch the surface of the a nearby physical surface (e.g., the user's lap, or a desk) at locations corresponding to the positions of the keys on the virtual keyboard to type a reply message for the message represented in the notification. Displaying the virtual keyboard at a position in the first view of the three-dimensional environment that corresponds to the location of a physical object (other than the electronic device) reduces the number of inputs needed to display the virtual keyboard at an appropriate location (e.g., the user does not need to perform an additional input to move the virtual keyboard to a position that is easy to interact with). Reducing the number of inputs needed to perform an operation enhances the operability of the device, which, additionally, reduces power usage and improves battery life of the device by enabling the user to use the device more quickly and efficiently.

In some embodiments, performing the respective operation with respect to the notification in accordance with the respective input includes: in accordance with a determination that the respective user input meets fourth criteria (e.g., notification-auto-play criteria), wherein the fourth criteria require that the movement of the hand in the physical environment raises a wrist connected to the hand (e.g., if the electronic device is a watch, the fourth criteria require the movement of the hand to raise the wrist that wears the watch (e.g., toward the user's face)) in order for the fourth criteria to be met, generating an audio output corresponding to content of the notification (e.g., playing back an audio version of a text message, or reading out textual content of the notification, auto-play an audio message, auto-play a media file attached in the message for which the notification was generated, displaying a movie (or a preview thereof) associated with the notification, etc.) in the three-dimensional environment. Generating an audio output corresponding to content of the notification in the three-dimensional environment, in accordance with a determination that the respective user input meets fourth criteria, requiring movement of the user's hand in the physical environment that includes raising a wrist connected to the hand, provides improved audio feedback to the user (e.g., improved audio feedback that the movement of the user's hand meets fourth criteria). Providing improved feedback enhances the operability of the device, which, additionally, reduces power usage and improves battery life of the device by enabling the user to use the device more quickly and efficiently.

In some embodiments, the fourth criteria require that the wrist be maintained in a raised position for at least a threshold amount of time in order for the fourth criteria to be met. For example, in some embodiments, there is a time delay between the user raising a wrist and the playing of the message. For example, the user has to hold up the wrist for a predefined period of time before the message starts to play—to prevent accidentally playing the message when the user merely moves his/her hand incidentally. Generating an audio output corresponding to content of the notification in the three-dimensional environment, in accordance with a determination that the respective user input meets fourth criteria, requiring that movement of the hand in the physical environment include raising a wrist connected to the hand and that the wrist be maintained in a raised position for at least a threshold amount of time, provides improved audio feedback to the user (e.g., improved audio feedback that the movement of the user's hand meets fourth criteria). Providing improved feedback enhances the operability of the device, which, additionally, reduces power usage and improves battery life of the device by enabling the user to use the device more quickly and efficiently.

In some embodiments, the fourth criteria require that a user's gaze input is detected in conjunction with the user's wrist being raised (e.g., along with movement of the user's hand), and that the user's gaze input is directed to the first representation of the notification in the three-dimensional environment. For example, in some embodiments, the user is required to gaze directly at the first/second representation of the notification while raising the user's wrist for the auto-play function of the notification to be triggered. In some embodiments, when the notification is for a message from another user, an animated character such as an virtual avatar (e.g., a human shaped, or a non-human shaped character or avatar, etc.) corresponding to the sender of the message is displayed to appear to speak the message associated with the notification. Generating an audio output corresponding to content of the notification in the three-dimensional environment, in accordance with a determination that the respective user input meets fourth criteria requiring that a gaze input is detected in conjunction with the user's wrist being raised, provides improved audio feedback to the user (e.g., improved audio feedback that the movement of the user's hand meets fourth criteria). Providing improved feedback enhances the operability of the device, which, additionally, reduces power usage and improves battery life of the device by enabling the user to use the device more quickly and efficiently.

In some embodiments, after the audio output is completed, the computer system detects a voice input from a user, and in response to detecting the voice input from the user, and in accordance with a determination that the voice input meets sixth criteria (e.g., reply-recording criteria), the computer system records the user voice input as a reply to a message associated with the notification. In some embodiments, recording the user voice input as a reply occurs when the user speaks while looking at the talking avatar (e.g., a human shaped, or a non-human shaped character or avatar, etc.) after the avatar finishes speaking the message associated with the message. In some embodiments, if an animated character has previously been displayed while playing the message associated with the notification, detecting the user voice input and starting the recording cause the animated character to disappear from the view of the three-dimensional environment. Recording the user voice input as a reply to a message associated with the notification in response to detecting the voice input from the user, after audio playback of the message is completed, provides additional control options without cluttering the user interface with additional displayed controls (e.g., additional displayed controls for replying to the message associated with the notification). Providing additional control options without cluttering the user interface with additional displayed controls enhances the operability of the device, which, additionally, reduces power usage and improves battery life of the device by enabling the user to use the device more quickly and efficiently.

It should be understood that the particular order in which the operations in FIG. 13 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, and 12000) are also applicable in an analogous manner to method 13000 described above with respect to FIG. 13. For example, the gestures, gaze inputs, physical objects, user interface objects, controls, movements, criteria, three-dimensional environment, display generation component, surface, representation of physical object, virtual objects, and/or animations described above with reference to method 13000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, 11000, and 12000). For brevity, these details are not repeated here.

The operations described above with reference to FIGS. 8, 9, 10, 11, 12, and 13 are, optionally, implemented by components depicted in FIGS. 1-6. In some embodiments, aspects/operations of methods 8000, 9000, 10000, 11000, 12000, and 13000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at a computer system that is in communication with a display generation component and one or more input devices:
      displaying, via the display generation component, a first view of a three-dimensional environment;
      while the first view of the three-dimensional environment is being displayed, detecting a first movement of a first hand that meets first criteria;
      in response to detecting the first movement of the first hand that meets the first criteria, displaying, via the display generation component, a first virtual object that includes a first plurality of selectable controls at a first position in the first view of the three-dimensional environment, wherein the first position corresponds to a location of the first hand after the first movement in a physical environment;
      while displaying, via the display generation component, the first virtual object at the first position, detecting a second movement of the first hand;
      in response to detecting the second movement of the first hand, maintaining display of the first virtual object that includes the first plurality of selectable controls at the first position while a representation of the first hand moves in the first view of the three-dimensional environment in accordance with the second movement of the first hand relative to the first virtual object in the first view of the three-dimensional environment;
      after detecting the second movement of the first hand, and while displaying the first virtual object at the first position in the first view of the three-dimensional environment, detecting movement of at least a first portion of the computer system; and
      in response to detecting the movement of at least the first portion of the computer system, displaying a second view of the three-dimensional environment that is different from the first view of the three-dimensional environment and displaying the first virtual object at a second position in the second view of the three-dimensional environment, wherein the first position at which the first virtual object was displayed in response to the first movement of the first hand, and the second position, at which the first virtual object is displayed in response to the movement of the first portion of the computer system, correspond to different portions of the three-dimensional environment.

2. The method of claim 1, wherein detecting the second movement of the first hand includes detecting a swipe gesture by the first hand in the physical environment, and the method includes:
   in response to detecting the swipe gesture by the first hand and in accordance with a determination that the first hand is in a first configuration during the swipe gesture, moving input focus from a first selectable control in the first virtual object to a second selectable control different from the first selectable control in the first virtual object in accordance with the second movement of the first hand.

3. The method of claim 1, wherein detecting the second movement of the first hand includes detecting a swipe gesture by the first hand in the physical environment, and the method includes:
   in response to detecting the swipe gesture by the first hand and in accordance with a determination that the first hand is in a second configuration during the swipe gesture, displaying a second plurality of selectable controls that were not included in the first virtual object prior to detecting the swipe gesture by the first hand in the second configuration.

4. The method of claim 1, wherein detecting the second movement of the first hand includes detecting a push gesture by the first hand and the method includes:
   in response to detecting the push gesture by the first hand and in accordance with a determination that the push gesture meets activation criteria, selecting a respective selectable control of the first plurality of selectable controls in the first virtual object.

5. The method of claim 4, including:
   in response to detecting the push gesture by the first hand, moving the first virtual object in the first view of the three-dimensional environment in accordance with the movement of the first hand during the push gesture.

6. The method of claim 1, including:
   in response to detecting the second movement of the first hand:
      in accordance with a determination that the second movement of the first hand corresponds to placing the first hand into a third configuration, performing a first operation with respect to the first virtual object; and
      in accordance with a determination that the second movement of the first hand corresponds to placing the first hand into a fourth configuration that is different from the third configuration, performing a second operation that is different from the first operation with respect to the first virtual object.

7. The method of claim 1, wherein displaying, via the display generation component, the first view of the three-dimensional environment includes displaying a mixed-reality environment of a first application, and wherein displaying the first virtual object includes replacing or blocking a view of at least a portion of the mixed-reality environment of the first application.

8. The method of claim 1, wherein displaying the first virtual object that includes the first plurality of selectable controls includes:
in accordance with a determination that the three-dimensional environment corresponds to an environment of a first application, including a first set of selectable controls corresponding to the first application among the first plurality of selectable controls; and
in accordance with a determination that the three-dimensional environment corresponds to an environment of a second application different from the first application, including a second set of selectable controls corresponding to the second application, different from the first set of selectable controls corresponding to the first application, among the first plurality of selectable controls.

9. The method of claim 1, wherein the three-dimensional environment includes a mixed reality environment of a first application, and wherein the method includes:
while displaying the first virtual object within the first view of the three-dimensional environment, detecting a third movement of the first hand; and
in response to detecting the third movement of the first hand and in accordance with a determination that the third movement of the first hand meets preset criteria for exiting the first application, ceasing to display the first virtual object and the first view of the three-dimensional environment, and displaying a view of the physical environment and a home menu that includes respective selectable controls for activating different applications.

10. The method of claim 1, wherein:
the first view of the three-dimensional environment corresponds to a first viewpoint and the second view of the three-dimensional environment corresponds to a second viewpoint different from the first viewpoint; and
the first virtual object displayed at the first position in the first view of the three-dimensional environment has a first spatial relationship with the first viewpoint, and the first virtual object displayed at the second position in the second view of the three-dimensional environment has the first spatial relationship with the second viewpoint.

11. A computer system, comprising:
a display generation component;
one or more input devices;
one or more processors; and
memory storing one or more programs, wherein the one or more programs are configured to be executed by the one or more processors, the one or more programs including instructions for:
displaying, via the display generation component, a first view of a three-dimensional environment;
while the first view of the three-dimensional environment is being displayed, detecting a first movement of a first hand that meets first criteria;
in response to detecting the first movement of the first hand that meets the first criteria, displaying, via the display generation component, a first virtual object that includes a first plurality of selectable controls at a first position in the first view of the three-dimensional environment, wherein the first position corresponds to a location of the first hand after the first movement in a physical environment;
while displaying, via the display generation component, the first virtual object at the first position, detecting a second movement of the first hand;
in response to detecting the second movement of the first hand, maintaining display of the first virtual object that includes the first plurality of selectable controls at the first position while a representation of the first hand moves in the first view of the three-dimensional environment in accordance with the second movement of the first hand relative to the first virtual object in the first view of the three-dimensional environment;
after detecting the second movement of the first hand, and while displaying the first virtual object at the first position in the first view of the three-dimensional environment, detecting movement of at least a first portion of the computer system; and
in response to detecting the movement of at least the first portion of the computer system, displaying a second view of the three-dimensional environment that is different from the first view of the three-dimensional environment and displaying the first virtual object at a second position in the second view of the three-dimensional environment, wherein the first position at which the first virtual object was displayed in response to the first movement of the first hand, and the second position, at which the first virtual object is displayed in response to the movement of the first portion of the computer system, correspond to different positions of the three-dimensional environment.

12. The computer system of claim 11, wherein detecting the second movement of the first hand includes detecting a swipe gesture by the first hand in the physical environment, and wherein the one or more programs include instructions for:
in response to detecting the swipe gesture by the first hand and in accordance with a determination that the first hand is in a first configuration during the swipe gesture, moving input focus from a first selectable control in the first virtual object to a second selectable control different from the first selectable control in the first virtual object in accordance with the second movement of the first hand.

13. The computer system of claim 11, wherein detecting the second movement of the first hand includes detecting a swipe gesture by the first hand in the physical environment, and wherein the one or more programs include instructions for:
in response to detecting the swipe gesture by the first hand and in accordance with a determination that the first hand is in a second configuration during the swipe gesture, displaying a second plurality of selectable controls that were not included in the first virtual object prior to detecting the swipe gesture by the first hand in the second configuration.

14. The computer system of claim 11, wherein detecting the second movement of the first hand includes detecting a push gesture by the first hand, and wherein the one or more programs include instructions for:
in response to detecting the push gesture by the first hand and in accordance with a determination that the push gesture meets activation criteria, selecting a respective selectable control of the first plurality of selectable controls in the first virtual object.

15. The computer system of claim 14, wherein the one or more programs include instructions for:
in response to detecting the push gesture by the first hand, moving the first virtual object in the first view of the three-dimensional environment in accordance with the movement of the first hand during the push gesture.

16. The computer system of claim 11, wherein the one or more programs include instructions for:
in response to detecting the second movement of the first hand:
in accordance with a determination that the second movement of the first hand corresponds to placing the first hand into a third configuration, performing a first operation with respect to the first virtual object; and
in accordance with a determination that the second movement of the first hand corresponds to placing the first hand into a fourth configuration that is different from the third configuration, performing a second operation that is different from the first operation with respect to the first virtual object.

17. The computer system of claim 11, wherein displaying, via the display generation component, the first view of the three-dimensional environment includes displaying a mixed-reality environment of a first application, and wherein displaying the first virtual object includes replacing or blocking a view of at least a portion of the mixed-reality environment of the first application.

18. The computer system of claim 11, wherein displaying the first virtual object that includes the first plurality of selectable controls includes:
in accordance with a determination that the three-dimensional environment corresponds to an environment of a first application, including a first set of selectable controls corresponding to the first application among the first plurality of selectable controls; and
in accordance with a determination that the three-dimensional environment corresponds to an environment of a second application different from the first application, including a second set of selectable controls corresponding to the second application, different from the first set of selectable controls corresponding to the first application, among the first plurality of selectable controls.

19. The computer system of claim 11, wherein the three-dimensional environment includes a mixed reality environment of a first application, and wherein the one or more programs include instructions for:
while displaying the first virtual object within the first view of the three-dimensional environment, detecting a third movement of the first hand; and
in response to detecting the third movement of the first hand and in accordance with a determination that the third movement of the first hand meets preset criteria for exiting the first application, ceasing to display the first virtual object and the first view of the three-dimensional environment, and displaying a view of the physical environment and a home menu that includes respective selectable controls for activating different applications.

20. The computer system of claim 11, wherein:
the first view of the three-dimensional environment corresponds to a first viewpoint and the second view of the three-dimensional environment corresponds to a second viewpoint different from the first viewpoint; and
the first virtual object displayed at the first position in the first view of the three-dimensional environment has a first spatial relationship with the first viewpoint, and the first virtual object displayed at the second position in the second view of the three-dimensional environment has the first spatial relationship with the second viewpoint.

21. A non-transitory computer readable storage medium storing one or more programs, the one or more programs comprising instructions that, when executed by a computer system that includes a display generation component and one or more input devices, cause the computer system to:
display, via the display generation component, a first view of a three-dimensional environment;
while the first view of the three-dimensional environment is being displayed, detect a first movement of a first hand that meets first criteria;
in response to detecting the first movement of the first hand that meets the first criteria, displaying, via the display generation component, a first virtual object that includes a first plurality of selectable controls at a first position in the first view of the three-dimensional environment, wherein the first position corresponds to a location of the first hand after the first movement in a physical environment;
while displaying, via the display generation component, the first virtual object at the first position, detect a second movement of the first hand;
in response to detecting the second movement of the first hand, maintain display of the first virtual object that includes the first plurality of selectable controls at the first position while a representation of the first hand moves in the first view of the three-dimensional environment in accordance with the second movement of the first hand relative to the first virtual object in the first view of the three-dimensional environment;
after detecting the second movement of the first hand, and while displaying the first virtual object at the first position in the first view of the three-dimensional environment, detect movement of at least a first portion of the computer system; and
in response to detecting the movement of at least the first portion of the computer system, display a second view of the three-dimensional environment that is different from the first view of the three-dimensional environment and display the first virtual object at a second position in the second view of the three-dimensional environment, wherein the first position at which the first virtual object was displayed in response to the first movement of the first hand, and the second position, at which the first virtual object is displayed in response to the movement of the first portion of the computer system, correspond to different portions of the three-dimensional environment.

22. The non-transitory computer readable storage medium of claim 21, wherein detecting the second movement of the first hand includes detecting a swipe gesture by the first hand in the physical environment, and wherein the one or more programs include instructions, which when executed by the computer system, cause the computer system to:
in response to detecting the swipe gesture by the first hand and in accordance with a determination that the first hand is in a first configuration during the swipe gesture, move input focus from a first selectable control in the first virtual object to a second selectable control different from the first selectable control in the first virtual object in accordance with the second movement of the first hand.

23. The non-transitory computer readable storage medium of claim 21, wherein detecting the second movement of the first hand includes detecting a swipe gesture by the first hand in the physical environment, and wherein the one or more programs include instructions, which when executed by the computer system, cause the computer system to:

in response to detecting the swipe gesture by the first hand and in accordance with a determination that the first hand is in a second configuration during the swipe gesture, display a second plurality of selectable controls that were not included in the first virtual object prior to detecting the swipe gesture by the first hand in the second configuration.

24. The non-transitory computer readable storage medium of claim 21, wherein detecting the second movement of the first hand includes detecting a push gesture by the first hand, and wherein the one or more programs include instructions, which when executed by the computer system, cause the computer system to:

in response to detecting the push gesture by the first hand and in accordance with a determination that the push gesture meets activation criteria, select a respective selectable control of the first plurality of selectable controls in the first virtual object.

25. The non-transitory computer readable storage medium of claim 24, wherein the one or more programs include instructions, which when executed by the computer system, cause the computer system to:

in response to detecting the push gesture by the first hand, move the first virtual object in the first view of the three-dimensional environment in accordance with the movement of the first hand during the push gesture.

26. The non-transitory computer readable storage medium of claim 21, wherein the one or more programs include instructions, which when executed by the computer system, cause the computer system to:

in response to detecting the second movement of the first hand:

in accordance with a determination that the second movement of the first hand corresponds to placing the first hand into a third configuration, perform a first operation with respect to the first virtual object; and in accordance with a determination that the second movement of the first hand corresponds to placing the first hand into a fourth configuration that is different from the third configuration, perform a second operation that is different from the first operation with respect to the first virtual object.

27. The non-transitory computer readable storage medium of claim 21, wherein displaying, via the display generation component, the first view of the three-dimensional environment includes displaying a mixed-reality environment of a first application, and wherein displaying the first virtual object includes replacing or blocking a view of at least a portion of the mixed-reality environment of the first application.

28. The non-transitory computer readable storage medium of claim 21, wherein displaying the first virtual object that includes the first plurality of selectable controls includes:

in accordance with a determination that the three-dimensional environment corresponds to an environment of a first application, including a first set of selectable controls corresponding to the first application among the first plurality of selectable controls; and in accordance with a determination that the three-dimensional environment corresponds to an environment of a second application different from the first application, including a second set of selectable controls corresponding to the second application, different from the first set of selectable controls corresponding to the first application, among the first plurality of selectable controls.

29. The non-transitory computer readable storage medium of claim 21, wherein the three-dimensional environment includes a mixed reality environment of a first application, and wherein the one or more programs include instructions, which when executed by the computer system, cause the computer system to:

while displaying the first virtual object within the first view of the three-dimensional environment, detect a third movement of the first hand; and in response to detecting the third movement of the first hand and in accordance with a determination that the third movement of the first hand meets preset criteria for exiting the first application, cease to display the first virtual object and the first view of the three-dimensional environment, and display a view of the physical environment and a home menu that includes respective selectable controls for activating different applications.

30. The non-transitory computer readable storage medium of claim 21, wherein:

the first view of the three-dimensional environment corresponds to a first viewpoint and the second view of the three-dimensional environment corresponds to a second viewpoint different from the first viewpoint; and the first virtual object displayed at the first position in the first view of the three-dimensional environment has a first spatial relationship with the first viewpoint, and the first virtual object displayed at the second position in the second view of the three-dimensional environment has the first spatial relationship with the second viewpoint.

* * * * *